US012739366B2

(12) United States Patent
Drugeon et al.

(10) Patent No.: US 12,739,366 B2
(45) Date of Patent: Sep. 15, 2026

(54) DECODING METHOD, ENCODING METHOD, DECODER, AND, ENCODER

(71) Applicant: Panasonic Intellectual Property Corporation of America, Torrance, CA (US)

(72) Inventors: Virginie Drugeon, Darmstadt (DE); Kiyofumi Abe, Osaka (JP); Takahiro Nishi, Nara (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/904,357

(22) Filed: Oct. 2, 2024

(65) Prior Publication Data

US 2025/0030846 A1 Jan. 23, 2025

Related U.S. Application Data

(63) Continuation of application No. PCT/JP2023/014813, filed on Apr. 12, 2023.

(30) Foreign Application Priority Data

Apr. 13, 2022 (EP) .................................... 22168179

(51) Int. Cl.
*H04N 19/11* (2014.01)
*H04N 19/119* (2014.01)
(Continued)

(52) U.S. Cl.
CPC ........... *H04N 19/11* (2014.11); *H04N 19/119* (2014.11); *H04N 19/159* (2014.11);
(Continued)

(58) Field of Classification Search
CPC .... H04N 19/11; H04N 19/119; H04N 19/159; H04N 19/167; H04N 19/176; H04N 19/593; H04N 19/107; H04N 19/134
See application file for complete search history.

(56) References Cited

U.S. PATENT DOCUMENTS 11,997,262 B2 * 5/2024 Iwamura .............. H04N 19/186
2020/0014947 A1 * 1/2020 Abe ..................... H04N 19/117
(Continued)

OTHER PUBLICATIONS

International Search Report (ISR) issued on Jun. 20, 2023 in International (PCT) Application No. PCT/JP2023/014813.
(Continued)

*Primary Examiner* — Shadan E Haghani
(74) *Attorney, Agent, or Firm* — Wenderoth, Lind & Ponack, L.L.P.

(57) ABSTRACT

A decoding method includes: determining two partitions in a current block according to a geometric partitioning mode; deriving an angular intra prediction mode from the geometric partitioning mode using a mapping relation between geometric partitioning modes and angular intra prediction modes; and predicting a first partition among the two partitions according to the angular intra prediction mode, in which in the deriving of the angular intra prediction mode, when a shape of the current block is square, a first mapping relation is used to derive the angular intra prediction mode, and when the shape of the current block is not square, a second mapping relation different from the first mapping relation is used to derive the angular intra prediction mode.

15 Claims, 122 Drawing Sheets

(51) Int. Cl.
*H04N 19/159* (2014.01)
*H04N 19/167* (2014.01)
*H04N 19/176* (2014.01)
*H04N 19/593* (2014.01)

(52) U.S. Cl.
CPC ......... *H04N 19/167* (2014.11); *H04N 19/176* (2014.11); *H04N 19/593* (2014.11)

(56) References Cited

U.S. PATENT DOCUMENTS

| | | | | |
|---|---|---|---|---|
| 2024/0146907 A1* | 5/2024 | Deng | ................... | H04N 19/105 |
| 2025/0274581 A1* | 8/2025 | Lim | ..................... | H04N 19/105 |

OTHER PUBLICATIONS

H.265 (ISO/IEC 23008-2 HEVC) / HEVC (High Efficiency Video Coding), Dec. 1, 2013.

Mohsen Abdoli, et al., "Non-CE3: Decoder-side Intra Mode Derivation with Prediction Fusion Using Planar", Joint Video Experts Team (JVET) of ITU-T SG 16 WP 3 and ISO/IEC JTC 1/SC 29/WG 11, Document: JVET-O0449-v2, Jul. 2019.

Keming Cao, et al., "EE2-related: Fusion for template-based intra mode derivation", Joint Video Experts Team (JVET) of ITU-T SG 16 WP 3 and ISO/IEC JTC 1/SC 29, Document: JVET-W0123-v2, Jul. 2021.

Extended European Search Report issued on Oct. 11, 2022 in European Patent Application No. 22168179.4 which is the priority application of the present application.

Muhammed Coban, et al., "Algorithm description of Enhanced Compression Model 4 (ECM 4)", Joint Video Experts Team (JVET) of ITU-T SG 16 WP 3 and ISO/IEC JTC 1/SC 29, Document: JVET-Y2025, Jul. 2021.

Adrian Browne, et al., "Algorithm description for Versatile Video Coding and Test Model 16 (VTM16)", Joint Video Experts Team (JVET) of ITU-T SG 16 WP 3 and ISO/IEC JTC 1/SC 29, Document: JVET-Y2002-v1, Jan. 2022.

Kevin Reuzé, et al., "CE4-related: GEO with 32 modes", Joint Video Experts Team (JVET) of ITU-T SG 16 WP 3 and ISO/IEC JTC 1/SC 29/WG 11, Document: JVET-Q0268_v2, Jan. 2020.

* cited by examiner (a) VIDEO SEQUENCE
VPS SPS PPS PPS SEI SEI PICTURE PICTURE PICTURE (b) PICTURE
PICTURE HEADER SLICE SLICE ... SLICE (c) SLICE
SLICE HEADER BRICK BRICK ... BRICK (d) BRICK
CTU CTU CTU CTU ... CTU (e) CODING TREE UNIT
CTU HEADER CU(10) CU(11) CU(12) CU(13)
CU (10)
CU (110) CU (111) CU (112) CU (113)
CU (12)
CU (132) CU (133) CU (134)
CU (1310) CU (1311) CU (1312) CU (1313)
CU(10) CU(12)

(f) CODING UNIT
CU HEADER PREDICTION INFORMATION RESIDUAL COEFFICIENT INFORMATION (TU)

FIG. 14

| TRANSFORM TYPE | BASIS FUNCTION $T_i(j)$, $i, j = 0, 1, \ldots, N-1$ |
|---|---|
| DCT - II | $T_i(j) = \omega_0 \cdot \sqrt{\frac{2}{N}} \cdot \cos\left(\frac{\pi \cdot i \cdot (2j+1)}{2N}\right)$ <br> WHERE $\omega_0 = \begin{cases} \sqrt{\frac{2}{N}} & i = 0 \\ 1 & i \neq 0 \end{cases}$ |
| DCT - V | $T_i(j) = \omega_0 \cdot \omega_1 \cdot \sqrt{\frac{2}{2N-1}} \cdot \cos\left(\frac{2\pi \cdot i \cdot j}{2N-1}\right)$ <br> WHERE $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT - VIII | $T_i(j) = \sqrt{\frac{4}{2N+1}} \cdot \cos\left(\frac{\pi \cdot (2i+1) \cdot (2j+1)}{4N+2}\right)$ |
| DST - I | $T_i(j) = \sqrt{\frac{2}{N+1}} \cdot \sin\left(\frac{\pi \cdot (i+1) \cdot (j+1)}{N+1}\right)$ |
| DST - VII | $T_i(j) = \sqrt{\frac{4}{2N+1}} \cdot \sin\left(\frac{\pi \cdot (2i+1) \cdot (j+1)}{2N+1}\right)$ |

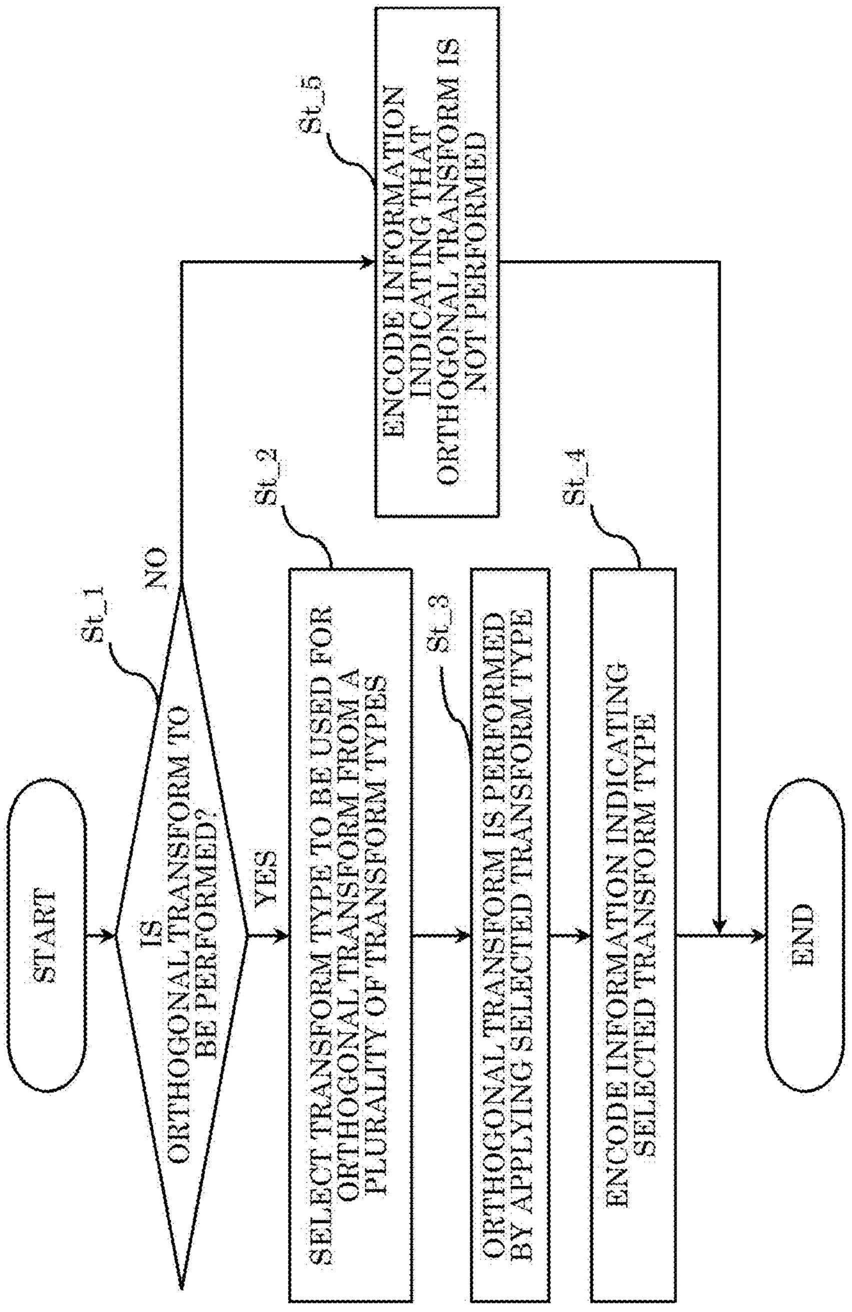

FIG. 16

START

St_1

IS ORTHOGONAL TRANSFORM TO BE PERFORMED?

YES

NO

St_2

SELECT TRANSFORM TYPE TO BE USED FOR ORTHOGONAL TRANSFORM FROM A PLURALITY OF TRANSFORM TYPES

St_3

ORTHOGONAL TRANSFORM IS PERFORMED BY APPLYING SELECTED TRANSFORM TYPE

St_4

ENCODE INFORMATION INDICATING SELECTED TRANSFORM TYPE

St_5

ENCODE INFORMATION INDICATING THAT ORTHOGONAL TRANSFORM IS NOT PERFORMED

END

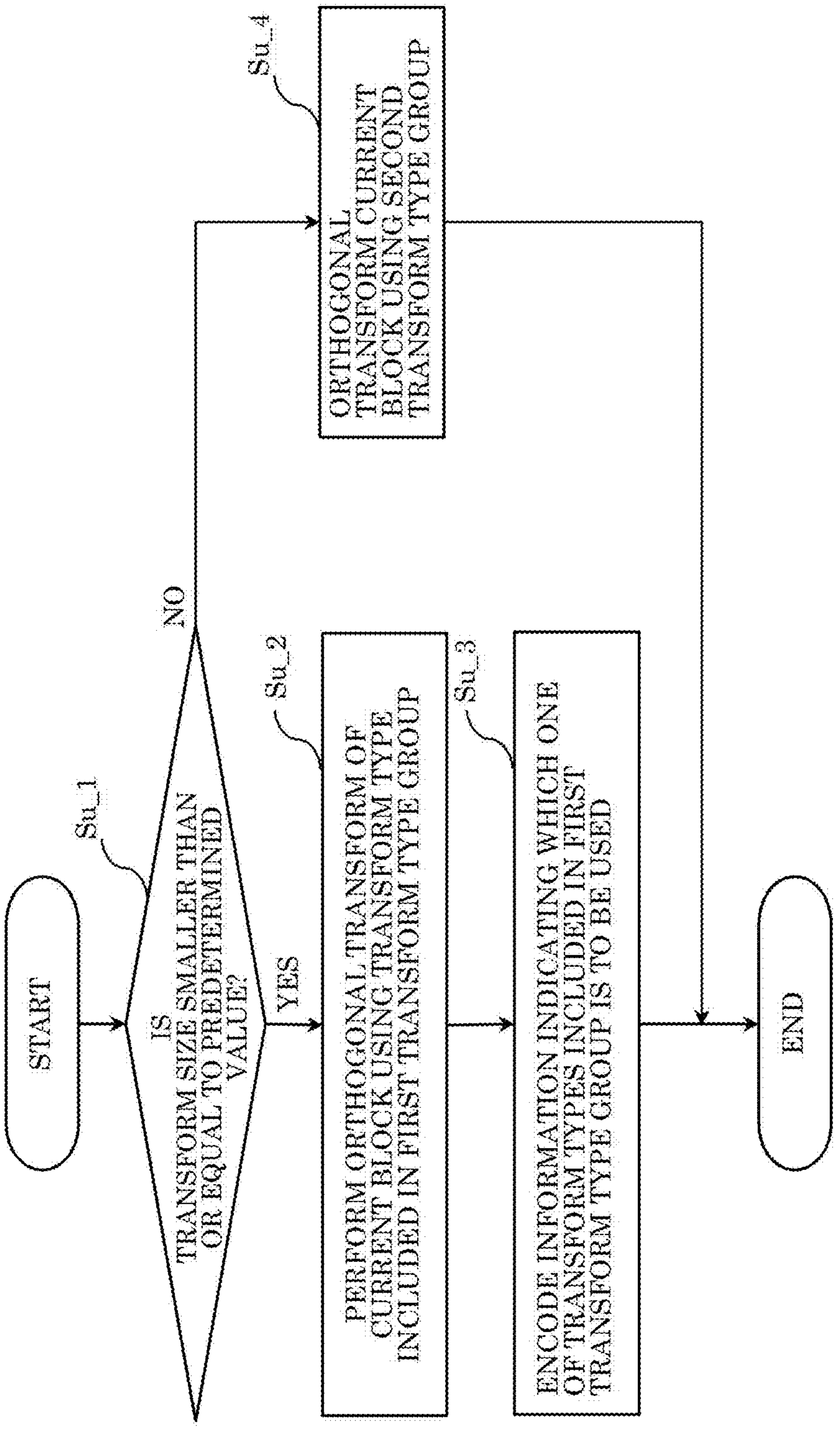

FIG. 17

START

Su_1

IS TRANSFORM SIZE SMALLER THAN OR EQUAL TO PREDETERMINED VALUE?

YES

NO

Su_2

PERFORM ORTHOGONAL TRANSFORM OF CURRENT BLOCK USING TRANSFORM TYPE INCLUDED IN FIRST TRANSFORM TYPE GROUP

Su_3

ENCODE INFORMATION INDICATING WHICH ONE OF TRANSFORM TYPES INCLUDED IN FIRST TRANSFORM TYPE GROUP IS TO BE USED

Su_4

ORTHOGONAL TRANSFORM CURRENT BLOCK USING SECOND TRANSFORM TYPE GROUP

END

FIG. 23G

| Index | 1 | 2 | 3 | 4 | 5 | 6 | 7 |
|---|---|---|---|---|---|---|---|
| $\|w\|$ | 1/4 | 1/2 | 3/4 | 1 | 4 | 2 | 4/3 |

120a

IMAGE TO BE FILTERED

1201 BOUNDARY DETERMINER

1202 NO YES

1203 FILTER DETERMINER

1204 OFF DETERMINATION ON DETERMINATION

1205 FILTERING EXECUTOR

1207 FILTER CHARACTERISTIC DETERMINER

1208 PROCESS DETERMINER

1206

FILTERED IMAGE $q'0 = (p1 + 2 \times p0 + 2 \times q0 + 2 \times q1 + q2 + 4) / 8$ $q'1 = (p0 + q0 + q1 + q2 + 2) / 4$ $q'2 = (p0 + q0 + q1 + 3 \times q2 + 2 \times q3 + 4) / 8$

FIG. 27

| CONDITIONS FOR BLOCKS P AND Q LOCATED ACROSS BOUNDARY FOR WHICH Bs VALUE IS TO BE DETERMINED | Bs VALUES |
| --- | --- |
| - AT LEAST ONE OF THE BLOCKS IS INTRA PREDICTION BLOCK | 2 |
| - AT LEAST ONE OF THE BLOCKS INCLUDES NON-ZERO TRANSFORM COEFFICIENT AND HAS A SIDE WHICH COINCIDES WITH BOUNDARY BETWEEN ORTHOGONAL TRANSFORM BLOCKS | 1 |
| - ABSOLUTE VALUE OF DIFFERENCE BETWEEN MOTION VECTORS OF THE TWO BLOCKS ACROSS BOUNDARY CORRESPONDS TO ONE OR MORE PIXELS | 1 |
| - REFERENCE IMAGES FOR MOTION COMPENSATION OF THE TWO BLOCKS ACROSS BOUNDARY OR THE NUMBERS OF MOTION VECTORS OF THE TWO BLOCKS ARE DIFFERENT | 1 |
| - THE OTHERS | 0 |

START
Sc_1a
GENERATE PREDICTION IMAGE USING FIRST METHOD
Sc_1b
GENERATE PREDICTION IMAGE USING SECOND METHOD
Sc_1c
GENERATE PREDICTION IMAGE USING THIRD METHOD
Sc_2
EVALUATION
Sc_3
SELECT PREDICTION
END

FIG. 38A

| MV DERIVATION MODE | | MOTION INFORMATION | MV DIFFERENCE |
|---|---|---|---|
| INTER MODE | | ○ | ○ |
| MERGE MODE | OTHER THAN MMVD MODE | ○ | × |
| | MMVD MODE | ○ | △ |
| FRUC MODE | | × | × |

MERGE MODE

CATEGORIZATION BY LIST AND MC SHAPE

NORMAL MERGE MODE

MMVD MODE

CIIP MODE

TRIANGLE MODE

ATMVP MODE

AFFINE MERGE MODE

AFFINE MODE

INTER MODE

AFFINE INTER MODE

NORMAL INTER MODE

FRUC MODE

FRUC MODE

<REFERENCE INFORMATION>
<STREAM OUTPUT>
START
START LOOP FOR EACH BLOCK
OBTAIN MV CANDIDATE (GENERATE MV CANDIDATE LIST)
Sg_1
MV OF ENCODED BLOCK
EXTRACT MV PREDICTOR CANDIDATES
Sg_2
SELECT MV PREDICTOR
Sg_3
MV PREDICTOR SELECTION INFORMATION
DERIVE MV
Sg_4
MV DIFFERENCE
MOTION COMPENSATION PROCESS
Sg_5
ENCODED REFERENCE PICTURE
END LOOP FOR EACH BLOCK
END

MV CANDIDATE LIST

| | |
|---|---|
| 1 | SPATIALLY NEIGHBORING MV CANDIDATE 1 |
| 2 | SPATIALLY NEIGHBORING MV CANDIDATE 2 |
| 3 | SPATIALLY NEIGHBORING MV CANDIDATE 3 |
| 4 | TEMPORALLY NEIGHBORING MV CANDIDATE P |
| 5 | |
| 6 | |

HMVP FIFO BUFFER

HMVP1 HMVP2 HMVP3 HMVP4 HMVP5

SEARCH HMVP DIFFERENT FROM REGISTERED MV CANDIDATE

<REFERENCE INFORMATION>

MV OF ENCODED BLOCK

ENCODED REFERENCE

START

START LOOP FOR EACH BLOCK

DERIVE MV AT CONTROL POINT

Sk_1

<STREAM OUTPUT>

MV SELECTION INFORMATION

LOOP FOR EACH SUB-BLOCK

CALCULATE AFFINE MV

Sk_2

AFFINE MOTION COMPENSATION

Sk_3

LOOP FOR EACH SUB-BLOCK

END LOOP FOR EACH BLOCK

END

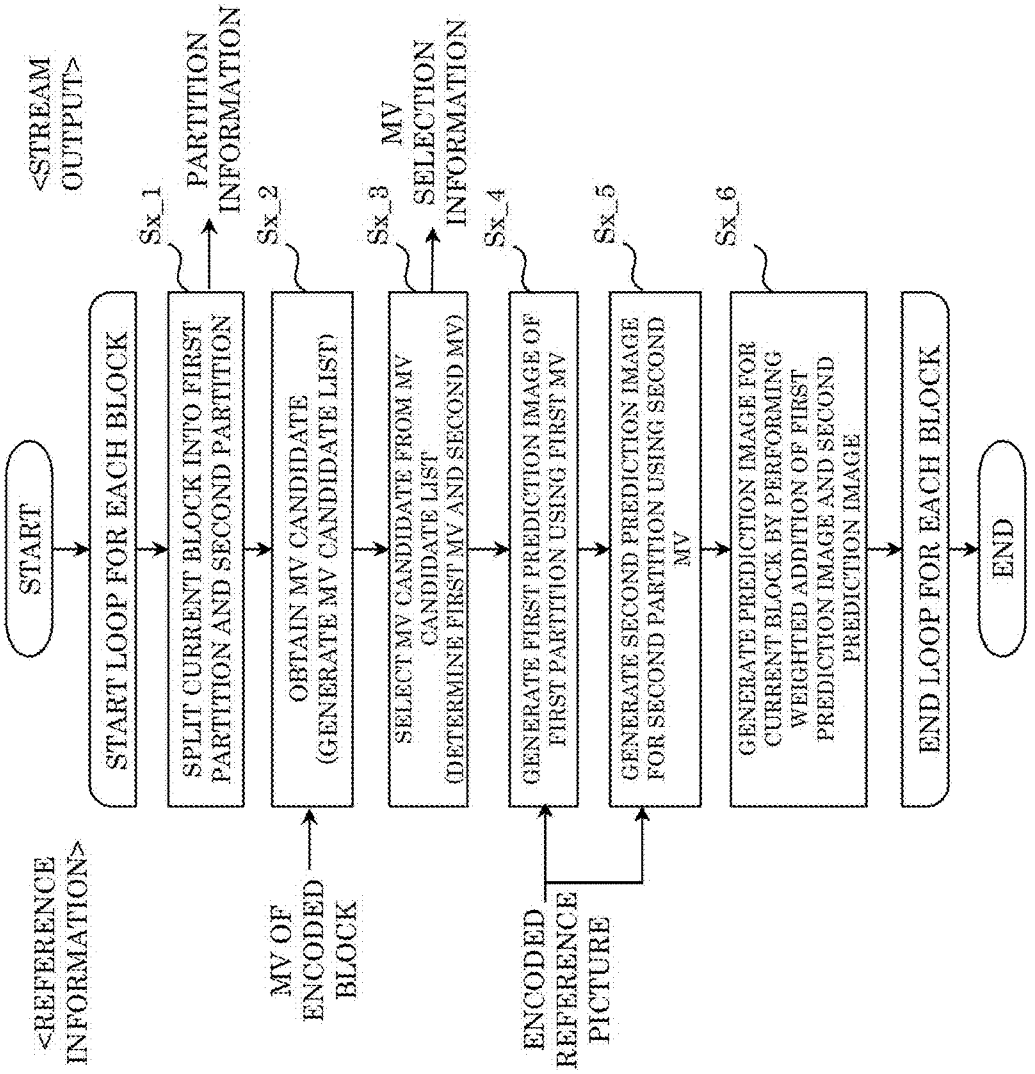

FIG. 53
<REFERENCE INFORMATION>
<STREAM OUTPUT>
START
START LOOP FOR EACH BLOCK
Sx_1
SPLIT CURRENT BLOCK INTO FIRST PARTITION AND SECOND PARTITION
PARTITION INFORMATION
Sx_2
MV OF ENCODED BLOCK
OBTAIN MV CANDIDATE (GENERATE MV CANDIDATE LIST)
Sx_3
SELECT MV CANDIDATE FROM MV CANDIDATE LIST (DETERMINE FIRST MV AND SECOND MV)
MV SELECTION INFORMATION
Sx_4
ENCODED REFERENCE PICTURE
GENERATE FIRST PREDICTION IMAGE OF FIRST PARTITION USING FIRST MV
Sx_5
GENERATE SECOND PREDICTION IMAGE FOR SECOND PARTITION USING SECOND MV
Sx_6
GENERATE PREDICTION IMAGE FOR CURRENT BLOCK BY PERFORMING WEIGHTED ADDITION OF FIRST PREDICTION IMAGE AND SECOND PREDICTION IMAGE
END LOOP FOR EACH BLOCK
END

START
DERIVE MV IN MERGE MODE
Sl_1
IS MV ESTIMATION TO BE PERFORMED?
Sl_2
YES
NO
DERIVE FINAL MV BY ESTIMATING SURROUNDING REGION OF DERIVED MV
Sl_3
DETERMINE DERIVED MV AS FINAL MV
Sl_4
DMVR
END

START
STEP 1
IS COST AT POINT OTHER THAN STARTING POINT SMALLEST?
YES
NO
STEP 2
IS COST AT POINT OTHER THAN STARTING POINT SMALLEST?
YES
NO
STEP 3
STEP 4
END

START

OBTAIN MV OF LEFT NEIGHBORING BLOCK — MV_L

OBTAIN PREDICTION IMAGE BY MV_L — Pred_L

CORRECT PREDICTION IMAGE BY WEIGHTED OVERLAPPING OF Pred_L — Pred+Pred_L

OBTAIN MV OF UPPER NEIGHBORING BLOCK — MV_U

OBTAIN PREDICTION IMAGE BY MV_U — Pred_U

CORRECT PREDICTION IMAGE BY WEIGHTED OVERLAPPING OF Pred_U — Pred+Pred_L+Pred_U

END

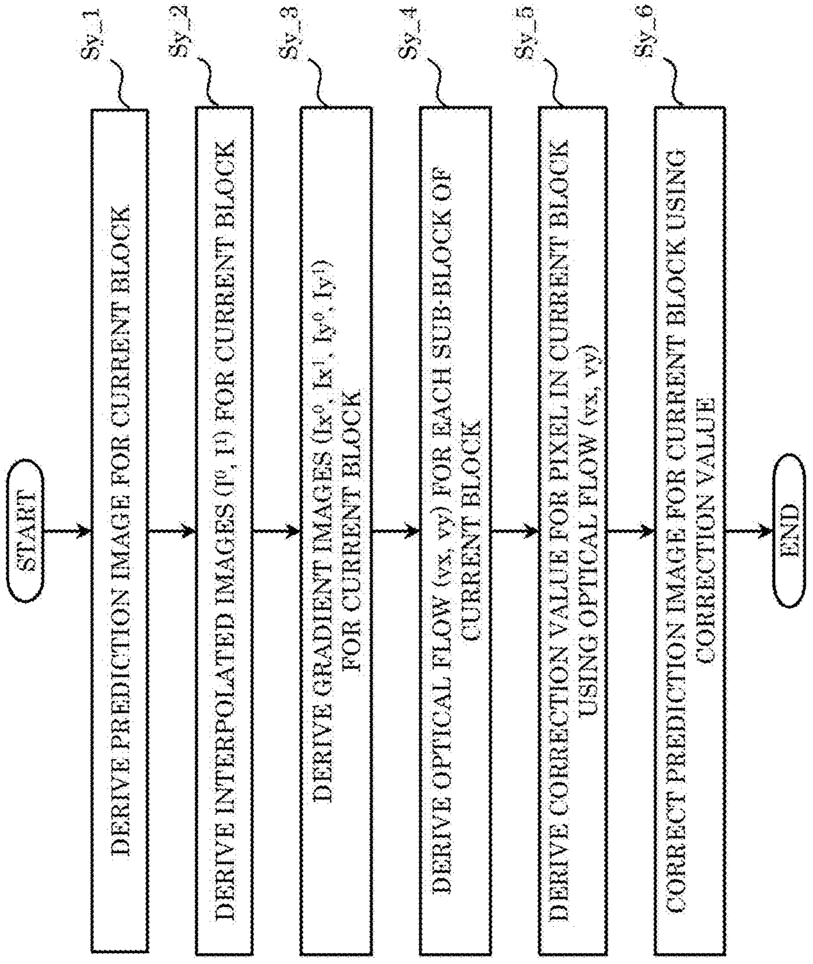

FIG. 64

START

DERIVE PREDICTION IMAGE FOR CURRENT BLOCK (Sy_1)

DERIVE INTERPOLATED IMAGES ($I^0$, $I^1$) FOR CURRENT BLOCK (Sy_2)

DERIVE GRADIENT IMAGES ($Ix^0$, $Ix^1$, $Iy^0$, $Iy^1$) FOR CURRENT BLOCK (Sy_3)

DERIVE OPTICAL FLOW (vx, vy) FOR EACH SUB-BLOCK OF CURRENT BLOCK (Sy_4)

DERIVE CORRECTION VALUE FOR PIXEL IN CURRENT BLOCK USING OPTICAL FLOW (vx, vy) (Sy_5)

CORRECT PREDICTION IMAGE FOR CURRENT BLOCK USING CORRECTION VALUE (Sy_6)

END

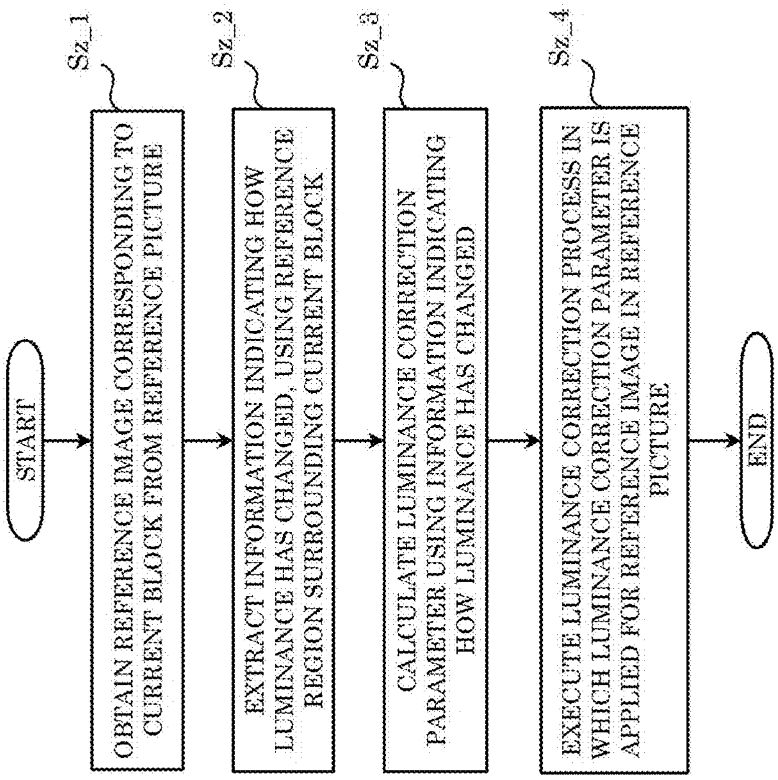

FIG. 66B

START

OBTAIN REFERENCE IMAGE CORRESPONDING TO CURRENT BLOCK FROM REFERENCE PICTURE (Sz_1)

EXTRACT INFORMATION INDICATING HOW LUMINANCE HAS CHANGED, USING REFERENCE REGION SURROUNDING CURRENT BLOCK (Sz_2)

CALCULATE LUMINANCE CORRECTION PARAMETER USING INFORMATION INDICATING HOW LUMINANCE HAS CHANGED (Sz_3)

EXECUTE LUMINANCE CORRECTION PROCESS IN WHICH LUMINANCE CORRECTION PARAMETER IS APPLIED FOR REFERENCE IMAGE IN REFERENCE PICTURE (Sz_4)

END

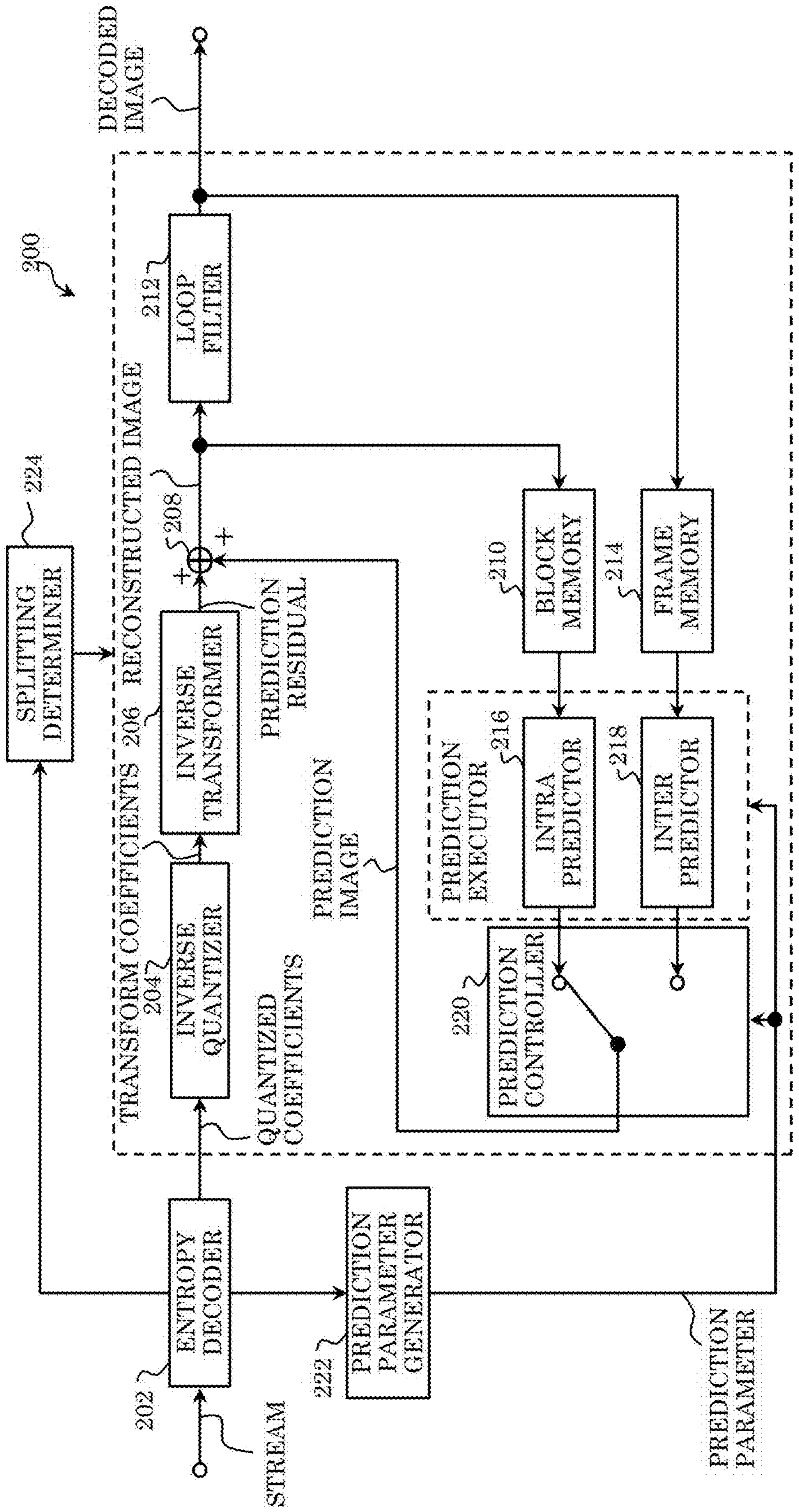

FIG. 67
200
STREAM
202
ENTROPY DECODER
QUANTIZED COEFFICIENTS
204
INVERSE QUANTIZER
TRANSFORM COEFFICIENTS
206
INVERSE TRANSFORMER
PREDICTION RESIDUAL
208
RECONSTRUCTED IMAGE
212
LOOP FILTER
DECODED IMAGE
224
SPLITTING DETERMINER
210
BLOCK MEMORY
214
FRAME MEMORY
PREDICTION EXECUTOR
216
INTRA PREDICTOR
218
INTER PREDICTOR
220
PREDICTION CONTROLLER
PREDICTION IMAGE
222
PREDICTION PARAMETER GENERATOR
PREDICTION PARAMETER

START DECODING
DETERMINE SPLITTING PATTERN
Sp_1
START PROCESSING OF EACH BLOCK
DECODE COEFFICIENT / PREDICTION PARAMETER
Sp_2
RESTORE PREDICTION RESIDUAL
Sp_3
GENERATE PREDICTION IMAGE
Sp_4
GENERATE RECONSTRUCTED IMAGE
Sp_5
FILTERING
Sp_6
END PROCESSING OF EACH BLOCK
HAS DECODING OF ENTIRE PICTURE BEEN FINISHED?
Sp_7
NO
YES
END DECODING

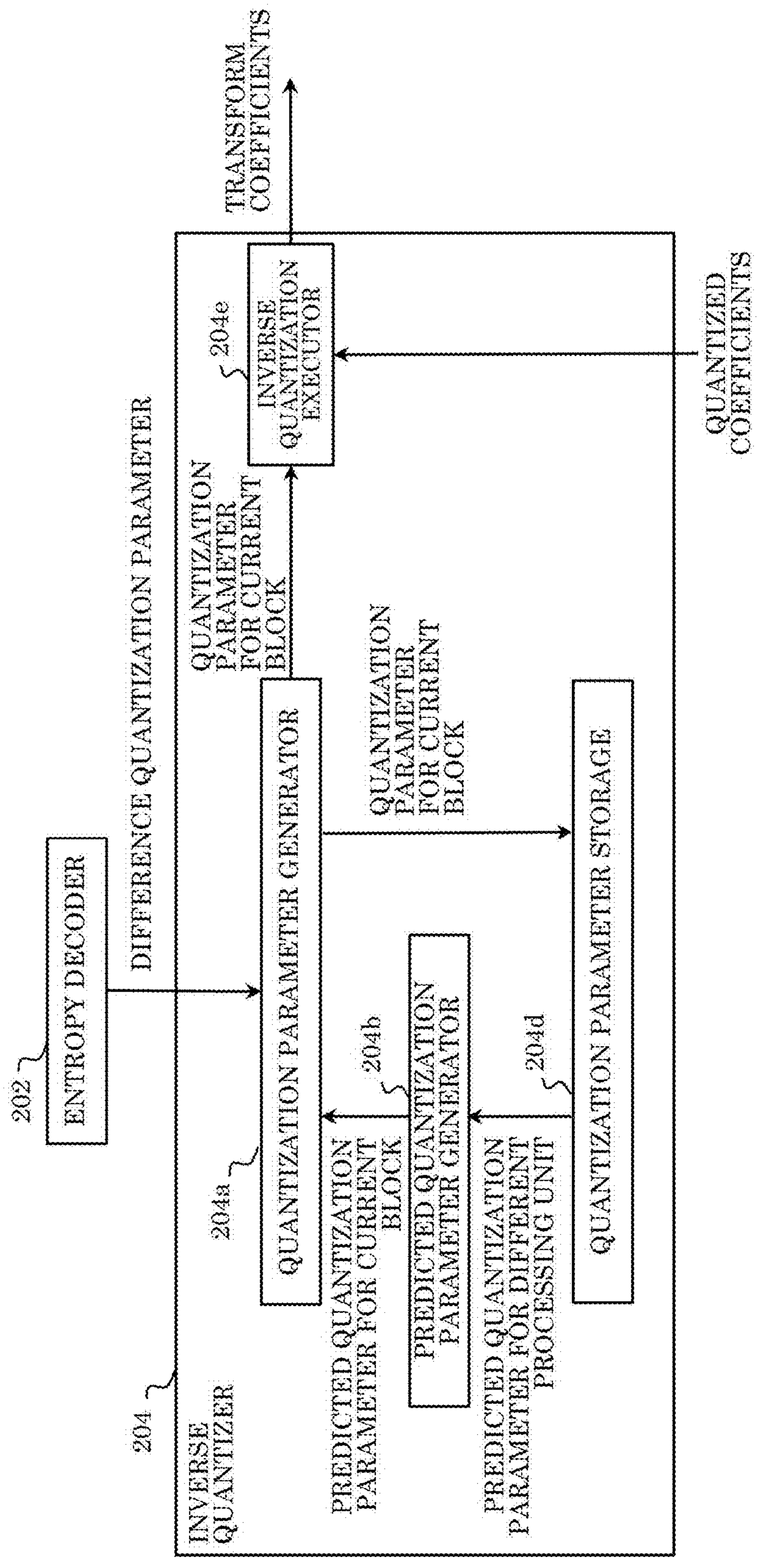

FIG. 73

202
ENTROPY DECODER
DIFFERENCE QUANTIZATION PARAMETER
204
INVERSE QUANTIZER
204a
QUANTIZATION PARAMETER GENERATOR
QUANTIZATION PARAMETER FOR CURRENT BLOCK
204e
INVERSE QUANTIZATION EXECUTOR
TRANSFORM COEFFICIENTS
PREDICTED QUANTIZATION PARAMETER FOR CURRENT BLOCK
204b
PREDICTED QUANTIZATION PARAMETER GENERATOR
QUANTIZATION PARAMETER FOR CURRENT BLOCK
PREDICTED QUANTIZATION PARAMETER FOR DIFFERENT PROCESSING UNIT
204d
QUANTIZATION PARAMETER STORAGE
QUANTIZED COEFFICIENTS

START

St_11

IS INFORMATION INDICATING THAT NO ORTHOGONAL TRANSFORM IS PERFORMED PRESENT?

YES

NO

St_12

OBTAIN INFORMATION INDICATING TRANSFORM TYPE

St_13

DETERMINE TRANSFORM TYPE USED FOR ORTHOGONAL TRANSFORM

St_14

PERFORM INVERSE ORTHOGONAL TRANSFORM USING DETERMINED TRANSFORM TYPE

END

START
Sr_1
WHICH MODE IS DETERMINED?
FIRST METHOD
SECOND METHOD
THIRD METHOD
Sr_2a
GENERATE PREDICTION IMAGE USING FIRST METHOD
Sr_2b
GENERATE PREDICTION IMAGE USING SECOND METHOD
Sr_2c
GENERATE PREDICTION IMAGE USING THIRD METHOD
END

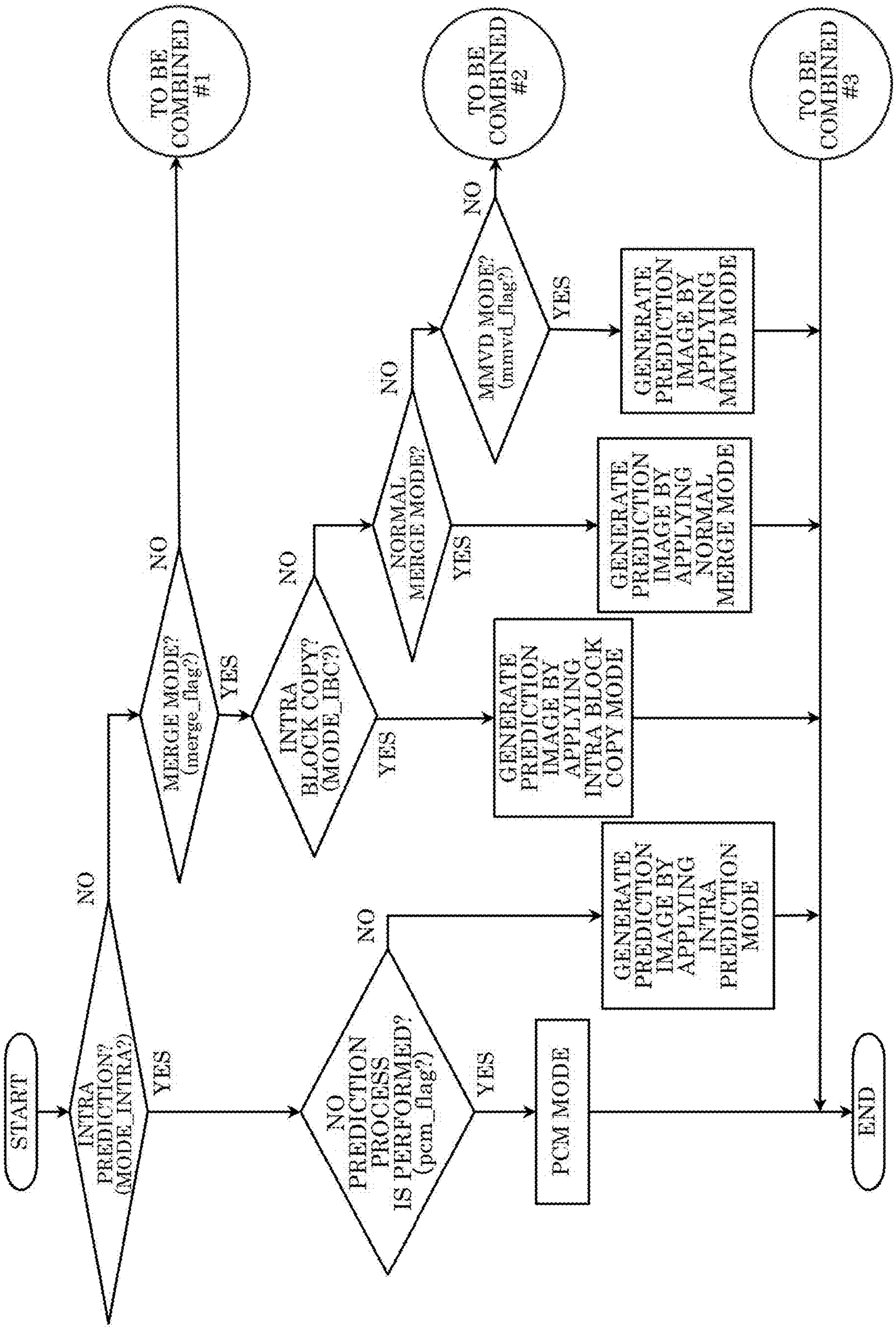

FIG. 80A

START

INTRA PREDICTION? (MODE_INTRA?)

NO

YES

MERGE MODE? (merge_flag?)

NO

TO BE COMBINED #1

YES

INTRA BLOCK COPY? (MODE_IBC?)

NO

NO PREDICTION PROCESS IS PERFORMED? (pcm_flag?)

NO

YES

NORMAL MERGE MODE?

NO

YES

YES

MMVD MODE? (mmvd_flag?)

NO

TO BE COMBINED #2

PCM MODE

GENERATE PREDICTION IMAGE BY APPLYING INTRA BLOCK COPY MODE

YES

GENERATE PREDICTION IMAGE BY APPLYING INTRA PREDICTION MODE

GENERATE PREDICTION IMAGE BY APPLYING NORMAL MERGE MODE

GENERATE PREDICTION IMAGE BY APPLYING MMVD MODE

TO BE COMBINED #3

END

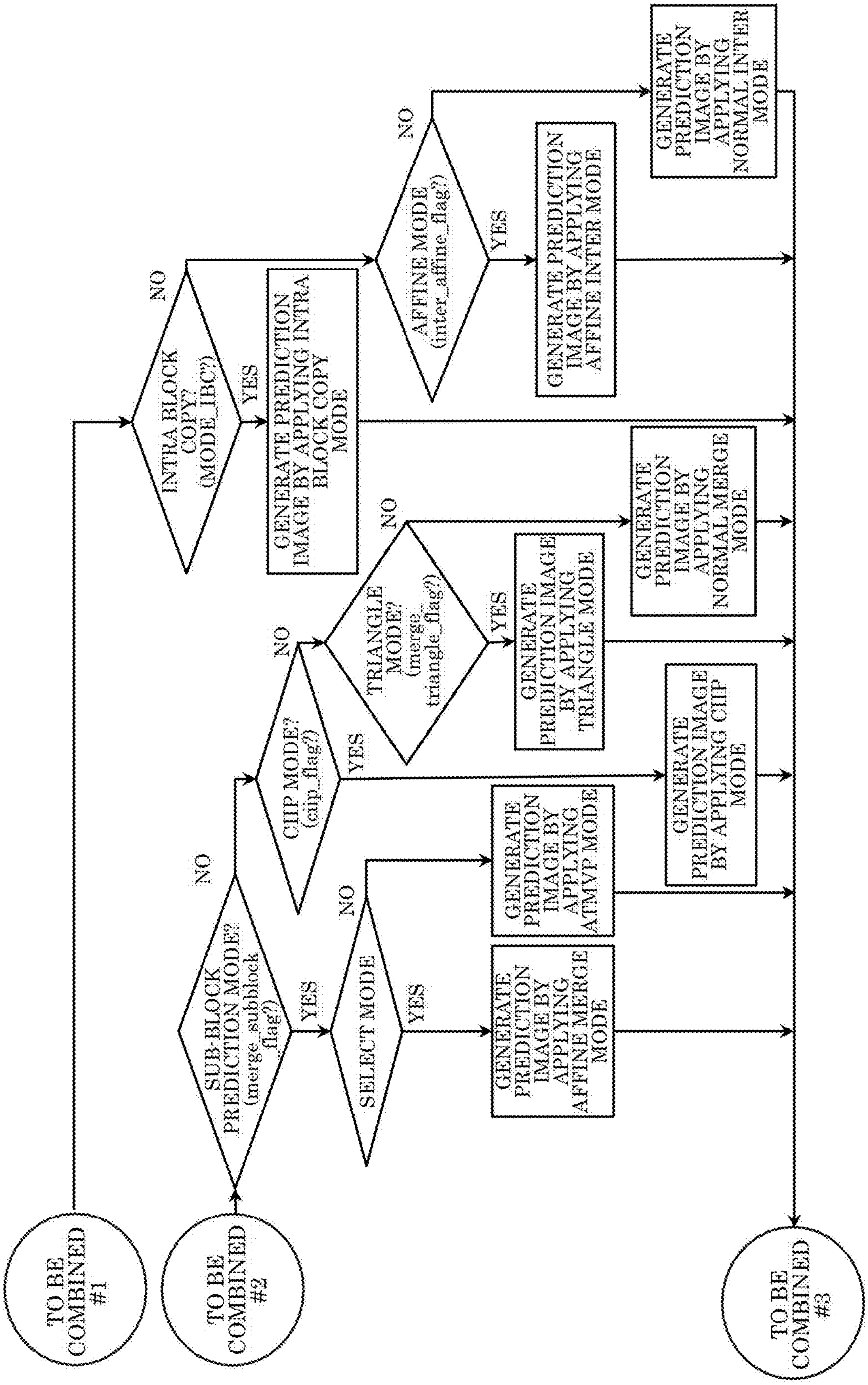

FIG. 80B
TO BE COMBINED #1
TO BE COMBINED #2
SUB-BLOCK PREDICTION MODE? (merge_subblock_flag?)
NO
YES
SELECT MODE
NO
YES
GENERATE PREDICTION IMAGE BY APPLYING AFFINE MERGE MODE
GENERATE PREDICTION IMAGE BY APPLYING ATMVP MODE
CIIP MODE? (ciip_flag?)
NO
YES
GENERATE PREDICTION IMAGE BY APPLYING CIIP MODE
TRIANGLE MODE? (merge_triangle_flag?)
NO
YES
GENERATE PREDICTION IMAGE BY APPLYING TRIANGLE MODE
GENERATE PREDICTION IMAGE BY APPLYING NORMAL MERGE MODE
INTRA BLOCK COPY? (MODE_IBC?)
NO
YES
GENERATE PREDICTION IMAGE BY APPLYING INTRA BLOCK COPY MODE
AFFINE MODE (inter_affine_flag?)
NO
YES
GENERATE PREDICTION IMAGE BY APPLYING AFFINE INTER MODE
GENERATE PREDICTION IMAGE BY APPLYING NORMAL INTER MODE
TO BE COMBINED #3

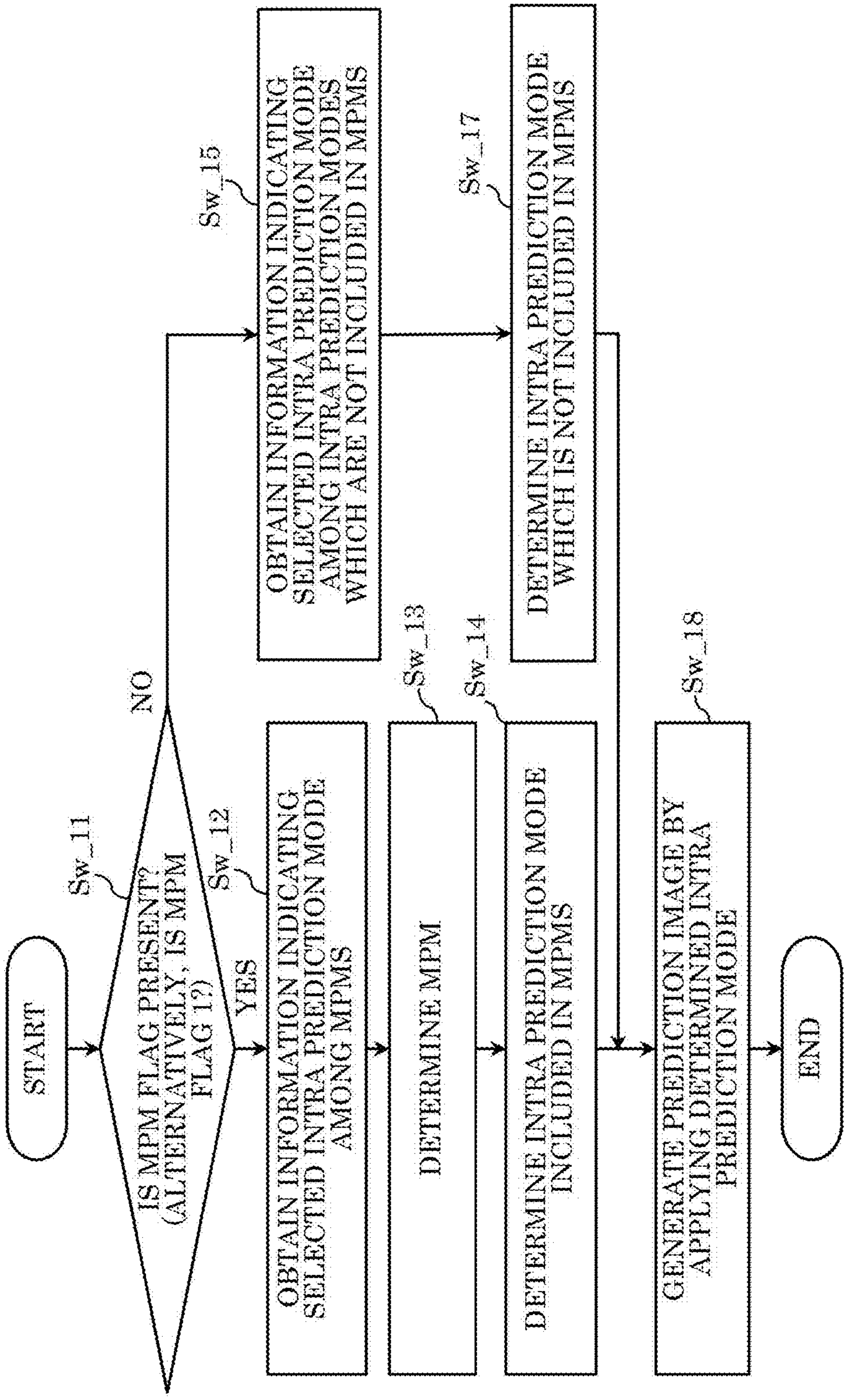

FIG. 81
START
IS MPM FLAG PRESENT? (ALTERNATIVELY, IS MPM FLAG 1?)
Sw_11
YES
NO
OBTAIN INFORMATION INDICATING SELECTED INTRA PREDICTION MODE AMONG MPMS
Sw_12
DETERMINE MPM
Sw_13
DETERMINE INTRA PREDICTION MODE INCLUDED IN MPMS
Sw_14
OBTAIN INFORMATION INDICATING SELECTED INTRA PREDICTION MODE AMONG INTRA PREDICTION MODES WHICH ARE NOT INCLUDED IN MPMS
Sw_15
DETERMINE INTRA PREDICTION MODE WHICH IS NOT INCLUDED IN MPMS
Sw_17
GENERATE PREDICTION IMAGE BY APPLYING DETERMINED INTRA PREDICTION MODE
Sw_18
END

START

IS MOTION INFORMATION TO BE DECODED?

YES

NO

DERIVE MV IN MODE IN WHICH MOTION INFORMATION IS DECODED

NORMAL INTER, NORMAL MERGE, AFFINE

DERIVE MV IN MODE IN WHICH NO MOTION INFORMATION IS DECODED

FRUC

END

START

IS MV DIFFERENCE TO BE DECODED?

YES

NO

DERIVE MV IN MODE IN WHICH MV DIFFERENCE IS DECODED

NORMAL INTER, (AFFINE)

DERIVE MV IN MODE IN WHICH NO MV DIFFERENCE IS DECODED

FRUC, NORMAL MERGE, (AFFINE)

END

<REFERENCE INFORMATION>

<STREAM INPUT>

START

START LOOP FOR EACH BLOCK

MV OF DECODED BLOCK → OBTAIN MV CANDIDATE (GENERATE MV CANDIDATE LIST) — Sg_11

EXTRACT MV PREDICTOR CANDIDATES — Sg_12

SELECT MV PREDICTOR — Sg_13 ← MV PREDICTOR SELECTION INFORMATION

DERIVE MV — Sg_14 ← MV DIFFERENCE

DECODED REFERENCE PICTURE → MOTION COMPENSATION PROCESS — Sg_15

END LOOP FOR EACH BLOCK

END

<REFERENCE INFORMATION>

<STREAM INPUT>

START

START LOOP FOR EACH BLOCK

MV OF DECODED BLOCK

OBTAIN MV CANDIDATE (GENERATE MV CANDIDATE LIST) Si_11

DECODED REFERENCE PICTURE

SELECT BEST MV CANDIDATE Si_12

ESTIMATION IN REGION SURROUNDING BEST MV CANDIDATE Si_14

MOTION COMPENSATION PROCESS Si_15

END LOOP FOR EACH BLOCK

END

START

STEP 1

IS COST AT POINT OTHER THAN STARTING POINT SMALLEST?

YES

NO

STEP 2

IS COST AT POINT OTHER THAN STARTING POINT SMALLEST?

YES

NO

STEP 3

STEP 4

END

START
OBTAIN MV OF LEFT NEIGHBORING BLOCK
MV_L
OBTAIN PREDICTION IMAGE BY MV_L
Pred_L
CORRECT PREDICTION IMAGE BY WEIGHTED OVERLAPPING OF Pred_L
Pred+Pred_L
OBTAIN MV OF UPPER NEIGHBORING BLOCK
MV_U
OBTAIN PREDICTION IMAGE BY MV_U
Pred_U
CORRECT PREDICTION IMAGE BY WEIGHTED OVERLAPPING OF Pred_U
Pred+Pred_L+Pred_U
END
OBMC BY DECODER

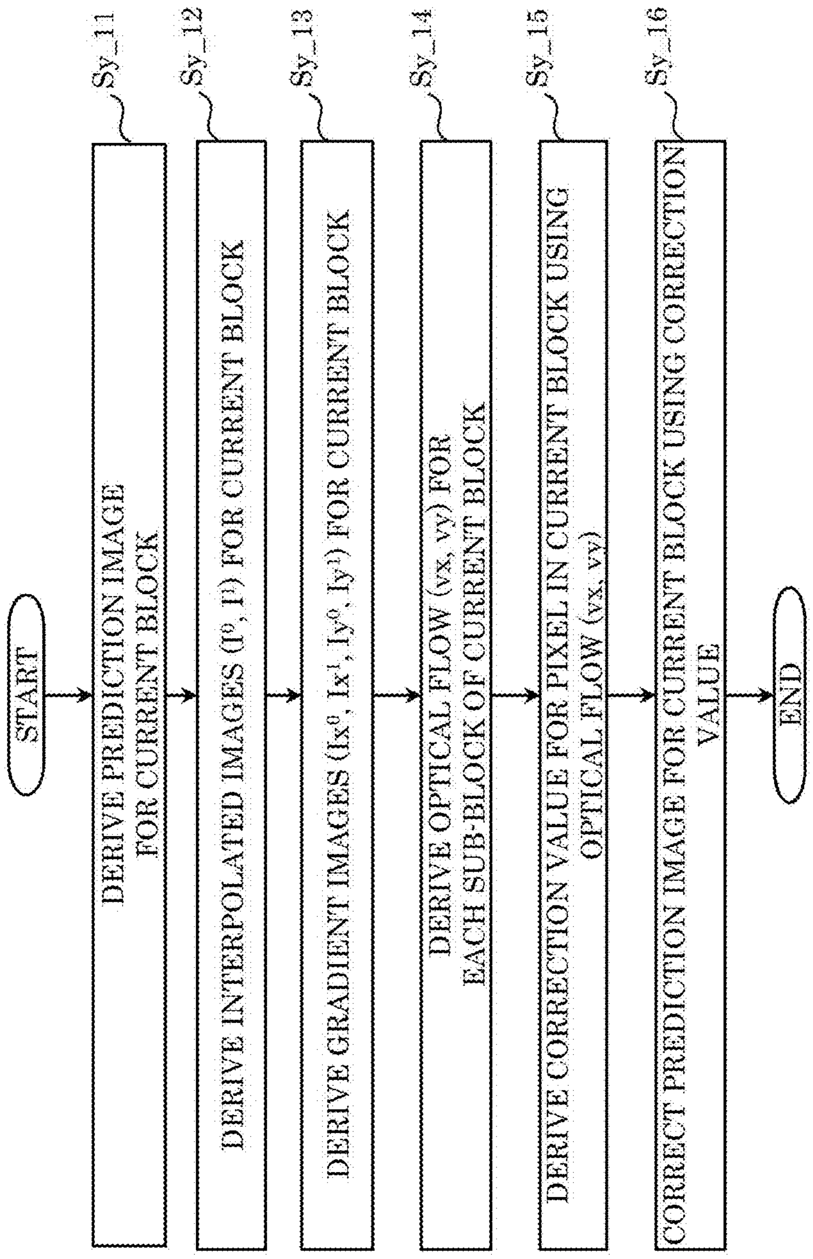

FIG. 95

START

DERIVE PREDICTION IMAGE FOR CURRENT BLOCK — Sy_11

DERIVE INTERPOLATED IMAGES ($I^0$, $I^1$) FOR CURRENT BLOCK — Sy_12

DERIVE GRADIENT IMAGES ($Ix^0$, $Ix^1$, $Iy^0$, $Iy^1$) FOR CURRENT BLOCK — Sy_13

DERIVE OPTICAL FLOW (vx, vy) FOR EACH SUB-BLOCK OF CURRENT BLOCK — Sy_14

DERIVE CORRECTION VALUE FOR PIXEL IN CURRENT BLOCK USING OPTICAL FLOW (vx, vy) — Sy_15

CORRECT PREDICTION IMAGE FOR CURRENT BLOCK USING CORRECTION VALUE — Sy_16

END

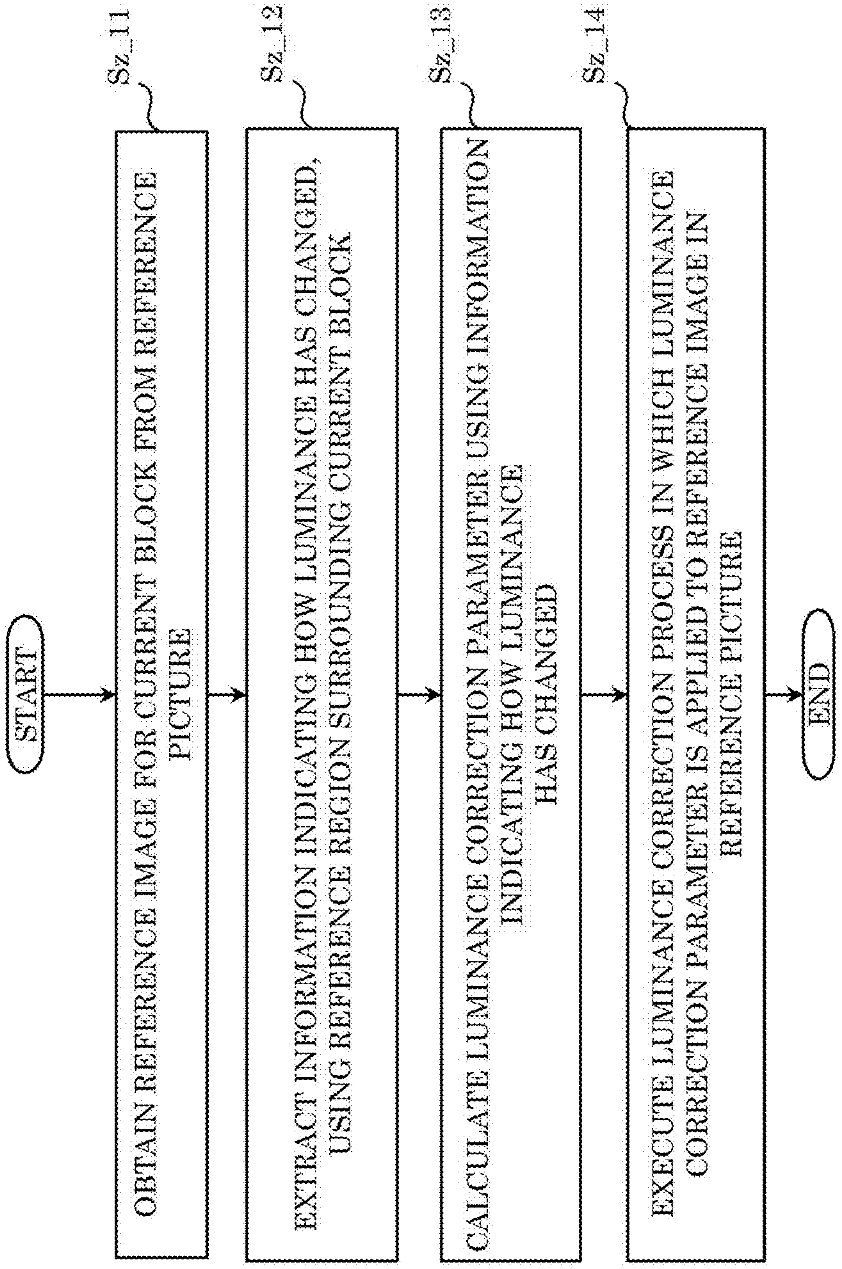

FIG. 96

START

OBTAIN REFERENCE IMAGE FOR CURRENT BLOCK FROM REFERENCE PICTURE (Sz_11)

EXTRACT INFORMATION INDICATING HOW LUMINANCE HAS CHANGED, USING REFERENCE REGION SURROUNDING CURRENT BLOCK (Sz_12)

CALCULATE LUMINANCE CORRECTION PARAMETER USING INFORMATION INDICATING HOW LUMINANCE HAS CHANGED (Sz_13)

EXECUTE LUMINANCE CORRECTION PROCESS IN WHICH LUMINANCE CORRECTION PARAMETER IS APPLIED TO REFERENCE IMAGE IN REFERENCE PICTURE (Sz_14)

END

GPM: 6 Intra: 40

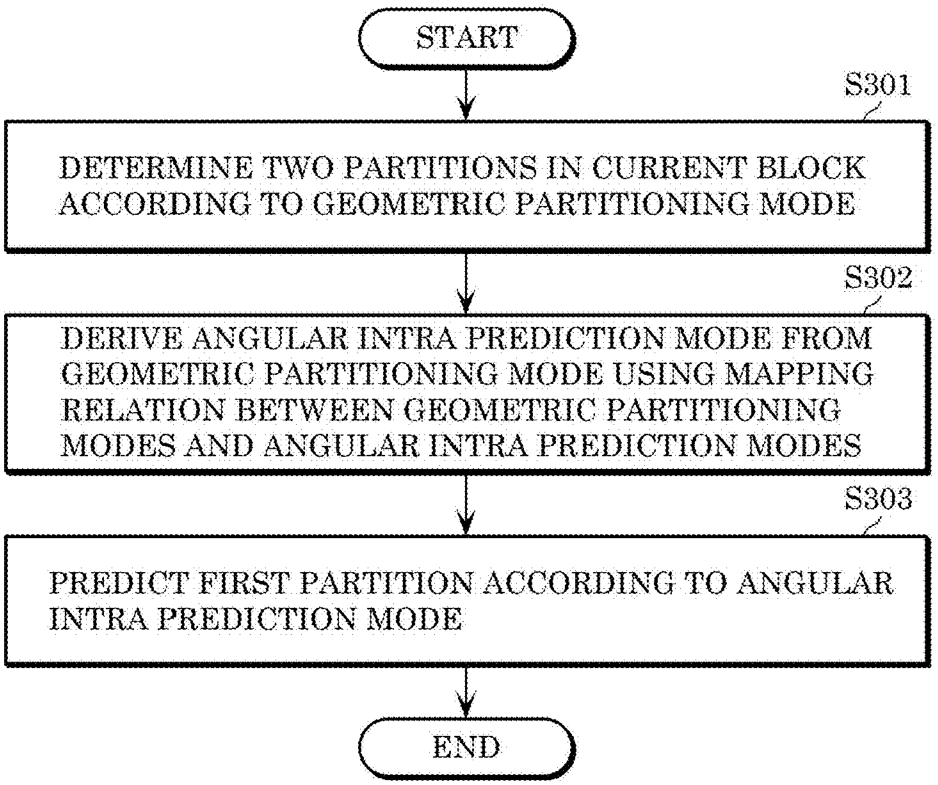

FIG. 104

START

S301: DETERMINE TWO PARTITIONS IN CURRENT BLOCK ACCORDING TO GEOMETRIC PARTITIONING MODE

S302: DERIVE ANGULAR INTRA PREDICTION MODE FROM GEOMETRIC PARTITIONING MODE USING MAPPING RELATION BETWEEN GEOMETRIC PARTITIONING MODES AND ANGULAR INTRA PREDICTION MODES

S303: PREDICT FIRST PARTITION ACCORDING TO ANGULAR INTRA PREDICTION MODE

END

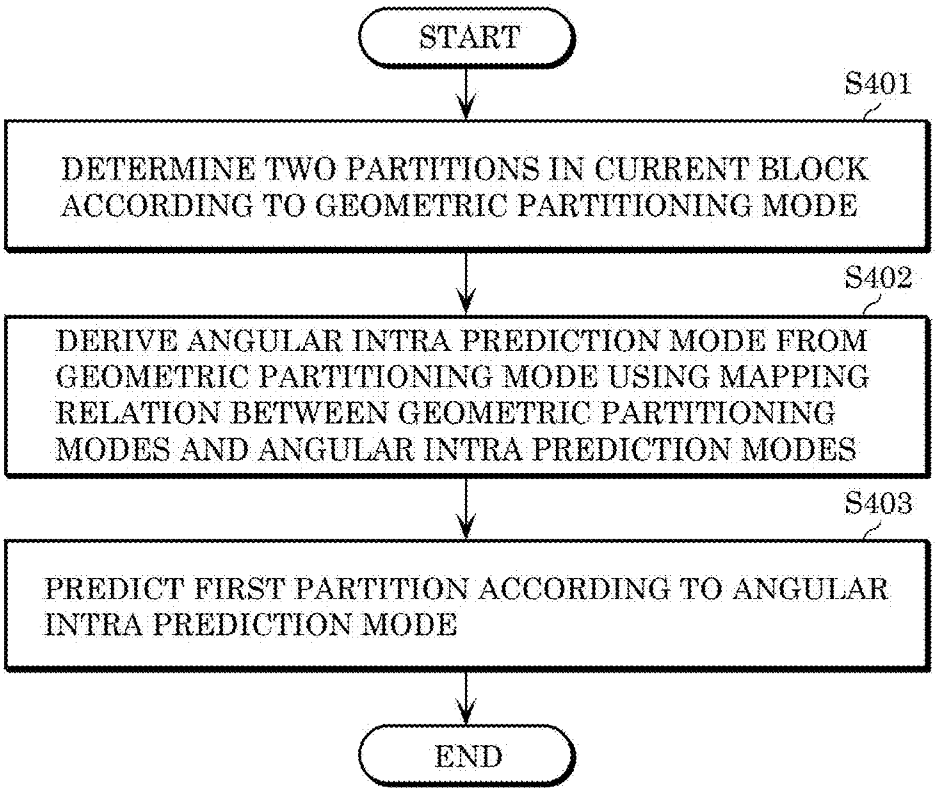

FIG. 105

START

S401: DETERMINE TWO PARTITIONS IN CURRENT BLOCK ACCORDING TO GEOMETRIC PARTITIONING MODE

S402: DERIVE ANGULAR INTRA PREDICTION MODE FROM GEOMETRIC PARTITIONING MODE USING MAPPING RELATION BETWEEN GEOMETRIC PARTITIONING MODES AND ANGULAR INTRA PREDICTION MODES

S403: PREDICT FIRST PARTITION ACCORDING TO ANGULAR INTRA PREDICTION MODE

END

SATELLITE ex116
AIRPLANE ex117
STREAMING SERVER ex103
INTERNET ex101
INTERNET SERVICE PROVIDER ex102
COMMUNICATIONS NETWORK ex104
LSI ex500
COMPUTER ex111
GAMING DEVICE ex112
CAMERA ex113
HOME APPLIANCE ex114
SMARTPHONE ex115
ex106
ex107
ex108
ex109
ex110
ex100

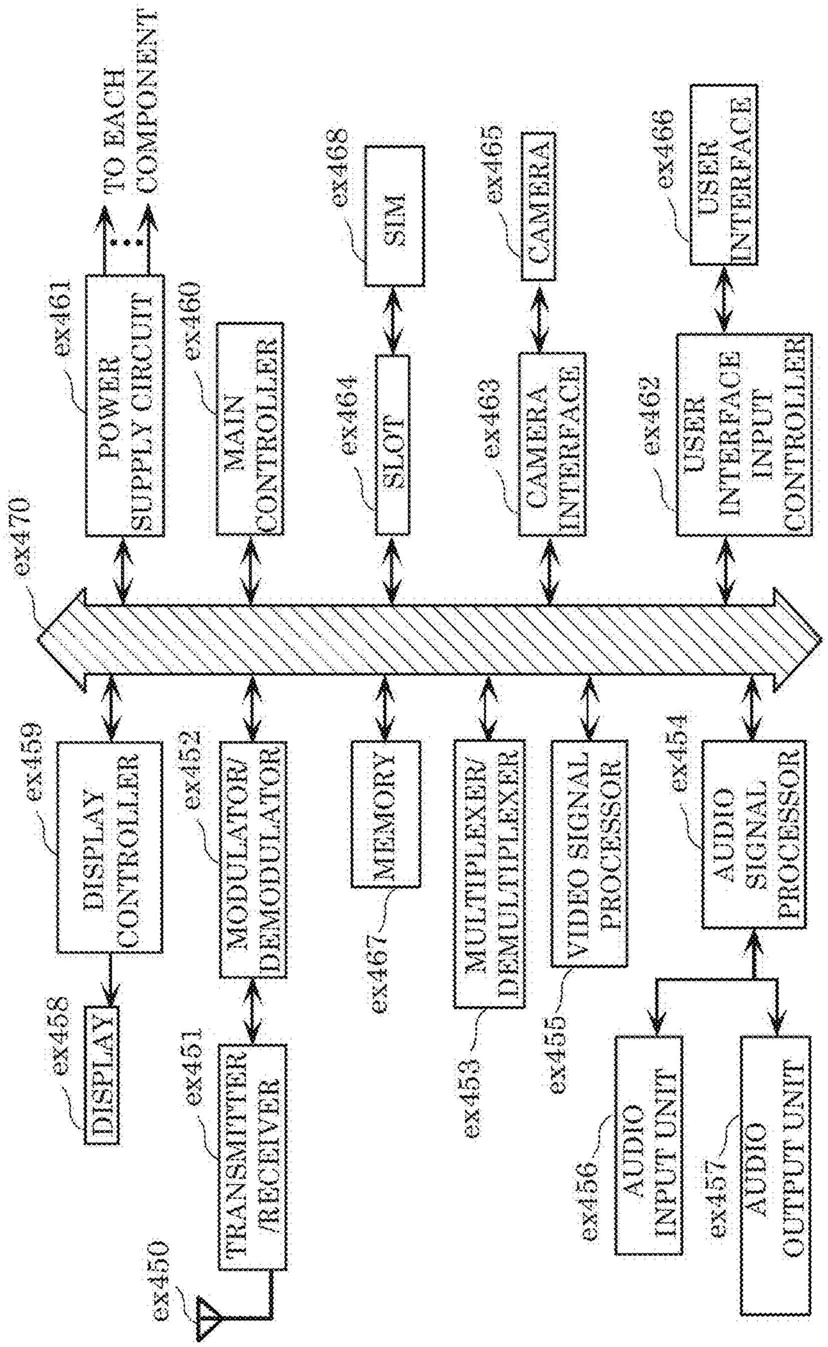

FIG. 110 ex450
TRANSMITTER /RECEIVER
ex451
MODULATOR/ DEMODULATOR
ex452
DISPLAY
ex458
DISPLAY CONTROLLER
ex459
MEMORY
ex467
MULTIPLEXER/ DEMULTIPLEXER
ex453
VIDEO SIGNAL PROCESSOR
ex455
AUDIO INPUT UNIT
ex456
AUDIO OUTPUT UNIT
ex457
AUDIO SIGNAL PROCESSOR
ex454
ex470
POWER SUPPLY CIRCUIT
ex461
TO EACH COMPONENT
MAIN CONTROLLER
ex460
SLOT
ex464
SIM
ex468
CAMERA INTERFACE
ex463
CAMERA
ex465
USER INTERFACE INPUT CONTROLLER
ex462
USER INTERFACE
ex466

DECODING METHOD, ENCODING METHOD, DECODER, AND, ENCODER

CROSS REFERENCE TO RELATED APPLICATIONS

This application is a U.S. continuation application of PCT International Patent Application Number PCT/JP2023/014813 filed on Apr. 12, 2023, claiming the benefit of priority of European Patent Application Number 22168179.4 filed on Apr. 13, 2022, the entire contents of which are hereby incorporated by reference.

BACKGROUND

1. Technical Field

The present disclosure relates to a decoding method, an encoding method, a decoder, and an encoder.

2. Description of the Related Art

With advancement in video coding technology, from H.261 and MPEG-1 to H.264/AVC (Advanced Video Coding), MPEG-LA, H.265/HEVC (High Efficiency Video Coding) and H.266/VVC (Versatile Video Codec), there remains a constant need to provide improvements and optimizations to the video coding technology to process an ever-increasing amount of digital video data in various applications. The present disclosure relates to further advancements, improvements and optimizations in video coding.

Note that H.265 (ISO/IEC 23008-2 HEVC)/HEVC (High Efficiency Video Coding) relates to one example of a conventional standard regarding the above-described video coding technology.

SUMMARY

For example, a decoding method according to one aspect of the present disclosure is a decoding method of decoding a current block of a video from a bitstream. The decoding method includes: determining two partitions in the current block according to a geometric partitioning mode; deriving an angular intra prediction mode from the geometric partitioning mode using a mapping relation between geometric partitioning modes and angular intra prediction modes; and predicting a first partition among the two partitions according to the angular intra prediction mode, in which in the deriving of the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode.

Each of embodiments, or each of part of constituent elements and methods in the present disclosure enables, for example, at least one of the following: improvement in coding efficiency, enhancement in image quality, reduction in processing amount of encoding/decoding, reduction in circuit scale, improvement in processing speed of encoding/decoding, etc. Alternatively, each of embodiments, or each of part of constituent elements and methods in the present disclosure enables, in encoding and decoding, appropriate selection of an element or an operation. The element is, for example, a filter, a block, a size, a motion vector, a reference picture, or a reference block. It is to be noted that the present disclosure includes disclosure regarding configurations and methods which may provide advantages other than the above-described ones. Examples of such configurations and methods include a configuration or method for improving coding efficiency while reducing increase in processing amount.

Additional benefits and advantages according to an aspect of the present disclosure will become apparent from the specification and drawings. The benefits and/or advantages may be individually obtained by the various embodiments and features of the specification and drawings, and not all of which need to be provided in order to obtain one or more of such benefits and/or advantages.

It is to be noted that these general or specific aspects may be implemented using a system, an integrated circuit, a computer program, or a computer readable medium (recording medium) such as a CD-ROM, or any combination of systems, methods, integrated circuits, computer programs, and media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 14 is a chart illustrating transform basis functions for each transform type;

FIG. 16 is a flow chart illustrating one example of a process performed by a transformer;

FIG. 17 is a flow chart illustrating another example of a process performed by the transformer;

FIG. 23G is a diagram illustrating an example for JC-CCALF weight index candidates;

FIG. 27 is a diagram illustrating examples of Bs values;

FIG. 38A is a diagram illustrating one example of categorization of modes for MV derivation;

FIG. 53 is a flow chart illustrating one example of a triangle mode;

FIG. 64 is a flow chart illustrating one example of inter prediction according to BIO;

FIG. 66B is a flow chart illustrating one example of a prediction image generation method using a luminance correction process by LIC;

FIG. 67 is a block diagram illustrating a configuration of a decoder according to an embodiment;

FIG. 73 is a block diagram illustrating one example of a configuration of an inverse quantizer;

FIG. 80A is a flow chart illustrating a portion of other example of a process performed by the predictor of the decoder;

FIG. 80B is a flow chart illustrating the remaining portion of the other example of the process performed by the predictor of the decoder;

FIG. 81 is a diagram illustrating one example of a process performed by an intra predictor of the decoder;

FIG. 95 is a flow chart illustrating another example of correction of a prediction image by BIO in the decoder;

FIG. 96 is a flow chart illustrating another example of correction of a prediction image by LIC in the decoder;

FIG. 101A is a conceptual diagram illustrating the first example of a relation between the geometric partitioning mode and the wide-angle intra prediction mode;

FIG. 101B is a conceptual diagram illustrating the second example of a relation between the geometric partitioning mode and the wide-angle intra prediction mode;

FIG. 102A is a flow chart indicating a part of an operation of determining parameters of the geometric partitioning mode;

FIG. 102B is a flow chart indicating the remaining part of the operation of determining parameters of the geometric partitioning mode;

FIG. 103A is a flow chart indicating a part of an operation of performing prediction according to the geometric partitioning mode;

FIG. 103B is a flow chart indicating the remaining part of the operation of performing prediction according to the geometric partitioning mode;

FIG. 104 is a flow chart illustrating an operation performed by an encoder according to an embodiment;

FIG. 105 is a flow chart illustrating an operation performed by a decoder according to an embodiment;

FIG. 106 is a diagram illustrating an overall configuration of a content providing system for implementing a content distribution service;

FIG. 107 is a diagram illustrating an example of a display screen of a web page;

FIG. 108 is a diagram illustrating an example of a display screen of a web page;

FIG. 109 is a diagram illustrating one example of a smartphone; and

Figure 1:
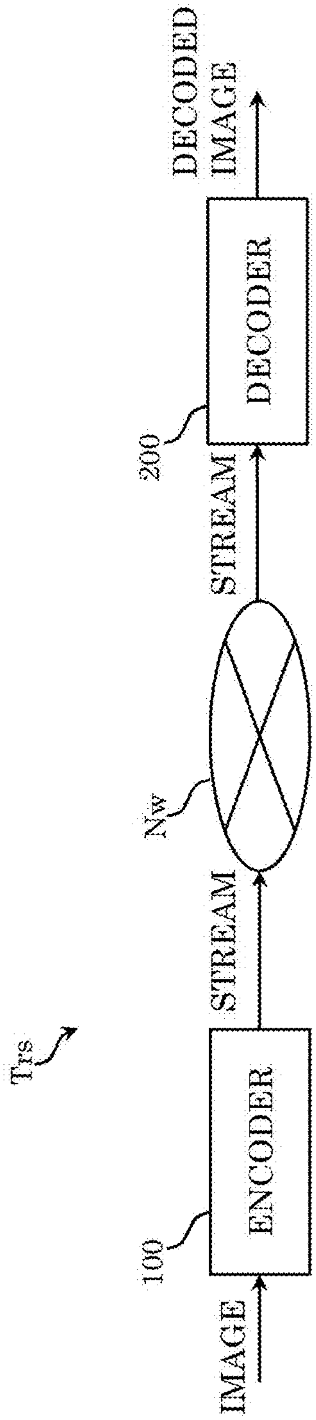
FIG. 1 is a schematic diagram illustrating one example of a configuration of a transmission system according to an embodiment.

FIG. 110 is a block diagram illustrating an example of a configuration of a smartphone.

DETAILED DESCRIPTION OF THE EMBODIMENTS

[Introduction]

In encoding a video, a geometric partitioning mode may be used. The geometric partitioning mode is also referred to GPM or a GPM mode. In the geometric partitioning mode, two partitions in a block are defined by a partitioning line. Prediction for the block is generated by combining prediction for one of the partitions and prediction for the other of the partitions. This may improve the prediction accuracy.

Moreover, in the geometric partitioning mode, intra prediction may be used for at least one of the two partitions. In this case, an intra prediction mode corresponding to the direction of the partitioning line in the geometric partitioning mode may be specified. Moreover, for a non-square block, a narrow-angle intra prediction mode satisfying a certain condition may be mapped to a wide-angle intra prediction mode to use the wide-angle intra prediction mode for prediction.

However, for example, for a non-square block, there is a possibility that a narrow-angle intra prediction mode satisfying a certain condition is mapped to a wide-angle intra prediction mode deviating from the wide-angle intra prediction mode having a prediction direction exactly opposite to the prediction direction of the narrow-angle intra prediction mode. Accordingly, for a non-square block, a narrow-angle intra prediction mode corresponding to the direction of the partitioning line in the geometric partitioning mode may be mapped to a wide-angle intra prediction mode not corresponding to the direction of the partitioning line in the geometric partitioning mode.

Therefore, an appropriate prediction direction is not used for a non-square block, and thus the prediction accuracy may be degraded.

In view of this, a decoding method of example 1 is a decoding method of decoding a current block of a video from a bitstream. The decoding method includes: determining two partitions in the current block according to a geometric partitioning mode; deriving an angular intra prediction mode from the geometric partitioning mode using a mapping relation between geometric partitioning modes and angular intra prediction modes; and predicting a first partition among the two partitions according to the angular intra prediction mode, in which in the deriving of the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode.

In this manner, it may be possible to apply a different mapping relation to derivation of the intra prediction mode for a square block and a non-square block. Accordingly, it may be possible to perform the intra prediction using an appropriate prediction direction. This may reduce the degradation of the prediction accuracy.

Moreover, a decoding method of Example 2 may be the decoding method of Example 1, in which the first mapping relation includes a mapping relation between the geometric partitioning mode and a first narrow-angle intra prediction mode, the second mapping relation includes a mapping relation between the geometric partitioning mode and a second narrow-angle intra prediction mode, when the first narrow-angle intra prediction mode is included in a subset of the angular intra prediction modes, (i) when a prediction direction of the first narrow-angle intra prediction mode is a diagonal direction of 45° with respect to a horizontal direction or a vertical direction, the second narrow-angle intra prediction mode has a prediction direction opposite to the prediction direction of the first narrow-angle intra prediction mode, and (ii) when the prediction direction of the first narrow-angle intra prediction mode is not the diagonal direction of 45° with respect to the horizontal direction or the vertical direction, the second narrow-angle intra prediction mode: has a second index obtained by applying addition or subtraction of a fixed offset to a first index of the first narrow-angle intra prediction mode; and is remapped to a wide-angle intra prediction mode, and when the first narrow-angle intra prediction mode is not included in the subset of the angular intra prediction modes, the second narrow-angle intra prediction mode is identical to the first narrow-angle intra prediction mode.

In this manner, it may be possible to correct the deviation of the prediction direction. Accordingly, it may be possible to perform the intra prediction using an appropriate prediction direction.

Moreover, a decoding method of Example 3 may be the decoding method of Example 2, in which the fixed offset is 1.

In this manner, it may be possible to correct the deviation corresponding to one intra prediction mode. Accordingly, it may be possible to perform the intra prediction using an appropriate prediction direction.

Moreover, a decoding method of Example 4 may be the decoding method of Example 2 or 3, in which the subset of the angular intra prediction modes is defined by a difference between a width and a height of the current block.

In this manner, it may be possible to define the narrow-angle intra prediction mode to which mapping different from the mapping for a square block is applied, according to a difference between a width and a height of the current block. Accordingly, it may be possible to adjust the prediction direction according to a difference between a width and a height of the current block. Accordingly, it may be possible to perform the intra prediction using an appropriate prediction direction.

Moreover, a decoding method of Example 5 may be the decoding method of any of Examples 2 to 4, in which the prediction direction of the first narrow-angle intra prediction mode is parallel to a boundary between the two partitions, and the prediction direction of the wide-angle intra prediction mode is parallel to the boundary.

In this manner, it may be possible to perform the intra prediction using a prediction direction corresponding to the boundary between the two partitions determined by the geometric partitioning mode. This may reduce the degradation of the prediction accuracy.

Moreover, a decoding method of Example 6 may be the decoding method of any of Examples 2 to 4, in which the prediction direction of the first narrow-angle intra prediction mode has a certain angle with respect to a boundary between the two partitions, and the prediction direction of the wide-angle intra prediction mode has the certain angle with respect to the boundary.

In this manner, it may be possible to perform the intra prediction using a prediction direction associated with the boundary between the two partitions determined by the geometric partitioning mode. This may reduce the degradation of the prediction accuracy.

Moreover, a decoding method of Example 7 may be the decoding method of Example 1, in which the first mapping relation is a mapping relation between the geometric partitioning modes and the angular intra prediction modes that are narrow-angle intra prediction modes, and the second mapping relation is a mapping relation between the geometric partitioning modes and the angular intra prediction modes including narrow-angle intra prediction modes and one or more wide-angle intra prediction modes.

In this manner, for a non-square block, it may be possible to map the geometric partitioning mode to the wide-angle intra prediction mode. Accordingly, it may be possible to perform the intra prediction using an appropriate prediction direction.

Moreover, a decoding method of Example 8 may be the decoding method of any of Examples 1 to 7, further including decoding, from the bitstream, a first prediction mode indicator indicating a prediction method for the first partition, and a second prediction mode indicator indicating a prediction method for a second partition among the two partitions, in which the first prediction mode indicator indicates, as the prediction method for the first partition, that the angular intra prediction mode derived from the geometric partitioning mode is to be used for prediction of the first partition.

In this manner, it may be possible to control the prediction method for each of the two partitions. For the first partition, it may be possible to control the application of the intra prediction mode corresponding to the geometric partitioning mode.

In view of this, an encoding method of example 9 is an encoding method of encoding a current block of a video into a bitstream. The encoding method includes: determining two partitions in the current block according to a geometric partitioning mode; deriving an angular intra prediction mode from the geometric partitioning mode using a mapping relation between geometric partitioning modes and angular intra prediction modes; and predicting a first partition among the two partitions according to the angular intra prediction mode, in which in the deriving of the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode.

In this manner, it may be possible to apply a different mapping relation to derivation of the intra prediction mode for a square block and a non-square block. Accordingly, it may be possible to perform the intra prediction using an appropriate prediction direction. This may reduce the degradation of the prediction accuracy.

Moreover, an encoding method of Example 10 may be the encoding method of Example 9, in which the first mapping relation includes a mapping relation between the geometric partitioning mode and a first narrow-angle intra prediction mode, the second mapping relation includes a mapping relation between the geometric partitioning mode and a second narrow-angle intra prediction mode, when the first narrow-angle intra prediction mode is included in a subset of the angular intra prediction modes, (i) when a prediction direction of the first narrow-angle intra prediction mode is a diagonal direction of 45° with respect to a horizontal direction or a vertical direction, the second narrow-angle intra prediction mode has a prediction direction opposite to the prediction direction of the first narrow-angle intra prediction mode, and (ii) when the prediction direction of the first narrow-angle intra prediction mode is not the diagonal direction of 45° with respect to the horizontal direction or the vertical direction, the second narrow-angle intra prediction mode: has a second index obtained by applying addition or subtraction of a fixed offset to a first index of the first narrow-angle intra prediction mode; and is remapped to a wide-angle intra prediction mode, and when the first narrow-angle intra prediction mode is not included in the subset of the angular intra prediction modes, the second narrow-angle intra prediction mode is identical to the first narrow-angle intra prediction mode.

In this manner, it may be possible to correct the deviation of the prediction direction. Accordingly, it may be possible to perform the intra prediction using an appropriate prediction direction.

Moreover, an encoding method of Example 11 may be the encoding method of Example 10, in which the fixed offset is 1.

In this manner, it may be possible to correct the deviation corresponding to one intra prediction mode. Accordingly, it may be possible to perform the intra prediction using an appropriate prediction direction.

Moreover, an encoding method of Example 12 may be the encoding method of Example 10 or 11, in which the subset of the angular intra prediction modes is defined by a difference between a width and a height of the current block.

In this manner, it may be possible to define the narrow-angle intra prediction mode to which mapping different from the mapping for a square block is applied, according to a difference between a width and a height of the current block. Accordingly, it may be possible to adjust the prediction direction according to a difference between a width and a height of the current block. Accordingly, it may be possible to perform the intra prediction using an appropriate prediction direction.

Moreover, an encoding method of Example 13 may be the encoding method of any of Examples 10 to 12, in which the prediction direction of the first narrow-angle intra prediction mode is parallel to a boundary between the two partitions, and the prediction direction of the wide-angle intra prediction mode is parallel to the boundary.

In this manner, it may be possible to perform the intra prediction using a prediction direction corresponding to the boundary between the two partitions determined by the geometric partitioning mode. This may reduce the degradation of the prediction accuracy.

Moreover, an encoding method of Example 14 may be the encoding method of any of Examples 10 to 12, in which the prediction direction of the first narrow-angle intra prediction mode has a certain angle with respect to a boundary between the two partitions, and the prediction direction of the wide-angle intra prediction mode has the certain angle with respect to the boundary.

In this manner, it may be possible to perform the intra prediction using a prediction direction associated with the boundary between the two partitions determined by the geometric partitioning mode. This may reduce the degradation of the prediction accuracy.

Moreover, an encoding method of Example 15 may be the encoding method of Example 9, in which the first mapping relation is a mapping relation between the geometric partitioning modes and the angular intra prediction modes that are narrow-angle intra prediction modes, and the second mapping relation is a mapping relation between the geometric partitioning modes and the angular intra prediction modes including narrow-angle intra prediction modes and one or more wide-angle intra prediction modes.

In this manner, for a non-square block, it may be possible to map the geometric partitioning mode to the wide-angle intra prediction mode. Accordingly, it may be possible to perform the intra prediction using an appropriate prediction direction.

Moreover, an encoding method of Example 16 may be the encoding method of any of Examples 9 to 15, further including encoding, into the bitstream, a first prediction mode indicator indicating a prediction method for the first partition, and a second prediction mode indicator indicating a prediction method for a second partition among the two partitions, wherein the first prediction mode indicator indicates, as the prediction method for the first partition, that the angular intra prediction mode derived from the geometric partitioning mode is to be used for prediction of the first partition.

In this manner, it may be possible to control the prediction method for each of the two partitions. For the first partition, it may be possible to control the application of the intra prediction mode corresponding to the geometric partitioning mode.

A non-transitory computer readable medium of Example 17 may be a non-transitory computer readable medium for a computer, storing a bitstream that causes the computer to execute a decoding process of decoding a current block. The decoding process includes: determining two partitions in the current block according to a geometric partitioning mode; deriving an angular intra prediction mode from the geometric partitioning mode using a mapping relation between geometric partitioning modes and angular intra prediction modes; and predicting a first partition among the two partitions according to the angular intra prediction mode, in which in the deriving of the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode.

With this, it may be possible to use the medium to perform the foregoing decoding method.

A decoder of Example 18 is a decoder that decodes a current block of a video from a bitstream. The decoder includes circuitry and memory coupled to the circuitry. In operation, the circuitry: determines two partitions in the current block according to a geometric partitioning mode; derives an angular intra prediction mode from the geometric partitioning mode using a mapping relation between geometric partitioning modes and angular intra prediction modes; and predicts a first partition among the two partitions according to the angular intra prediction mode, in which in deriving the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode.

With this, it may be possible to use the decoder to perform the foregoing decoding method.

An encoder of Example 19 is an encoder that encodes a current block of a video into a bitstream. The encoder includes circuitry and memory coupled to the circuitry. In operation, the circuitry: determines two partitions in the current block according to a geometric partitioning mode; derives an angular intra prediction mode from the geometric partitioning mode using a mapping relation between geometric partitioning modes and angular intra prediction modes; and predicts a first partition among the two partitions according to the angular intra prediction mode, in which in deriving the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode.

With this, it may be possible to use the encoder to perform the foregoing encoding method.

Moreover, the decoder of Example 20 includes an inputter, an entropy decoder, an inverse quantizer, an inverse transformer, an intra predictor, an inter predictor, a loop filter unit, and an outputter.

The inputter receives an encoded bitstream. The entropy decoder applies variable length decoding on the encoded bitstream to derive quantized coefficients. The inverse quantizer inverse quantizes the quantized coefficients to derive transform coefficients. The inverse transformer inverse transforms the transformed coefficients to derive prediction errors.

The intra predictor generates prediction signals of a current block included in the current picture, using reference pixels included in the current picture. The inter predictor generates prediction signals of a current block included in the current picture, using a reference block included in a reference picture different from the current picture.

The loop filter unit applies a filter to a reconstructed block in a current block included in the current picture. The current picture is then output from the outputter.

In operation, the intra predictor then: determines two partitions in the current block according to a geometric partitioning mode; derives an angular intra prediction mode from the geometric partitioning mode using a mapping relation between geometric partitioning modes and angular intra prediction modes; and predicts a first partition among the two partitions according to the angular intra prediction mode, in which in deriving the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode.

Moreover, the encoder of Example 21 includes an inputter, a splitter, an intra predictor, an inter predictor, a loop filter, a transformer, a quantizer, an entropy encoder, and an outputter.

The inputter receives a current picture. The splitter splits the current picture into multiple blocks.

The intra predictor generates prediction signals of a current block included in the current picture, using reference pixels included in the current picture. The inter predictor generates prediction signals of a current block included in the current picture, using a reference block included in a reference picture different from the current picture. The loop filter unit applies a filter to a reconstructed block in a current block included in the current picture.

The transformer generates transformed coefficients by transforming prediction errors between original signals of the current block included in the current picture and prediction signals generated by either the intra predictor or the inter predictor. The quantizer quantizes the transform coefficients to generate quantized coefficients. The entropy encoder applies variable length encoding on the quantized coefficients to generate an encoded bitstream. The quantized coefficients to which the variable length encoding has been applied and the encoded bitstream including control information are then output from the outputter.

In operation, the intra predictor then: determines two partitions in the current block according to a geometric partitioning mode; derives an angular intra prediction mode from the geometric partitioning mode using a mapping relation between geometric partitioning modes and angular intra prediction modes; and predicts a first partition among the two partitions according to the angular intra prediction mode, in which in deriving the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode.

Furthermore, these general or specific aspects may be implemented using a system, an apparatus, a method, an integrated circuit, a computer program, or a non-transitory computer readable medium such as a CD-ROM, or any combination of systems, apparatuses, methods, integrated circuits, computer programs, or media.

[Definitions of Terms]

The respective terms may be defined as indicated below as examples.

(1) Image

An image is a data unit configured with a set of pixels, is a picture or includes blocks smaller than a picture. Images include a still image in addition to a video.

(2) Picture

A picture is an image processing unit configured with a set of pixels, and is also referred to as a frame or a field.

(3) Block

A block is a processing unit which is a set of a particular number of pixels. The block is also referred to as indicated in the following examples. The shapes of blocks are not limited. Examples include a rectangle shape of M×N pixels and a square shape of M×M pixels for the first place, and also include a triangular shape, a circular shape, and other shapes.

(Examples of Blocks)

slice/tile/brick

CTU/super block/basic splitting unit

VPDU/processing splitting unit for hardware

CU/processing block unit/prediction block unit (PU)/orthogonal transform block unit (TU)/unit sub-block (4) Pixel/Sample A pixel or sample is a smallest point of an image. Pixels or samples include not only a pixel at an integer position but also a pixel at a sub-pixel position generated based on a pixel at an integer position.

(5) Pixel Value/Sample Value

A pixel value or sample value is an eigen value of a pixel. Pixel or sample values naturally include a luma value, a chroma value, an RGB gradation level and also covers a depth value, or a binary value of 0 or 1.

(6) Flag

A flag indicates one or more bits, and may be, for example, a parameter or index represented by two or more bits. Alternatively, the flag may indicate not only a binary value represented by a binary number but also a multiple value represented by a number other than the binary number.

(7) Signal

A signal is the one symbolized or encoded to convey information. Signals include a discrete digital signal and an analog signal which takes a continuous value.

(8) Stream/Bitstream

A stream or bitstream is a digital data string or a digital data flow. A stream or bitstream may be one stream or may be configured with a plurality of streams having a plurality of hierarchical layers. A stream or bitstream may be transmitted in serial communication using a single transmission path, or may be transmitted in packet communication using a plurality of transmission paths.

(9) Difference

In the case of scalar quantity, it is only necessary that a simple difference (x−y) and a difference calculation be included. Differences include an absolute value of a difference (|x−y|), a squared difference (x^2−y^2), a square root of a difference (√(x−y)), a weighted difference (ax−by: a and b are constants), an offset difference (x−y+a: a is an offset).

(10) Sum

In the case of scalar quantity, it is only necessary that a simple sum (x+y) and a sum calculation be included. Sums include an absolute value of a sum (|x+y|), a squared sum (x^2+y^2), a square root of a sum (√(x+y)), a weighted difference (ax+by: a and b are constants), an offset sum (x+y+a: a is an offset).

(11) Based on

A phrase "based on something" means that a thing other than the something may be considered. In addition, "based on" may be used in a case in which a direct result is obtained or a case in which a result is obtained through an intermediate result.

(12) Used, Using

A phrase "something used" or "using something" means that a thing other than the something may be considered. In addition, "used" or "using" may be used in a case in which a direct result is obtained or a case in which a result is obtained through an intermediate result.

(13) Prohibit, Forbid

The term "prohibit" or "forbid" can be rephrased as "does not permit" or "does not allow". In addition, "being not prohibited/forbidden" or "being permitted/allowed" does not always mean "obligation".

(14) Limit, Restriction/Restrict/Restricted

The term "limit" or "restriction/restrict/restricted" can be rephrased as "does not permit/allow" or "being not permitted/allowed". In addition, "being not prohibited/forbidden" or "being permitted/allowed" does not always mean "obligation". Furthermore, it is only necessary that part of something be prohibited/forbidden quantitatively or qualitatively, and something may be fully prohibited/forbidden.

(15) Chroma

An adjective, represented by the symbols Cb and Cr, specifying that a sample array or single sample is representing one of the two color difference signals related to the primary colors. The term chroma may be used instead of the term chrominance.

(16) Luma

An adjective, represented by the symbol or subscript Y or L, specifying that a sample array or single sample is representing the monochrome signal related to the primary colors. The term luma may be used instead of the term luminance.

[Notes Related to the Descriptions]

In the drawings, same reference numbers indicate same or similar components. The sizes and relative locations of components are not necessarily drawn by the same scale.

Hereinafter, embodiments will be described with reference to the drawings. Note that the embodiments described below each show a general or specific example. The numerical values, shapes, materials, components, the arrangement and connection of the components, steps, the relation and order of the steps, etc., indicated in the following embodiments are mere examples, and are not intended to limit the scope of the claims.

Embodiments of an encoder and a decoder will be described below. The embodiments are examples of an encoder and a decoder to which the processes and/or configurations presented in the description of aspects of the present disclosure are applicable. The processes and/or configurations can also be implemented in an encoder and a decoder different from those according to the embodiments. For example, regarding the processes and/or configurations as applied to the embodiments, any of the following may be implemented:

(1) Any of the components of the encoder or the decoder according to the embodiments presented in the description of aspects of the present disclosure may be substituted or combined with another component presented anywhere in the description of aspects of the present disclosure.

(2) In the encoder or the decoder according to the embodiments, discretionary changes may be made to functions or processes performed by one or more components of the encoder or the decoder, such as addition, substitution, removal, etc., of the functions or processes. For example, any function or process may be substituted or combined with another function or process presented anywhere in the description of aspects of the present disclosure.

(3) In methods implemented by the encoder or the decoder according to the embodiments, discretionary changes may be made such as addition, substitution, and removal of one or more of the processes included in the method. For example, any process in the method may be substituted or combined with another process presented anywhere in the description of aspects of the present disclosure.

(4) One or more components included in the encoder or the decoder according to embodiments may be combined with a component presented anywhere in the description of aspects of the present disclosure, may be combined with a component including one or more functions presented anywhere in the description of aspects of the present disclosure, and may be combined with a component that implements one or more processes implemented by a component presented in the description of aspects of the present disclosure.

(5) A component including one or more functions of the encoder or the decoder according to the embodiments, or a component that implements one or more processes of the encoder or the decoder according to the embodiments, may be combined or substituted with a component presented anywhere in the description of aspects of the present disclosure, with a component including one or more functions presented anywhere in the description of aspects of the present disclosure, or with a component that implements one or more processes presented anywhere in the description of aspects of the present disclosure.

(6) In methods implemented by the encoder or the decoder according to the embodiments, any of the processes included in the method may be substituted or combined with a process presented anywhere in the description of aspects of the present disclosure or with any corresponding or equivalent process.

(7) One or more processes included in methods implemented by the encoder or the decoder according to the embodiments may be combined with a process presented anywhere in the description of aspects of the present disclosure.

(8) The implementation of the processes and/or configurations presented in the description of aspects of the present disclosure is not limited to the encoder or the decoder according to the embodiments. For example, the processes and/or configurations may be implemented in a device used for a purpose different from the moving picture encoder or the moving picture decoder disclosed in the embodiments.

[System Configuration]

FIG. 1 is a schematic diagram illustrating one example of a configuration of a transmission system according to an embodiment.

Transmission system Trs is a system which transmits a stream generated by encoding an image and decodes the transmitted stream. Transmission system Trs like this includes, for example, encoder 100, network Nw, and decoder 200 as illustrated in FIG. 1.

An image is input to encoder 100. Encoder 100 generates a stream by encoding the input image, and outputs the stream to network Nw. The stream includes, for example, the encoded image and control information for decoding the encoded image. The image is compressed by the encoding.

It is to be noted that a previous image before being encoded and being input to encoder 100 is also referred to as the original image, the original signal, or the original sample. The image may be a video or a still image. The image is a generic concept of a sequence, a picture, and a block, and thus is not limited to a spatial region having a particular size and to a temporal region having a particular size unless otherwise specified. The image is an array of pixels or pixel values, and the signal representing the image or pixel values are also referred to as samples. The stream may be referred to as a bitstream, an encoded bitstream, a compressed bitstream, or an encoded signal. Furthermore, the encoder may be referred to as an image encoder or a video encoder. The encoding method performed by encoder 100 may be referred to as an encoding method, an image encoding method, or a video encoding method.

Network Nw transmits the stream generated by encoder 100 to decoder 200. Network Nw may be the Internet, the Wide Area Network (WAN), the Local Area Network (LAN), or any combination of these networks. Network Nw is not always limited to a bi-directional communication network, and may be a uni-directional communication network which transmits broadcast waves of digital terrestrial broadcasting, satellite broadcasting, or the like. Alternatively, network Nw may be replaced by a medium such as a Digital Versatile Disc (DVD) and a Blu-Ray Disc (BD) (R), etc. on which a stream is recorded.

Decoder 200 generates, for example, a decoded image which is an uncompressed image by decoding a stream transmitted by network Nw. For example, the decoder decodes a stream according to a decoding method corresponding to an encoding method by encoder 100.

It is to be noted that the decoder may also be referred to as an image decoder or a video decoder, and that the decoding method performed by decoder 200 may also be referred to as a decoding method, an image decoding method, or a video decoding method.

[Data Structure]

Figure 2:
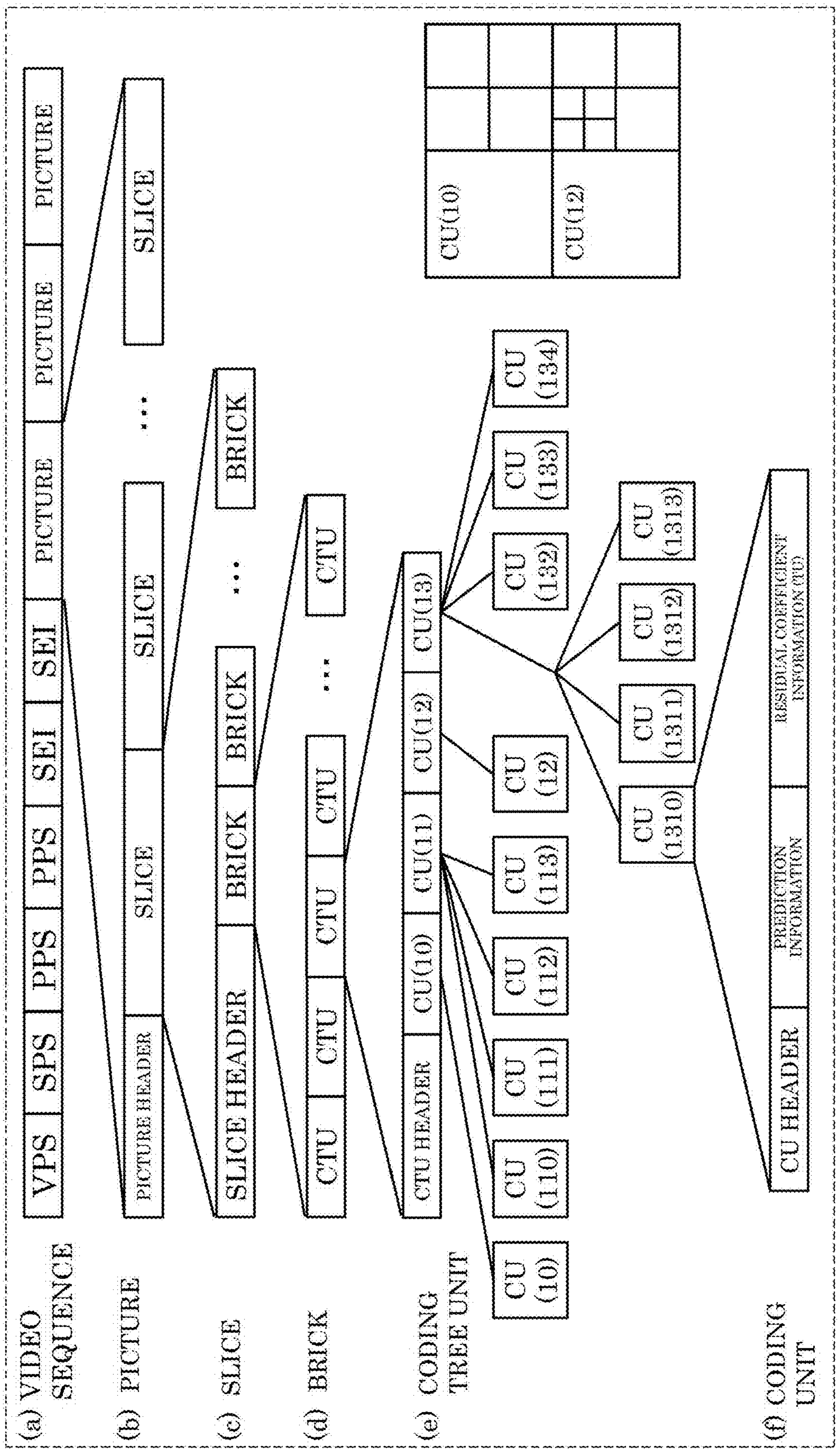
FIG. 2 is a diagram illustrating one example of a hierarchical structure of data in a stream.

FIG. 2 is a diagram illustrating one example of a hierarchical structure of data in a stream. A stream includes, for example, a video sequence. As illustrated in (a) of FIG. 2, the video sequence includes a video parameter set (VPS), a sequence parameter set (SPS), a picture parameter set (PPS), supplemental enhancement information (SEI), and a plurality of pictures.

In a video having a plurality of layers, a VPS includes: a coding parameter which is common between some of the plurality of layers; and a coding parameter related to some of the plurality of layers included in the video or an individual layer.

An SPS includes a parameter which is used for a sequence, that is, a coding parameter which decoder 200 refers to in order to decode the sequence. For example, the coding parameter may indicate the width or height of a picture. It is to be noted that a plurality of SPSs may be present.

A PPS includes a parameter which is used for a picture, that is, a coding parameter which decoder 200 refers to in order to decode each of the pictures in the sequence. For example, the coding parameter may include a reference value for the quantization width which is used to decode a picture and a flag indicating application of weighted prediction. It is to be noted that a plurality of PPSs may be present. Each of the SPS and the PPS may be simply referred to as a parameter set.

As illustrated in (b) of FIG. 2, a picture may include a picture header and at least one slice. A picture header includes a coding parameter which decoder 200 refers to in order to decode the at least one slice.

As illustrated in (c) of FIG. 2, a slice includes a slice header and at least one brick. A slice header includes a coding parameter which decoder 200 refers to in order to decode the at least one brick.

As illustrated in (d) of FIG. 2, a brick includes at least one coding tree unit (CTU).

It is to be noted that a picture may not include any slice and may include a tile group instead of a slice. In this case, the tile group includes at least one tile. In addition, a brick may include a slice.

A CTU is also referred to as a super block or a basis splitting unit. As illustrated in (e) of FIG. 2, a CTU like this includes a CTU header and at least one coding unit (CU). A CTU header includes a coding parameter which decoder 200 refers to in order to decode the at least one CU.

A CU may be split into a plurality of smaller CUs. As illustrated in (f) of FIG. 2, a CU includes a CU header, prediction information, and residual coefficient information. Prediction information is information for predicting the CU, and the residual coefficient information is information indicating a prediction residual to be described later. Although a CU is basically the same as a prediction unit (PU) and a transform unit (TU), it is to be noted that, for example, an SBT to be described later may include a plurality of TUs smaller than the CU. In addition, the CU may be processed for each virtual pipeline decoding unit (VPDU) included in the CU. The VPDU is, for example, a fixed unit which can be processed at one stage when pipeline processing is performed in hardware.

It is to be noted that a stream may not include part of the hierarchical layers illustrated in FIG. 2. The order of the hierarchical layers may be exchanged, or any of the hierarchical layers may be replaced by another hierarchical layer. Here, a picture which is a target for a process which is about to be performed by a device such as encoder 100 or decoder 200 is referred to as a current picture. A current picture means a current picture to be encoded when the process is an encoding process, and a current picture means a current picture to be decoded when the process is a decoding process. Likewise, for example, a CU or a block of CUs which is a target for a process which is about to be performed by a device such as encoder 100 or decoder 200 is referred to as a current block. A current block means a current block to be encoded when the process is an encoding process, and a current block means a current block to be decoded when the process is a decoding process.

[Picture Structure: Slice/Tile]

A picture may be configured with one or more slice units or tile units in order to decode the picture in parallel.

Slices are basic encoding units included in a picture. A picture may include, for example, one or more slices. In addition, a slice includes one or more successive coding tree units (CTUs).

Figure 3:
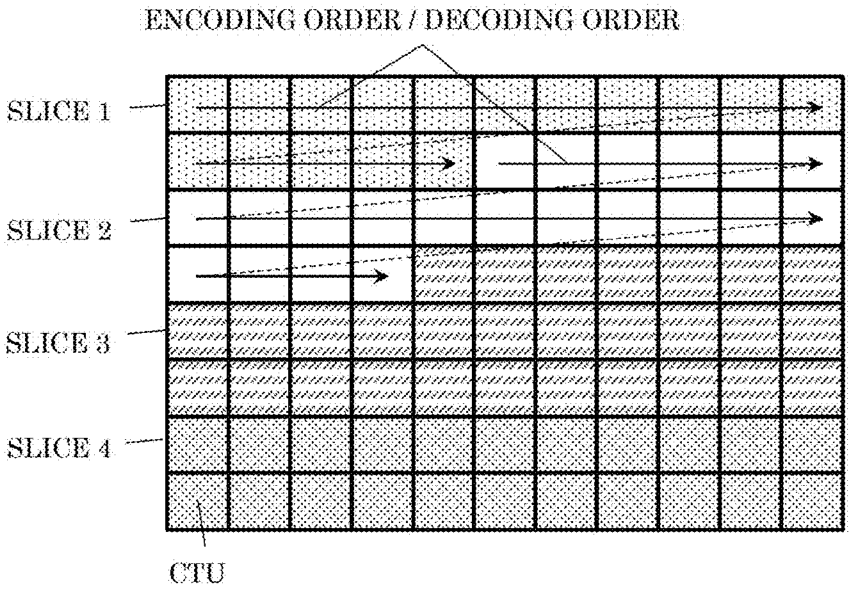
FIG. 3 is a diagram illustrating one example of a slice configuration.

FIG. 3 is a diagram illustrating one example of a slice configuration. For example, a picture includes 11×8 CTUs, and is split into four slices (slices 1 to 4). Slice 1 includes sixteen CTUs, slice 2 includes twenty-one CTUs, slice 3 includes twenty-nine CTUs, and slice 4 includes twenty-two CTUs. Here, each CTU in the picture belongs to one of the slices. The shape of each slice is a shape obtained by splitting the picture horizontally. A boundary of each slice does not need to coincide with an image end, and may coincide with any of the boundaries between CTUs in the image. The processing order of the CTUs in a slice (an encoding order or a decoding order) is, for example, a raster-scan order. A slice includes a slice header and encoded data. Features of the slice may be written in the slice header. The features include a CTU address of a top CTU in the slice, a slice type, etc.

A tile is a unit of a rectangular region included in a picture. Each of tiles may be assigned with a number referred to as TileId in raster-scan order.

Figure 4:
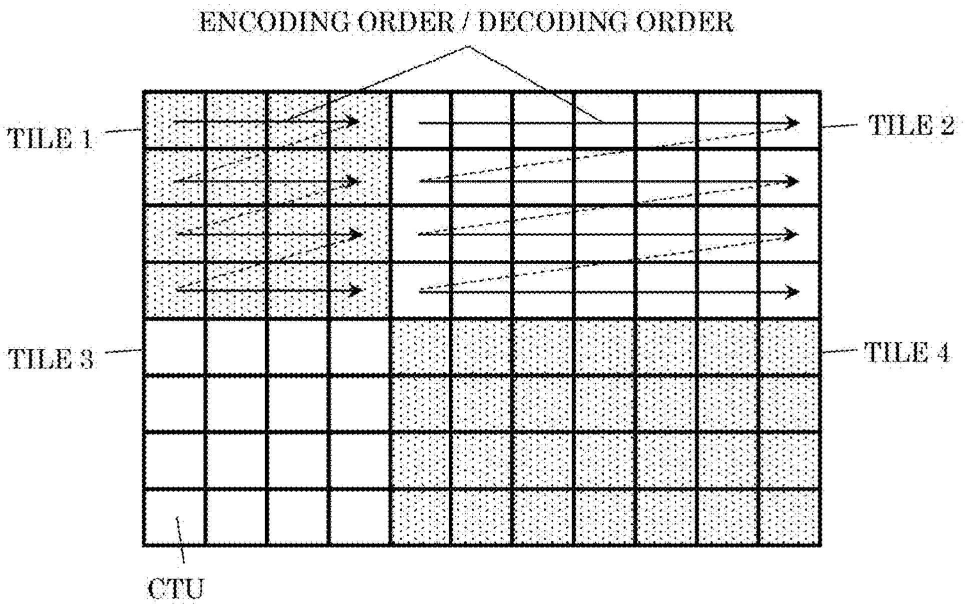
FIG. 4 is a diagram illustrating one example of a tile configuration.

FIG. 4 is a diagram illustrating one example of a tile configuration. For example, a picture includes 11×8 CTUs, and is split into four tiles of rectangular regions (tiles 1 to 4). When tiles are used, the processing order of CTUs is changed from the processing order in the case where no tile is used. When no tile is used, a plurality of CTUs in a picture are processed in raster-scan order. When a plurality of tiles are used, at least one CTU in each of the plurality of tiles is processed in raster-scan order. For example, as illustrated in FIG. 4, the processing order of the CTUs included in tile 1 is the order which starts from the left-end of the first column of tile 1 toward the right-end of the first column of tile 1 and then starts from the left-end of the second column of tile 1 toward the right-end of the second column of tile 1.

It is to be noted that one tile may include one or more slices, and one slice may include one or more tiles.

It is to be noted that a picture may be configured with one or more tile sets. A tile set may include one or more tile groups, or one or more tiles. A picture may be configured with only one of a tile set, a tile group, and a tile. For example, an order for scanning a plurality of tiles for each tile set in raster scan order is assumed to be a basic encoding order of tiles. A set of one or more tiles which are continuous in the basic encoding order in each tile set is assumed to be a tile group. Such a picture may be configured by splitter 102 (see FIG. 7) to be described later.

[Scalable Encoding]

Figure 5:
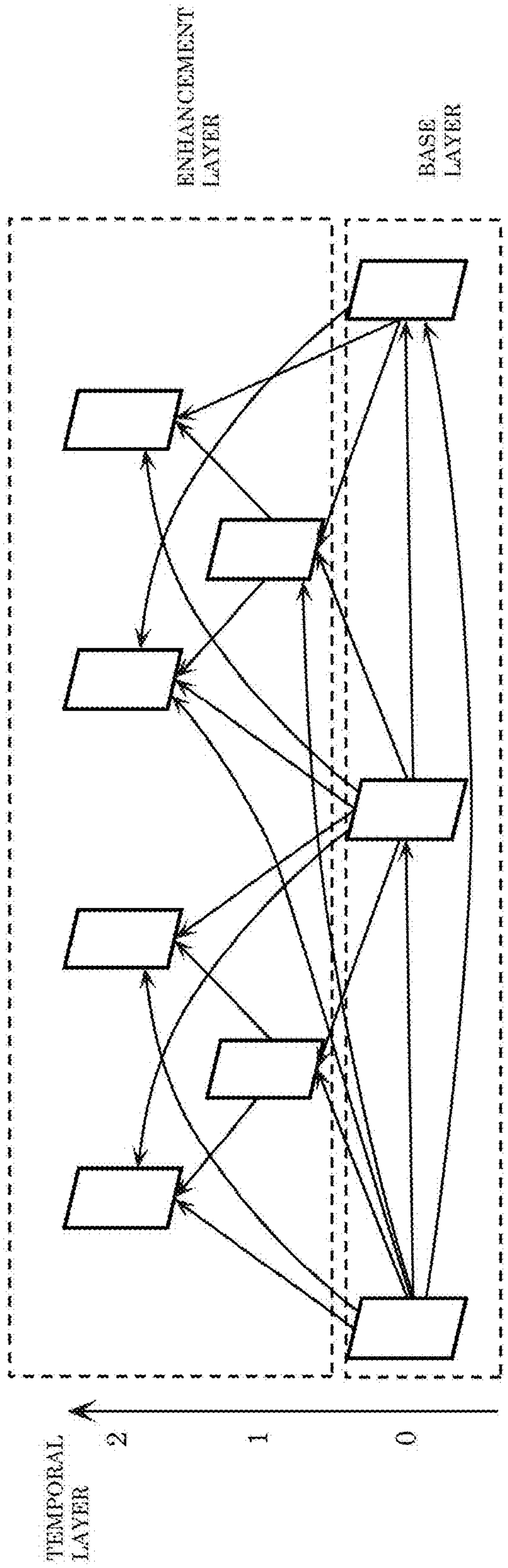
FIG. 5 is a diagram illustrating one example of an encoding structure in scalable encoding.
Figure 6:
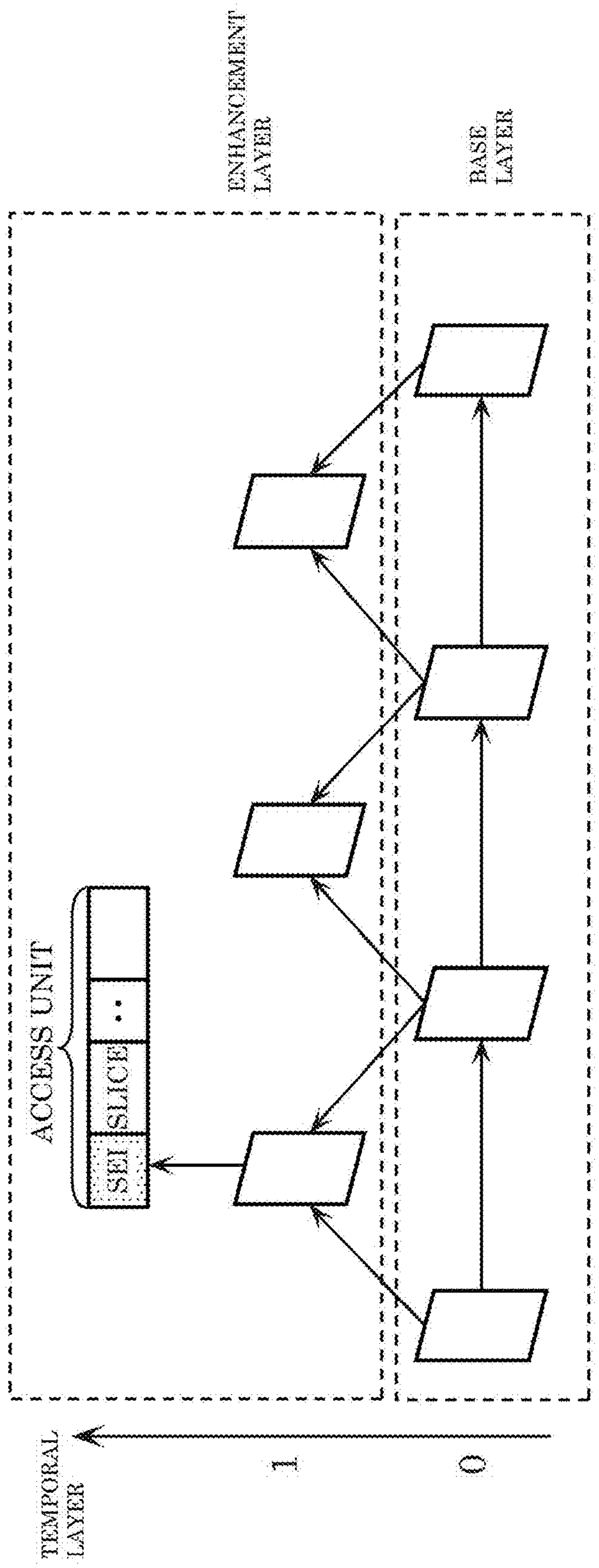
FIG. 6 is a diagram illustrating one example of an encoding structure in scalable encoding.

FIGS. 5 and 6 are diagrams illustrating examples of scalable stream structures.

As illustrated in FIG. 5, encoder 100 may generate a temporally/spatially scalable stream by dividing each of a plurality of pictures into any of a plurality of layers and encoding the picture in the layer. For example, encoder 100 encodes the picture for each layer, thereby achieving scalability where an enhancement layer is present above a base layer. Such encoding of each picture is also referred to as scalable encoding. In this way, decoder 200 is capable of switching image quality of an image which is displayed by decoding the stream. In other words, decoder 200 determines up to which layer to decode based on internal factors such as the processing ability of decoder 200 and external factors such as a state of a communication bandwidth. As a result, decoder 200 is capable of decoding a content while freely switching between low resolution and high resolution. For example, the user of the stream watches a video of the stream halfway using a smartphone on the way to home, and continues watching the video at home on a device such as a TV connected to the Internet. It is to be noted that each of the smartphone and the device described above includes decoder 200 having the same or different performances. In this case, when the device decodes layers up to the higher layer in the stream, the user can watch the video at high quality at home. In this way, encoder 100 does not need to generate a plurality of streams having different image qualities of the same content, and thus the processing load can be reduced.

Furthermore, the enhancement layer may include meta information based on statistical information on the image. Decoder 200 may generate a video whose image quality has been enhanced by performing super-resolution imaging on a picture in the base layer based on the metadata. Super-resolution imaging may be any of improvement in the Signal-to-Noise (SN) ratio in the same resolution and increase in resolution. Metadata may include information for identifying a linear or a non-linear filter coefficient, as used in a super-resolution process, or information identifying a parameter value in a filter process, machine learning, or a least squares method used in super-resolution processing.

Alternatively, a configuration may be provided in which a picture is divided into, for example, tiles in accordance with, for example, the meaning of an object in the picture. In this case, decoder 200 may decode only a partial region in a picture by selecting a tile to be decoded. In addition, an attribute of the object (person, car, ball, etc.) and a position of the object in the picture (coordinates in identical images) may be stored as metadata. In this case, decoder 200 is capable of identifying the position of a desired object based on the metadata, and determining the tile including the object. For example, as illustrated in FIG. 6, the metadata may be stored using a data storage structure different from image data, such as SEI in HEVC. This metadata indicates, for example, the position, size, or color of a main object.

Metadata may be stored in units of a plurality of pictures, such as a stream, a sequence, or a random access unit. In this way, decoder 200 is capable of obtaining, for example, the time at which a specific person appears in the video, and by fitting the time information with picture unit information, is capable of identifying a picture in which the object is present and determining the position of the object in the picture.

[Encoder]

Figure 7:
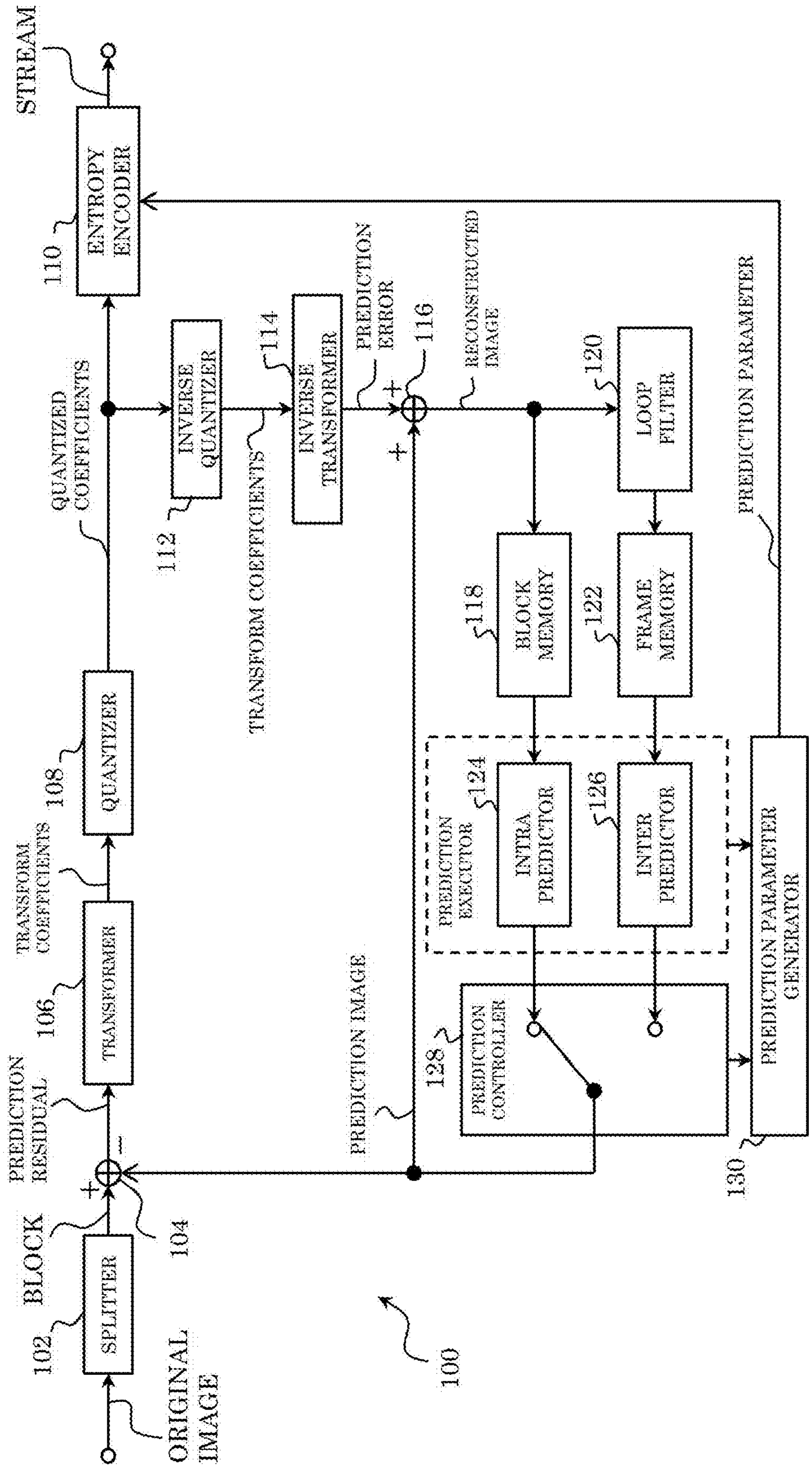
FIG. 7 is a block diagram illustrating one example of a configuration of an encoder according to an embodiment.

Next, encoder 100 according to this embodiment is described. FIG. 7 is a block diagram illustrating one example of a configuration of encoder 100 according to this embodiment. Encoder 100 encodes an image in units of a block.

As illustrated in FIG. 7, encoder 100 is an apparatus which encodes an image in units of a block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, prediction controller 128, and prediction parameter generator 130. It is to be noted that intra predictor 124 and inter predictor 126 are configured as part of a prediction executor.

[Mounting Example of Encoder]

Figure 8:
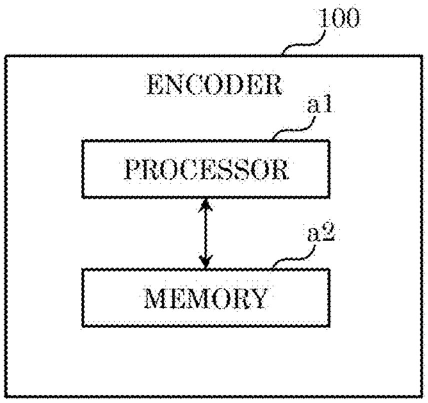
FIG. 8 is a block diagram illustrating a mounting example of the encoder.

FIG. 8 is a block diagram illustrating a mounting example of encoder 100. Encoder 100 includes processor a1 and memory a2. For example, the plurality of constituent elements of encoder 100 illustrated in FIG. 7 are mounted on processor a1 and memory a2 illustrated in FIG. 8.

Processor a1 is circuitry which performs information processing and is accessible to memory a2. For example, processor a1 is dedicated or general electronic circuitry which encodes an image. Processor a1 may be a processor such as a CPU. In addition, processor a1 may be an aggregate of a plurality of electronic circuits. In addition, for example, processor a1 may take the roles of two or more constituent elements other than a constituent element for storing information out of the plurality of constituent elements of encoder 100 illustrated in FIG. 7, etc.

Memory a2 is dedicated or general memory for storing information that is used by processor a1 to encode the image. Memory a2 may be electronic circuitry, and may be connected to processor a1. In addition, memory a2 may be included in processor a1. In addition, memory a2 may be an aggregate of a plurality of electronic circuits. In addition, memory a2 may be a magnetic disc, an optical disc, or the like, or may be represented as storage, a medium, or the like. In addition, memory a2 may be non-volatile memory, or volatile memory.

For example, memory a2 may store an image to be encoded or a stream corresponding to an encoded image. In addition, memory a2 may store a program for causing processor a1 to encode an image.

In addition, for example, memory a2 may take the roles of two or more constituent elements for storing information out of the plurality of constituent elements of encoder 100 illustrated in FIG. 7. More specifically, memory a2 may take the roles of block memory 118 and frame memory 122 illustrated in FIG. 7. More specifically, memory a2 may store a reconstructed image (specifically, a reconstructed block, a reconstructed picture, or the like).

It is to be noted that, in encoder 100, not all of the plurality of constituent elements indicated in FIG. 7, etc. may be implemented, and not all the processes described above may be performed. Part of the constituent elements indicated in FIG. 7 may be included in another device, or part of the processes described above may be performed by another device.

Hereinafter, an overall flow of processes performed by encoder 100 is described, and then each of constituent elements included in encoder 100 is described.

[Overall Flow of Encoding Process]

Figure 9:
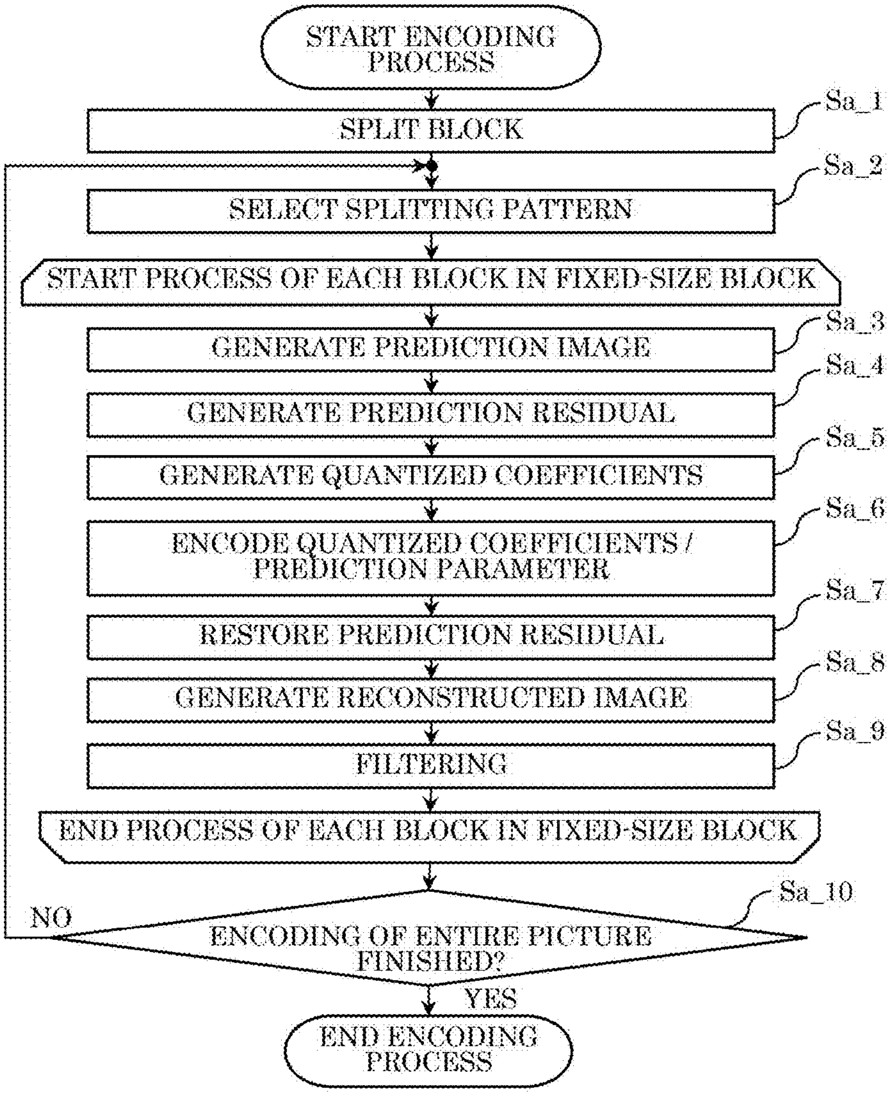
FIG. 9 is a flow chart illustrating one example of an overall encoding process performed by the encoder.

FIG. 9 is a flow chart illustrating one example of an overall encoding process performed by encoder 100.

First, splitter 102 of encoder 100 splits each of pictures included in an original image into a plurality of blocks having a fixed size (128×128 pixels) (Step Sa_1). Splitter 102 then selects a splitting pattern for the fixed-size block (Step Sa_2). In other words, splitter 102 further splits the fixed-size block into a plurality of blocks which form the selected splitting pattern. Encoder 100 performs, for each of the plurality of blocks, Steps Sa_3 to Sa_9 for the block.

Prediction controller 128 and a prediction executor which is configured with intra predictor 124 and inter predictor 126 generate a prediction image of a current block (Step Sa_3). It is to be noted that the prediction image is also referred to as a prediction signal, a prediction block, or prediction samples.

Next, subtractor 104 generates the difference between a current block and a prediction image as a prediction residual (Step Sa_4). It is to be noted that the prediction residual is also referred to as a prediction error.

Next, transformer 106 transforms the prediction image and quantizer 108 quantizes the result, to generate a plurality of quantized coefficients (Step Sa_5).

Next, entropy encoder 110 encodes (specifically, entropy encodes) the plurality of quantized coefficients and a prediction parameter related to generation of a prediction image to generate a stream (Step Sa_6).

Next, inverse quantizer 112 performs inverse quantization of the plurality of quantized coefficients and inverse transformer 114 performs inverse transform of the result, to restore a prediction residual (Step Sa_7).

Next, adder 116 adds the prediction image to the restored prediction residual to reconstruct the current block (Step Sa_8). In this way, the reconstructed image is generated. It is to be noted that the reconstructed image is also referred to as a reconstructed block, and, in particular, that a reconstructed image generated by encoder 100 is also referred to as a local decoded block or a local decoded image.

When the reconstructed image is generated, loop filter 120 performs filtering of the reconstructed image as necessary (Step Sa_9).

Encoder 100 then determines whether encoding of the entire picture has been finished (Step Sa_10). When determining that the encoding has not yet been finished (No in Step Sa_10), processes from Step Sa_2 are executed repeatedly.

Although encoder 100 selects one splitting pattern for a fixed-size block, and encodes each block according to the splitting pattern in the above-described example, it is to be noted that each block may be encoded according to a corresponding one of a plurality of splitting patterns. In this case, encoder 100 may evaluate a cost for each of the plurality of splitting patterns, and, for example, may select the stream obtained by encoding according to the splitting pattern which yields the smallest cost as a stream which is output finally.

Alternatively, the processes in Steps Sa_1 to Sa_10 may be performed sequentially by encoder 100, or two or more of the processes may be performed in parallel or may be reordered.

The encoding process by encoder 100 is hybrid encoding using prediction encoding and transform encoding. In addition, prediction encoding is performed by an encoding loop configured with subtractor 104, transformer 106, quantizer 108, inverse quantizer 112, inverse transformer 114, adder 116, loop filter 120, block memory 118, frame memory 122, intra predictor 124, inter predictor 126, and prediction controller 128. In other words, the prediction executor configured with intra predictor 124 and inter predictor 126 is part of the encoding loop.

[Splitter]

Splitter 102 splits each of pictures included in the original image into a plurality of blocks, and outputs each block to subtractor 104. For example, splitter 102 first splits a picture into blocks of a fixed size (for example, 128×128 pixels). The fixed-size block is also referred to as a coding tree unit (CTU). Splitter 102 then splits each fixed-size block into blocks of variable sizes (for example, 64×64 pixels or smaller), based on recursive quadtree and/or binary tree block splitting. In other words, splitter 102 selects a splitting pattern. The variable-size block is also referred to as a coding unit (CU), a prediction unit (PU), or a transform unit (TU). It is to be noted that, in various kinds of mounting examples, there is no need to differentiate between CU, PU, and TU; all or some of the blocks in a picture may be processed in units of a CU, a PU, or a TU.

Figure 10:
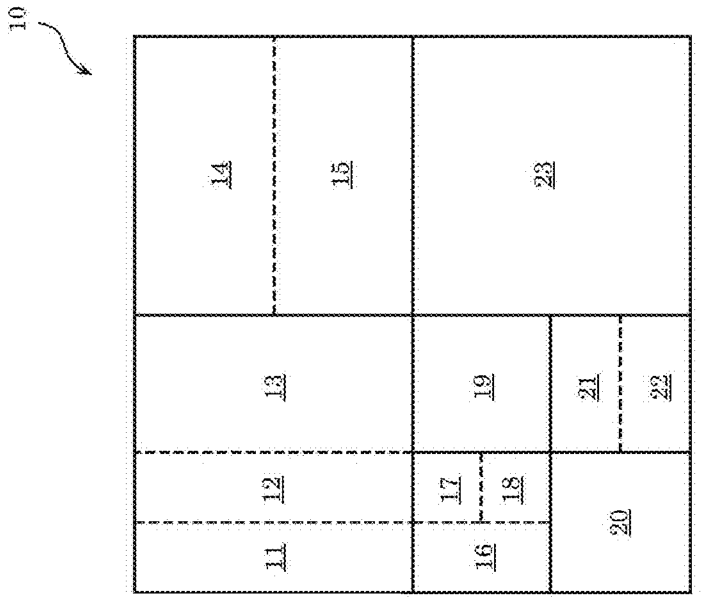
FIG. 10 is a diagram illustrating one example of block splitting.

FIG. 10 is a diagram illustrating one example of block splitting according to this embodiment. In FIG. 10, the solid lines represent block boundaries of blocks split by quadtree block splitting, and the dashed lines represent block boundaries of blocks split by binary tree block splitting.

Here, block 10 is a square block having 128×128 pixels. This block 10 is first split into four square 64×64 pixel blocks (quadtree block splitting).

The upper-left 64×64 pixel block is further vertically split into two rectangle 32×64 pixel blocks, and the left 32×64 pixel block is further vertically split into two rectangle 16×64 pixel blocks (binary tree block splitting). As a result, the upper-left square 64×64 pixel block is split into two 16×64 pixel blocks 11 and 12 and one 32×64 pixel block 13.

The upper-right square 64×64 pixel block is horizontally split into two rectangle 64×32 pixel blocks 14 and 15 (binary tree block splitting).

The lower-left square 64×64 pixel block is first split into four square 32×32 pixel blocks (quadtree block splitting). The upper-left block and the lower-right block among the four square 32×32 pixel blocks are further split. The upper-left square 32×32 pixel block is vertically split into two rectangle 16×32 pixel blocks, and the right 16×32 pixel block is further horizontally split into two 16×16 pixel blocks (binary tree block splitting). The lower-right 32×32 pixel block is horizontally split into two 32×16 pixel blocks (binary tree block splitting). The upper-right square 32×32 pixel block is horizontally split into two rectangle 32×16 pixel blocks (binary tree block splitting). As a result, the lower-left square 64×64 pixel block is split into rectangle16×32 pixel block 16, two square 16×16 pixel blocks 17 and 18, two square 32×32 pixel blocks 19 and 20, and two rectangle 32×16 pixel blocks 21 and 22.

The lower-right 64×64 pixel block 23 is not split.

As described above, in FIG. 10, block 10 is split into thirteen variable-size blocks 11 through 23 based on recursive quadtree and binary tree block splitting. Such splitting is also referred to as quad-tree plus binary tree splitting (QTBT).

It is to be noted that, in FIG. 10, one block is split into four or two blocks (quadtree or binary tree block splitting), but splitting is not limited to these examples. For example, one block may be split into three blocks (ternary block splitting). Splitting including such ternary block splitting is also referred to as multi type tree (MBT) splitting.

Figure 11:
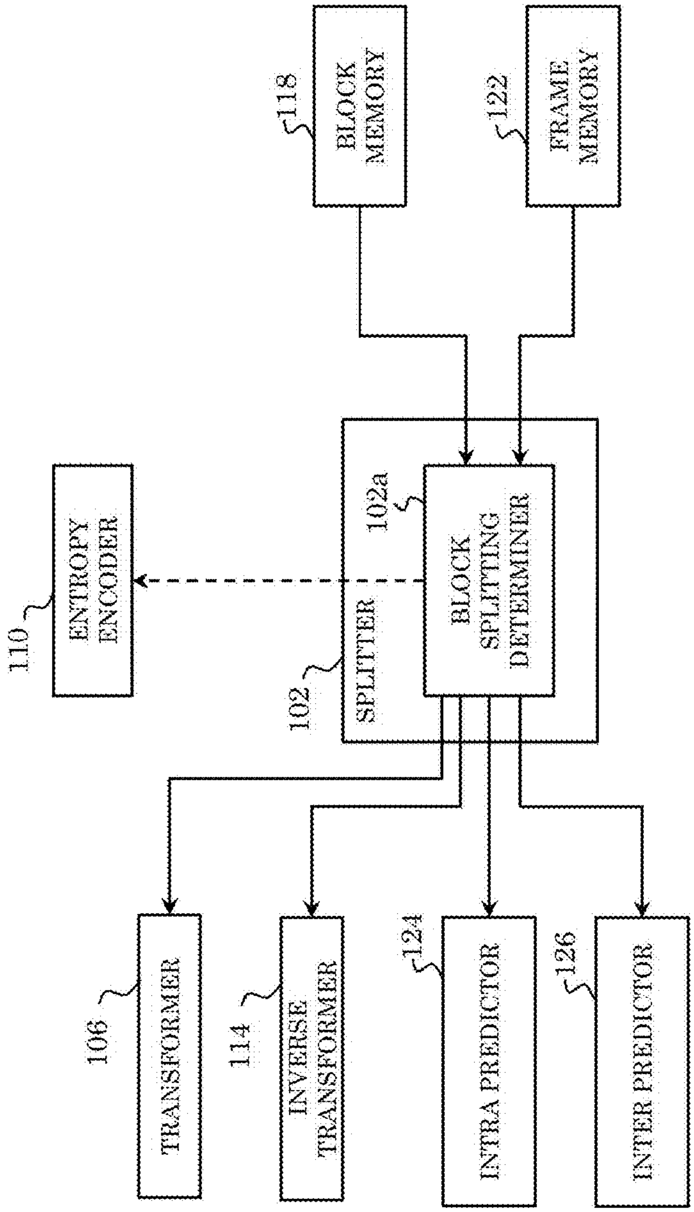
FIG. 11 is a diagram illustrating one example of a configuration of a splitter.

FIG. 11 is a diagram illustrating one example of a configuration of splitter 102. As illustrated in FIG. 11, splitter 102 may include block splitting determiner 102*a*. Block splitting determiner 102*a* may perform the following processes as examples.

For example, block splitting determiner 102*a* collects block information from either block memory 118 or frame memory 122, and determines the above-described splitting pattern based on the block information. Splitter 102 splits the original image according to the splitting pattern, and outputs at least one block obtained by the splitting to subtractor 104.

In addition, for example, block splitting determiner 102*a* outputs a parameter indicating the above-described splitting pattern to transformer 106, inverse transformer 114, intra predictor 124, inter predictor 126, and entropy encoder 110. Transformer 106 may transform a prediction residual based on the parameter. Intra predictor 124 and inter predictor 126 may generate a prediction image based on the parameter. In addition, entropy encoder 110 may entropy encodes the parameter.

The parameter related to the splitting pattern may be written in a stream as indicated below as one example.

Figure 12:
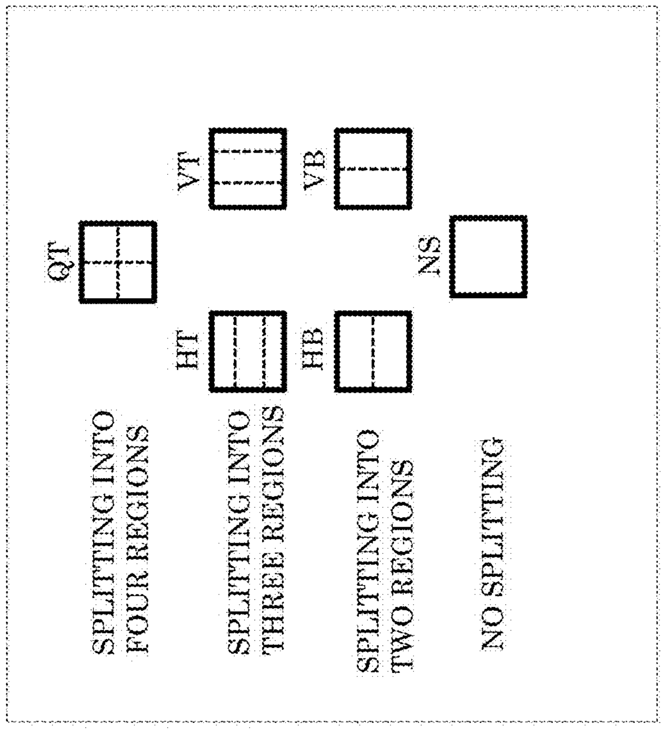
FIG. 12 is a diagram illustrating examples of splitting patterns.

FIG. 12 is a diagram illustrating examples of splitting patterns. Examples of splitting patterns include: splitting into four regions (QT) in which a block is split into two regions both horizontally and vertically; splitting into three regions (HT or VT) in which a block is split in the same direction in a ratio of 1:2:1; splitting into two regions (HB or VB) in which a block is split in the same direction in a ratio of 1:1; and no splitting (NS).

It is to be noted that the splitting pattern does not have any block splitting direction in the case of splitting into four regions and no splitting, and that the splitting pattern has splitting direction information in the case of splitting into two regions or three regions.

Figure 13A:
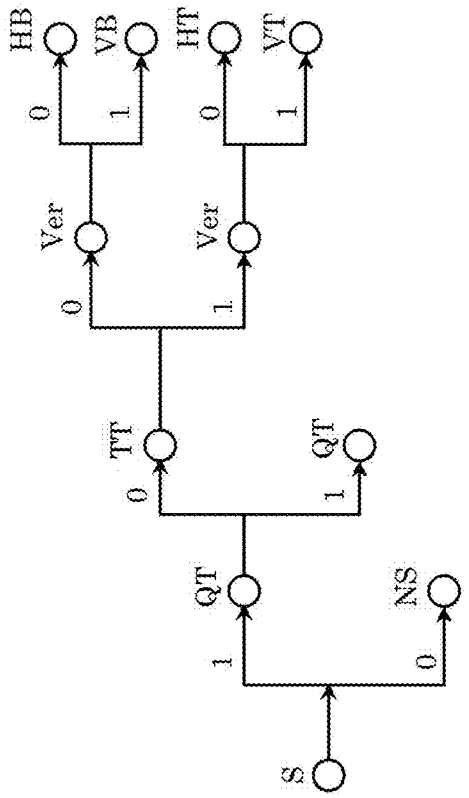
FIG. 13A is a diagram illustrating one example of a syntax tree of a splitting pattern.
Figure 13B:
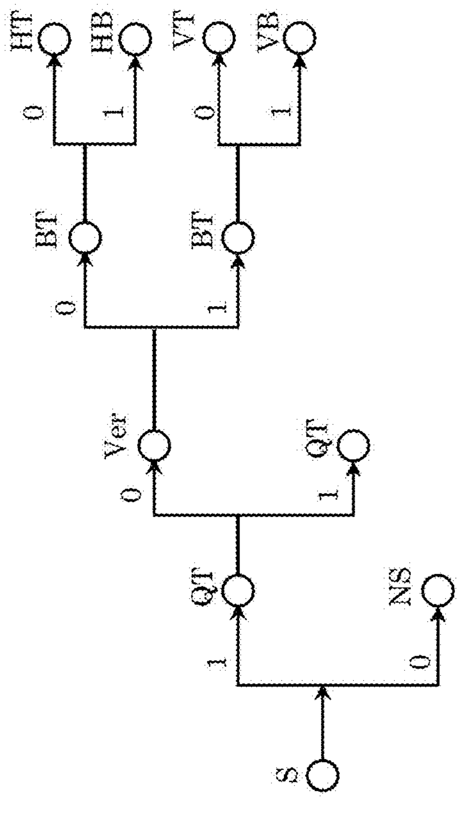
FIG. 13B is a diagram illustrating another example of a syntax tree of a splitting pattern.

FIGS. 13A and 13B are each a diagram illustrating one example of a syntax tree of a splitting pattern. In the example of FIG. 13A, first, information indicating whether to perform splitting (S: Split flag) is present, and information indicating whether to perform splitting into four regions (QT: QT flag) is present next. Information indicating which one of splitting into three regions and two regions is to be performed (TT: TT flag or BT: BT flag) is present next, and lastly, information indicating a division direction (Ver: Vertical flag or Hor: Horizontal flag) is present. It is to be noted that each of at least one block obtained by splitting according to such a splitting pattern may be further split repeatedly in a similar process. In other words, as one example, whether splitting is performed, whether splitting into four regions is performed, which one of the horizontal direction and the vertical direction is the direction in which a splitting method is to be performed, which one of splitting into three regions and splitting into two regions is to be performed may be recursively determined, and the determination results may be encoded in a stream according to the encoding order disclosed by the syntax tree illustrated in FIG. 13A.

In addition, although information items respectively indicating S, QT, TT, and Ver are arranged in the listed order in the syntax tree illustrated in FIG. 13A, information items respectively indicating S, QT, Ver, and BT may be arranged in the listed order. In other words, in the example of FIG. 13B, first, information indicating whether to perform splitting (S: Split flag) is present, and information indicating whether to perform splitting into four regions (QT: QT flag) is present next. Information indicating the splitting direction (Ver: Vertical flag or Hor: Horizontal flag) is present next, and lastly, information indicating which one of splitting into two regions and splitting into three regions is to be performed (BT: BT flag or TT: TT flag) is present.

It is to be noted that the splitting patterns described above are examples, and splitting patterns other than the described splitting patterns may be used, or part of the described splitting patterns may be used.

[Subtractor]

Subtractor 104 subtracts a prediction image (prediction image that is input from prediction controller 128) from the original image in units of a block input from splitter 102 and split by splitter 102. In other words, subtractor 104 calculates prediction residuals of a current block. Subtractor 104 then outputs the calculated prediction residuals to transformer 106.

The original signal is an input signal which has been input to encoder 100 and represents an image of each picture included in a video (for example, a luma signal and two chroma signals).

[Transformer]

Transformer 106 transforms prediction residuals in spatial domain into transform coefficients in frequency domain, and outputs the transform coefficients to quantizer 108. More specifically, transformer 106 applies, for example, a predefined discrete cosine transform (DCT) or discrete sine transform (DST) to prediction residuals in spatial domain.

It is to be noted that transformer 106 may adaptively select a transform type from among a plurality of transform types, and transform prediction residuals into transform coefficients by using a transform basis function corresponding to the selected transform type. This sort of transform is also referred to as explicit multiple core transform (EMT) or adaptive multiple transform (AMT). In addition, a transform basis function is also simply referred to as a basis.

The transform types include, for example, DCT-II, DCT-V, DCT-VIII, DST-I, and DST-VII. It is to be noted that these transform types may be represented as DCT2, DCT5, DCT8, DST1, and DST7. FIG. 14 is a chart illustrating transform basis functions for each transform type. In FIG. 14, N indicates the number of input pixels. For example, selection of a transform type from among the plurality of transform types may depend on a prediction type (one of intra prediction and inter prediction), and may depend on an intra prediction mode.

Information indicating whether to apply such EMT or AMT (referred to as, for example, an EMT flag or an AMT flag) and information indicating the selected transform type is normally signaled at the CU level. It is to be noted that the signaling of such information does not necessarily need to be performed at the CU level, and may be performed at another level (for example, at the sequence level, picture level, slice level, brick level, or CTU level).

In addition, transformer 106 may re-transform the transform coefficients (which are transform results). Such re-transform is also referred to as adaptive secondary transform (AST) or non-separable secondary transform (NSST). For example, transformer 106 performs re-transform in units of a sub-block (for example, 4×4 pixel sub-block) included in a transform coefficient block corresponding to an intra prediction residual. Information indicating whether to apply NSST and information related to a transform matrix for use in NSST are normally signaled at the CU level. It is to be noted that the signaling of such information does not necessarily need to be performed at the CU level, and may be performed at another level (for example, at the sequence level, picture level, slice level, brick level, or CTU level).

Transformer 106 may employ a separable transform and a non-separable transform. A separable transform is a method in which a transform is performed a plurality of times by separately performing a transform for each of directions according to the number of dimensions of inputs. A non-separable transform is a method of performing a collective transform in which two or more dimensions in multidimensional inputs are collectively regarded as a single dimension.

In one example of the non-separable transform, when an input is a 4×4 pixel block, the 4×4 pixel block is regarded as a single array including sixteen elements, and the transform applies a 16×16 transform matrix to the array.

In another example of the non-separable transform, an input block of 4×4 pixels is regarded as a single array including sixteen elements, and then a transform (hypercube givens transform) in which givens revolution is performed on the array a plurality of times may be performed.

In the transform in transformer 106, the transform types of transform basis functions to be transformed into the frequency domain according to regions in a CU can be switched. Examples include a spatially varying transform (SVT).

Figure 15:
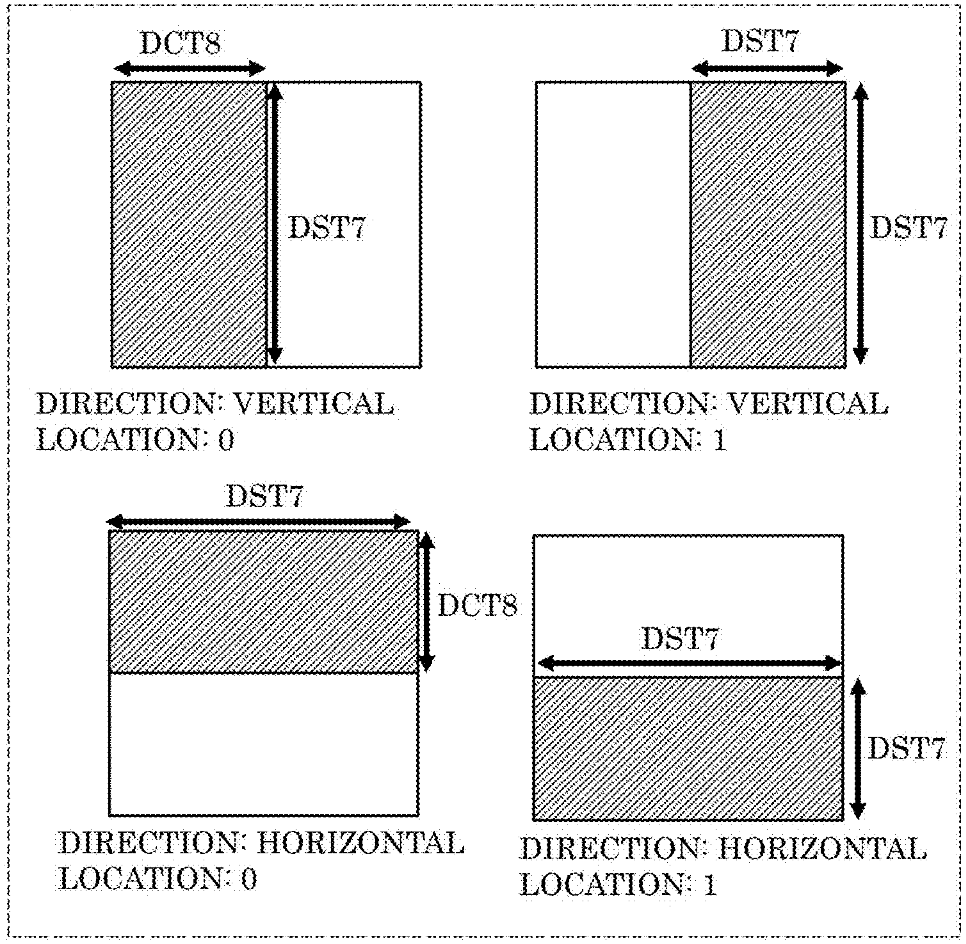
FIG. 15 is a diagram illustrating examples of SVT.

FIG. 15 is a diagram illustrating one example of SVT.

In SVT, as illustrated in FIG. 15, CUs are split into two equal regions horizontally or vertically, and only one of the regions is transformed into the frequency domain. A transform type can be set for each region. For example, DST7 and DST8 are used. For example, among the two regions obtained by splitting a CU vertically into two equal regions, DST7 and DCT8 may be used for the region at position 0. Alternatively, among the two regions, DST7 is used for the region at position 1. Likewise, among the two regions obtained by splitting a CU horizontally into two equal regions, DST7 and DCT8 are used for the region at position 0. Alternatively, among the two regions, DST7 is used for the region at position 1. Although only one of the two regions in a CU is transformed and the other is not transformed in the example illustrated in FIG. 15, each of the two regions may be transformed. In addition, splitting method may include not only splitting into two regions but also splitting into four regions. In addition, the splitting method can be more flexible. For example, information indicating the splitting method may be encoded and may be signaled in the same manner as the CU splitting. It is to be noted that SVT is also referred to as sub-block transform (SBT).

The AMT and EMT described above may be referred to as MTS (multiple transform selection). When MTS is applied, a transform type that is DST7, DCT8, or the like can be selected, and the information indicating the selected transform type may be encoded as index information for each CU. There is another process referred to as IMTS (implicit MTS) as a process for selecting, based on the shape of a CU, a transform type to be used for orthogonal transform performed without encoding index information. When IMTS is applied, for example, when a CU has a rectangle shape, orthogonal transform of the rectangle shape is performed using DST7 for the short side and DST2 for the long side. In addition, for example, when a CU has a square shape, orthogonal transform of the rectangle shape is performed using DCT2 when MTS is effective in a sequence and using DST7 when MTS is ineffective in the sequence. DCT2 and DST7 are mere examples. Other transform types may be used, and it is also possible to change the combination of transform types for use to a different combination of transform types. IMTS may be used only for intra prediction blocks, or may be used for both intra prediction blocks and inter prediction block.

The three processes of MTS, SBT, and IMTS have been described above as selection processes for selectively switching transform types for use in orthogonal transform. However, all of the three selection processes may be made effective, or only part of the selection processes may be selectively made effective. Whether each of the selection processes is made effective can be identified based on flag information or the like in a header such as an SPS. For example, when all of the three selection processes are effective, one of the three selection processes is selected for each CU and orthogonal transform of the CU is performed. It is to be noted that the selection processes for selectively switching the transform types may be selection processes different from the above three selection processes, or each of the three selection processes may be replaced by another process as long as at least one of the following four functions [1] to [4] can be achieved. Function [1] is a function for performing orthogonal transform of the entire CU and encoding information indicating the transform type used in the transform. Function [2] is a function for performing orthogonal transform of the entire CU and determining the transform type based on a predetermined rule without encoding information indicating the transform type. Function [3] is a function for performing orthogonal transform of a partial region of a CU and encoding information indicating the transform type used in the transform. Function [4] is a function for performing orthogonal transform of a partial region of a CU and determining the transform type based on a predetermined rule without encoding information indicating the transform type used in the transform.

It is to be noted that whether each of MTS, IMTS, and SBT is applied may be determined for each processing unit. For example, whether each of MTS, IMTS, and SBT is applied may be determined for each sequence, picture, brick, slice, CTU, or CU.

It is to be noted that a tool for selectively switching transform types in the present disclosure may be rephrased by a method for selectively selecting a basis for use in a transform process, a selection process, or a process for selecting a basis. In addition, the tool for selectively switching transform types may be rephrased by a mode for adaptively selecting a transform type.

FIG. 16 is a flow chart illustrating one example of a process performed by transformer 106.

For example, transformer 106 determines whether to perform orthogonal transform (Step St_1). Here, when determining to perform orthogonal transform (Yes in Step St_1), transformer 106 selects a transform type for use in orthogonal transform from a plurality of transform types (Step St_2). Next, transformer 106 performs orthogonal transform by applying the selected transform type to the prediction residual of a current block (Step St_3). Transformer 106 then outputs information indicating the selected transform type to entropy encoder 110, so as to allow entropy encoder 110 to encode the information (Step St_4). On the other hand, when determining not to perform orthogonal transform (No in Step St_1), transformer 106 outputs information indicating that no orthogonal transform is performed, so as to allow entropy encoder 110 to encode the information (Step St_5). It is to be noted that whether to perform orthogonal transform in Step St_1 may be determined based on, for example, the size of a transform block, a prediction mode applied to the CU, etc. Alternatively, orthogonal transform may be performed using a predefined transform type without encoding information indicating the transform type for use in orthogonal transform.

FIG. 17 is a flow chart illustrating another example of a process performed by transformer 106. It is to be noted that the example illustrated in FIG. 17 is an example of orthogonal transform in the case where transform types for use in orthogonal transform are selectively switched as in the case of the example illustrated in FIG. 16.

As one example, a first transform type group may include DCT2, DST7, and DCT8. As another example, a second transform type group may include DCT2. The transform types included in the first transform type group and the transform types included in the second transform type group may partly overlap with each other, or may be totally different from each other.

More specifically, transformer 106 determines whether a transform size is smaller than or equal to a predetermined value (Step Su_1). Here, when determining that the transform size is smaller than or equal to the predetermined value (Yes in Step Su_1), transformer 106 performs orthogonal transform of the prediction residual of the current block using the transform type included in the first transform type group (Step Su_2). Next, transformer 106 outputs information indicating the transform type to be used among at least one transform type included in the first transform type group to entropy encoder 110, so as to allow entropy encoder 110 to encode the information (Step Su_3). On the other hand, when determining that the transform size is not smaller than or equal to the predetermined value (No in Step Su_1), transformer 106 performs orthogonal transform of the prediction residual of the current block using the second transform type group (Step Su_4).

In Step Su_3, the information indicating the transform type for use in orthogonal transform may be information indicating a combination of the transform type to be applied vertically in the current block and the transform type to be applied horizontally in the current block. The first type group may include only one transform type, and the information indicating the transform type for use in orthogonal transform may not be encoded. The second transform type group may include a plurality of transform types, and information indicating the transform type for use in orthogonal transform among the one or more transform types included in the second transform type group may be encoded.

Alternatively, a transform type may be determined based only on a transform size. It is to be noted that such determinations are not limited to the determination as to whether the transform size is smaller than or equal to the predetermined value, and other processes are also possible as long as the processes are for determining a transform type for use in orthogonal transform based on the transform size.

[Quantizer]

Quantizer 108 quantizes the transform coefficients output from transformer 106. More specifically, quantizer 108 scans, in a determined scanning order, the transform coefficients of the current block, and quantizes the scanned transform coefficients based on quantization parameters (QP) corresponding to the transform coefficients. Quantizer 108 then outputs the quantized transform coefficients (hereinafter also referred to as quantized coefficients) of the current block to entropy encoder 110 and inverse quantizer 112.

A determined scanning order is an order for quantizing/inverse quantizing transform coefficients. For example, a determined scanning order is defined as ascending order of frequency (from low to high frequency) or descending order of frequency (from high to low frequency).

A quantization parameter (QP) is a parameter defining a quantization step (quantization width). For example, when the value of the quantization parameter increases, the quantization step also increases. In other words, when the value of the quantization parameter increases, an error in quantized coefficients (quantization error) increases.

In addition, a quantization matrix may be used for quantization. For example, several kinds of quantization matrices may be used correspondingly to frequency transform sizes such as 4×4 and 8×8, prediction modes such as intra prediction and inter prediction, and pixel components such as luma and chroma pixel components. It is to be noted that quantization means digitalizing values sampled at predetermined intervals correspondingly to predetermined levels. In this technical field, quantization may be represented as other expressions such as rounding and scaling.

Methods using quantization matrices include a method using a quantization matrix which has been set directly at the encoder 100 side and a method using a quantization matrix which has been set as a default (default matrix). At the encoder 100 side, a quantization matrix suitable for features of an image can be set by directly setting a quantization matrix. This case, however, has a disadvantage of increasing a coding amount for encoding the quantization matrix. It is to be noted that a quantization matrix to be used to quantize the current block may be generated based on a default quantization matrix or an encoded quantization matrix, instead of directly using the default quantization matrix or the encoded quantization matrix.

There is a method for quantizing a high-frequency coefficient and a low-frequency coefficient in the same manner without using a quantization matrix. It is to be noted that this method is equivalent to a method using a quantization matrix (flat matrix) whose all coefficients have the same value.

The quantization matrix may be encoded, for example, at the sequence level, picture level, slice level, brick level, or CTU level.

When using a quantization matrix, quantizer 108 scales, for each transform coefficient, for example a quantization width which can be calculated based on a quantization parameter, etc., using the value of the quantization matrix. The quantization process performed without using any quantization matrix may be a process of quantizing transform coefficients based on a quantization width calculated based on a quantization parameter, etc. It is to be noted that, in the quantization process performed without using any quantization matrix, the quantization width may be multiplied by a predetermined value which is common for all the transform coefficients in a block.

Figure 18:
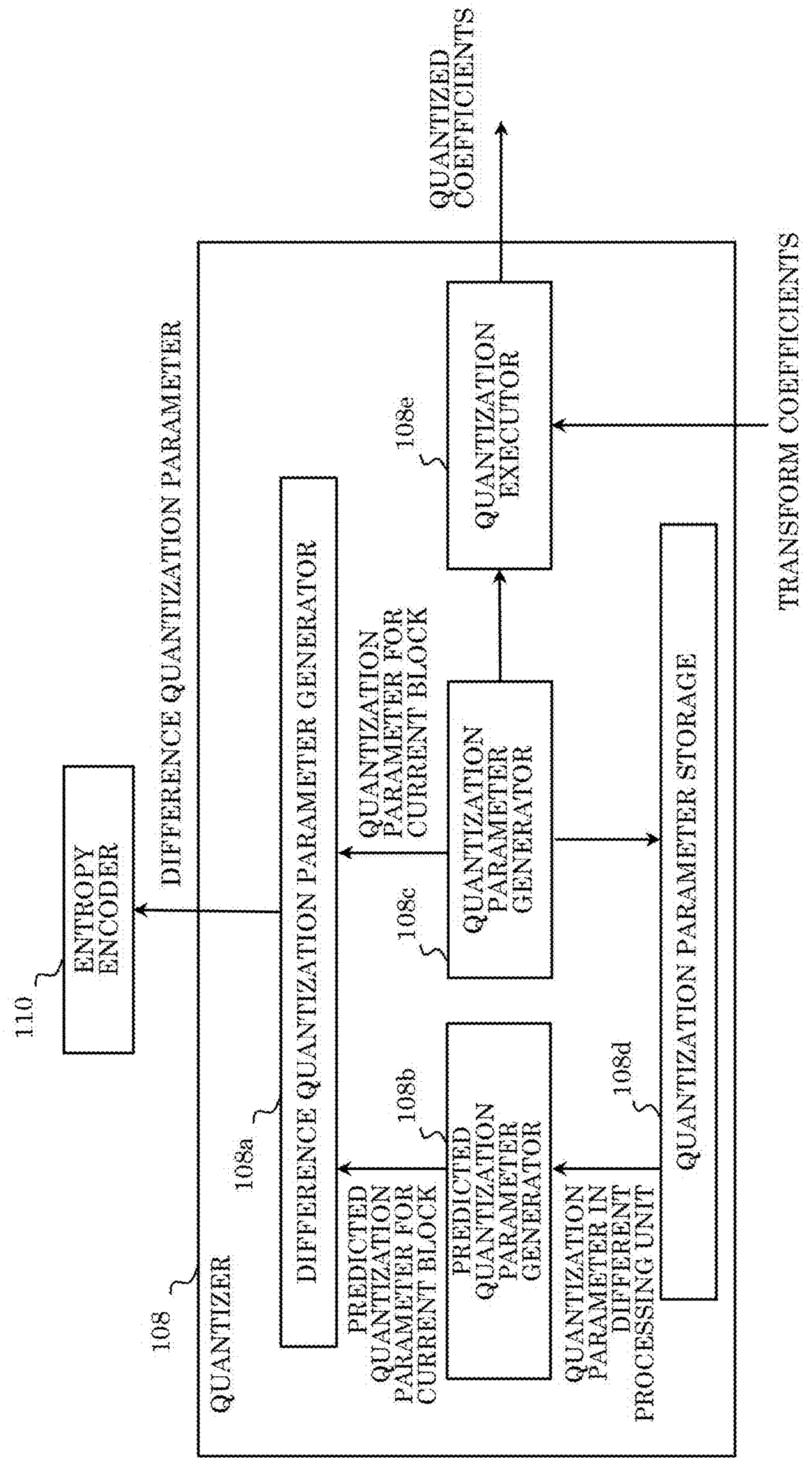
FIG. 18 is a block diagram illustrating one example of a configuration of a quantizer.

FIG. 18 is a block diagram illustrating one example of a configuration of quantizer 108.

For example, quantizer 108 includes difference quantization parameter generator 108*a*, predicted quantization parameter generator 108*b*, quantization parameter generator 108*c*, quantization parameter storage 108*d*, and quantization executor 108*e*.

Figure 19:
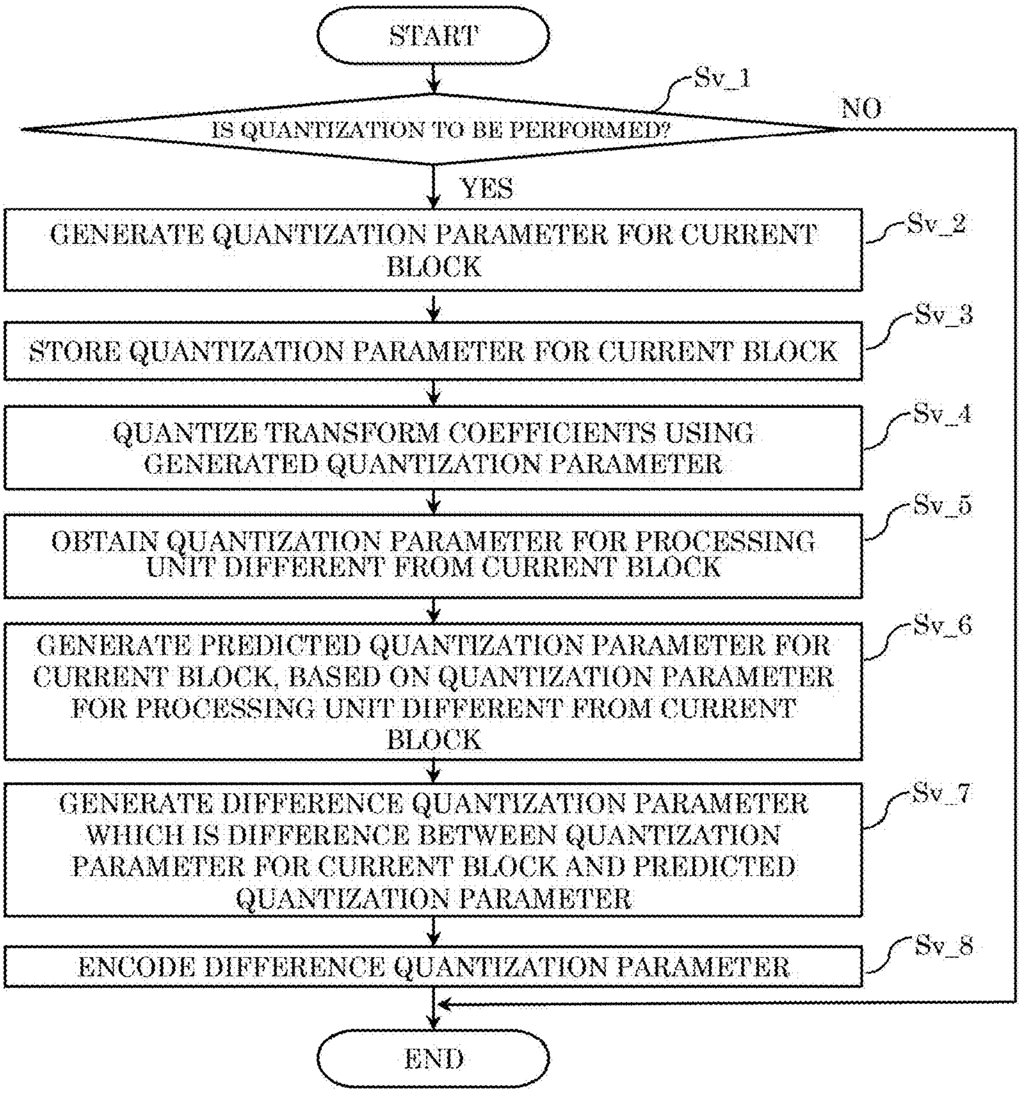
FIG. 19 is a flow chart illustrating one example of quantization performed by the quantizer.

FIG. 19 is a flow chart illustrating one example of quantization performed by quantizer 108.

As one example, quantizer 108 may perform quantization for each CU based on the flow chart illustrated in FIG. 19. More specifically, quantization parameter generator 108*c* determines whether to perform quantization (Step Sv_1). Here, when determining to perform quantization (Yes in Step Sv_1), quantization parameter generator 108*c* generates a quantization parameter for a current block (Step Sv_2), and stores the quantization parameter into quantization parameter storage 108*d* (Step Sv_3).

Next, quantization executor 108*e* quantizes transform coefficients of the current block using the quantization parameter generated in Step Sv_2 (Step Sv_4). Predicted quantization parameter generator 108*b* then obtains a quantization parameter for a processing unit different from the current block from quantization parameter storage 108*d* (Step Sv_5). Predicted quantization parameter generator 108*b* generates a predicted quantization parameter of the current block based on the obtained quantization parameter (Step Sv_6). Difference quantization parameter generator 108*a* calculates the difference between the quantization parameter of the current block generated by quantization parameter generator 108*c* and the predicted quantization parameter of the current block generated by predicted quantization parameter generator 108*b* (Step Sv_7). The difference quantization parameter is generated by calculating the difference. Difference quantization parameter generator 108*a* outputs the difference quantization parameter to entropy encoder 110, so as to allow entropy encoder 110 to encode the difference quantization parameter (Step Sv_8).

It is to be noted that the difference quantization parameter may be encoded, for example, at the sequence level, picture level, slice level, brick level, or CTU level. In addition, the initial value of the quantization parameter may be encoded at the sequence level, picture level, slice level, brick level, or CTU level. At this time, the quantization parameter may be generated using the initial value of the quantization parameter and the difference quantization parameter.

It is to be noted that quantizer 108 may include a plurality of quantizers, and may apply dependent quantization in which transform coefficients are quantized using a quantization method selected from a plurality of quantization methods.

[Entropy Encoder]

Figure 20:
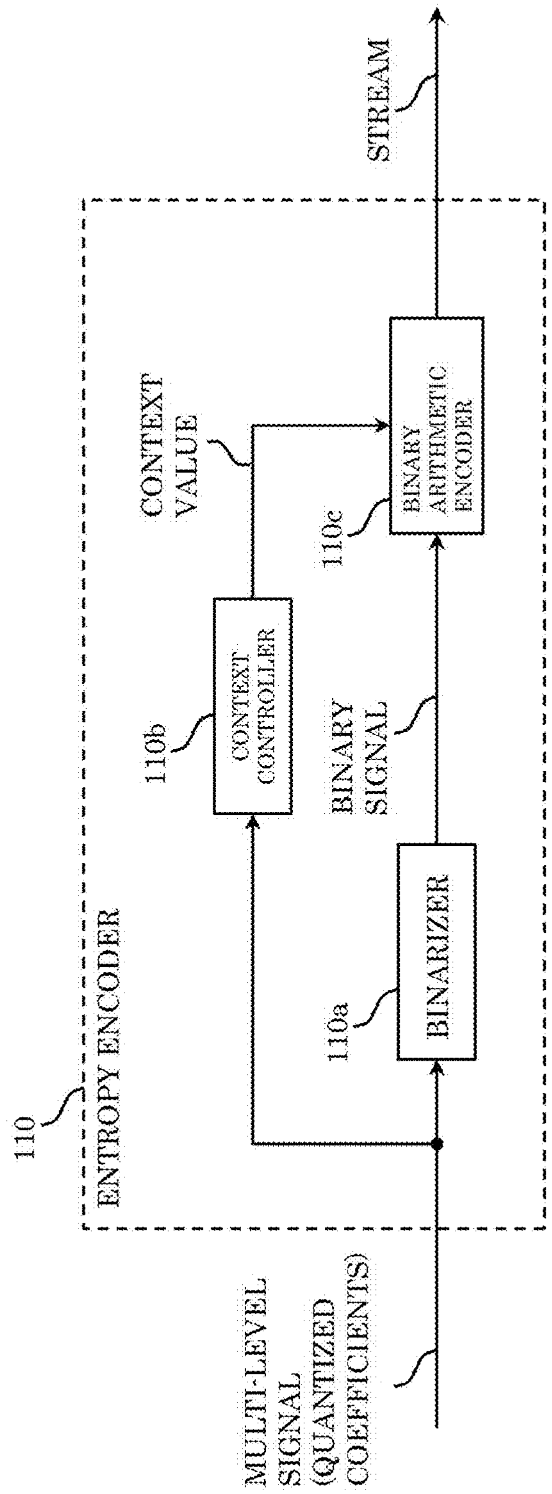
FIG. 20 is a block diagram illustrating one example of a configuration of an entropy encoder.

FIG. 20 is a block diagram illustrating one example of a configuration of entropy encoder 110.

Entropy encoder 110 generates a stream by entropy encoding the quantized coefficients input from quantizer 108 and a prediction parameter input from prediction parameter generator 130. For example, context-based adaptive binary arithmetic coding (CABAC) is used as the entropy encoding. More specifically, entropy encoder 110 includes binarizer 110*a*, context controller 110*b*, and binary arithmetic encoder 110*c*. Binarizer 110*a* performs binarization in which multi-level signals such as quantized coefficients and a prediction parameter are transformed into binary signals. Examples of binarization methods include truncated Rice binarization, exponential Golomb codes, and fixed length binarization. Context controller 110*b* derives a context value according to a feature or a surrounding state of a syntax element, that is, an occurrence probability of a binary signal. Examples of methods for deriving a context value include bypass, referring to a syntax element, referring to an upper and left adjacent blocks, referring to hierarchical information, and others. Binary arithmetic encoder 110*c* arithmetically encodes the binary signal using the derived context value.

Figure 21:
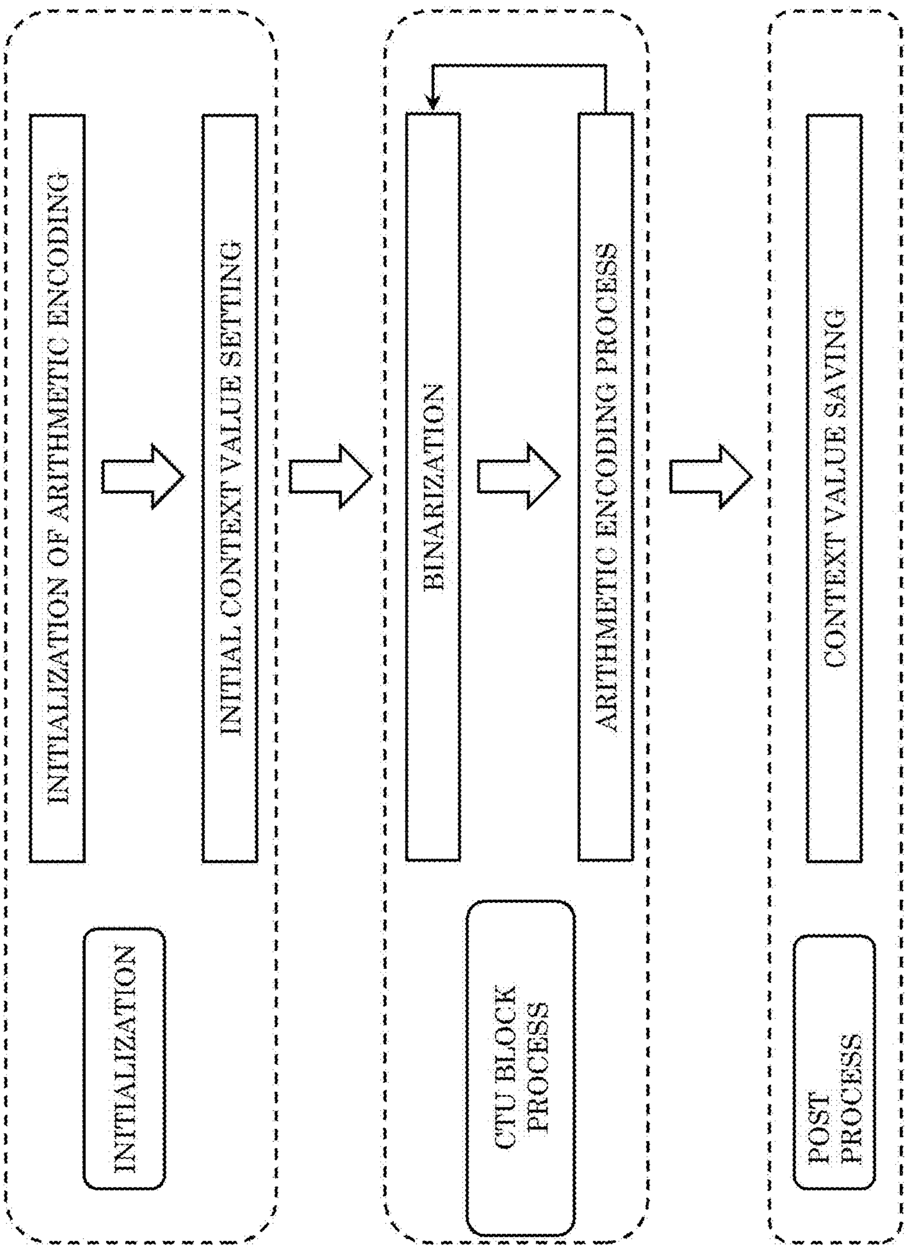
FIG. 21 is a diagram illustrating a flow of CABAC in the entropy encoder.

FIG. 21 is a diagram illustrating a flow of CABAC in entropy encoder 110.

First, initialization is performed in CABAC in entropy encoder 110. In the initialization, initialization in binary arithmetic encoder 110*c* and setting of an initial context value are performed. For example, binarizer 110*a* and binary arithmetic encoder 110*c* execute binarization and arithmetic encoding of a plurality of quantization coefficients in a CTU sequentially. At this time, context controller 110*b* updates the context value each time arithmetic encoding is performed. Context controller 110*b* then saves the context value as a post process. The saved context value is used, for example, to initialize the context value for the next CTU.

[Inverse Quantizer]

Inverse quantizer 112 inverse quantizes quantized coefficients which have been input from quantizer 108. More specifically, inverse quantizer 112 inverse quantizes, in a determined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming the transform coefficients which have been input from inverse quantizer 112. More specifically, inverse transformer 114 restores the prediction residuals of the current block by performing an inverse transform corresponding to the transform applied to the transform coefficients by transformer 106. Inverse transformer 114 then outputs the restored prediction residuals to adder 116.

It is to be noted that since information is normally lost in quantization, the restored prediction residuals do not match the prediction errors calculated by subtractor 104. In other words, the restored prediction residuals normally include quantization errors.

[Adder]

Adder 116 reconstructs the current block by adding the prediction residuals which have been input from inverse transformer 114 and prediction images which have been input from prediction controller 128. Consequently, a reconstructed image is generated. Adder 116 then outputs the reconstructed image to block memory 118 and loop filter 120.

[Block Memory]

Block memory 118 is storage for storing a block which is included in a current picture and is referred to in intra prediction. More specifically, block memory 118 stores a reconstructed image output from adder 116.

[Frame Memory]

Frame memory 122 is, for example, storage for storing reference pictures for use in inter prediction, and is also referred to as a frame buffer. More specifically, frame memory 122 stores a reconstructed image filtered by loop filter 120.

[Loop Filter]

Loop filter 120 applies a loop filter to a reconstructed image output by adder 116, and outputs the filtered reconstructed image to frame memory 122. A loop filter is a filter used in an encoding loop (in-loop filter). Examples of loop filters include, for example, an adaptive loop filter (ALF), a deblocking filter (DF or DBF), a sample adaptive offset (SAO), etc.

Figure 22:
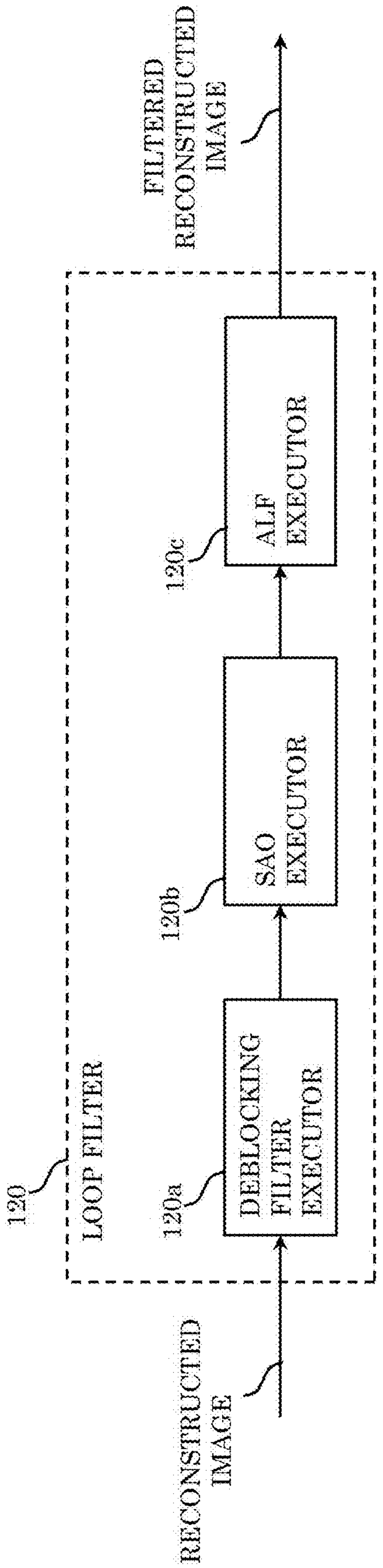
FIG. 22 is a block diagram illustrating one example of a configuration of a loop filter.

FIG. 22 is a block diagram illustrating one example of a configuration of loop filter 120.

For example, as illustrated in FIG. 22, loop filter 120 includes deblocking filter executor 120*a*, SAO executor 120*b*, and ALF executor 120*c*. Deblocking filter executor 120*a* performs a deblocking filter process of the reconstructed image. SAO executor 120*b* performs a SAO process of the reconstructed image after being subjected to the deblocking filter process. ALF executor 120*c* performs an ALF process of the reconstructed image after being subjected to the SAO process. The ALF and deblocking filter processes are described later in detail. The SAO process is a process for enhancing image quality by reducing ringing (a phenomenon in which pixel values are distorted like waves around an edge) and correcting deviation in pixel value. Examples of SAO processes include an edge offset process and a band offset process. It is to be noted that loop filter 120 does not always need to include all the constituent elements disclosed in FIG. 22, and may include only part of the constituent elements. In addition, loop filter 120 may be configured to perform the above processes in a processing order different from the one disclosed in FIG. 22.

[Loop Filter>Adaptive Loop Filter]

In an ALF, a least square error filter for removing compression artifacts is applied. For example, one filter selected from among a plurality of filters based on the direction and activity of local gradients is applied for each of 2×2 pixel sub-blocks in the current block.

More specifically, first, each sub-block (for example, each 2×2 pixel sub-block) is categorized into one out of a plurality of classes (for example, fifteen or twenty-five classes). The categorization of the sub-block is based on, for example, gradient directionality and activity. In a specific example, category index C (for example, C=5D+A) is calculated based on gradient directionality D (for example, 0 to 2 or 0 to 4) and gradient activity A (for example, 0 to 4). Then, based on category index C, each sub-block is categorized into one out of a plurality of classes.

For example, gradient directionality D is calculated by comparing gradients of a plurality of directions (for example, the horizontal, vertical, and two diagonal directions). Moreover, for example, gradient activity A is calculated by adding gradients of a plurality of directions and quantizing the result of the addition.

The filter to be used for each sub-block is determined from among the plurality of filters based on the result of such categorization.

Figure 23A:
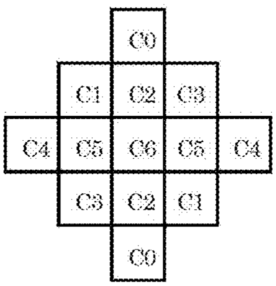
FIG. 23A is a diagram illustrating one example of a filter shape used in an adaptive loop filter (ALF)
Figure 23B:
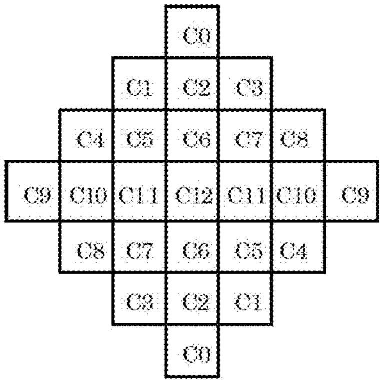
FIG. 23B is a diagram illustrating another example of a filter shape used in an ALF.
Figure 23C:
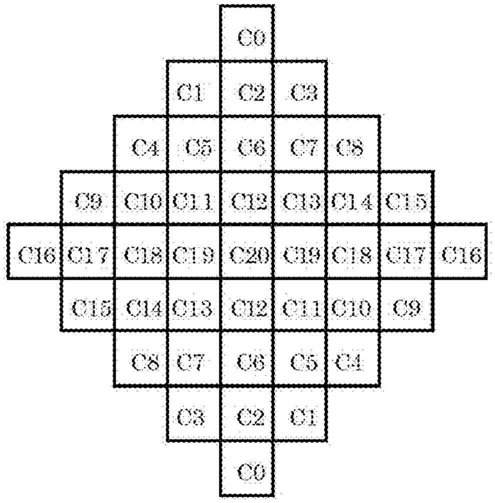
FIG. 23C is a diagram illustrating another example of a filter shape used in an ALF.

The filter shape to be used in an ALF is, for example, a circular symmetric filter shape. FIG. 23A through FIG. 23C illustrate examples of filter shapes used in ALFs. FIG. 23A illustrates a 5×5 diamond shape filter, FIG. 23B illustrates a 7×7 diamond shape filter, and FIG. 23C illustrates a 9×9 diamond shape filter. Information indicating the filter shape is normally signaled at the picture level. It is to be noted that the signaling of such information indicating the filter shape does not necessarily need to be performed at the picture level, and may be performed at another level (for example, at the sequence level, slice level, brick level, CTU level, or CU level).

The ON or OFF of the ALF is determined, for example, at the picture level or CU level. For example, the decision of whether to apply the ALF to luma may be made at the CU level, and the decision of whether to apply ALF to chroma may be made at the picture level. Information indicating ON or OFF of the ALF is normally signaled at the picture level or CU level. It is to be noted that the signaling of information indicating ON or OFF of the ALF does not necessarily need to be performed at the picture level or CU level, and may be performed at another level (for example, at the sequence level, slice level, brick level, or CTU level).

In addition, as described above, one filter is selected from the plurality of filters, and an ALF process of a sub-block is performed. A coefficient set of coefficients to be used for each of the plurality of filters (for example, up to the fifteenth or twenty-fifth filter) is normally signaled at the picture level. It is to be noted that the coefficient set does not always need to be signaled at the picture level, and may be signaled at another level (for example, the sequence level, slice level, brick level, CTU level, CU level, or sub-block level).

[Loop Filter>Cross Component Adaptive Loop Filter]

Figure 23D:
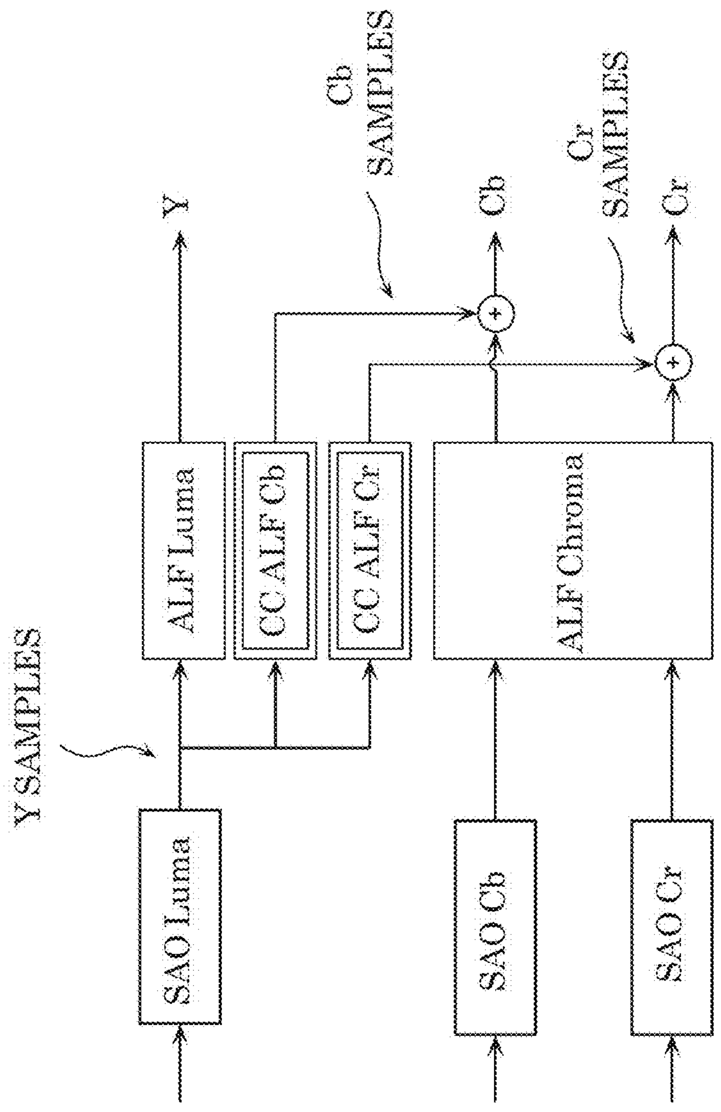
FIG. 23D is a diagram illustrating an example where Y samples (first component) are used for a cross component ALF (CCALF) for Cb and a CCALF for Cr (components different from the first component)
Figure 23E:
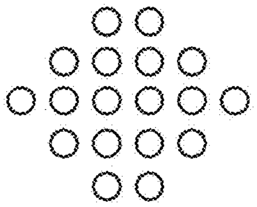
FIG. 23E is a diagram illustrating a diamond shaped filter.

FIG. 23D is a diagram illustrating an example where Y samples (first component) are used for a cross component ALF (CCALF) for Cb and a CCALF for Cr (components different from the first component). FIG. 23E is a diagram illustrating a diamond shaped filter.

One example of CC-ALF operates by applying a linear, diamond shaped filter (FIGS. 23D, 23E) to a luma channel for each chroma component. The filter coefficients, for example, may be transmitted in the APS, scaled by a factor of 2^10, and rounded for fixed point representation. The application of the filters is controlled on a variable block size and signaled by a context-coded flag received for each block of samples. The block size along with a CC-ALF enabling flag is received at the slice-level for each chroma component. Syntax and semantics for CC-ALF are provided in the Appendix. In the contribution, the following block sizes (in chroma samples) were supported: 16×16, 32×32, 64×64, and 128×128.

[Loop Filter>Joint Chroma Cross Component Adaptive Loop Filter]

Figure 23F:
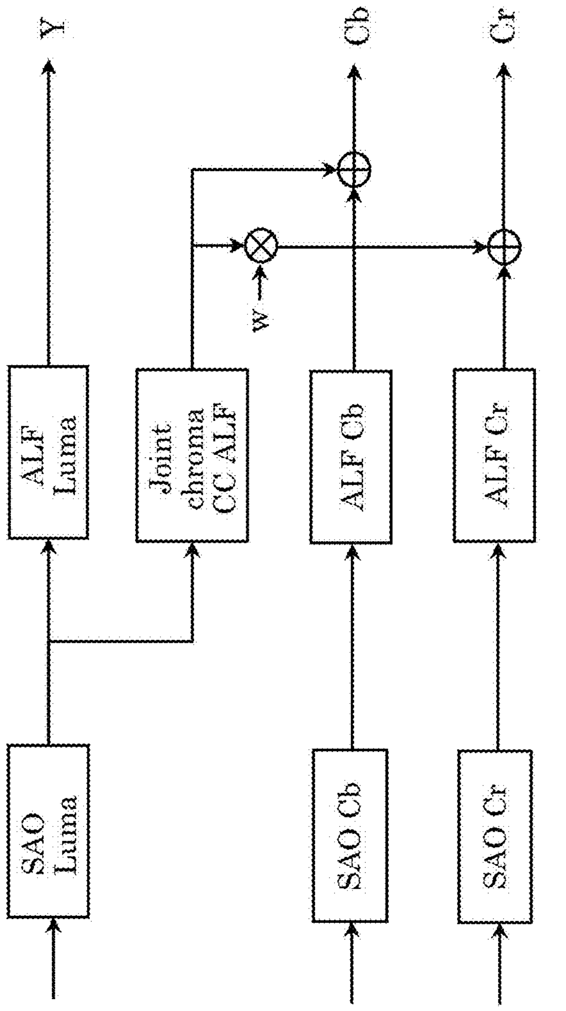
FIG. 23F is a diagram illustrating an example for a joint chroma CCALF (JC-CCALF)

FIG. 23F is a diagram illustrating an example for a joint chroma CCALF (JC-CCALF).

One example of JC-CCALF, where only one CCALF filter will be used to generate one CCALF filtered output as a chroma refinement signal for one color component only, while a properly weighted version of the same chroma refinement signal will be applied to the other color component. In this way, the complexity of existing CCALF is reduced roughly by half.

The weight value is coded into a sign flag and a weight index. The weight index (denoted as weight_index) is coded into 3 bits, and specifies the magnitude of the JC-CCALF weight JcCcWeight. It cannot be equal to 0. The magnitude of JcCcWeight is determined as follows.

If weight_index is less than or equal to 4, JcCcWeight is equal to weight_index>>2.

Otherwise, JcCcWeight is equal to 4/(weight_index−4).

The block-level on/off control of ALF filtering for Cb and Cr are separate. This is the same as in CCALF, and two separate sets of block-level on/off control flags will be coded. Different from CCALF, herein, the Cb, Cr on/off control block sizes are the same, and thus, only one block size variable is coded.

[Loop Filter>Deblocking Filter]

In a deblocking filter process, loop filter 120 performs a filter process on a block boundary in a reconstructed image so as to reduce distortion which occurs at the block boundary.

Figure 24:
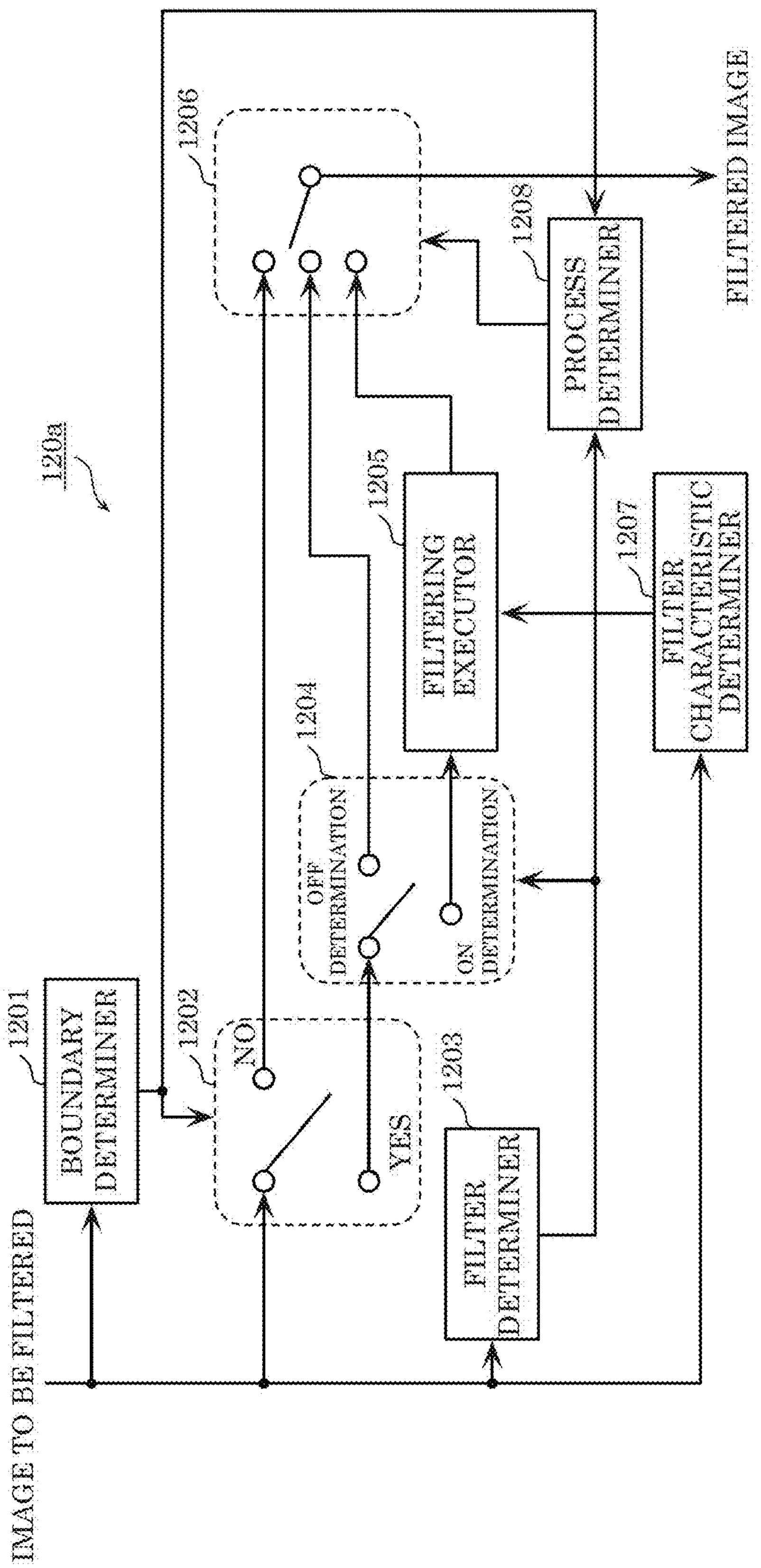
FIG. 24 is a block diagram illustrating one example of a specific configuration of a loop filter which functions as a DBF.

FIG. 24 is a block diagram illustrating one example of a specific configuration of deblocking filter executor 120*a*.

For example, deblocking filter executor 120*a* includes: boundary determiner 1201; filter determiner 1203; filter executor 1205; process determiner 1208; filter characteristic determiner 1207; and switches 1202, 1204, and 1206.

Boundary determiner 1201 determines whether a pixel to be deblock filtered (that is, a current pixel) is present around a block boundary. Boundary determiner 1201 then outputs the determination result to switch 1202 and process determiner 1208.

In the case where boundary determiner 1201 has determined that a current pixel is present around a block boundary, switch 1202 outputs an unfiltered image to switch 1204. In the opposite case where boundary determiner 1201 has determined that no current pixel is present around a block boundary, switch 1202 outputs an unfiltered image to switch 1206. It is to be noted that the unfiltered image is an image configured with a current pixel and at least one surrounding pixel located around the current pixel.

Filter determiner 1203 determines whether to perform deblocking filtering of the current pixel, based on the pixel value of at least one surrounding pixel located around the current pixel. Filter determiner 1203 then outputs the determination result to switch 1204 and process determiner 1208.

In the case where filter determiner 1203 has determined to perform deblocking filtering of the current pixel, switch 1204 outputs the unfiltered image obtained through switch 1202 to filter executor 1205.

In the opposite case where filter determiner 1203 has determined not to perform deblocking filtering of the current pixel, switch 1204 outputs the unfiltered image obtained through switch 1202 to switch 1206.

When obtaining the unfiltered image through switches 1202 and 1204, filter executor 1205 executes, for the current pixel, deblocking filtering having the filter characteristic determined by filter characteristic determiner 1207. Filter executor 1205 then outputs the filtered pixel to switch 1206.

Under control by process determiner 1208, switch 1206 selectively outputs a pixel which has not been deblock filtered and a pixel which has been deblock filtered by filter executor 1205.

Process determiner 1208 controls switch 1206 based on the results of determinations made by boundary determiner 1201 and filter determiner 1203. In other words, process determiner 1208 causes switch 1206 to output the pixel which has been deblock filtered when boundary determiner 1201 has determined that the current pixel is present around the block boundary and filter determiner 1203 has determined to perform deblocking filtering of the current pixel. In addition, in a case other than the above case, process determiner 1208 causes switch 1206 to output the pixel which has not been deblock filtered. A filtered image is output from switch 1206 by repeating output of a pixel in this way. It is to be noted that the configuration illustrated in FIG. 24 is one example of a configuration in deblocking filter executor 120*a*. Deblocking filter executor 120*a* may have another configuration.

Figure 25:
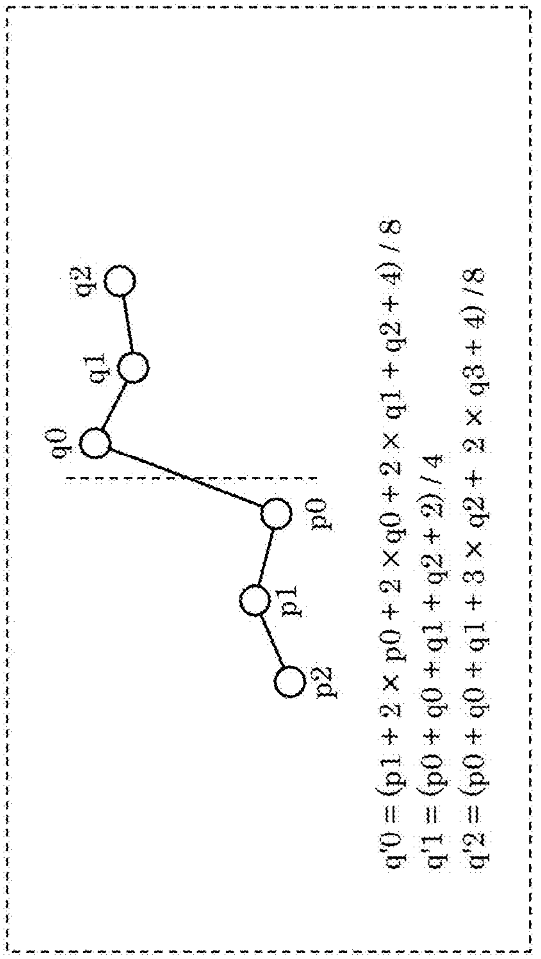
FIG. 25 is a diagram illustrating an example of a deblocking filter having a symmetrical filtering characteristic with respect to a block boundary.

FIG. 25 is a diagram illustrating an example of a deblocking filter having a symmetrical filtering characteristic with respect to a block boundary.

In a deblocking filter process, one of two deblocking filters having different characteristics, that is, a strong filter and a weak filter is selected using pixel values and quantization parameters, for example. In the case of the strong filter, pixels p0 to p2 and pixels q0 to q2 are present across a block boundary as illustrated in FIG. 25, the pixel values of the respective pixels q0 to q2 are changed to pixel values q'0 to q'2 by performing computations according to the expressions below.

$$q'0=(p1+2\times p0+2\times q0+2\times q1+q2+4)/8$$

$$q'1=(p0+q0+q1+q2+2)/4$$

$$q'2=(p0+q0+q1+3\times q2+2\times q3+4)/8$$

It is to be noted that, in the above expressions, p0 to p2 and q0 to q2 are the pixel values of respective pixels p0 to p2 and pixels q0 to q2. In addition, q3 is the pixel value of neighboring pixel q3 located at the opposite side of pixel q2 with respect to the block boundary. In addition, in the right side of each of the expressions, coefficients which are multiplied with the respective pixel values of the pixels to be used for deblocking filtering are filter coefficients.

Furthermore, in the deblocking filtering, clipping may be performed so that the calculated pixel values do not change over a threshold value. In the clipping process, the pixel values calculated according to the above expressions are clipped to a value obtained according to "a pre-computation pixel value+2×a threshold value" using the threshold value determined based on a quantization parameter. In this way, it is possible to prevent excessive smoothing.

Figure 26:
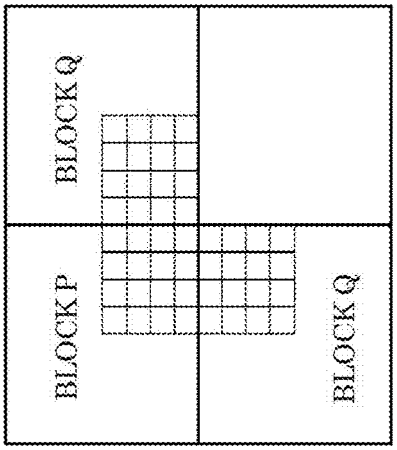
FIG. 26 is a diagram for illustrating a block boundary on which a deblocking filter process is performed.

FIG. 26 is a diagram for illustrating one example of a block boundary on which a deblocking filter process is performed. FIG. 27 is a diagram illustrating examples of Bs values.

The block boundary on which the deblocking filter process is performed is, for example, a boundary between CUs, PUs, or TUs having 8×8 pixel blocks as illustrated in FIG. 26. The deblocking filter process is performed, for example, in units of four rows or four columns. First, boundary strength (Bs) values are determined as indicated in FIG. 27 for block P and block Q illustrated in FIG. 26.

According to the Bs values in FIG. 27, whether to perform deblocking filter processes of block boundaries belonging to the same image using different strengths may be determined. The deblocking filter process for a chroma signal is performed when a Bs value is 2. The deblocking filter process for a luma signal is performed when a Bs value is 1 or more and a determined condition is satisfied. It is to be noted that conditions for determining Bs values are not limited to those indicated in FIG. 27, and a Bs value may be determined based on another parameter.

[Predictor (Intra Predictor, Inter Predictor, Prediction Controller)]

Figure 28:
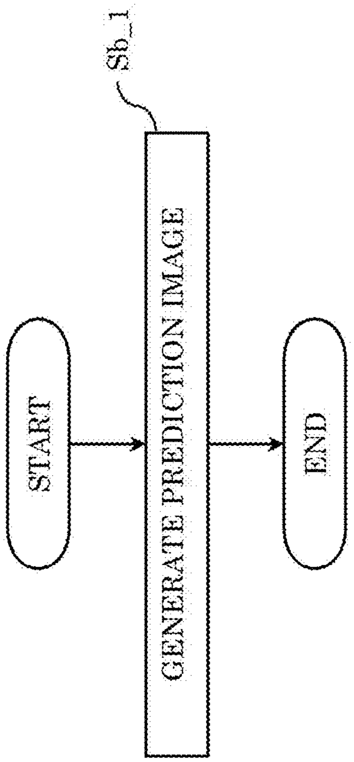
FIG. 28 is a flow chart illustrating one example of a process performed by a predictor of the encoder.

FIG. 28 is a flow chart illustrating one example of a process performed by a predictor of encoder 100. It is to be noted that the predictor, as one example, includes all or part of the following constituent elements: intra predictor 124; inter predictor 126; and prediction controller 128. The prediction executor includes, for example, intra predictor 124 and inter predictor 126.

The predictor generates a prediction image of a current block (Step Sb_1). It is to be noted that the prediction image is, for example, an intra prediction image (intra prediction signal) or an inter prediction image (inter prediction signal). More specifically, the predictor generates the prediction image of the current block using a reconstructed image which has been already obtained for another block through generation of a prediction image, generation of a prediction residual, generation of quantized coefficients, restoring of a prediction residual, and addition of a prediction image.

The reconstructed image may be, for example, an image in a reference picture or an image of an encoded block (that is, the other block described above) in a current picture which is the picture including the current block. The encoded block in the current picture is, for example, a neighboring block of the current block.

Figure 29:
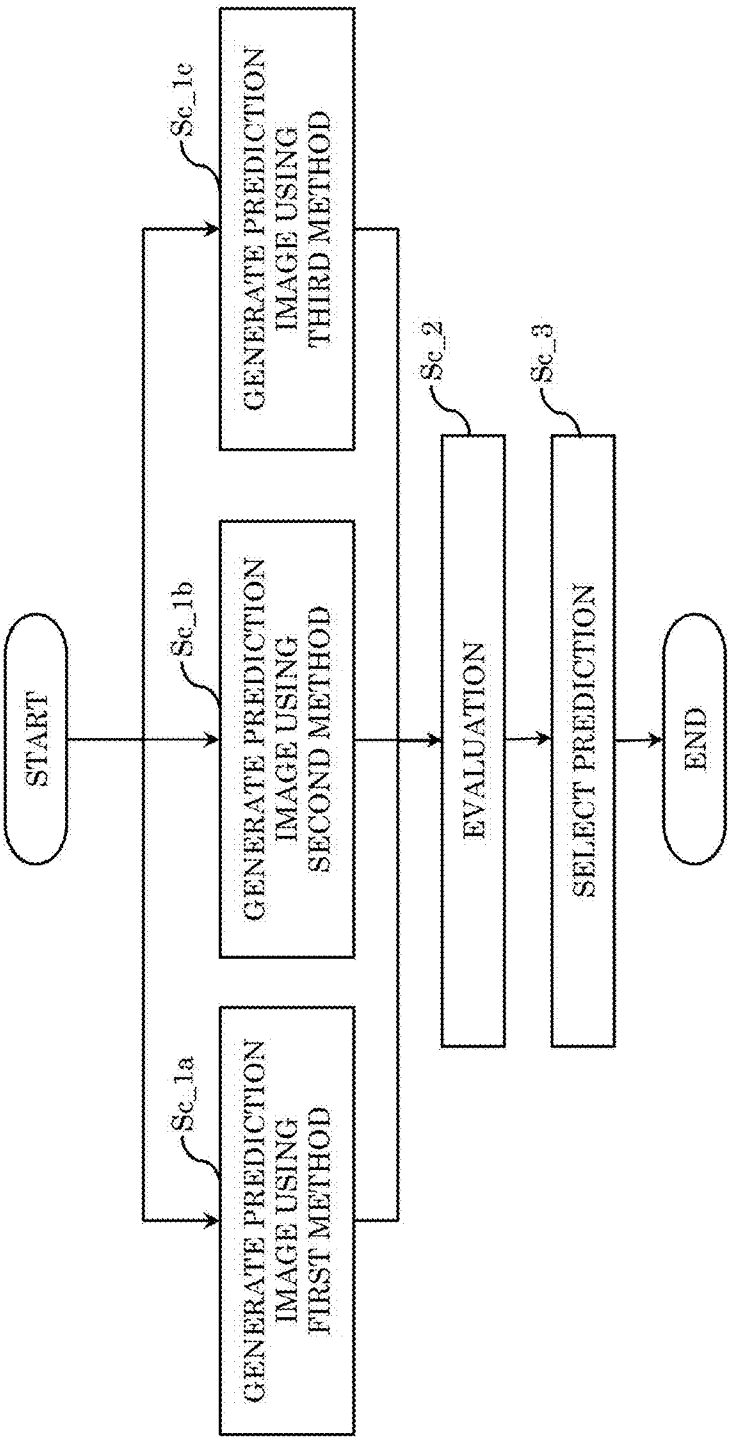
FIG. 29 is a flow chart illustrating another example of a process performed by the predictor of the encoder.

FIG. 29 is a flow chart illustrating another example of a process performed by the predictor of encoder 100.

The predictor generates a prediction image using a first method (Step Sc_1*a*), generates a prediction image using a second method (Step Sc_1*b*), and generates a prediction image using a third method (Step Sc_1*c*). The first method, the second method, and the third method may be mutually different methods for generating a prediction image. Each of the first to third methods may be an inter prediction method, an intra prediction method, or another prediction method. The above-described reconstructed image may be used in these prediction methods.

Next, the predictor evaluates the prediction images generated in Steps Sc_1*a*, Sc_1*b*, and Sc_1*c* (Step Sc_2). For example, the predictor calculates costs C for the prediction images generated in Step Sc_1*a*, Sc_1*b*, and Sc_1*c*, and evaluates the prediction images by comparing the costs C of the prediction images. It is to be noted that cost C is calculated according to an expression of an R-D optimization model, for example, C=D+λ×R. In this expression, D indicates compression artifacts of a prediction image, and is represented as, for example, a sum of absolute differences between the pixel value of a current block and the pixel value of a prediction image. In addition, R indicates a bit rate of a stream. In addition, λ indicates, for example, a multiplier according to the method of Lagrange multiplier.

The predictor then selects one of the prediction images generated in Steps Sc_1*a*, Sc_1*b*, and Sc_1*c* (Step Sc_3). In other words, the predictor selects a method or a mode for obtaining a final prediction image. For example, the predictor selects the prediction image having the smallest cost C, based on costs C calculated for the prediction images. Alternatively, the evaluation in Step Sc_2 and the selection of the prediction image in Step Sc_3 may be made based on a parameter which is used in an encoding process. Encoder 100 may transform information for identifying the selected prediction image, the method, or the mode into a stream. The information may be, for example, a flag or the like. In this way, decoder 200 is capable of generating a prediction image according to the method or the mode selected by encoder 100, based on the information. It is to be noted that, in the example illustrated in FIG. 29, the predictor selects any of the prediction images after the prediction images are generated using the respective methods. However, the predictor may select a method or a mode based on a parameter for use in the above-described encoding process before generating prediction images, and may generate a prediction image according to the method or mode selected.

For example, the first method and the second method may be intra prediction and inter prediction, respectively, and the predictor may select a final prediction image for a current block from prediction images generated according to the prediction methods.

Figure 30:
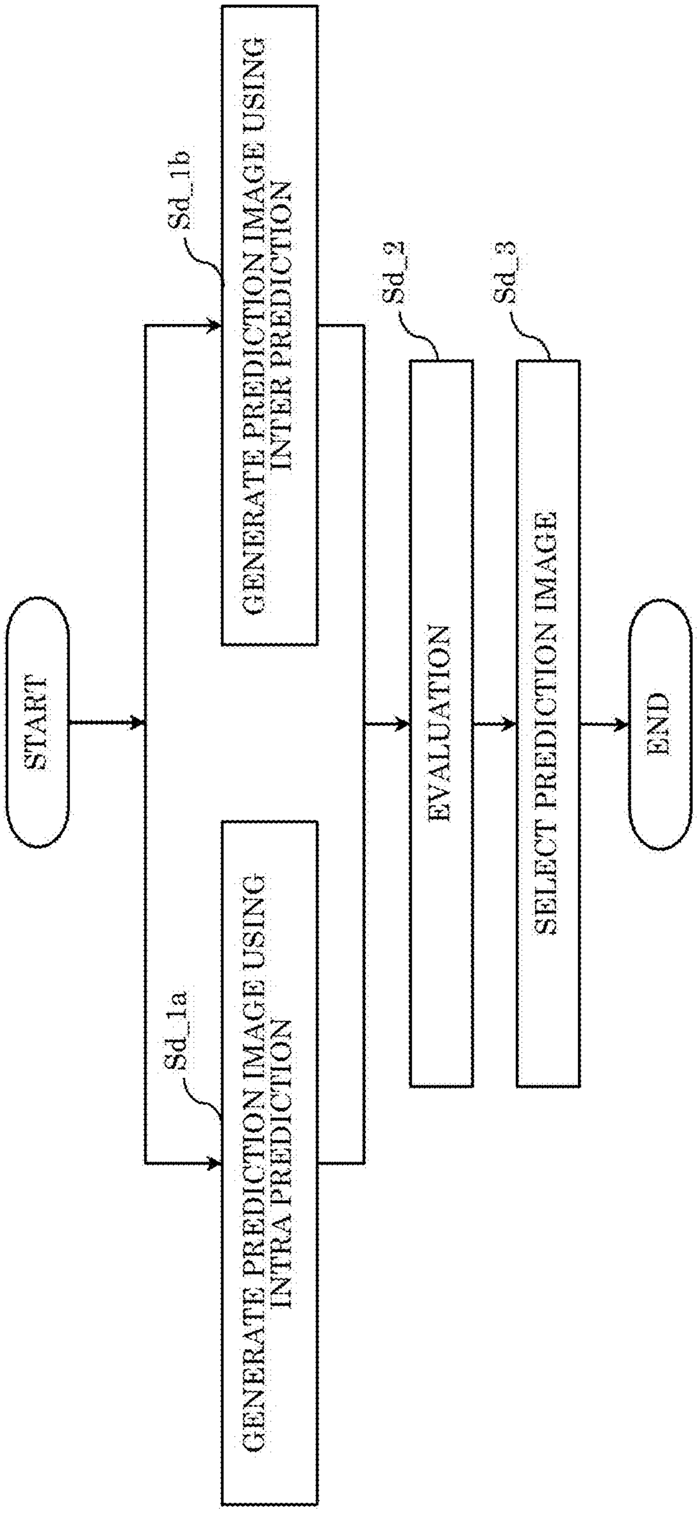
FIG. 30 is a flow chart illustrating another example of a process performed by the predictor of the encoder.

FIG. 30 is a flow chart illustrating another example of a process performed by the predictor of encoder 100.

First, the predictor generates a prediction image using intra prediction (Step Sd_1*a*), and generates a prediction image using inter prediction (Step Sd_1*b*). It is to be noted that the prediction image generated by intra prediction is also referred to as an intra prediction image, and the prediction image generated by inter prediction is also referred to as an inter prediction image.

Next, the predictor evaluates each of the intra prediction image and the inter prediction image (Step Sd_2). Cost C described above may be used in the evaluation. The predictor may then select the prediction image for which the smallest cost C has been calculated among the intra prediction image and the inter prediction image, as the final prediction image for the current block (Step Sd_3). In other words, the prediction method or the mode for generating the prediction image for the current block is selected.

[Intra Predictor]

Intra predictor 124 generates a prediction image (that is, intra prediction image) of a current block by performing intra prediction (also referred to as intra frame prediction) of the current block by referring to a block or blocks in the current picture which is or are stored in block memory 118. More specifically, intra predictor 124 generates an intra prediction image by performing intra prediction by referring to pixel values (for example, luma and/or chroma values) of a block or blocks neighboring the current block, and then outputs the intra prediction image to prediction controller 128.

For example, intra predictor 124 performs intra prediction by using one mode from among a plurality of intra prediction modes which have been predefined. The intra prediction modes normally include one or more non-directional prediction modes and a plurality of directional prediction modes.

The one or more non-directional prediction modes include, for example, planar prediction mode and DC prediction mode defined in the H.265/HEVC standard.

Figure 31:
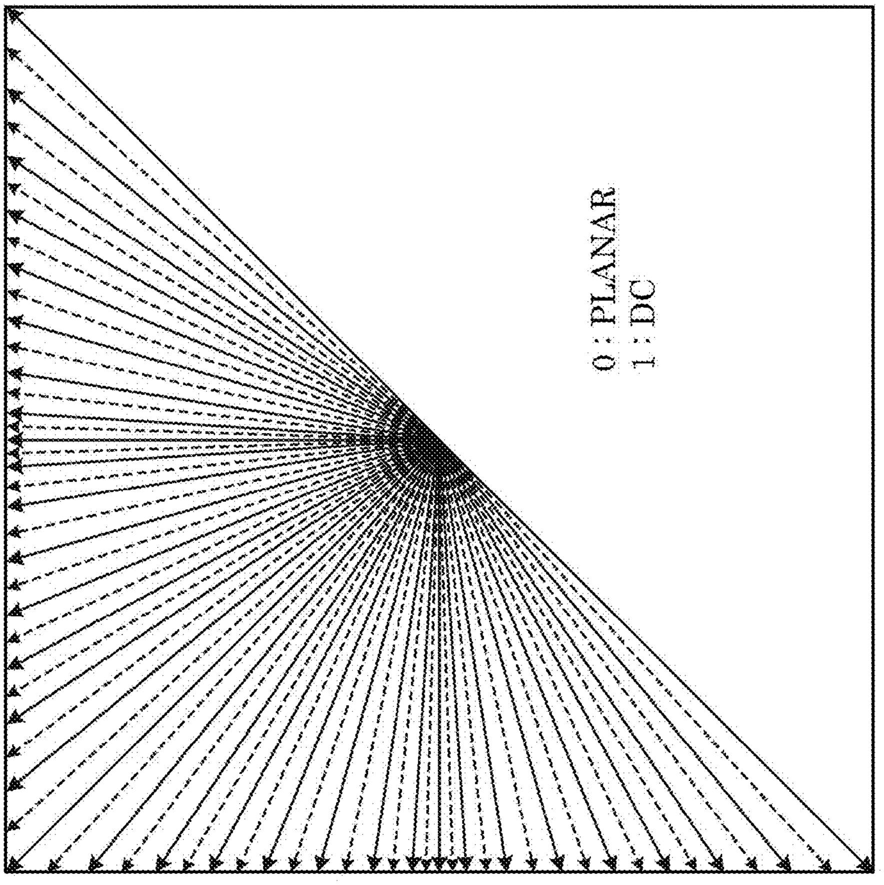
FIG. 31 is a diagram illustrating one example of sixty-seven intra prediction modes used in intra prediction.

The plurality of directional prediction modes include, for example, the thirty-three directional prediction modes defined in the H.265/HEVC standard. It is to be noted that the plurality of directional prediction modes may further include thirty-two directional prediction modes in addition to the thirty-three directional prediction modes (for a total of sixty-five directional prediction modes). FIG. 31 is a diagram illustrating sixty-seven intra prediction modes in total used in intra prediction (two non-directional prediction modes and sixty-five directional prediction modes). The solid arrows represent the thirty-three directions defined in the H.265/HEVC standard, and the dashed arrows represent the additional thirty-two directions (the two non-directional prediction modes are not illustrated in FIG. 31).

In various kinds of mounting examples, a luma block may be referred to in intra prediction of a chroma block. In other words, a chroma component of the current block may be predicted based on a luma component of the current block. Such intra prediction is also referred to as cross-component linear model (CCLM). The intra prediction mode for a chroma block in which such a luma block is referred to (also referred to as, for example, a CCLM mode) may be added as one of the intra prediction modes for chroma blocks.

Intra predictor 124 may correct intra-predicted pixel values based on horizontal/vertical reference pixel gradients. The intra prediction which accompanies this sort of correcting is also referred to as position dependent intra prediction combination (PDPC). Information indicating whether to apply PDPC (referred to as, for example, a PDPC flag) is normally signaled at the CU level. It is to be noted that the signaling of such information does not necessarily need to be performed at the CU level, and may be performed at another level (for example, at the sequence level, picture level, slice level, brick level, or CTU level).

Figure 32:
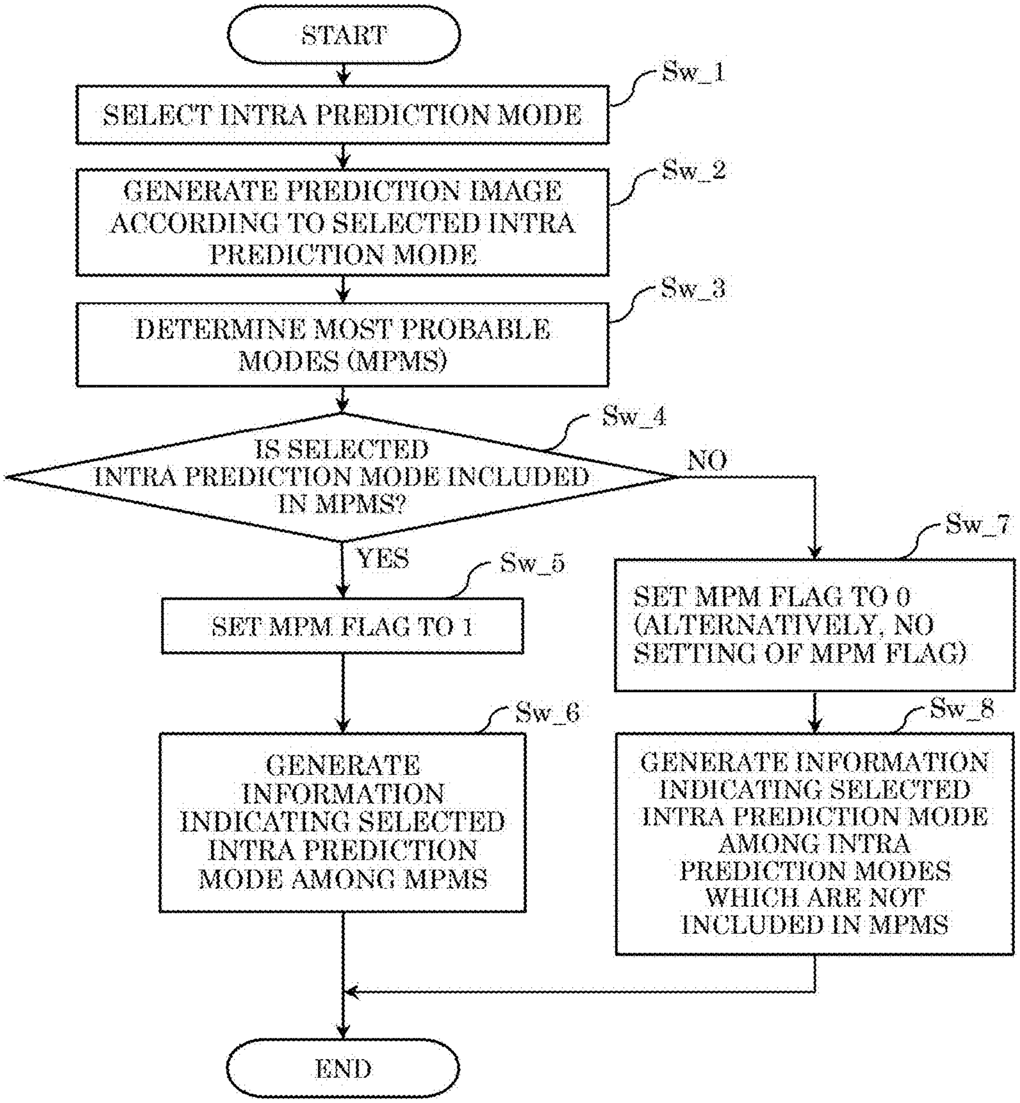
FIG. 32 is a flow chart illustrating one example of a process performed by an intra predictor.

FIG. 32 is a flow chart illustrating one example of a process performed by intra predictor 124.

Intra predictor 124 selects one intra prediction mode from a plurality of intra prediction modes (Step Sw_1). Intra predictor 124 then generates a prediction image according to the selected intra prediction mode (Step Sw_2). Next, intra predictor 124 determines most probable modes (MPMs) (Step Sw_3). MPMs include, for example, six intra prediction modes. Two modes among the six intra prediction modes may be planar mode and DC prediction mode, and the other four modes may be directional prediction modes. Intra predictor 124 determines whether the intra prediction mode selected in Step Sw_1 is included in the MPMs (Step Sw_4).

Here, when determining that the intra prediction mode selected in Step Sw_1 is included in the MPMs (Yes in Step Sw_4), intra predictor 124 sets an MPM flag to 1 (Step Sw_5), and generates information indicating the selected intra prediction mode among the MPMs (Step Sw_6). It is to be noted that the MPM flag set to 1 and the information indicating the intra prediction mode are encoded as prediction parameters by entropy encoder 110.

When determining that the selected intra prediction mode is not included in the MPMs (No in Step Sw_4), intra predictor 124 sets the MPM flag to 0 (Step Sw_7). Alternatively, intra predictor 124 does not set any MPM flag. Intra predictor 124 then generates information indicating the selected intra prediction mode among at least one intra prediction mode which is not included in the MPMs (Step Sw_8). It is to be noted that the MPM flag set to 0 and the information indicating the intra prediction mode are encoded as prediction parameters by entropy encoder 110. The information indicating the intra prediction mode indicates, for example, any one of 0 to 60.

[Inter Predictor]

Inter predictor 126 generates a prediction image (inter prediction image) by performing inter prediction (also referred to as inter frame prediction) of the current block by referring to a block or blocks in a reference picture which is different from the current picture and is stored in frame memory 122. Inter prediction is performed in units of a current block or a current sub-block in the current block. The sub-block is included in the block and is a unit smaller than the block. The size of the sub-block may be 4×4 pixels, 8×8 pixels, or another size. The size of the sub-block may be switched for a unit such as slice, brick, picture, etc.

For example, inter predictor 126 performs motion estimation in a reference picture for a current block or a current sub-block, and finds out a reference block or a reference sub-block which best matches the current block or current sub-block. Inter predictor 126 then obtains motion information (for example, a motion vector) which compensates a motion or a change from the reference block or the reference sub-block to the current block or the current sub-block. Inter predictor 126 generates an inter prediction image of the current block or the current sub-block by performing motion compensation (or motion prediction) based on the motion information. Inter predictor 126 outputs the generated inter prediction image to prediction controller 128.

The motion information used in motion compensation may be signaled as inter prediction images in various forms. For example, a motion vector may be signaled. As another example, the difference between a motion vector and a motion vector predictor may be signaled.

[Reference Picture List]

Figure 33:
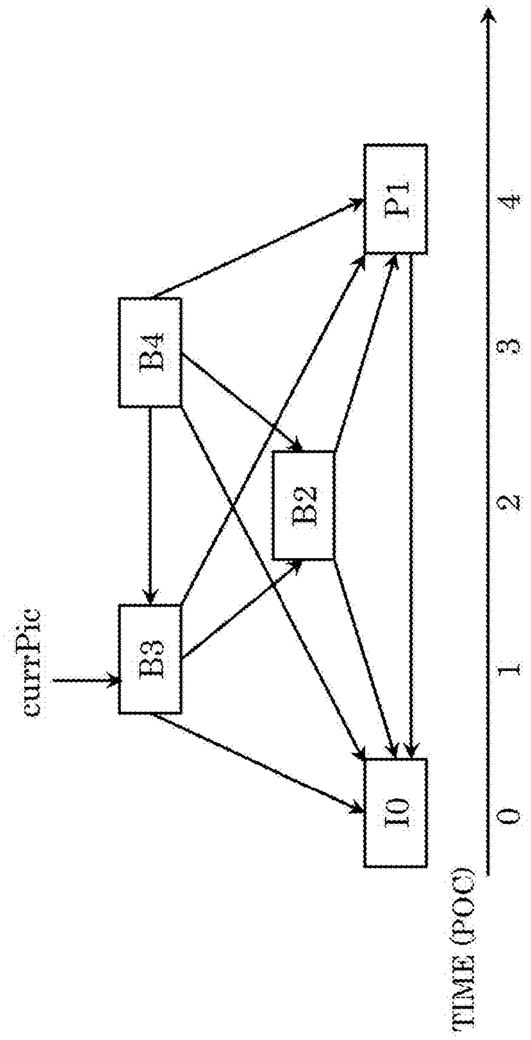
FIG. 33 is a diagram illustrating examples of reference pictures.
Figure 34:
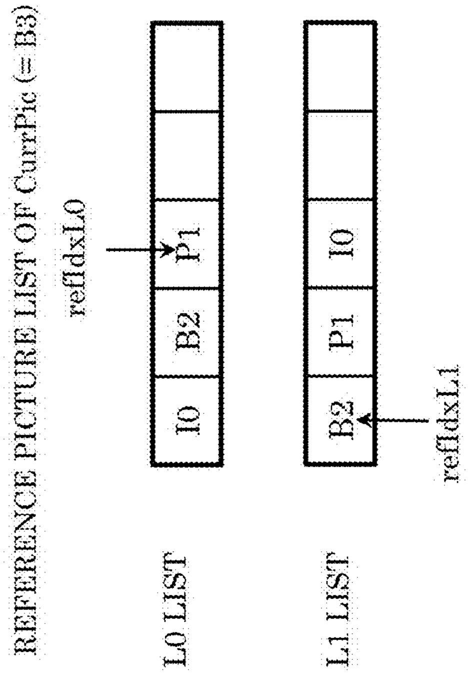
FIG. 34 is a diagram illustrating examples of reference picture lists.

FIG. 33 is a diagram illustrating examples of reference pictures. FIG. 34 is a conceptual diagram illustrating examples of reference picture lists. Each reference picture list is a list indicating at least one reference picture stored in frame memory 122. It is to be noted that, in FIG. 33, each of rectangles indicates a picture, each of arrows indicates a picture reference relationship, the horizontal axis indicates time, I, P, and B in the rectangles indicate an intra prediction picture, a uni-prediction picture, and a bi-prediction picture, respectively, and numerals in the rectangles indicate a decoding order. As illustrated in FIG. 33, the decoding order of the pictures is an order of I0, P1, B2, B3, and B4, and the display order of the pictures is an order of I0, B3, B2, B4, and P1. As illustrated in FIG. 34, the reference picture list is a list representing reference picture candidates. For example, one picture (or a slice) may include at least one reference picture list. For example, one reference picture list is used when a current picture is a uni-prediction picture, and two reference picture lists are used when a current picture is a bi-prediction picture. In the examples of FIGS. 33 and 34, picture B3 which is current picture currPic has two reference picture lists which are the L0 list and the L1 list. When current picture currPic is picture B3, reference picture candidates for current picture currPic are I0, P1, and B2, and the reference picture lists (which are the L0 list and the L1 list) indicate these pictures. Inter predictor 126 or prediction controller 128 specifies which picture in each reference picture list is to be actually referred to in form of a reference picture index refIdxLx. In FIG. 34, reference pictures P1 and B2 are specified by reference picture indices refIdxL0 and refIdxL1.

Such a reference picture list may be generated for each unit such as a sequence, picture, slice, brick, CTU, or CU. In addition, among reference pictures indicated in reference picture lists, a reference picture index indicating a reference picture to be referred to in inter prediction may be signaled at the sequence level, picture level, slice level, brick level, CTU level, or CU level. In addition, a common reference picture list may be used in a plurality of inter prediction modes.

[Basic Flow of Inter Prediction]

Figure 35:
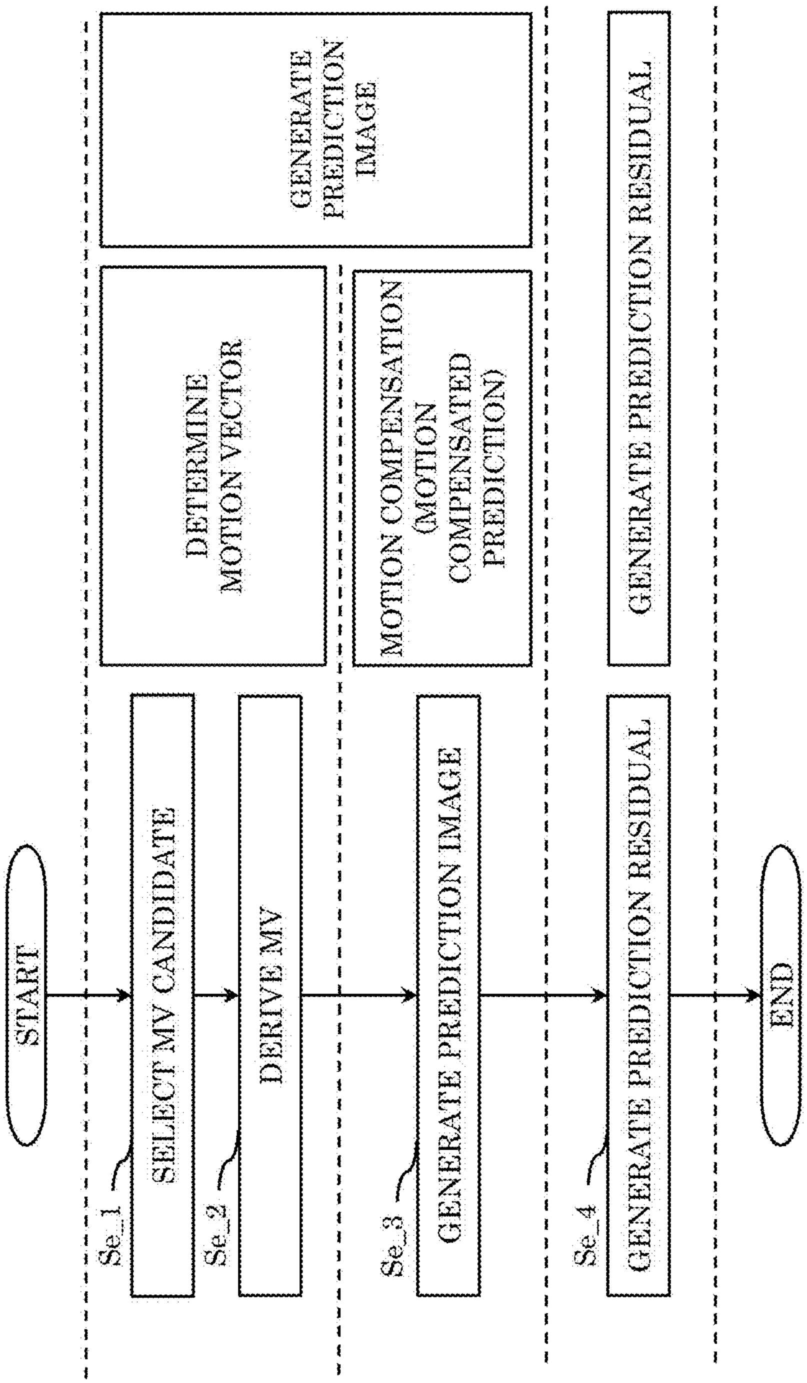
FIG. 35 is a flow chart illustrating a basic processing flow of inter prediction.

FIG. 35 is a flow chart illustrating a basic processing flow of inter prediction.

First, inter predictor 126 generates a prediction signal (Steps Se_1 to Se_3). Next, subtractor 104 generates the difference between a current block and a prediction image as a prediction residual (Step Se_4).

Here, in the generation of the prediction image, inter predictor 126 generates the prediction image through, for example, determination of a motion vector (MV) of the current block (Steps Se_1 and Se_2) and motion compensation (Step Se_3). Furthermore, in determination of an MV, inter predictor 126 determines the MV through, for example, selection of a motion vector candidate (MV candidate) (Step Se_1) and derivation of an MV (Step Se_2). The selection of the MV candidate is made by means of, for example, inter predictor 126 generating an MV candidate list and selecting at least one MV candidate from the MV candidate list. It is to be noted that MVs derived in the past may be added to the MV candidate list. Alternatively, in derivation of an MV, inter predictor 126 may further select at least one MV candidate from the at least one MV candidate, and determine the selected at least one MV candidate as the MV for the current block. Alternatively, inter predictor 126 may determine the MV for the current block by performing estimation in a reference picture region specified by each of the selected at least one MV candidate. It is to be noted that the estimation in the reference picture region may be referred to as motion estimation.

In addition, although Steps Se_1 to Se_3 are performed by inter predictor 126 in the above-described example, a process that is, for example, Step Se_1, Step Se_2, or the like may be performed by another constituent element included in encoder 100.

It is to be noted that an MV candidate list may be generated for each process in inter prediction mode, or a common MV candidate list may be used in a plurality of inter prediction modes. The processes in Steps Se_3 and Se_4 correspond to Steps Sa_3 and Sa_4 illustrated in FIG. 9, respectively. The process in Step Se_3 corresponds to the process in Step Sd_1*b* in FIG. 30.

[MV Derivation Flow]

Figure 36:
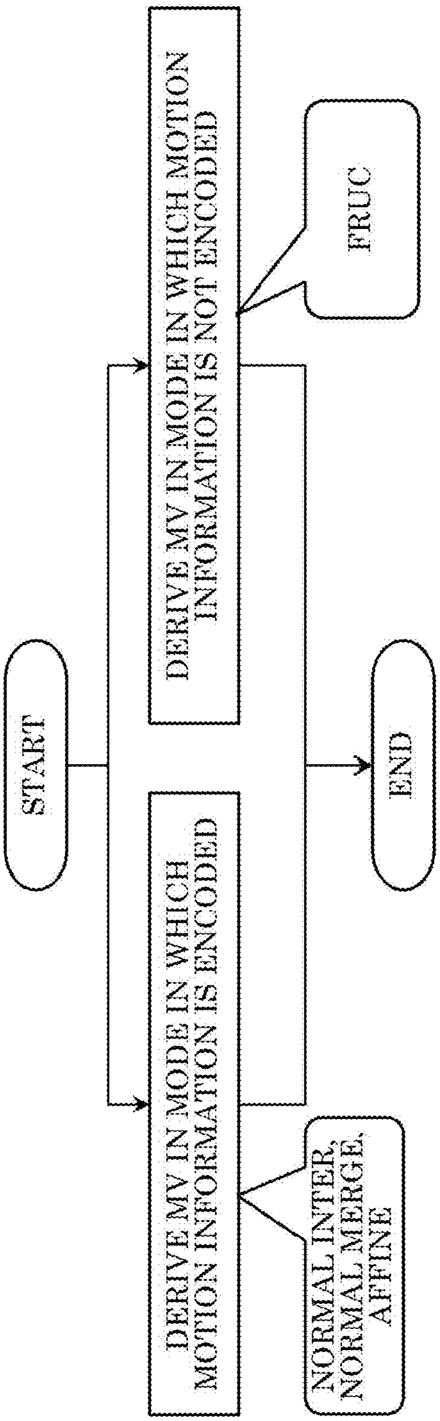
FIG. 36 is a flow chart illustrating one example of MV derivation.

FIG. 36 is a flow chart illustrating one example of MV derivation. Inter predictor 126 may derive an MV for a current block in a mode for encoding motion information (for example, an MV). In this case, for example, the motion information may be encoded as a prediction parameter, and may be signaled. In other words, the encoded motion information is included in a stream.

Alternatively, inter predictor 126 may derive an MV in a mode in which motion information is not encoded. In this case, no motion information is included in the stream.

Here, MV derivation modes include a normal inter mode, a normal merge mode, a FRUC mode, an affine mode, etc. which are described later. Modes in which motion information is encoded among the modes include the normal inter mode, the normal merge mode, the affine mode (specifically, an affine inter mode and an affine merge mode), etc. It is to be noted that motion information may include not only an MV but also MV predictor selection information which is described later. Modes in which no motion information is encoded include the FRUC mode, etc. Inter predictor 126 selects a mode for deriving an MV of the current block from the plurality of modes, and derives the MV of the current block using the selected mode.

Figure 37:
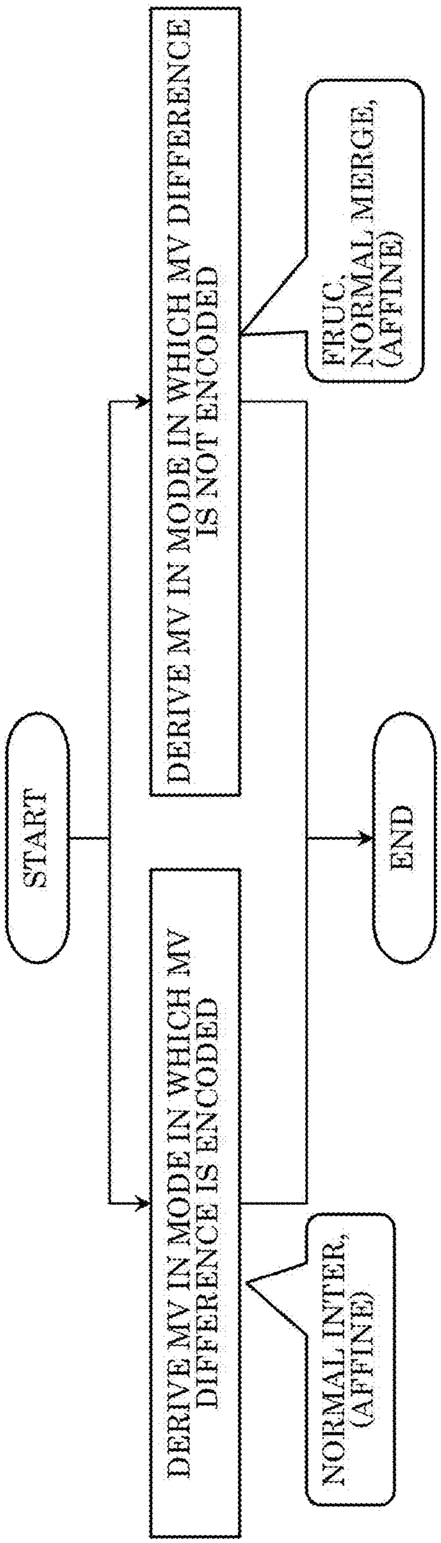
FIG. 37 is a flow chart illustrating another example of MV derivation.

FIG. 37 is a flow chart illustrating another example of MV derivation.

Inter predictor 126 may derive an MV for a current block in a mode in which an MV difference is encoded. In this case, for example, the MV difference is encoded as a prediction parameter, and is signaled. In other words, the encoded MV difference is included in a stream. The MV difference is the difference between the MV of the current block and the MV predictor. It is to be noted that the MV predictor is a motion vector predictor.

Alternatively, inter predictor 126 may derive an MV in a mode in which no MV difference is encoded. In this case, no encoded MV difference is included in the stream.

Here, as described above, the MV derivation modes include the normal inter mode, the normal merge mode, the FRUC mode, the affine mode, etc. which are described later. Modes in which an MV difference is encoded among the modes include the normal inter mode, the affine mode (specifically, the affine inter mode), etc. Modes in which no MV difference is encoded include the FRUC mode, the normal merge mode, the affine mode (specifically, the affine merge mode), etc. Inter predictor 126 selects a mode for deriving an MV of the current block from the plurality of modes, and derives the MV for the current block using the selected mode.

[MV Derivation Modes]

Figure 38B:
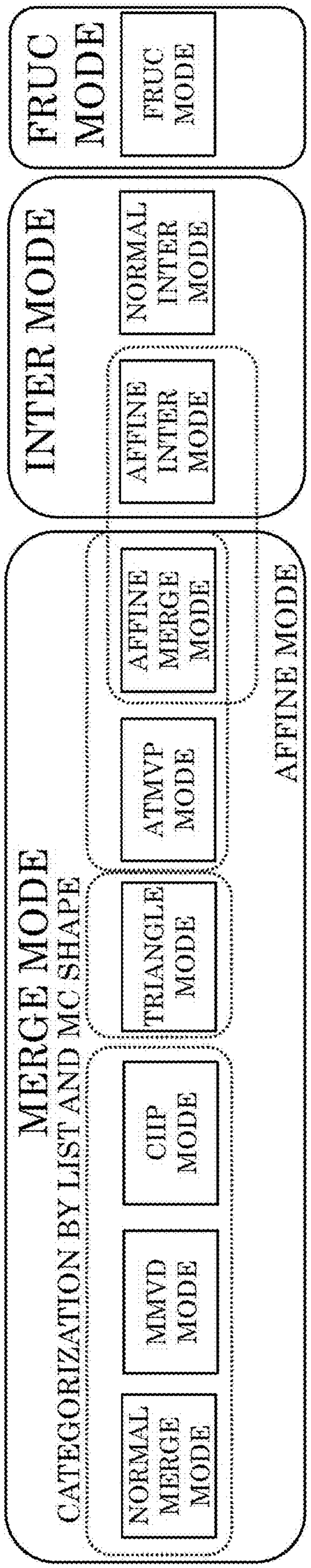
FIG. 38B is a diagram illustrating one example of categorization of modes for MV derivation.

FIGS. 38A and 38B are each a diagram illustrating one example of categorization of modes for MV derivation. For example, as illustrated in FIG. 38A, MV derivation modes are roughly categorized into three modes according to whether to encode motion information and whether to encode MV differences. The three modes are inter mode, merge mode, and frame rate up-conversion (FRUC) mode. The inter mode is a mode in which motion estimation is performed, and in which motion information and an MV difference are encoded. For example, as illustrated in FIG. 38B, the inter mode includes affine inter mode and normal inter mode. The merge mode is a mode in which no motion estimation is performed, and in which an MV is selected from an encoded surrounding block and an MV for the current block is derived using the MV. The merge mode is a mode in which, basically, motion information is encoded and no MV difference is encoded. For example, as illustrated in FIG. 38B, the merge modes include normal merge mode (also referred to as normal merge mode or regular merge mode), merge with motion vector difference (MMVD) mode, combined inter merge/intra prediction (CIIP) mode, triangle mode, ATMVP mode, and affine merge mode. Here, an MV difference is encoded exceptionally in the MMVD mode among the modes included in the merge modes. It is to be noted that the affine merge mode and the affine inter mode are modes included in the affine modes. The affine mode is a mode for deriving, as an MV of a current block, an MV of each of a plurality of sub-blocks included in the current block, assuming affine transform. The FRUC mode is a mode which is for deriving an MV of the current block by performing estimation between encoded regions, and in which neither motion information nor any MV difference is encoded. It is to be noted that the respective modes will be described later in detail.

It is to be noted that the categorization of the modes illustrated in FIGS. 38A and 38B are examples, and categorization is not limited thereto. For example, when an MV difference is encoded in CIIP mode, the CIIP mode is categorized into inter modes.

[MV Derivation>Normal Inter Mode]

The normal inter mode is an inter prediction mode for deriving an MV of a current block by finding out a block similar to the image of the current block from a reference picture region specified by an MV candidate. In this normal inter mode, an MV difference is encoded.

Figure 39:
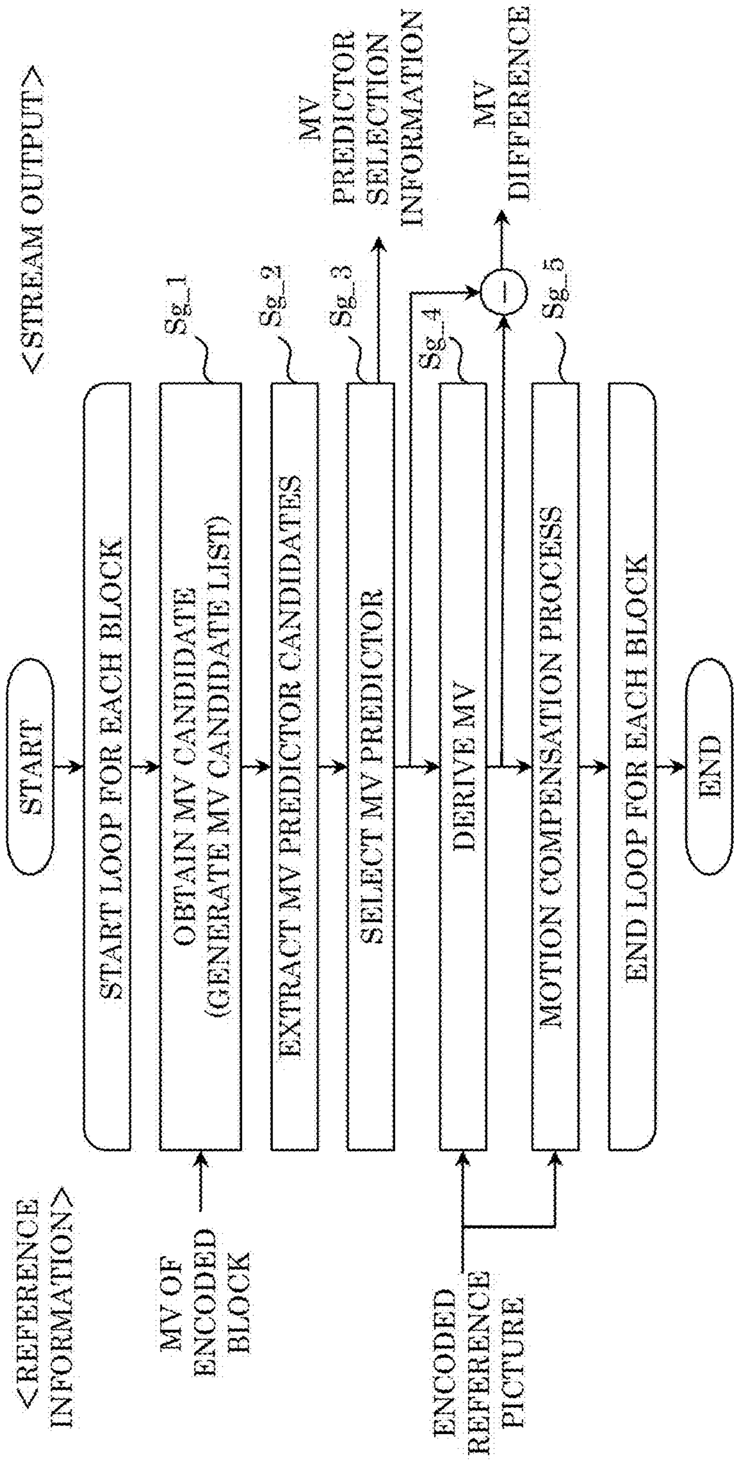
FIG. 39 is a flow chart illustrating an example of inter prediction by normal inter mode.

FIG. 39 is a flow chart illustrating an example of inter prediction by normal inter mode.

First, inter predictor 126 obtains a plurality of MV candidates for a current block based on information such as MVs of a plurality of encoded blocks temporally or spatially surrounding the current block (Step Sg_1). In other words, inter predictor 126 generates an MV candidate list.

Next, inter predictor 126 extracts N (an integer of 2 or larger) MV candidates from the plurality of MV candidates obtained in Step Sg_1, as motion vector predictor candidates according to a predetermined priority order (Step Sg_2). It is to be noted that the priority order is determined in advance for each of the N MV candidates.

Next, inter predictor 126 selects one MV predictor candidate from the N MV predictor candidates as the MV predictor for the current block (Step Sg_3). At this time, inter predictor 126 encodes, in a stream, MV predictor selection information for identifying the selected MV predictor. In other words, inter predictor 126 outputs the MV predictor selection information as a prediction parameter to entropy encoder 110 through prediction parameter generator 130.

Next, inter predictor 126 derives an MV of a current block by referring to an encoded reference picture (Step Sg_4). At this time, inter predictor 126 further encodes, in the stream, the difference value between the derived MV and the MV predictor as an MV difference. In other words, inter predictor 126 outputs the MV difference as a prediction parameter to entropy encoder 110 through prediction parameter generator 130. It is to be noted that the encoded reference picture is a picture including a plurality of blocks which have been reconstructed after being encoded.

Lastly, inter predictor 126 generates a prediction image for the current block by performing motion compensation of the current block using the derived MV and the encoded reference picture (Step Sg_5). The processes in Steps Sg_1 to Sg_5 are executed on each block. For example, when the processes in Steps Sg_1 to Sg_5 are executed on each of all the blocks in the slice, inter prediction of the slice using the normal inter mode finishes. For example, when the processes in Steps Sg_1 to Sg_5 are executed on each of all the blocks in the picture, inter prediction of the picture using the normal inter mode finishes. It is to be noted that not all the blocks included in the slice may be subjected to the processes in Steps Sg_1 to Sg_5, and inter prediction of the slice using the normal inter mode may finish when part of the blocks are subjected to the processes. Likewise, inter prediction of the picture using the normal inter mode may finish when the processes in Steps Sg_1 to Sg_5 are executed on part of the blocks in the picture.

It is to be noted that the prediction image is an inter prediction signal as described above. In addition, information indicating the inter prediction mode (normal inter mode in the above example) used to generate the prediction image is, for example, encoded as a prediction parameter in an encoded signal.

It is to be noted that the MV candidate list may be also used as a list for use in another mode. In addition, the processes related to the MV candidate list may be applied to processes related to the list for use in another mode. The processes related to the MV candidate list include, for example, extraction or selection of an MV candidate from the MV candidate list, reordering of MV candidates, or deletion of an MV candidate.

[MV Derivation>Normal Merge Mode]

The normal merge mode is an inter prediction mode for selecting an MV candidate from an MV candidate list as an MV for a current block, thereby deriving the MV. It is to be noted that the normal merge mode is a merge mode in a narrow meaning and is also simply referred to as a merge mode. In this embodiment, the normal merge mode and the merge mode are distinguished, and the merge mode is used in a broad meaning.

Figure 40:
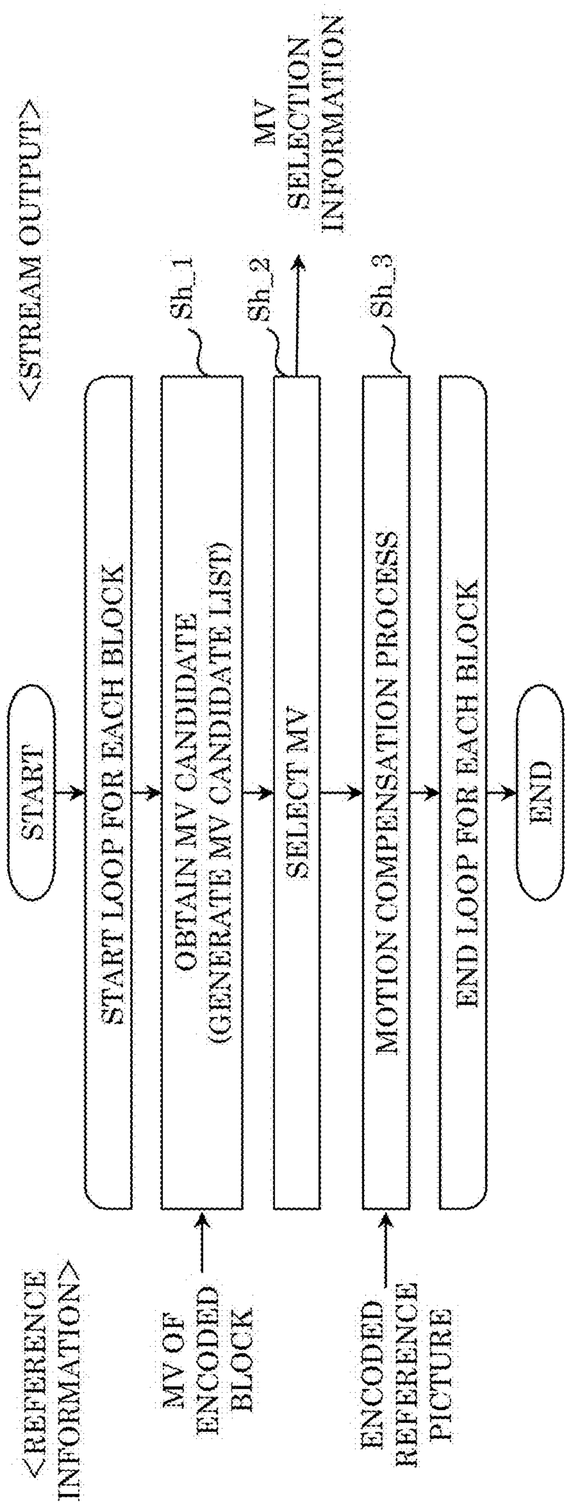
FIG. 40 is a flow chart illustrating an example of inter prediction by normal merge mode.

FIG. 40 is a flow chart illustrating an example of inter prediction by normal merge mode.

First, inter predictor 126 obtains a plurality of MV candidates for a current block based on information such as MVs of a plurality of encoded blocks temporally or spatially surrounding the current block (Step Sh_1). In other words, inter predictor 126 generates an MV candidate list.

Next, inter predictor 126 selects one MV candidate from the plurality of MV candidates obtained in Step Sh_1, thereby deriving an MV for the current block (Step Sh_2). At this time, inter predictor 126 encodes, in a stream, MV selection information for identifying the selected MV candidate. In other words, inter predictor 126 outputs the MV selection information as a prediction parameter to entropy encoder 110 through prediction parameter generator 130.

Lastly, inter predictor 126 generates a prediction image for the current block by performing motion compensation of the current block using the derived MV and the encoded reference picture (Step Sh_3). The processes in Steps Sh_1 to Sh_3 are executed, for example, on each block. For example, when the processes in Steps Sh_1 to Sh_3 are executed on each of all the blocks in the slice, inter prediction of the slice using the normal merge mode finishes. In addition, when the processes in Steps Sh_1 to Sh_3 are executed on each of all the blocks in the picture, inter prediction of the picture using the normal merge mode finishes. It is to be noted that not all the blocks included in the slice may be subjected to the processes in Steps Sh_1 to Sh_3, and inter prediction of the slice using the normal merge mode may finish when part of the blocks are subjected to the processes. Likewise, inter prediction of the picture using the normal merge mode may finish when the processes in Steps Sh_1 to Sh_3 are executed on part of the blocks in the picture.

In addition, information indicating the inter prediction mode (normal merge mode in the above example) used to generate the prediction image is, for example, encoded as a prediction parameter in a stream.

Figure 41:
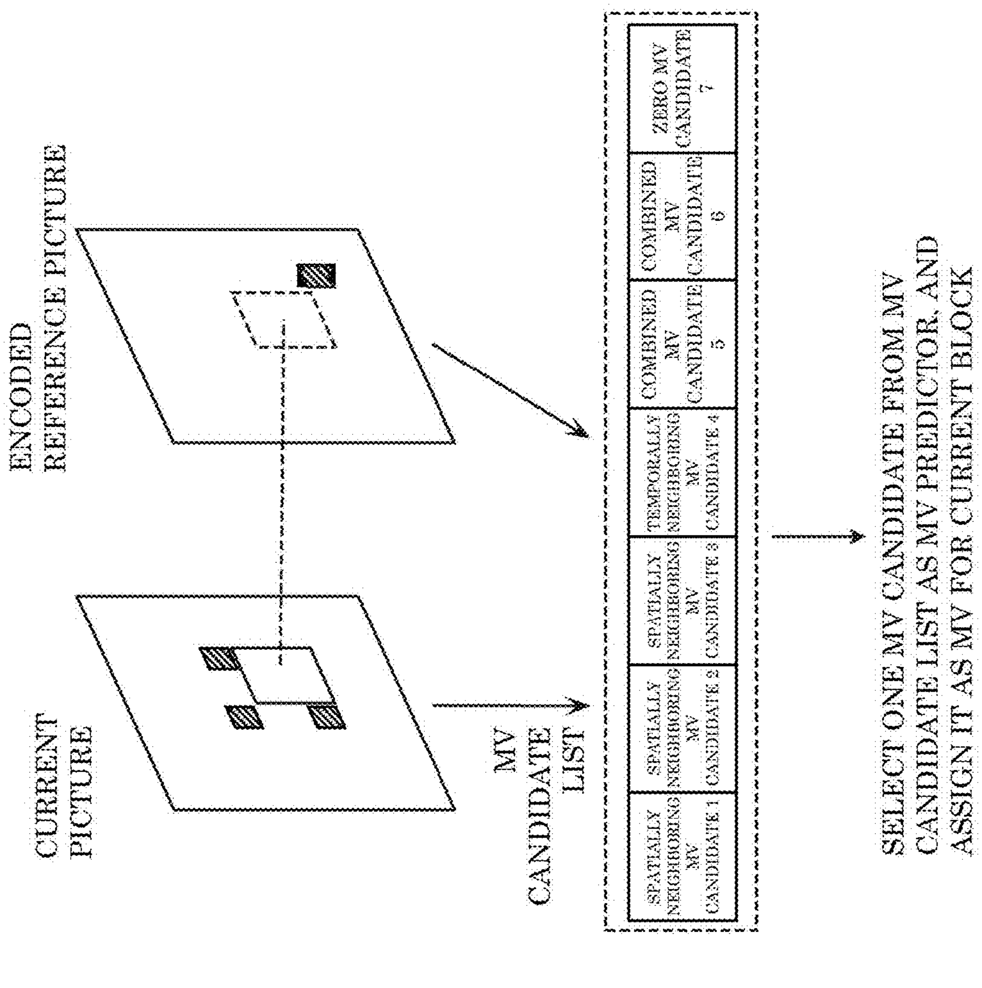
FIG. 41 is a diagram for illustrating one example of an MV derivation process by normal merge mode.

FIG. 41 is a diagram for illustrating one example of an MV derivation process for a current picture by normal merge mode.

First, inter predictor 126 generates an MV candidate list in which MV candidates are registered. Examples of MV candidates include: spatially neighboring MV candidates which are MVs of a plurality of encoded blocks located spatially surrounding a current block; temporally neighboring MV candidates which are MVs of surrounding blocks on which the position of a current block in an encoded reference picture is projected; combined MV candidates which are MVs generated by combining the MV value of a spatially neighboring MV predictor and the MV value of a temporally neighboring MV predictor; and a zero MV candidate which is an MV having a zero value.

Next, inter predictor 126 selects one MV candidate from a plurality of MV candidates registered in an MV candidate list, and determines the MV candidate as the MV of the current block.

Furthermore, entropy encoder 110 writes and encodes, in a stream, merge_idx which is a signal indicating which MV candidate has been selected.

It is to be noted that the MV candidates registered in the MV candidate list described in FIG. 41 are examples. The number of MV candidates may be different from the number of MV candidates in the diagram, the MV candidate list may be configured in such a manner that some of the kinds of the MV candidates in the diagram may not be included, or that one or more MV candidates other than the kinds of MV candidates in the diagram are included.

A final MV may be determined by performing a dynamic motion vector refreshing (DMVR) to be described later using the MV of the current block derived by normal merge mode. It is to be noted that, in normal merge mode, no MV difference is encoded, but an MV difference is encoded. In MMVD mode, one MV candidate is selected from an MV candidate list as in the case of normal merge mode, an MV difference is encoded. As illustrated in FIG. 38B, MMVD may be categorized into merge modes together with normal merge mode. It is to be noted that the MV difference in MMVD mode does not always need to be the same as the MV difference for use in inter mode. For example, MV difference derivation in MMVD mode may be a process that requires a smaller amount of processing than the amount of processing required for MV difference derivation in inter mode.

In addition, a combined inter merge/intra prediction (CIIP) mode may be performed. The mode is for overlapping a prediction image generated in inter prediction and a prediction image generated in intra prediction to generate a prediction image for a current block.

It is to be noted that the MV candidate list may be referred to as a candidate list. In addition, merge_idx is MV selection information.

[MV Derivation>HMVP Mode]

Figure 42:
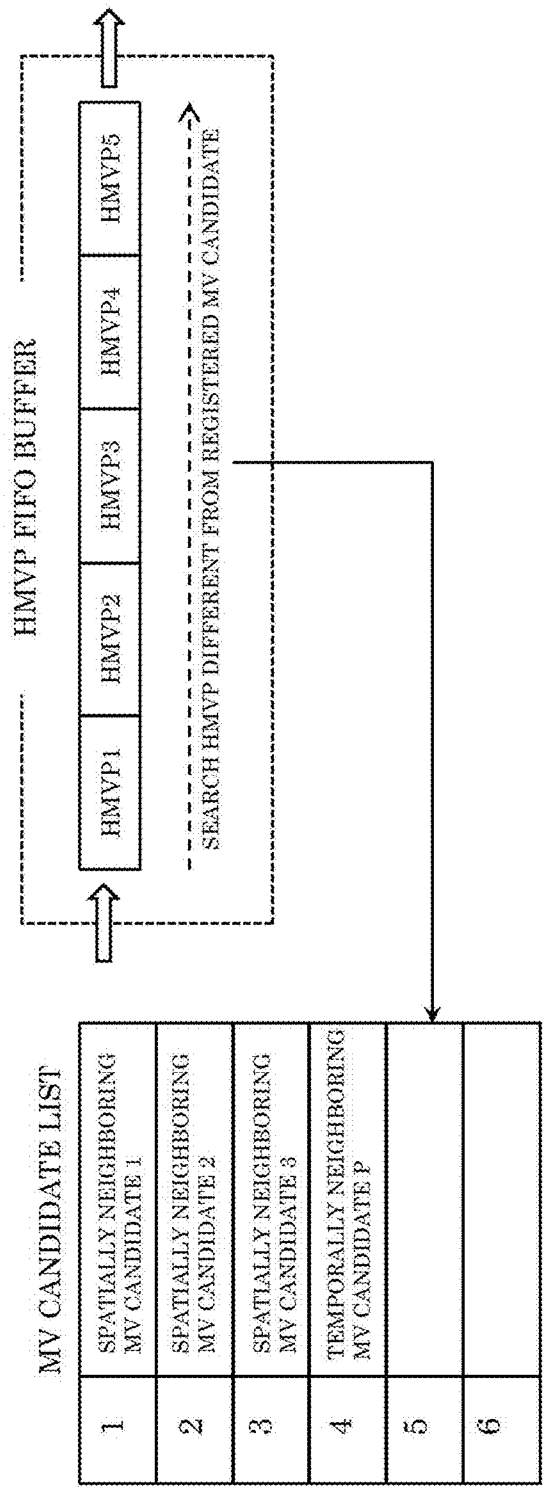
FIG. 42 is a diagram for illustrating one example of an MV derivation process by a history-based motion vector prediction/predictor (HMVP) mode.

FIG. 42 is a diagram for illustrating one example of an MV derivation process for a current picture by HMVP merge mode.

In normal merge mode, an MV for, for example, a CU which is a current block is determined by selecting one MV candidate from an MV candidate list generated by referring to an encoded block (for example, a CU). Here, another MV candidate may be registered in the MV candidate list. The mode in which such another MV candidate is registered is referred to as HMVP mode.

In HMVP mode, MV candidates are managed using a first-in first-out (FIFO) buffer for HMVP, separately from the MV candidate list for normal merge mode.

In FIFO buffer, motion information such as MVs of blocks processed in the past are stored newest first. In the management of the FIFO buffer, each time when one block is processed, the MV for the newest block (that is the CU processed immediately before) is stored in the FIFO buffer, and the MV of the oldest CU (that is, the CU processed earliest) is deleted from the FIFO buffer. In the example illustrated in FIG. 42, HMVP1 is the MV for the newest block, and HMVP5 is the MV for the oldest MV.

Inter predictor 126 then, for example, checks whether each MV managed in the FIFO buffer is an MV different from all the MV candidates which have been already registered in the MV candidate list for normal merge mode starting from HMVP1. When determining that the MV is different from all the MV candidates, inter predictor 126 may add the MV managed in the FIFO buffer in the MV candidate list for normal merge mode as an MV candidate. At this time, the MV candidate registered from the FIFO buffer may be one or more.

By using the HMVP mode in this way, it is possible to add not only the MV of a block which neighbors the current block spatially or temporally but also an MV for a block processed in the past. As a result, the variation of MV candidates for normal merge mode is expanded, which increases the probability that coding efficiency can be increased.

It is to be noted that the MV may be motion information. In other words, information stored in the MV candidate list and the FIFO buffer may include not only MV values but also reference picture information, reference directions, the numbers of pictures, etc. In addition, the block is, for example, a CU.

It is to be noted that the MV candidate list and the FIFO buffer illustrated in FIG. 42 are examples. The MV candidate list and FIFO buffer may be different in size from those in FIG. 42, or may be configured to register MV candidates in an order different from the one in FIG. 42. In addition, the process described here is common between encoder 100 and decoder 200.

It is to be noted that the HMVP mode can be applied for modes other than the normal merge mode. For example, it is also excellent that motion information such as MVs of blocks processed in affine mode in the past may be stored newest first, and may be used as MV candidates. The mode obtained by applying HMVP mode to affine mode may be referred to as history affine mode.

[MV Derivation>FRUC Mode]

Motion information may be derived at the decoder 200 side without being signaled from the encoder 100 side. For example, motion information may be derived by performing motion estimation at the decoder 200 side. At this time, at the decoder 200 side, motion estimation is performed without using any pixel value in a current block. Modes in which motion estimation is performed at the decoder 200 side in this way include a frame rate up-conversion (FRUC) mode, a pattern matched motion vector derivation (PMMVD) mode, etc.

Figure 43:
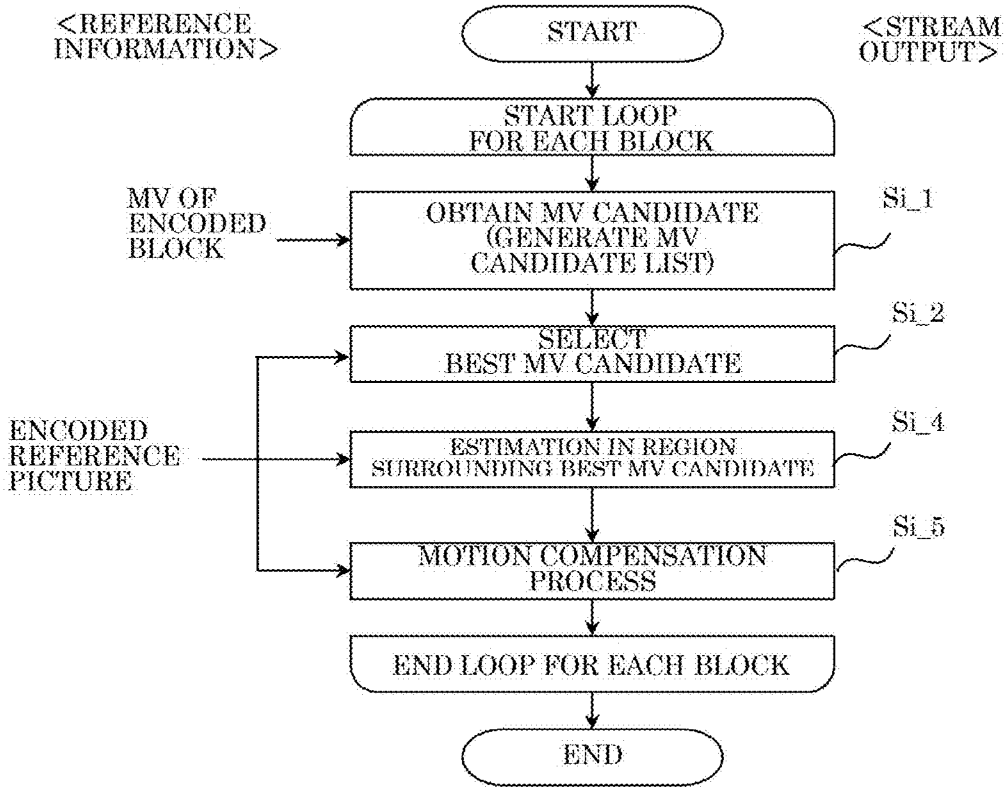
FIG. 43 is a flow chart illustrating one example of frame rate up conversion (FRUC)

One example of a FRUC process is illustrated in FIG. 43. First, a list which indicates, as MV candidates, MVs for encoded blocks each of which neighbors the current block spatially or temporally is generated by referring to the MVs (the list may be an MV candidate list, and be also used as the MV candidate list for normal merge mode) (Step Si_1). Next, a best MV candidate is selected from the plurality of MV candidates registered in the MV candidate list (Step Si_2). For example, the evaluation values of the respective MV candidates included in the MV candidate list are calculated, and one MV candidate is selected as the best MV candidate based on the evaluation values. Based on the selected best MV candidate, a motion vector for the current block is then derived (Step Si_4). More specifically, for example, the selected best MV candidate is directly derived as the MV for the current block. In addition, for example, the MV for the current block may be derived using pattern matching in a surrounding region of a position which is included in a reference picture and corresponds to the selected best MV candidate. In other words, estimation using the pattern matching in a reference picture and the evaluation values may be performed in the surrounding region of the best MV candidate, and when there is an MV that yields a better evaluation value, the best MV candidate may be updated to the MV that yields the better evaluation value, and the updated MV may be determined as the final MV for the current block. Update to the MV that yields the better evaluation value may not be performed.

Lastly, inter predictor 126 generates a prediction image for the current block by performing motion compensation of the current block using the derived MV and the encoded reference picture (Step Si_5). The processes in Steps Si_1 to Si_5 are executed, for example, on each block. For example, when the processes in Steps Si_1 to Si_5 are executed on each of all the blocks in the slice, inter prediction of the slice using the FRUC mode finishes. For example, when the processes in Steps Si_1 to Si_5 are executed on each of all the blocks in the picture, inter prediction of the picture using the FRUC mode finishes. It is to be noted that not all the blocks included in the slice may be subjected to the processes in Steps Si_1 to Si_5, and inter prediction of the slice using the FRUC mode may finish when part of the blocks are subjected to the processes. Likewise, inter prediction of the picture using the FRUC mode may finish when the processes in Steps Si_1 to Si_5 are executed on part of the blocks included in the picture.

Each sub-block may be processed similarly to the above-described case of processing each block.

Evaluation values may be calculated according to various kinds of methods. For example, a comparison is made between a reconstructed image in a region in a reference picture corresponding to an MV and a reconstructed image in a determined region (the region may be, for example, a region in another reference picture or a region in a neighboring block of a current picture, as indicated below). The difference between the pixel values of the two reconstructed images may be used for an evaluation value of the MV. It is to be noted that an evaluation value may be calculated using information other than the value of the difference.

Next, pattern matching is described in detail. First, one MV candidate included in an MV candidate list (also referred to as a merge list) is selected as a starting point for estimation by pattern matching. As the pattern matching, either a first pattern matching or a second pattern matching may be used. The first pattern matching and the second pattern matching may be referred to as bilateral matching and template matching, respectively.

[MV Derivation>FRUC>Bilateral Matching]

In the first pattern matching, the pattern matching is performed between two blocks which are located along a motion trajectory of a current block and included in two different reference pictures. Accordingly, in the first pattern matching, a region in another reference picture located along the motion trajectory of the current block is used as a determined region for calculating the evaluation value of the above-described MV candidate.

Figure 44:
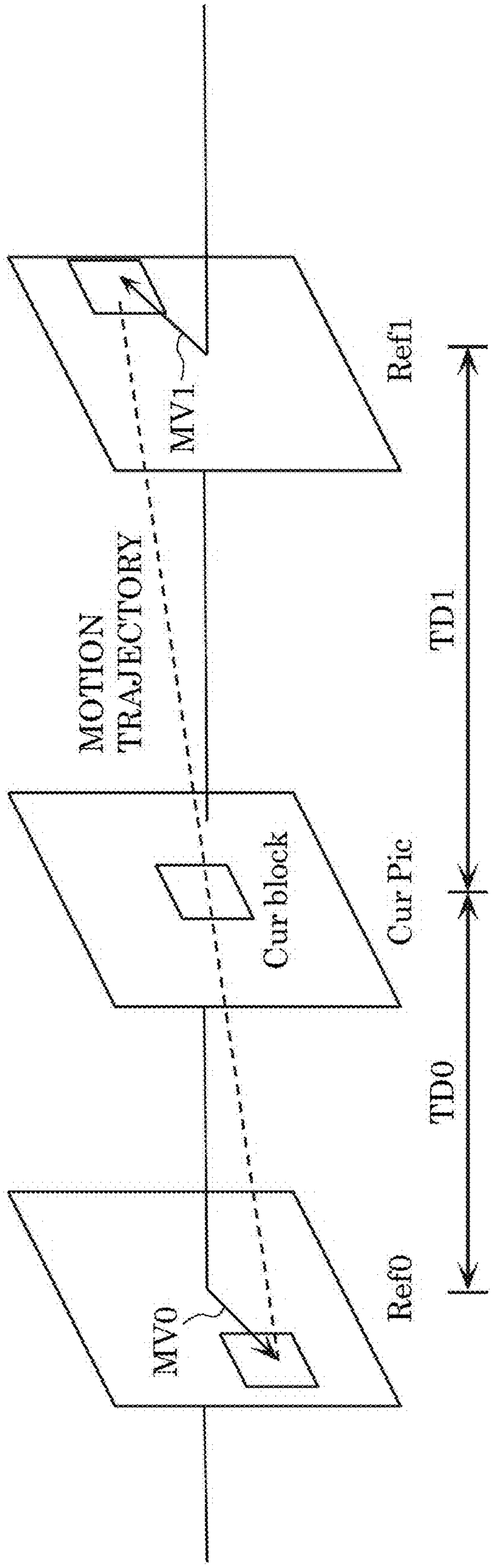
FIG. 44 is a diagram for illustrating one example of pattern matching (bilateral matching) between two blocks located along a motion trajectory.

FIG. 44 is a diagram for illustrating one example of the first pattern matching (bilateral matching) between the two blocks in the two reference pictures located along the motion trajectory. As illustrated in FIG. 44, in the first pattern matching, two motion vectors (MV0, MV1) are derived by estimating a pair which best matches among pairs of two blocks which are included in the two different reference pictures (Ref0, Ref1) and located along the motion trajectory of the current block (Cur block). More specifically, a difference between the reconstructed image at a specified position in the first encoded reference picture (Ref0) specified by an MV candidate and the reconstructed image at a specified position in the second encoded reference picture (Ref1) specified by a symmetrical MV obtained by scaling the MV candidate at a display time interval is derived for the current block, and an evaluation value is calculated using the value of the obtained difference. It is excellent to select, as the best MV, the MV candidate which yields the best evaluation value among the plurality of MV candidates.

In the assumption of a continuous motion trajectory, the motion vectors (MV0, MV1) specifying the two reference blocks are proportional to temporal distances (TD0, TD1) between the current picture (Cur Pic) and the two reference pictures (Ref0, Ref1). For example, when the current picture is temporally located between the two reference pictures and the temporal distances from the current picture to the respective two reference pictures are equal to each other, mirror-symmetrical bi-directional MVs are derived in the first pattern matching.

[MV Derivation>FRUC>Template Matching]

In the second pattern matching (template matching), pattern matching is performed between a block in a reference picture and a template in the current picture (the template is a block neighboring the current block in the current picture (the neighboring block is, for example, an upper and/or left neighboring block(s))). Accordingly, in the second pattern matching, the block neighboring the current block in the current picture is used as the determined region for calculating the evaluation value of the above-described MV candidate.

Figure 45:
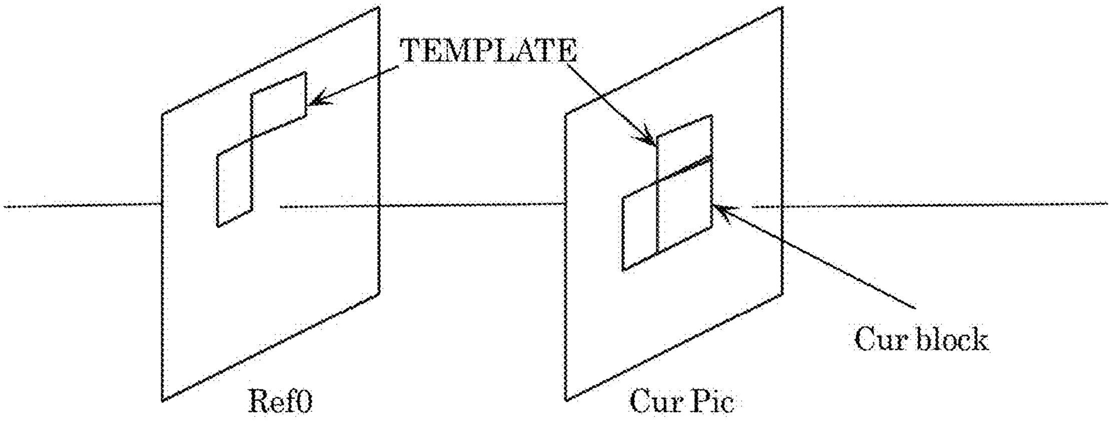
FIG. 45 is a diagram for illustrating one example of pattern matching (template matching) between a template in a current picture and a block in a reference picture.

FIG. 45 is a diagram for illustrating one example of pattern matching (template matching) between a template in a current picture and a block in a reference picture. As illustrated in FIG. 45, in the second pattern matching, the MV for the current block (Cur block) is derived by estimating, in the reference picture (Ref0), the block which best matches the block neighboring the current block in the current picture (Cur Pic). More specifically, the difference between a reconstructed image in an encoded region which neighbors both left and above or either left or above and a reconstructed image which is in a corresponding region in the encoded reference picture (Ref0) and is specified by an MV candidate is derived, and an evaluation value is calculated using the value of the obtained difference. It is excellent to select, as the best MV candidate, the MV candidate which yields the best evaluation value among the plurality of MV candidates.

Such information indicating whether to apply the FRUC mode (referred to as, for example, a FRUC flag) may be signaled at the CU level. In addition, when the FRUC mode is applied (for example, when a FRUC flag is true), information indicating an applicable pattern matching method (either the first pattern matching or the second pattern matching) may be signaled at the CU level. It is to be noted that the signaling of such information does not necessarily need to be performed at the CU level, and may be performed at another level (for example, at the sequence level, picture level, slice level, brick level, CTU level, or sub-block level).

[MV Derivation>Affine Mode]

The affine mode is a mode for generating an MV using affine transform. For example, an MV may be derived in units of a sub-block based on motion vectors of a plurality of neighboring blocks. This mode is also referred to as an affine motion compensation prediction mode.

Figure 46A:
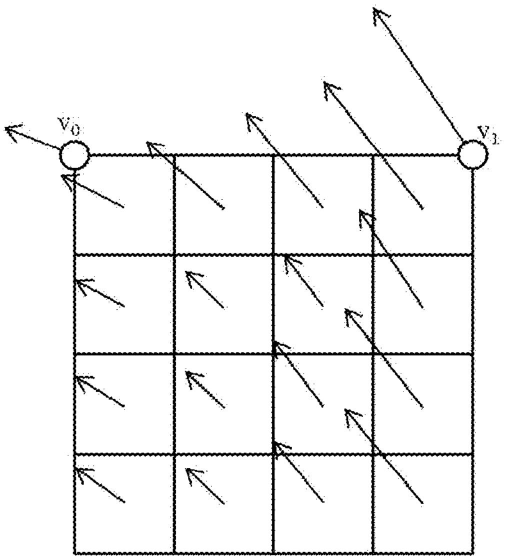
FIG. 46A is a diagram for illustrating one example of MV derivation in units of a sub-block in affine mode in which two control points are used.

FIG. 46A is a diagram for illustrating one example of MV derivation in units of a sub-block based on MVs of a plurality of neighboring blocks. In FIG. 46A, the current block includes sixteen 4×4 pixel sub-blocks. Here, motion vector $v_0$ at an upper-left corner control point in the current block is derived based on an MV of a neighboring block, and likewise, motion vector $v_1$ at an upper-right corner control point in the current block is derived based on an MV of a neighboring sub-block. Two motion vectors $v_0$ and $v_1$ are projected according to an expression (1A) indicated below, and motion vectors $(v_x, v_y)$ for the respective sub-blocks in the current block are derived.

[MATH. 1]

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1A)$$

Here, x and y indicate the horizontal position and the vertical position of the sub-block, respectively, and w indicates a predetermined weighting coefficient.

Such information indicating the affine mode (for example, referred to as an affine flag) may be signaled at the CU level. It is to be noted that the signaling of such information does not necessarily need to be performed at the CU level, and may be performed at another level (for example, at the sequence level, picture level, slice level, brick level, CTU level, or sub-block level).

In addition, the affine mode may include several modes for different methods for deriving MVs at the upper-left and upper-right corner control points. For example, the affine modes include two modes which are the affine inter mode (also referred to as an affine normal inter mode) and the affine merge mode.

Figure 46B:
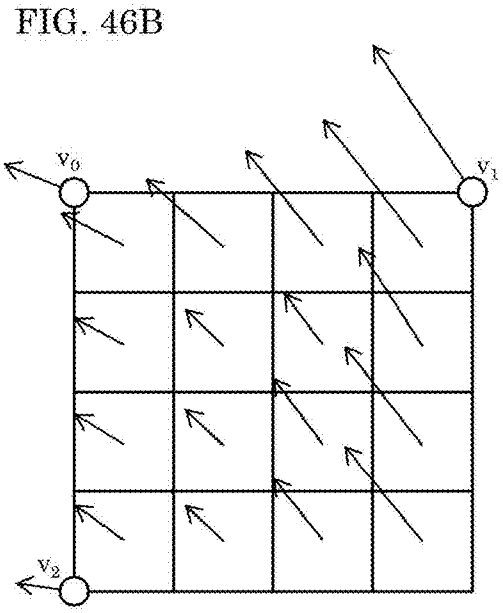
FIG. 46B is a diagram for illustrating one example of MV derivation in units of a sub-block in affine mode in which three control points are used.

FIG. 46B is a diagram for illustrating one example of MV derivation in units of a sub-block in affine mode in which three control points are used. In FIG. 46B, the current block includes, for example, sixteen 4×4 pixel sub-blocks. Here, motion vector $v_0$ at an upper-left corner control point in the current block is derived based on an MV of a neighboring block. Here, motion vector $v_1$ at an upper-right corner control point in the current block is derived based on an MV of a neighboring block, and likewise, motion vector $v_2$ at a lower-left corner control point for the current block is derived based on an MV of a neighboring block. Three motion vectors $v_0$, $v_1$, and $v_2$ are projected according to an expression (1B) indicated below, and motion vectors $(v_x, v_y)$ for the respective sub-blocks in the current block are derived.

[MATH. 2]

$$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \quad (1B)$$

Here, x and y indicate the horizontal position and the vertical position of the sub-block, respectively, and each of w and h indicates a predetermined weighting coefficient. Here, w may indicate the width of a current block, and h may indicate the height of the current block.

Affine modes in which different numbers of control points (for example, two and three control points) are used may be switched and signaled at the CU level. It is to be noted that information indicating the number of control points in affine mode used at the CU level may be signaled at another level (for example, the sequence level, picture level, slice level, brick level, CTU level, or sub-block level).

In addition, such an affine mode in which three control points are used may include different methods for deriving MVs at the upper-left, upper-right, and lower-left corner control points. For example, the affine modes in which three control points are used include two modes which are affine inter mode and affine merge mode, as in the case of affine modes in which two control points are used.

It is to be noted that, in the affine modes, the size of each sub-block included in the current block may not be limited to 4×4 pixels, and may be another size. For example, the size of each sub-block may be 8×8 pixels.

[MV Derivation>Affine Mode>Control Point]

Figure 47A:
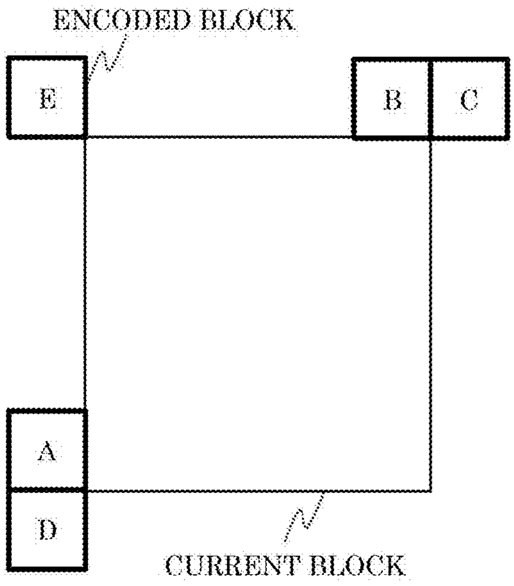
FIG. 47A is a conceptual diagram for illustrating one example of MV derivation at control points in an affine mode.
Figure 47B:
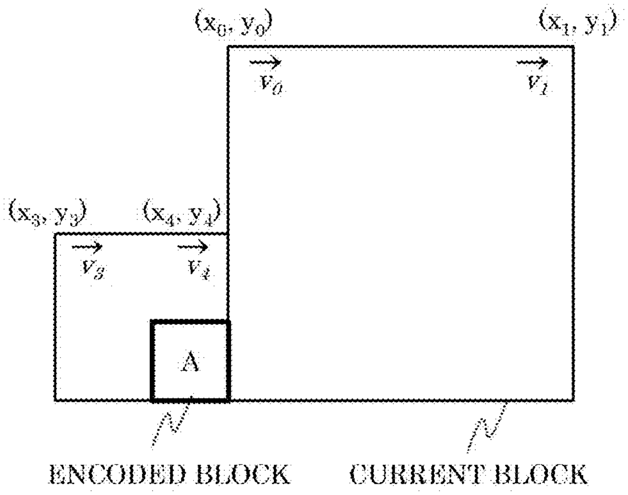
FIG. 47B is a conceptual diagram for illustrating one example of MV derivation at control points in an affine mode.
Figure 47C:
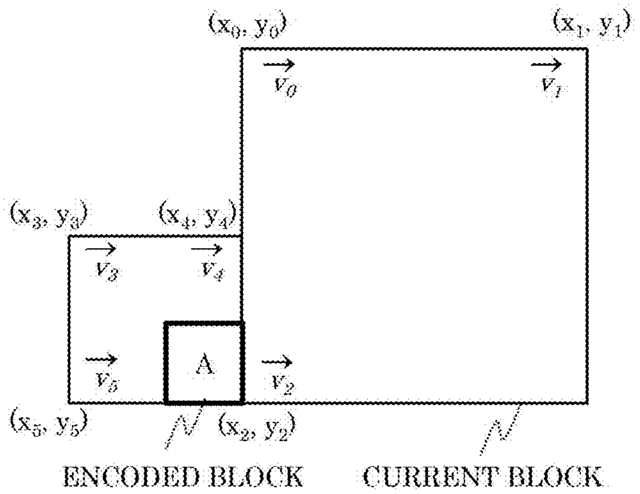
FIG. 47C is a conceptual diagram for illustrating one example of MV derivation at control points in an affine mode.

FIGS. 47A, 47B, and 47C are each a conceptual diagram for illustrating one example of MV derivation at control points in an affine mode.

As illustrated in FIG. 47A, in the affine mode, for example, MV predictors at respective control points for a current block are calculated based on a plurality of MVs corresponding to blocks encoded according to the affine mode among encoded block A (left), block B (upper), block C (upper-right), block D (lower-left), and block E (upper-left) which neighbor the current block. More specifically, encoded block A (left), block B (upper), block C (upper-right), block D (lower-left), and block E (upper-left) are checked in the listed order, and the first effective block encoded according to the affine mode is identified. The MV at each control point for the current block is calculated based on the plurality of MVs corresponding to the identified block.

For example, as illustrated in FIG. 47B, when block A which neighbors to the left of the current block has been encoded according to an affine mode in which two control points are used, motion vectors $v_3$ and $v_4$ projected at the upper-left corner position and the upper-right corner position of the encoded block including block A are derived. Motion vector $v_0$ at the upper-left control point and motion vector $v_1$ at the upper-right control point for the current block are then calculated from derived motion vectors $v_3$ and $v_4$.

For example, as illustrated in FIG. 47C, when block A which neighbors to the left of the current block has been encoded according to an affine mode in which three control points are used, motion vectors $v_3$, $v_4$, and $v_5$ projected at the upper-left corner position, the upper-right corner position, and the lower-left corner position of the encoded block including block A are derived. Motion vector $v_0$ at the upper-left control point for the current block, motion vector $v_1$ at the upper-right control point for the current block, and motion vector $v_2$ at the lower-left control point for the current block are then calculated from derived motion vectors $v_3$, $v_4$, and $v_5$.

The MV derivation methods illustrated in FIGS. 47A to 47C may be used in the MV derivation at each control point for the current block in Step Sk_1 illustrated in FIG. 50 described later, or may be used for MV predictor derivation at each control point for the current block in Step Sj_1 illustrated in FIG. 51 described later.

Figure 48A:
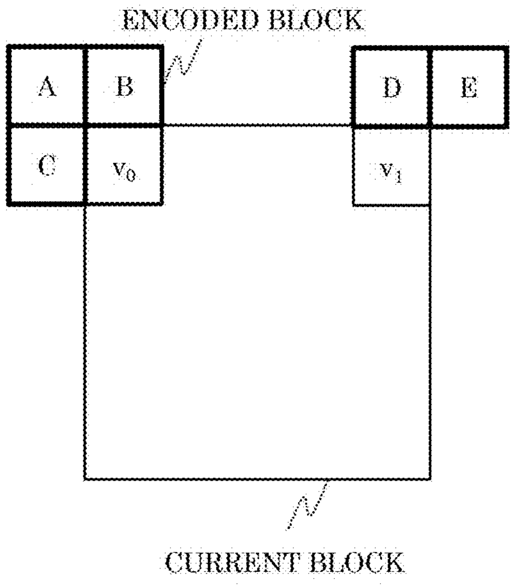
FIG. 48A is a diagram for illustrating an affine mode in which two control points are used.
Figure 48B:
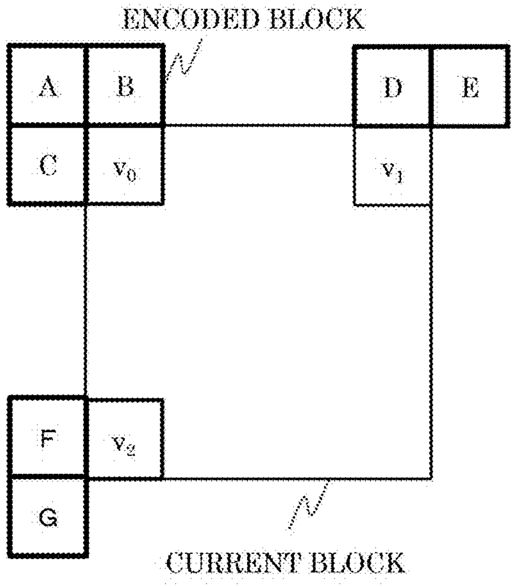
FIG. 48B is a diagram for illustrating an affine mode in which three control points are used.

FIGS. 48A and 48B are each a conceptual diagram for illustrating another example of MV derivation at control points in affine mode.

FIG. 48A is a diagram for illustrating an affine mode in which two control points are used.

In the affine mode, as illustrated in FIG. 48A, an MV selected from MVs at encoded block A, block B, and block C which neighbor the current block is used as motion vector $v_0$ at the upper-left corner control point for the current block. Likewise, an MV selected from MVs of encoded block D and block E which neighbor the current block is used as motion vector $v_1$ at the upper-right corner control point for the current block.

FIG. 48B is a diagram for illustrating an affine mode in which three control points are used.

In the affine mode, as illustrated in FIG. 48B, an MV selected from MVs at encoded block A, block B, and block C which neighbor the current block is used as motion vector $v_0$ at the upper-left corner control point for the current block. Likewise, an MV selected from MVs of encoded block D and block E which neighbor the current block is used as motion vector $v_1$ at the upper-right corner control point for the current block. Furthermore, an MV selected from MVs of encoded block F and block G which neighbor the current block is used as motion vector $v_2$ at the lower-left corner control point for the current block.

It is to be noted that the MV derivation methods illustrated in FIGS. 48A and 48B may be used in the MV derivation at each control point for the current block in Step Sk_1 illustrated in FIG. 50 described later, or may be used for MV predictor derivation at each control point for the current block in Step Sj_1 illustrated in FIG. 51 described later.

Here, when affine modes in which different numbers of control points (for example, two and three control points) are used may be switched and signaled at the CU level, the number of control points for an encoded block and the number of control points for a current block may be different from each other.

Figure 49A:
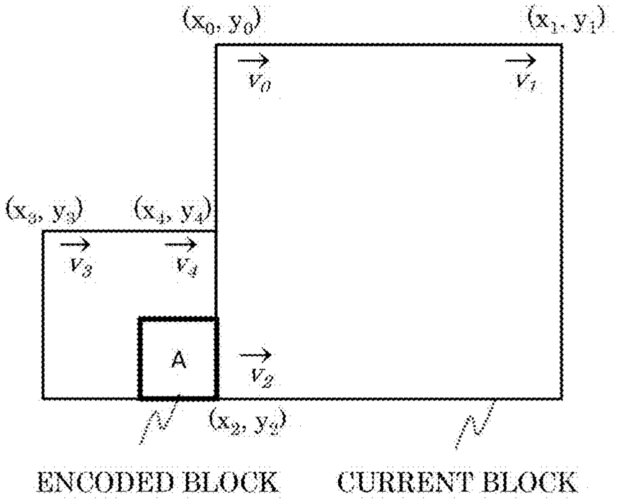
FIG. 49A is a conceptual diagram for illustrating one example of a method for MV derivation at control points when the number of control points for an encoded block and the number of control points for a current block are different from each other.
Figure 49B:
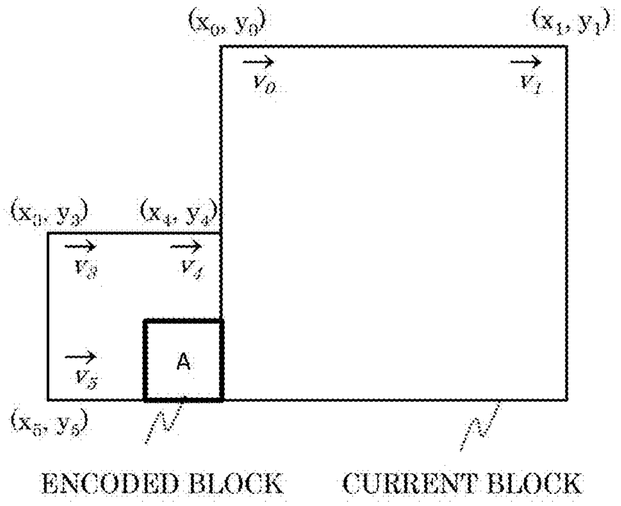
FIG. 49B is a conceptual diagram for illustrating another example of a method for MV derivation at control points when the number of control points for an encoded block and the number of control points for a current block are different from each other.

FIGS. 49A and 49B are each a conceptual diagram for illustrating one example of a method for MV derivation at control points when the number of control points for an encoded block and the number of control points for a current block are different from each other.

For example, as illustrated in FIG. 49A, a current block has three control points at the upper-left corner, the upper-right corner, and the lower-left corner, and block A which neighbors to the left of the current block has been encoded according to an affine mode in which two control points are used. In this case, motion vectors $v_3$ and $v_4$ projected at the upper-left corner position and the upper-right corner position in the encoded block including block A are derived. Motion vector $v_0$ at the upper-left corner control point and motion vector $v_1$ at the upper-right corner control point for the current block are then calculated from derived motion vectors $v_3$ and $v_4$. Furthermore, motion vector $v_2$ at the lower-left corner control point is calculated from derived motion vectors $v_0$ and $v_1$.

For example, as illustrated in FIG. 49B, a current block has two control points at the upper-left corner and the upper-right corner, and block A which neighbors to the left of the current block has been encoded according to an affine mode in which three control points are used. In this case, motion vectors $v_3$, $v_4$, and $v_5$ projected at the upper-left corner position in the encoded block including block A, the upper-right corner position in the encoded block, and the lower-left corner position in the encoded block are derived. Motion vector $v_0$ at the upper-left corner control point for the current block and motion vector $v_1$ at the upper-right corner control point for the current block are then calculated from derived motion vectors $v_3$, $v_4$, and $v_5$.

It is to be noted that the MV derivation methods illustrated in FIGS. 49A and 49B may be used in the MV derivation at each control point for the current block in Step Sk_1 illustrated in FIG. 50 described later, or may be used for MV predictor derivation at each control point for the current block in Step Sj_1 illustrated in FIG. 51 described later.

[MV Derivation>Affine Mode>Affine Merge Mode]

Figure 50:
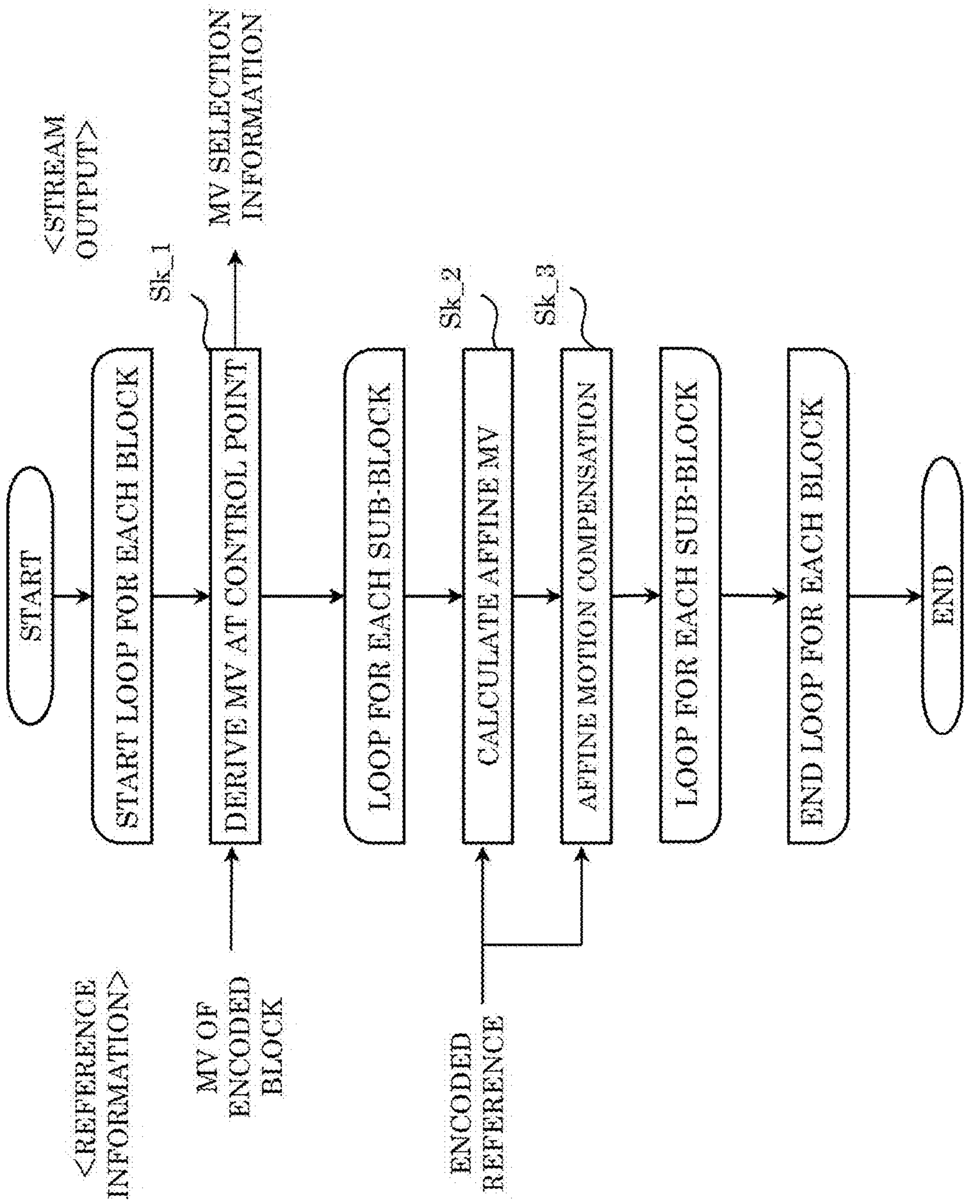
FIG. 50 is a flow chart illustrating one example of a process in affine merge mode.

FIG. 50 is a flow chart illustrating one example of the affine merge mode.

In the affine merge mode, first, inter predictor 126 derives MVs at respective control points for a current block (Step Sk_1). The control points are an upper-left corner point of the current block and an upper-right corner point of the current block as illustrated in FIG. 46A, or an upper-left corner point of the current block, an upper-right corner point of the current block, and a lower-left corner point of the current block as illustrated in FIG. 46B. At this time, inter predictor 126 may encode MV selection information for identifying two or three derived MVs in a stream.

For example, when MV derivation methods illustrated in FIGS. 47A to 47C are used, as illustrated in FIG. 47A, inter predictor 126 checks encoded block A (left), block B (upper), block C (upper-right), block D (lower-left), and block E (upper-left) in the listed order, and identifies the first effective block encoded according to the affine mode.

Inter predictor 126 derives the MV at the control point using the identified first effective block encoded according to the identified affine mode. For example, when block A is identified and block A has two control points, as illustrated in FIG. 47B, inter predictor 126 calculates motion vector $v_0$ at the upper-left corner control point of the current block and motion vector $v_1$ at the upper-right corner control point of the current block from motion vectors $v_3$ and $v_4$ at the upper-left corner of the encoded block including block A and the upper-right corner of the encoded block. For example, inter predictor 126 calculates motion vector $v_0$ at the upper-left corner control point of the current block and motion vector $v_1$ at the upper-right corner control point of the current block by projecting motion vectors $v_3$ and $v_4$ at the upper-left corner and the upper-right corner of the encoded block onto the current block.

Alternatively, when block A is identified and block A has three control points, as illustrated in FIG. 47C, inter predictor 126 calculates motion vector $v_0$ at the upper-left corner control point of the current block, motion vector $v_1$ at the upper-right corner control point of the current block, and motion vector $v_2$ at the lower-left corner control point of the current block from motion vectors $v_3$, $v_4$, and $v_5$ at the upper-left corner of the encoded block including block A, the upper-right corner of the encoded block, and the lower-left corner of the encoded block. For example, inter predictor 126 calculates motion vector $v_0$ at the upper-left corner control point of the current block, motion vector $v_1$ at the upper-right corner control point of the current block, and motion vector $v_2$ at the lower-left corner control point of the current block by projecting motion vectors $v_3$, $v_4$, and $v_5$ at the upper-left corner, the upper-right corner, and the lower-left corner of the encoded block onto the current block.

It is to be noted that, as illustrated in FIG. 49A described above, MVs at three control points may be calculated when block A is identified and block A has two control points, and that, as illustrated in FIG. 49B described above, MVs at two control points may be calculated when block A is identified and block A has three control points.

Next, inter predictor 126 performs motion compensation of each of a plurality of sub-blocks included in the current block. In other words, inter predictor 126 calculates an MV for each of the plurality of sub-blocks as an affine MV, using either two motion vectors $v_0$ and $v_1$ and the above expression (1A) or three motion vectors $v_0$, $v_1$, and $v_2$ and the above expression (1B) (Step Sk_2). Inter predictor 126 then performs motion compensation of the sub-blocks using these affine MVs and encoded reference pictures (Step Sk_3). When the processes in Steps Sk_2 and Sk_3 are executed for each of all the sub-blocks included in the current block, the process for generating a prediction image using the affine merge mode for the current block finishes. In other words, motion compensation of the current block is performed to generate a prediction image of the current block.

It is to be noted that the above-described MV candidate list may be generated in Step Sk_1. The MV candidate list may be, for example, a list including MV candidates derived using a plurality of MV derivation methods for each control point. The plurality of MV derivation methods may be any combination of the MV derivation methods illustrated in FIGS. 47A to 47C, the MV derivation methods illustrated in FIGS. 48A and 48B, the MV derivation methods illustrated in FIGS. 49A and 49B, and other MV derivation methods.

It is to be noted that MV candidate lists may include MV candidates in a mode in which prediction is performed in units of a sub-block, other than the affine mode.

It is to be noted that, for example, an MV candidate list including MV candidates in an affine merge mode in which two control points are used and an affine merge mode in which three control points are used may be generated as an MV candidate list. Alternatively, an MV candidate list including MV candidates in the affine merge mode in which two control points are used and an MV candidate list including MV candidates in the affine merge mode in which three control points are used may be generated separately. Alternatively, an MV candidate list including MV candidates in one of the affine merge mode in which two control points are used and the affine merge mode in which three control points are used may be generated. The MV candidate(s) may be, for example, MVs for encoded block A (left), block B (upper), block C (upper-right), block D (lower-left), and block E (upper-left), or an MV for an effective block among the blocks.

It is to be noted that index indicating one of the MVs in an MV candidate list may be transmitted as MV selection information.

[MV Derivation>Affine Mode>Affine Inter Mode]

Figure 51:
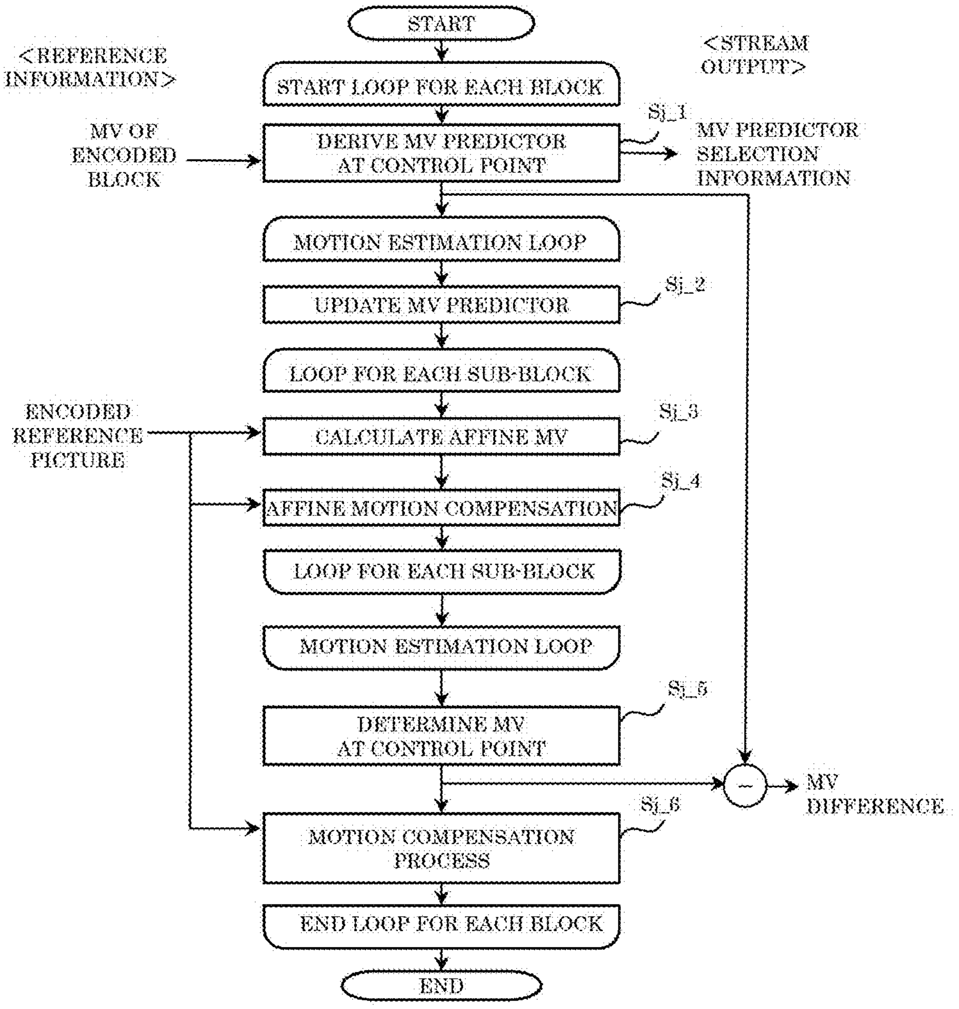
FIG. 51 is a flow chart illustrating one example of a process in affine inter mode.

FIG. 51 is a flow chart illustrating one example of an affine inter mode.

In the affine inter mode, first, inter predictor 126 derives MV predictors ($v_0$, $v_1$) or ($v_0$, $v_1$, $v_2$) of respective two or three control points for a current block (Step Sj_1). The control points are an upper-left corner point for the current block, an upper-right corner point of the current block, and a lower-left corner point for the current block as illustrated in FIG. 46A or FIG. 46B.

For example, when the MV derivation methods illustrated in FIGS. 48A and 48B are used, inter predictor 126 derives the MV predictors ($v_0$, $v_1$) or ($v_0$, $v_1$, $v_2$) at respective two or three control points for the current block by selecting MVs of any of the blocks among encoded blocks in the vicinity of the respective control points for the current block illustrated in either FIG. 48A or FIG. 48B. At this time, inter predictor 126 encodes, in a stream, MV predictor selection information for identifying the selected two or three MV predictors.

For example, inter predictor 126 may determine, using a cost evaluation or the like, the block from which an MV as an MV predictor at a control point is selected from among encoded blocks neighboring the current block, and may write, in a bitstream, a flag indicating which MV predictor has been selected. In other words, inter predictor 126 outputs, as a prediction parameter, the MV predictor selection information such as a flag to entropy encoder 110 through prediction parameter generator 130.

Next, inter predictor 126 performs motion estimation (Steps Sj_3 and Sj_4) while updating the MV predictor selected or derived in Step Sj_1 (Step Sj_2). In other words, inter predictor 126 calculates, as an affine MV, an MV of each of sub-blocks which corresponds to an updated MV predictor, using either the expression (1A) or expression (1B) described above (Step Sj_3). Inter predictor 126 then performs motion compensation of the sub-blocks using these affine MVs and encoded reference pictures (Step Sj_4). The processes in Steps Sj_3 and Sj_4 are executed on all the blocks in the current block each time an MV predictor is updated in Step Sj_2. As a result, for example, inter predictor 126 determines the MV predictor which yields the smallest cost as the MV at a control point in a motion estimation loop (Step Sj_5). At this time, inter predictor 126 further encodes, in the stream, the difference value between the determined MV and the MV predictor as an MV difference. In other words, inter predictor 126 outputs the MV difference as a prediction parameter to entropy encoder 110 through prediction parameter generator 130.

Lastly, inter predictor 126 generates a prediction image for the current block by performing motion compensation of the current block using the determined MV and the encoded reference picture (Step Sj_6).

It is to be noted that the above-described MV candidate list may be generated in Step Sj_1. The MV candidate list may be, for example, a list including MV candidates derived using a plurality of MV derivation methods for each control point. The plurality of MV derivation methods may be any combination of the MV derivation methods illustrated in FIGS. 47A to 47C, the MV derivation methods illustrated in FIGS. 48A and 48B, the MV derivation methods illustrated in FIGS. 49A and 49B, and other MV derivation methods.

It is to be noted that the MV candidate list may include MV candidates in a mode in which prediction is performed in units of a sub-block, other than the affine mode.

It is to be noted that, for example, an MV candidate list including MV candidates in an affine inter mode in which two control points are used and an affine inter mode in which three control points are used may be generated as an MV candidate list. Alternatively, an MV candidate list including MV candidates in the affine inter mode in which two control points are used and an MV candidate list including MV candidates in the affine inter mode in which three control points are used may be generated separately. Alternatively, an MV candidate list including MV candidates in one of the affine inter mode in which two control points are used and the affine inter mode in which three control points are used may be generated. The MV candidate(s) may be, for example, MVs for encoded block A (left), block B (upper), block C (upper-right), block D (lower-left), and block E (upper-left), or an MV for an effective block among the blocks.

It is to be noted that index indicating one of the MV candidates in an MV candidate list may be transmitted as MV predictor selection information.

[MV Derivation>Triangle Mode]

Inter predictor 126 generates one rectangular prediction image for a rectangular current block in the above example. However, inter predictor 126 may generate a plurality of prediction images each having a shape different from a rectangle for the rectangular current block, and may combine the plurality of prediction images to generate the final rectangular prediction image. The shape different from a rectangle may be, for example, a triangle.

Figure 52A:
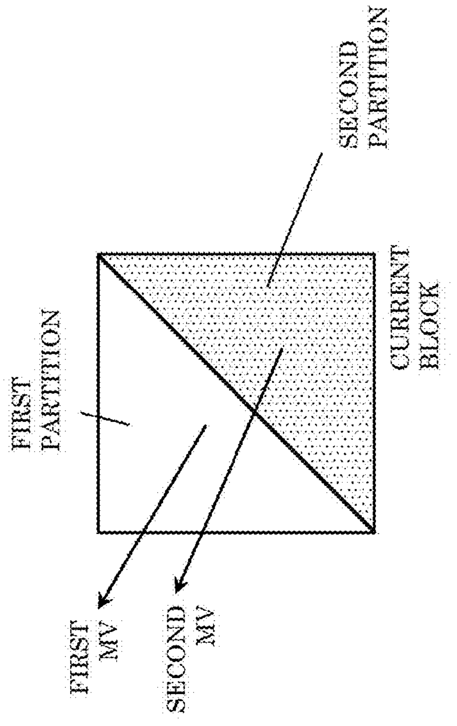
FIG. 52A is a diagram for illustrating generation of two triangular prediction images.

FIG. 52A is a diagram for illustrating generation of two triangular prediction images.

Inter predictor 126 generates a triangular prediction image by performing motion compensation of a first partition having a triangular shape in a current block by using a first MV of the first partition, to generate a triangular prediction image. Likewise, inter predictor 126 generates a triangular prediction image by performing motion compensation of a second partition having a triangular shape in a current block by using a second MV of the second partition, to generate a triangular prediction image. Inter predictor 126 then generates a prediction image having the same rectangular shape as the rectangular shape of the current block by combining these prediction images.

It is to be noted that a first prediction image having a rectangular shape corresponding to a current block may be generated as a prediction image for a first partition, using a first MV. In addition, a second prediction image having a rectangular shape corresponding to a current block may be generated as a prediction image for a second partition, using a second MV. A prediction image for the current block may be generated by performing a weighted addition of the first prediction image and the second prediction image. It is to be noted that the part which is subjected to the weighted addition may be a partial region across the boundary between the first partition and the second partition.

Figure 52B:
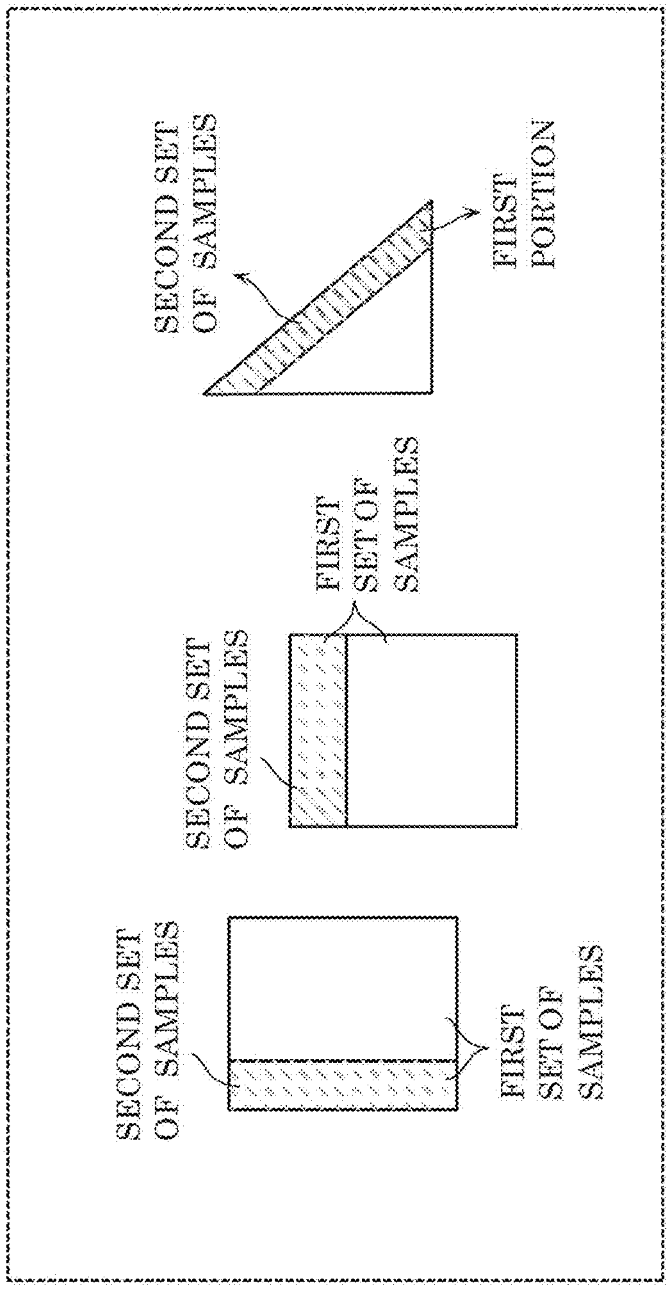
FIG. 52B is a conceptual diagram illustrating examples of a first portion of a first partition and first and second sets of samples.

FIG. 52B is a conceptual diagram for illustrating examples of a first portion of a first partition which overlaps with a second partition, and first and second sets of samples which may be weighted as part of a correction process. The first portion may be, for example, one fourth of the width or height of the first partition. In another example, the first portion may have a width corresponding to N samples adjacent to an edge of the first partition, where N is an integer greater than zero, and N may be, for example, the integer 2. As illustrated, the left example of FIG. 52B shows a rectangular partition having a rectangular portion with a width which is one fourth of the width of the first partition, with the first set of samples including samples outside of the first portion and samples inside of the first portion, and the second set of samples including samples within the first portion. The center example of FIG. 52B shows a rectangular partition having a rectangular portion with a height which is one fourth of the height of the first partition, with the first set of samples including samples outside of the first portion and samples inside of the first portion, and the second set of samples including samples within the first portion. The right example of FIG. 52B shows a triangular partition having a polygonal portion with a height which corresponds to two samples, with the first set of samples including samples outside of the first portion and samples inside of the first portion, and the second set of samples including samples within the first portion.

Figure 52C:
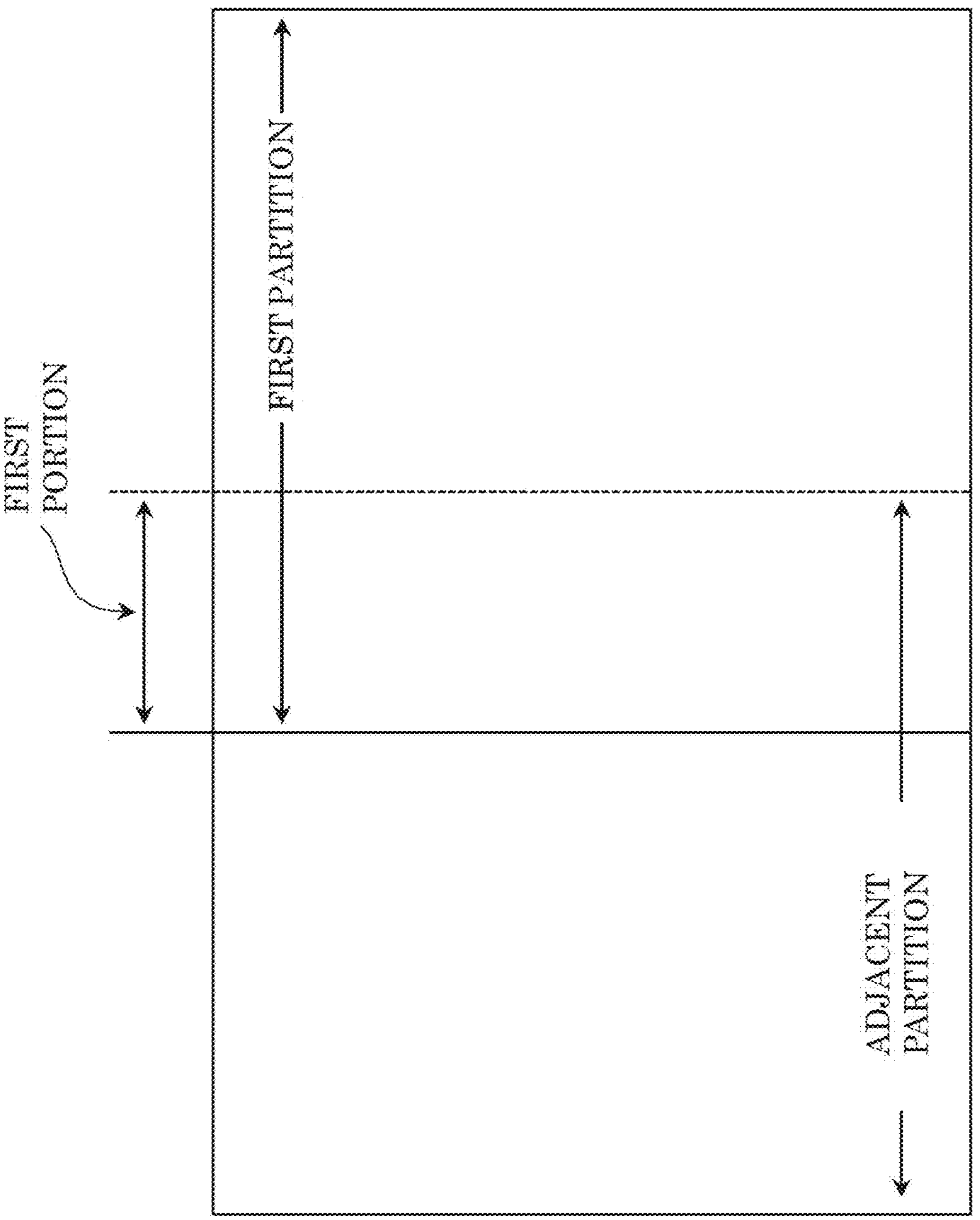
FIG. 52C is a conceptual diagram illustrating a first portion of a first partition.

The first portion may be a portion of the first partition which overlaps with an adjacent partition. FIG. 52C is a conceptual diagram for illustrating a first portion of a first partition, which is a portion of the first partition that overlaps with a portion of an adjacent partition. For ease of illustration, a rectangular partition having an overlapping portion with a spatially adjacent rectangular partition is shown. Partitions having other shapes, such as triangular partitions, may be employed, and the overlapping portions may overlap with a spatially or temporally adjacent partition.

In addition, although an example is given in which a prediction image is generated for each of two partitions using inter prediction, a prediction image may be generated for at least one partition using intra prediction.

FIG. 53 is a flow chart illustrating one example of a triangle mode.

In the triangle mode, first, inter predictor 126 splits the current block into the first partition and the second partition (Step Sx_1). At this time, inter predictor 126 may encode, in a stream, partition information which is information related to the splitting into the partitions as a prediction parameter. In other words, inter predictor 126 may output the partition information as the prediction parameter to entropy encoder 110 through prediction parameter generator 130.

First, inter predictor 126 obtains a plurality of MV candidates for a current block based on information such as MVs of a plurality of encoded blocks temporally or spatially surrounding the current block (Step Sx_2). In other words, inter predictor 126 generates an MV candidate list.

Inter predictor 126 then selects the MV candidate for the first partition and the MV candidate for the second partition as a first MV and a second MV, respectively, from the plurality of MV candidates obtained in Step Sx_2 (Step Sx_3). At this time, inter predictor 126 encodes, in a stream, MV selection information for identifying the selected MV candidate, as a prediction parameter. In other words, inter predictor 126 outputs the MV selection information as a prediction parameter to entropy encoder 110 through prediction parameter generator 130.

Next, inter predictor 126 generates a first prediction image by performing motion compensation using the selected first MV and an encoded reference picture (Step Sx_4). Likewise, inter predictor 126 generates a second prediction image by performing motion compensation using the selected second MV and an encoded reference picture (Step Sx_5).

Lastly, inter predictor 126 generates a prediction image for the current block by performing a weighted addition of the first prediction image and the second prediction image (Step Sx_6).

It is to be noted that, although the first partition and the second partition are triangles in the example illustrated in FIG. 52A, the first partition and the second partition may be trapezoids, or other shapes different from each other. Furthermore, although the current block includes two partitions in the example illustrated in FIG. 52A, the current block may include three or more partitions.

In addition, the first partition and the second partition may overlap with each other. In other words, the first partition and the second partition may include the same pixel region. In this case, a prediction image for a current block may be generated using a prediction image in the first partition and a prediction image in the second partition.

In addition, although the example in which the prediction image is generated for each of the two partitions using inter prediction has been illustrated, a prediction image may be generated for at least one partition using intra prediction.

It is to be noted that the MV candidate list for selecting the first MV and the MV candidate list for selecting the second MV may be different from each other, or the MV candidate list for selecting the first MV may be also used as the MV candidate list for selecting the second MV.

It is to be noted that partition information may include an index indicating the splitting direction in which at least a current block is split into a plurality of partitions. The MV selection information may include an index indicating the selected first MV and an index indicating the selected second MV. One index may indicate a plurality of pieces of information. For example, one index collectively indicating a part or the entirety of partition information and a part or the entirety of MV selection information may be encoded.

[Mv Derivation>Atmvp Mode]

Figure 54:
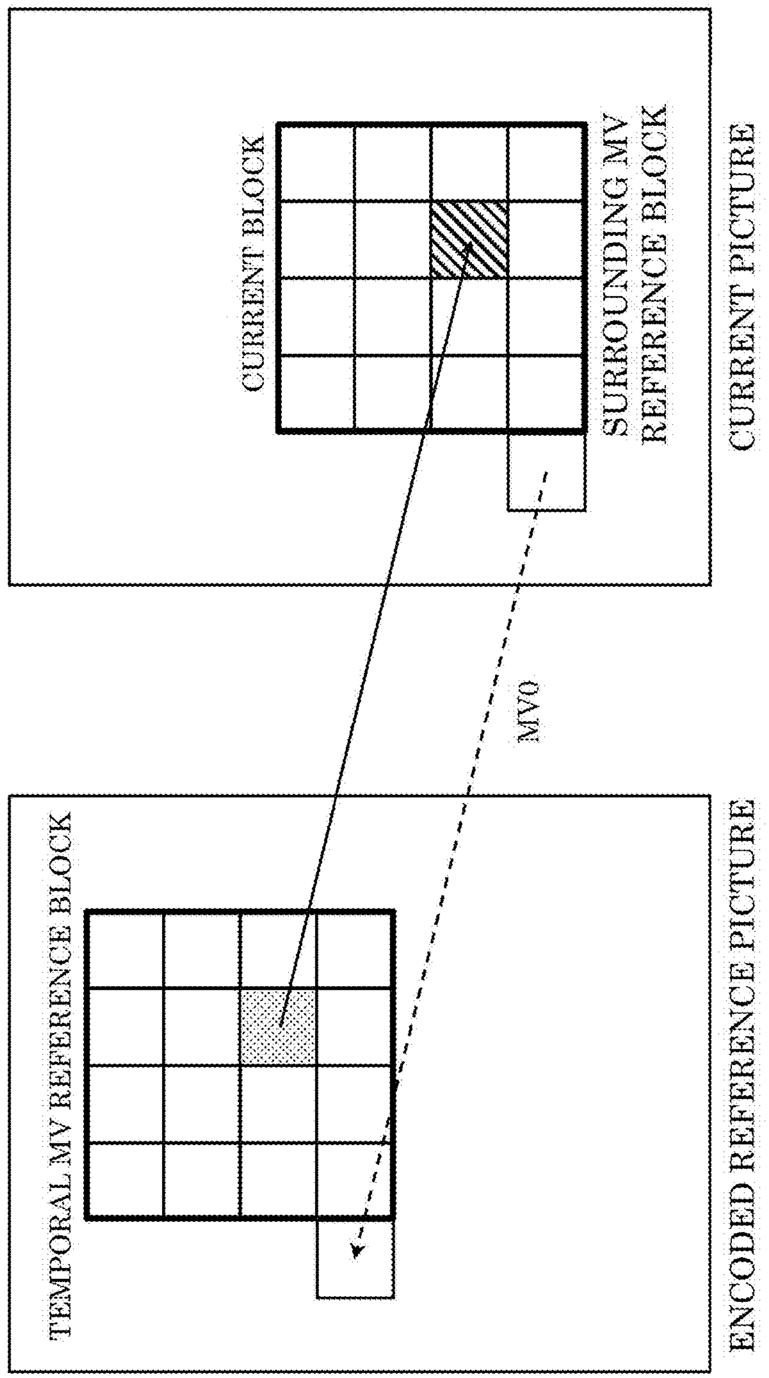
FIG. 54 is a diagram illustrating one example of an advanced temporal motion vector prediction/predictor (ATMVP) mode in which an MV is derived in units of a sub-block.

FIG. 54 is a diagram illustrating one example of an ATMVP mode in which an MV is derived in units of a sub-block.

The ATMVP mode is a mode categorized into the merge mode. For example, in the ATMVP mode, an MV candidate for each sub-block is registered in an MV candidate list for use in normal merge mode.

More specifically, in the ATMVP mode, first, as illustrated in FIG. 54, a temporal MV reference block associated with a current block is identified in an encoded reference picture specified by an MV (MV0) of a neighboring block located at the lower-left position with respect to the current block. Next, in each sub-block in the current block, the MV used to encode the region corresponding to the sub-block in the temporal MV reference block is identified. The MV identified in this way is included in an MV candidate list as an MV candidate for the sub-block in the current block. When the MV candidate for each sub-block is selected from the MV candidate list, the sub-block is subjected to motion compensation in which the MV candidate is used as the MV for the sub-block. In this way, a prediction image for each sub-block is generated.

Although the block located at the lower-left position with respect to the current block is used as a surrounding MV reference block in the example illustrated in FIG. 54, it is to be noted that another block may be used. In addition, the size of the sub-block may be 4×4 pixels, 8×8 pixels, or another size. The size of the sub-block may be switched for a unit such as a slice, brick, picture, etc.

[Motion Estimation>DMVR]

Figure 55:
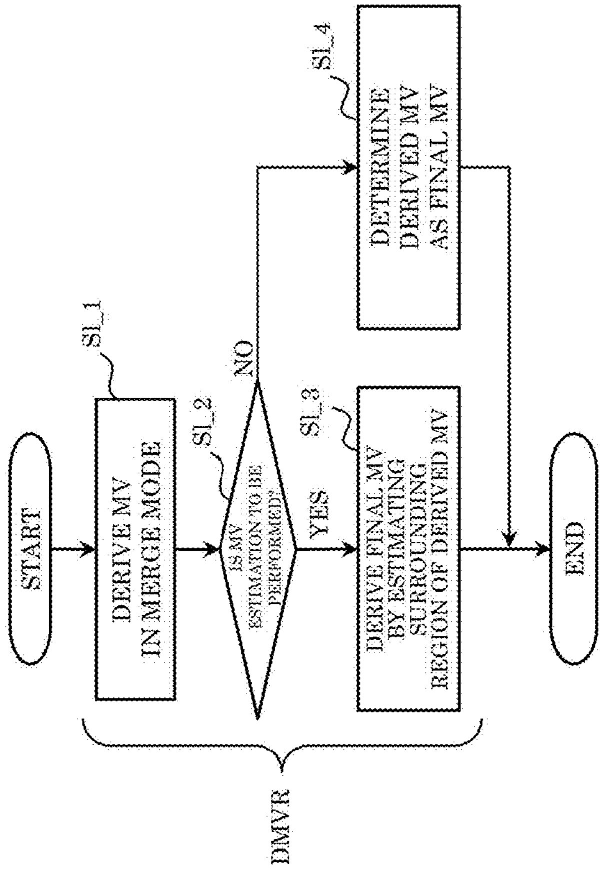
FIG. 55 is a diagram illustrating a relationship between a merge mode and dynamic motion vector refreshing (DMVR)

FIG. 55 is a diagram illustrating a relationship between a merge mode and DMVR.

Inter predictor 126 derives an MV for a current block according to the merge mode (Step Sl_1). Next, inter predictor 126 determines whether to perform estimation of an MV that is motion estimation (Step Sl_2). Here, when determining not to perform motion estimation (No in Step Sl_2), inter predictor 126 determines the MV derived in Step Sl_1 as the final MV for the current block (Step Sl_4). In other words, in this case, the MV for the current block is determined according to the merge mode.

When determining to perform motion estimation in Step Sl_1 (Yes in Step Sl_2), inter predictor 126 derives the final MV for the current block by estimating a surrounding region of the reference picture specified by the MV derived in Step Sl_1 (Step Sl_3). In other words, in this case, the MV for the current block is determined according to the DMVR.

Figure 56:
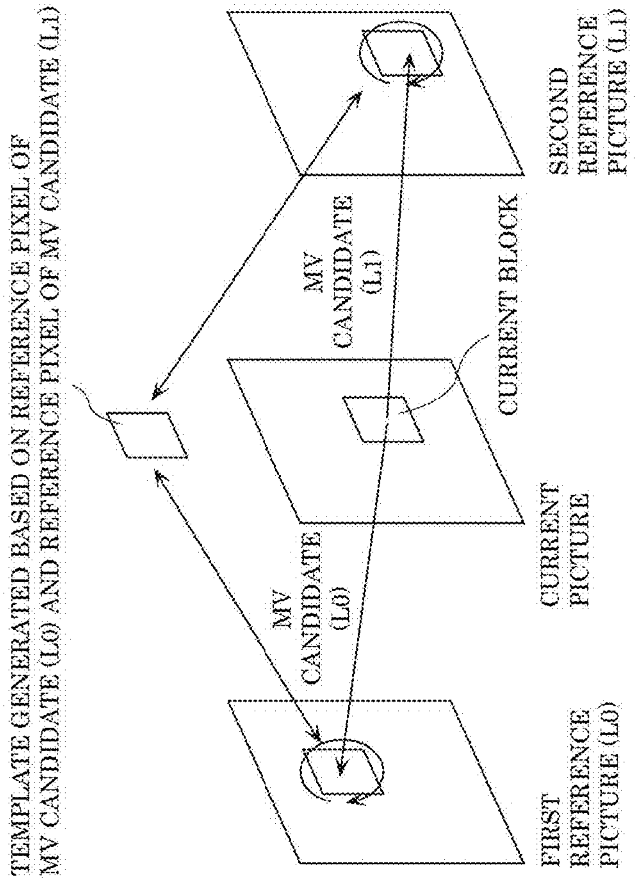
FIG. 56 is a conceptual diagram for illustrating one example of DMVR.

FIG. 56 is a conceptual diagram for illustrating another example of DMVR for determining an MV.

First, in the merge mode for example, MV candidates (L0 and L1) are selected for the current block. A reference pixel is identified from a first reference picture (L0) which is an encoded picture in the L0 list according to the MV candidate (L0). Likewise, a reference pixel is identified from a second reference picture (L1) which is an encoded picture in the L1 list according to the MV candidate (L1). A template is generated by calculating an average of these reference pixels.

Next, each of the surrounding regions of MV candidates of the first reference picture (L0) and the second reference picture (L1) are estimated using the template, and the MV which yields the smallest cost is determined to be the final MV. It is to be noted that the cost may be calculated, for example, using a difference value between each of the pixel values in the template and a corresponding one of the pixel values in the estimation region, the values of MV candidates, etc.

Exactly the same processes described here do not always need to be performed. Any process for enabling derivation of the final MV by estimation in surrounding regions of MV candidates may be used.

Figure 57:
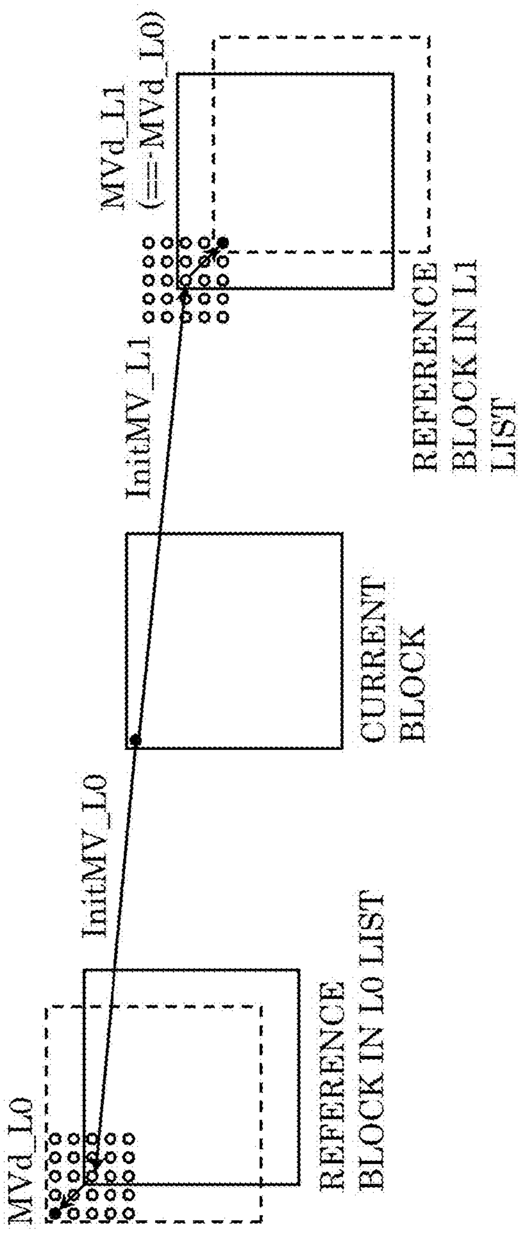
FIG. 57 is a conceptual diagram for illustrating another example of DMVR for determining an MV.

FIG. 57 is a conceptual diagram for illustrating another example of DMVR for determining an MV. Unlike the example of DMVR illustrated in FIG. 56, in the example illustrated in FIG. 57, costs are calculated without generating any template.

First, inter predictor 126 estimates a surrounding region of a reference block included in each of reference pictures in the L0 list and L1 list, based on an initial MV which is an MV candidate obtained from each MV candidate list. For example, as illustrated in FIG. 57, the initial MV corresponding to the reference block in the L0 list is InitMV_L0, and the initial MV corresponding to the reference block in the L1 list is InitMV_L1. In motion estimation, inter predictor 126 firstly sets a search position for the reference picture in the L0 list. Based on the position indicated by the vector difference indicating the search position to be set, specifically, the initial MV (that is, InitMV_L0), the vector difference to the search position is MVd_L0. Inter predictor 126 then determines the estimation position in the reference picture in the L1 list. This search position is indicated by the vector difference to the search position from the position indicated by the initial MV (that is, InitMV_L1). More specifically, inter predictor 126 determines the vector difference as MVd_L1 by mirroring of MVd_L0. In other words, inter predictor 126 determines the position which is symmetrical with respect to the position indicated by the initial MV to be the search position in each reference picture in the L0 list and the L1 list. Inter predictor 126 calculates, for each search position, the total sum of the absolute differences (SADs) between values of pixels at search positions in blocks as a cost, and finds out the search position that yields the smallest cost.

Figure 58A:
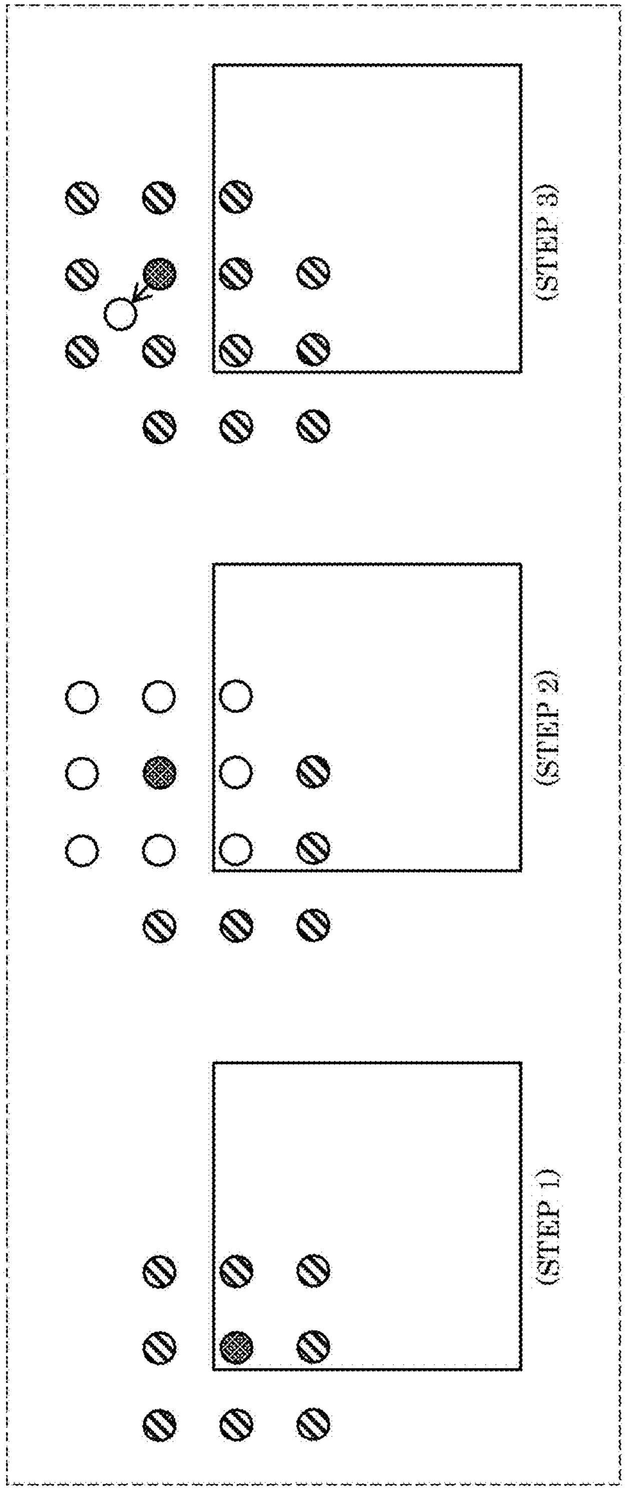
FIG. 58A is a diagram illustrating one example of motion estimation in DMVR.
Figure 58B:
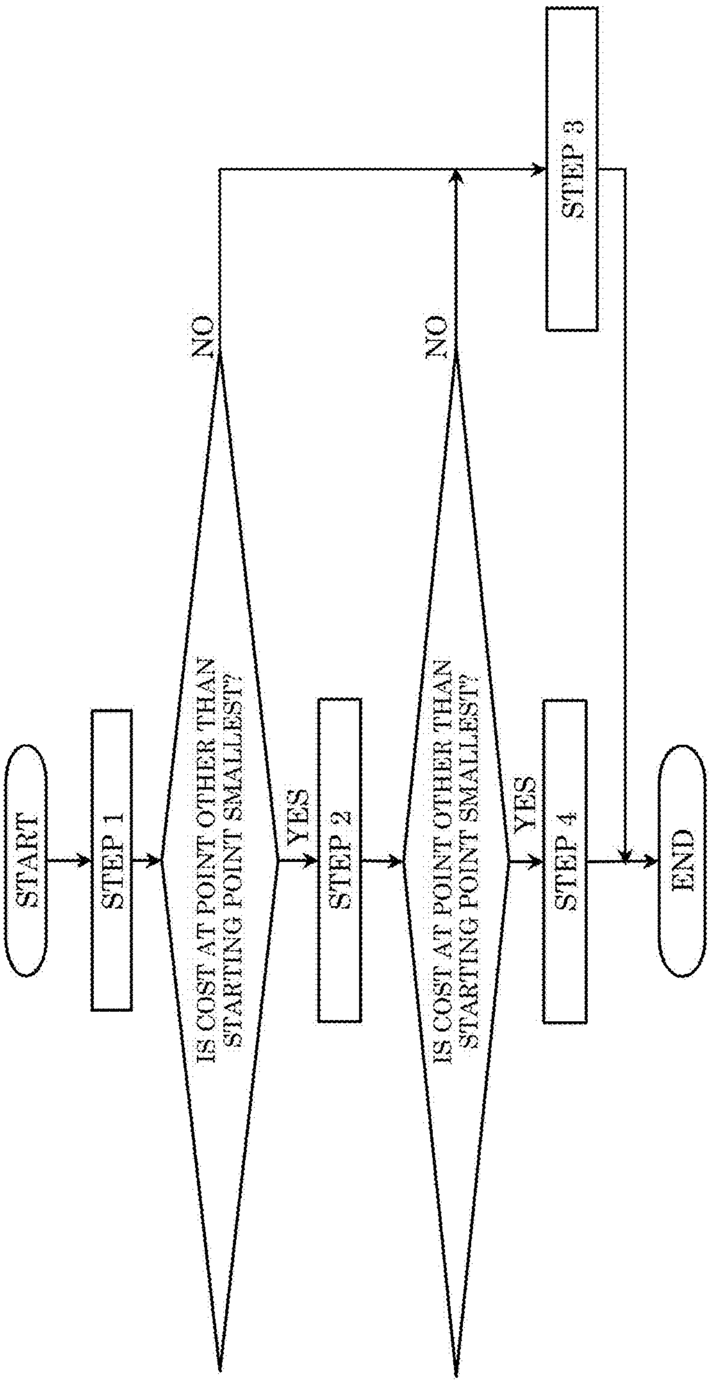
FIG. 58B is a flow chart illustrating one example of motion estimation in DMVR.

FIG. 58A is a diagram illustrating one example of motion estimation in DMVR, and FIG. 58B is a flow chart illustrating one example of the motion estimation.

First, in Step 1, inter predictor 126 calculates the cost between the search position (also referred to as a starting point) indicated by the initial MV and eight surrounding search positions. Inter predictor 126 then determines whether the cost at each of the search positions other than the starting point is the smallest. Here, when determining that the cost at the search position other than the starting point is the smallest, inter predictor 126 changes a target to the search position at which the smallest cost is obtained, and performs the process in Step 2. When the cost at the starting point is the smallest, inter predictor 126 skips the process in Step 2 and performs the process in Step 3.

In Step 2, inter predictor 126 performs the search similar to the process in Step 1, regarding, as a new starting point, the search position after the target change according to the result of the process in Step 1. Inter predictor 126 then determines whether the cost at each of the search positions other than the starting point is the smallest. Here, when determining that the cost at the search position other than the starting point is the smallest, inter predictor 126 performs the process in Step 4. When the cost at the starting point is the smallest, inter predictor 126 performs the process in Step 3.

In Step 4, inter predictor 126 regards the search position at the starting point as the final search position, and determines the difference between the position indicated by the initial MV and the final search position to be a vector difference.

In Step 3, inter predictor 126 determines the pixel position at sub-pixel accuracy at which the smallest cost is obtained, based on the costs at the four points located at upper, lower, left, and right positions with respect to the starting point in Step 1 or Step 2, and regards the pixel position as the final search position. The pixel position at the sub-pixel accuracy is determined by performing weighted addition of each of the four upper, lower, left, and right vectors ((0, 1), (0, −1), (−1, 0), and (1, 0)), using, as a weight, the cost at a corresponding one of the four search positions. Inter predictor 126 then determines the difference between the position indicated by the initial MV and the final search position to be the vector difference.

[Motion Compensation>BIO/OBMC/LIC]

Motion compensation involves a mode for generating a prediction image, and correcting the prediction image. The mode is, for example, BIO, OBMC, and LIC to be described later.

Figure 59:
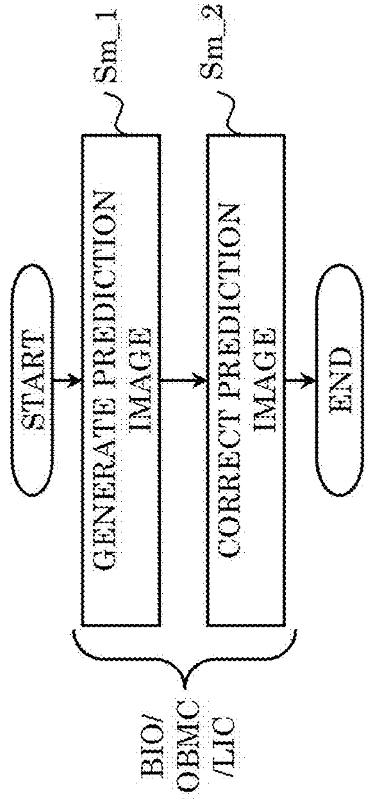
FIG. 59 is a flow chart illustrating one example of generation of a prediction image.

FIG. 59 is a flow chart illustrating one example of generation of a prediction image.

Inter predictor 126 generates a prediction image (Step Sm_1), and corrects the prediction image according to any of the modes described above (Step Sm_2).

Figure 60:
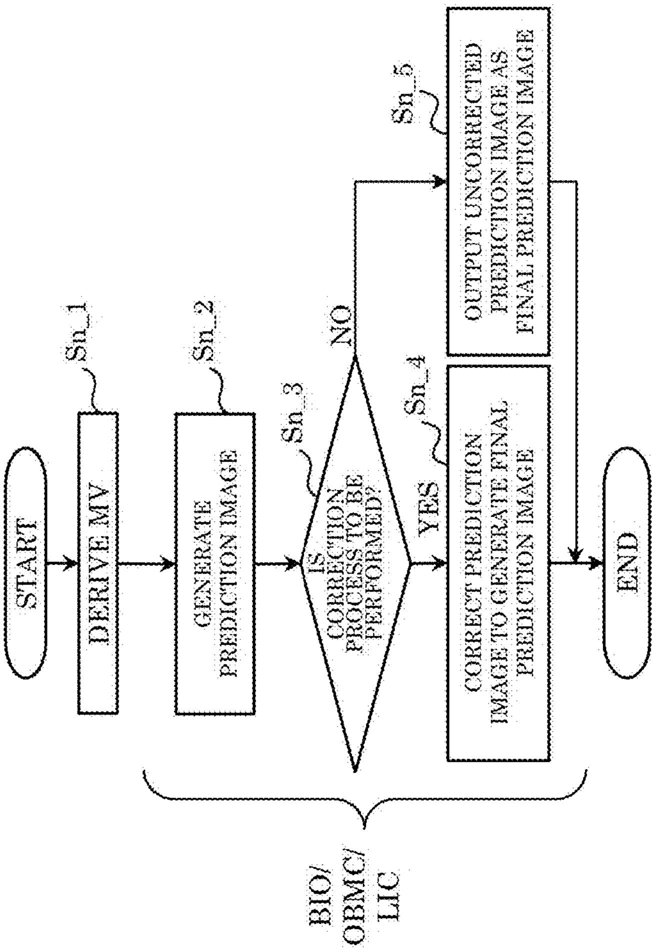
FIG. 60 is a flow chart illustrating another example of generation of a prediction image.

FIG. 60 is a flow chart illustrating another example of generation of a prediction image.

Inter predictor 126 derives an MV of a current block (Step Sn_1). Next, inter predictor 126 generates a prediction image using the MV (Step Sn_2), and determines whether to perform a correction process (Step Sn_3). Here, when determining to perform a correction process (Yes in Step Sn_3), inter predictor 126 generates the final prediction image by correcting the prediction image (Step Sn_4). It is to be noted that, in LIC described later, luminance and chrominance may be corrected in Step Sn_4. When determining not to perform a correction process (No in Step Sn_3), inter predictor 126 outputs the prediction image as the final prediction image without correcting the prediction image (Step Sn_5).

[Motion Compensation>OBMC]

It is to be noted that an inter prediction image may be generated using motion information for a neighboring block in addition to motion information for the current block obtained by motion estimation. More specifically, an inter prediction image may be generated for each sub-block in a current block by performing weighted addition of a prediction image based on the motion information obtained by motion estimation (in a reference picture) and a prediction image based on the motion information of the neighboring block (in the current picture). Such inter prediction (motion compensation) is also referred to as overlapped block motion compensation (OBMC) or an OBMC mode.

In OBMC mode, information indicating a sub-block size for OBMC (referred to as, for example, an OBMC block size) may be signaled at the sequence level. Moreover, information indicating whether to apply the OBMC mode (referred to as, for example, an OBMC flag) may be signaled at the CU level. It is to be noted that the signaling of such information does not necessarily need to be performed at the sequence level and CU level, and may be performed at another level (for example, at the picture level, slice level, brick level, CTU level, or sub-block level).

Figure 61:
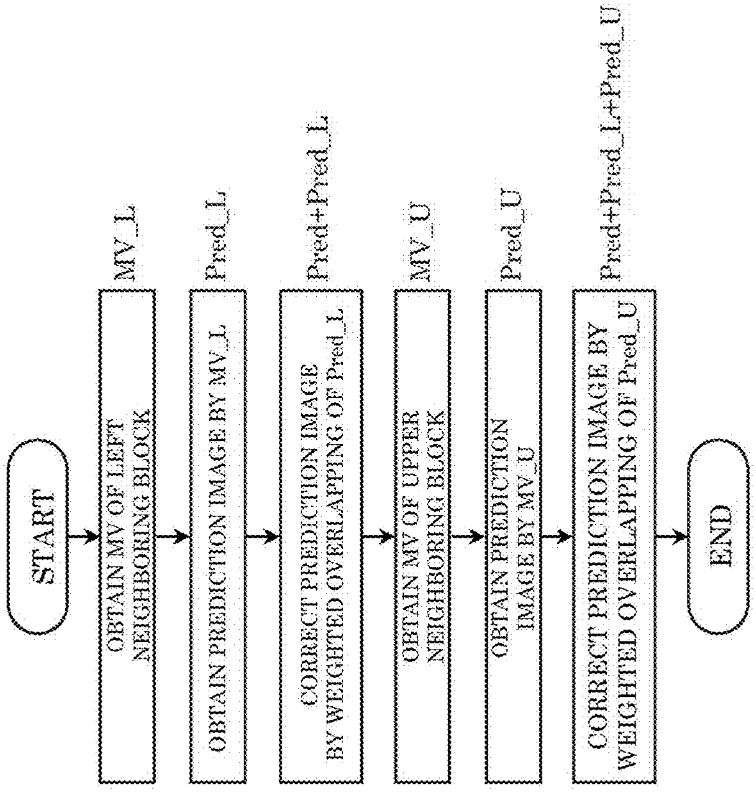
FIG. 61 is a flow chart illustrating one example of a correction process of a prediction image by overlapped block motion compensation (OBMC)
Figure 62:
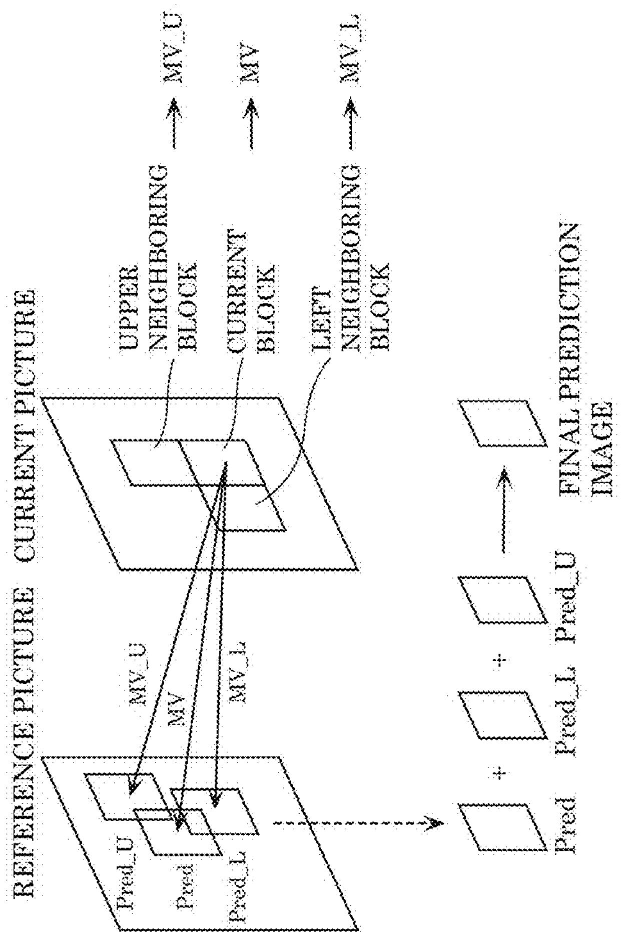
FIG. 62 is a conceptual diagram for illustrating one example of a prediction image correction process by OBMC.

The OBMC mode will be described in further detail. FIGS. 61 and 62 are a flow chart and a conceptual diagram for illustrating an outline of a prediction image correction process performed by OBMC.

First, as illustrated in FIG. 62, a prediction image (Pred) by normal motion compensation is obtained using an MV assigned to a current block. In FIG. 62, the arrow "MV" points a reference picture, and indicates what the current block of the current picture refers to in order to obtain the prediction image.

Next, a prediction image (Pred_L) is obtained by applying a motion vector (MV_L) which has been already derived for the encoded block neighboring to the left of the current block to the current block (re-using the motion vector for the current block). The motion vector (MV_L) is indicated by an arrow "MV_L" indicating a reference picture from a current block. A first correction of a prediction image is performed by overlapping two prediction images Pred and Pred_L. This provides an effect of blending the boundary between neighboring blocks.

Likewise, a prediction image (Pred_U) is obtained by applying an MV (MV_U) which has been already derived for the encoded block neighboring above the current block to the current block (re-using the MV for the current block). The MV (MV_U) is indicated by an arrow "MV_U" indicating a reference picture from a current block. A second correction of a prediction image is performed by overlapping the prediction image Pred_U to the prediction images (for example, Pred and Pred_L) on which the first correction has been performed. This provides an effect of blending the boundary between neighboring blocks. The prediction image obtained by the second correction is the one in which the boundary between the neighboring blocks has been blended (smoothed), and thus is the final prediction image of the current block.

Although the above example is a two-path correction method using left and upper neighboring blocks, it is to be noted that the correction method may be three- or more-path correction method using also the right neighboring block and/or the lower neighboring block.

It is to be noted that the region in which such overlapping is performed may be only part of a region near a block boundary instead of the pixel region of the entire block.

It is to be noted that the prediction image correction process according to OBMC for obtaining one prediction image Pred from one reference picture by overlapping additional prediction images Pred_L and Pred_U has been described above. However, when a prediction image is corrected based on a plurality of reference images, a similar process may be applied to each of the plurality of reference pictures. In such a case, after corrected prediction images are obtained from the respective reference pictures by performing OBMC image correction based on the plurality of reference pictures, the obtained corrected prediction images are further overlapped to obtain the final prediction image.

It is to be noted that, in OBMC, a current block unit may be a PU or a sub-block unit obtained by further splitting the PU.

One example of a method for determining whether to apply OBMC is a method for using an obmc_flag which is a signal indicating whether to apply OBMC. As one specific example, encoder 100 may determine whether the current block belongs to a region having complicated motion. Encoder 100 sets the obmc_flag to a value of "1" when the block belongs to a region having complicated motion and applies OBMC when encoding, and sets the obmc_flag to a value of "0" when the block does not belong to a region having complicated motion and encodes the block without applying OBMC. Decoder 200 switches between application and non-application of OBMC by decoding the obmc_flag written in a stream.

[Motion Compensation>BIO]

Next, an MV derivation method is described. First, a mode for deriving an MV based on a model assuming uniform linear motion is described. This mode is also referred to as a bi-directional optical flow (BIO) mode. In addition, this bi-directional optical flow may be written as BDOF instead of BIO.

Figure 63:
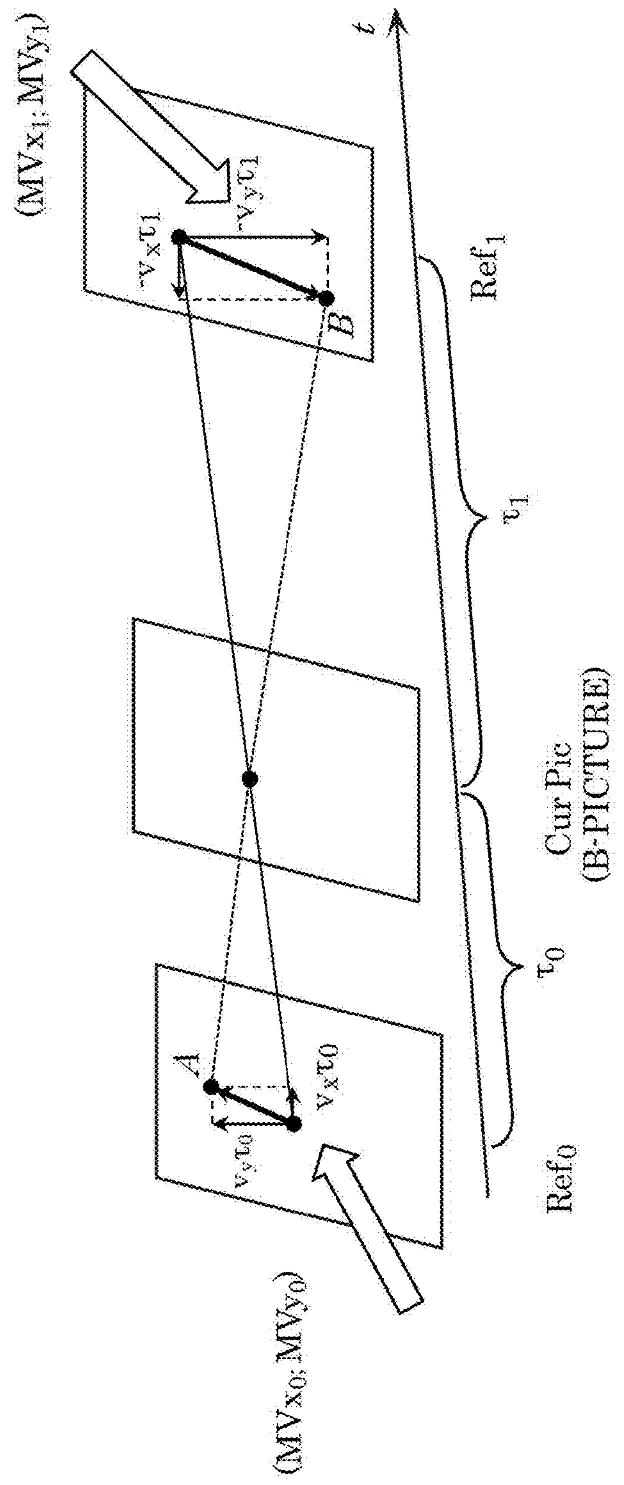
FIG. 63 is a diagram for illustrating a model assuming uniform linear motion.

FIG. 63 is a diagram for illustrating a model assuming uniform linear motion. In FIG. 63, (vx, vy) indicates a velocity vector, and τ0 and τ1 indicate temporal distances between a current picture (Cur Pic) and two reference pictures ($Ref_0$, $Ref_1$). ($MVx_0$, $MVy_0$) indicates an MV corresponding to reference picture $Ref_0$, and ($MVx_1$, $MVy_1$) indicates an MV corresponding to reference picture $Ref_1$.

Here, under the assumption of uniform linear motion exhibited by a velocity vector (vx, vy), ($MVx_0$, $MVy_0$) and ($MVx_1$, $MVy_1$) are represented as (vxτ0, vyτ0) and (−vxτ1, −vyτ1), respectively, and the following optical flow equation (2) is given.

[MATH. 3]

$$\partial I^{(k)}/\partial t+v_x\,\partial I^{(k)}/\partial x+v_y\partial I^{(k)}/\partial y=0 \quad (2)$$

Here, I(k) denotes a luma value from reference image k (k=0, 1) after motion compensation. This optical flow equation shows that the sum of (i) the time derivative of the luma value, (ii) the product of the horizontal velocity and the horizontal component of the spatial gradient of a reference image, and (iii) the product of the vertical velocity and the vertical component of the spatial gradient of a reference image is equal to zero. A motion vector of each block obtained from, for example, an MV candidate list may be corrected in units of a pixel, based on a combination of the optical flow equation and Hermite interpolation.

It is to be noted that a motion vector may be derived on the decoder 200 side using a method other than deriving a motion vector based on a model assuming uniform linear motion. For example, a motion vector may be derived in units of a sub-block based on MVs of a plurality of neighboring blocks.

Figure 65:
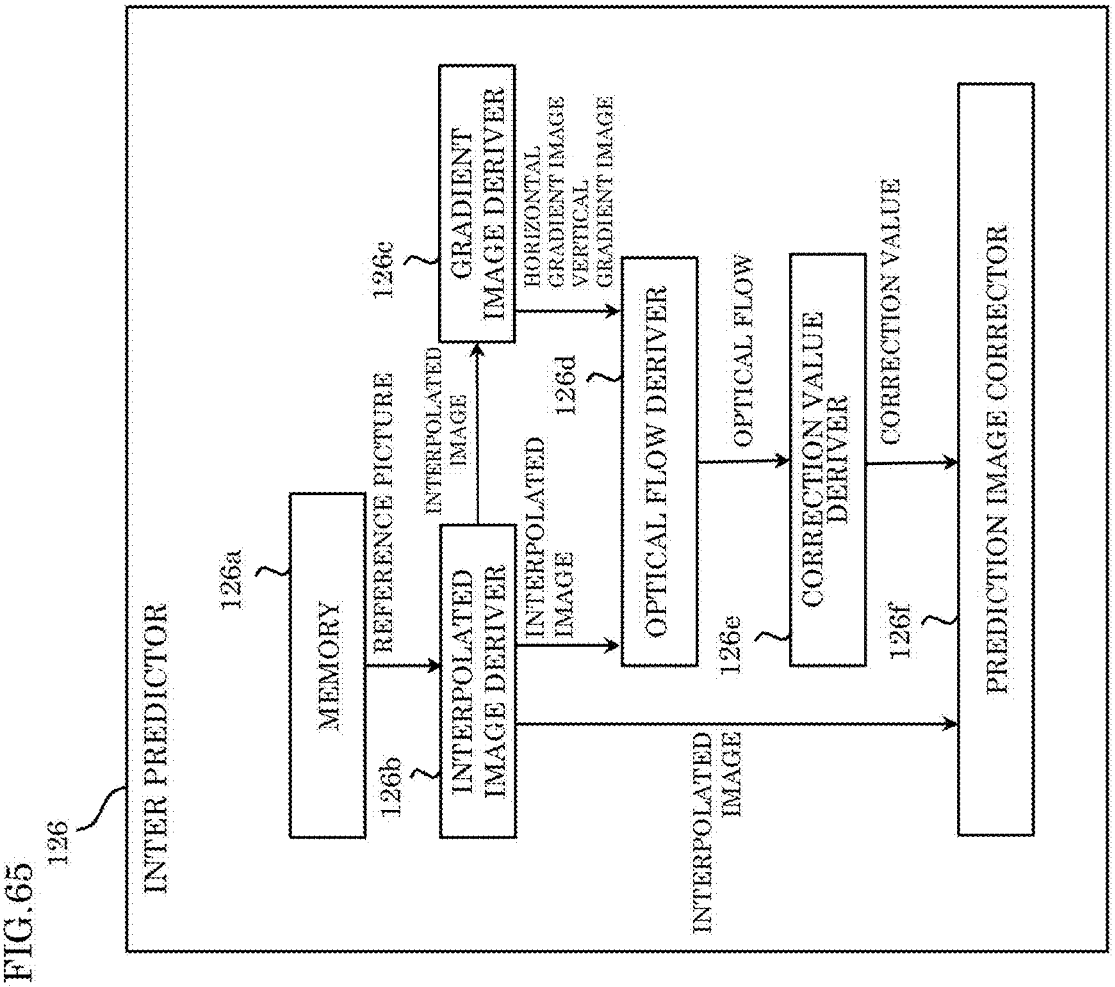
FIG. 65 is a diagram illustrating one example of a configuration of an inter predictor which performs inter prediction according to BIO.

FIG. 64 is a flow chart illustrating one example of inter prediction according to BIO. FIG. 65 is a diagram illustrating one example of a configuration of inter predictor 126 which performs inter prediction according to BIO.

As illustrated in FIG. 65, inter predictor 126 includes, for example, memory 126*a*, interpolated image deriver 126*b*, gradient image deriver 126*c*, optical flow deriver 126*d*, correction value deriver 126*e*, and prediction image corrector 126*f*. It is to be noted that memory 126*a* may be frame memory 122.

Inter predictor 126 derives two motion vectors (M0, M1), using two reference pictures ($Ref_0$, $Ref_1$) different from the picture (Cur Pic) including a current block. Inter predictor 126 then derives a prediction image for the current block using the two motion vectors (M0, M1) (Step Sy_1). It is to be noted that motion vector M0 is motion vector ($MVx_0$, $MVy_0$) corresponding to reference picture $Ref_0$, and motion vector M1 is motion vector ($MVx_1$, $MVy_1$) corresponding to reference picture $Ref_1$.

Next, interpolated image deriver 126*b* derives interpolated image $I^0$ for the current block, using motion vector M0 and reference picture L0 by referring to memory 126*a*. Next, interpolated image deriver 126*b* derives interpolated image 11 for the current block, using motion vector M1 and reference picture L1 by referring to memory 126*a* (Step Sy_2). Here, interpolated image $I^0$ is an image included in reference picture $Ref_0$ and to be derived for the current block, and interpolated image $I^1$ is an image included in reference picture $Ref_1$ and to be derived for the current block. Each of interpolated image $I^0$ and interpolated image $I^1$ may be the same in size as the current block. Alternatively, each of interpolated image $I^0$ and interpolated image $I^1$ may be an image larger than the current block. Furthermore, interpolated image $I^0$ and interpolated image $I^1$ may include a prediction image obtained by using motion vectors (M0, M1) and reference pictures (L0, L1) and applying a motion compensation filter.

In addition, gradient image deriver 126*c* derives gradient images ($Ix^0$, $Ix^1$, $Iy^0$, $Iy^1$) of the current block, from interpolated image $I^0$ and interpolated image $I^1$. It is to be noted that the gradient images in the horizontal direction are ($Ix^0$, $Ix^1$), and the gradient images in the vertical direction are ($Iy^0$, $Iy^1$). Gradient image deriver 126*c* may derive each gradient image by, for example, applying a gradient filter to the interpolated images. It is only necessary that a gradient image indicate the amount of spatial change in pixel value along the horizontal direction or the vertical direction.

Next, optical flow deriver 126*d* derives, for each sub-block of the current block, an optical flow (vx, vy) which is a velocity vector, using the interpolated images ($I^0$, $I^1$) and the gradient images ($Ix^0$, $Ix^1$, $Iy^0$, $Iy^1$). The optical flow indicates coefficients for correcting the amount of spatial pixel movement, and may be referred to as a local motion estimation value, a corrected motion vector, or a corrected weighting vector. As one example, a sub-block may be 4×4 pixel sub-CU. It is to be noted that the optical flow derivation may be performed for each pixel unit, or the like, instead of being performed for each sub-block.

Next, inter predictor 126 corrects a prediction image for the current block using the optical flow (vx, vy). For example, correction value deriver 126*e* derives a correction value for the value of a pixel included in a current block, using the optical flow (vx, vy) (Step Sy_5). Prediction image corrector 126*f* may then correct the prediction image for the current block using the correction value (Step Sy_6). It is to be noted that the correction value may be derived in units of a pixel, or may be derived in units of a plurality of pixels or in units of a sub-block.

It is to be noted that the BIO process flow is not limited to the process disclosed in FIG. 64. Only part of the processes disclosed in FIG. 64 may be performed, or a different process may be added or used as a replacement, or the processes may be executed in a different processing order.

[Motion Compensation>LIC]

Next, one example of a mode for generating a prediction image (prediction) using a local illumination compensation (LIC) is described.

Figure 66A:
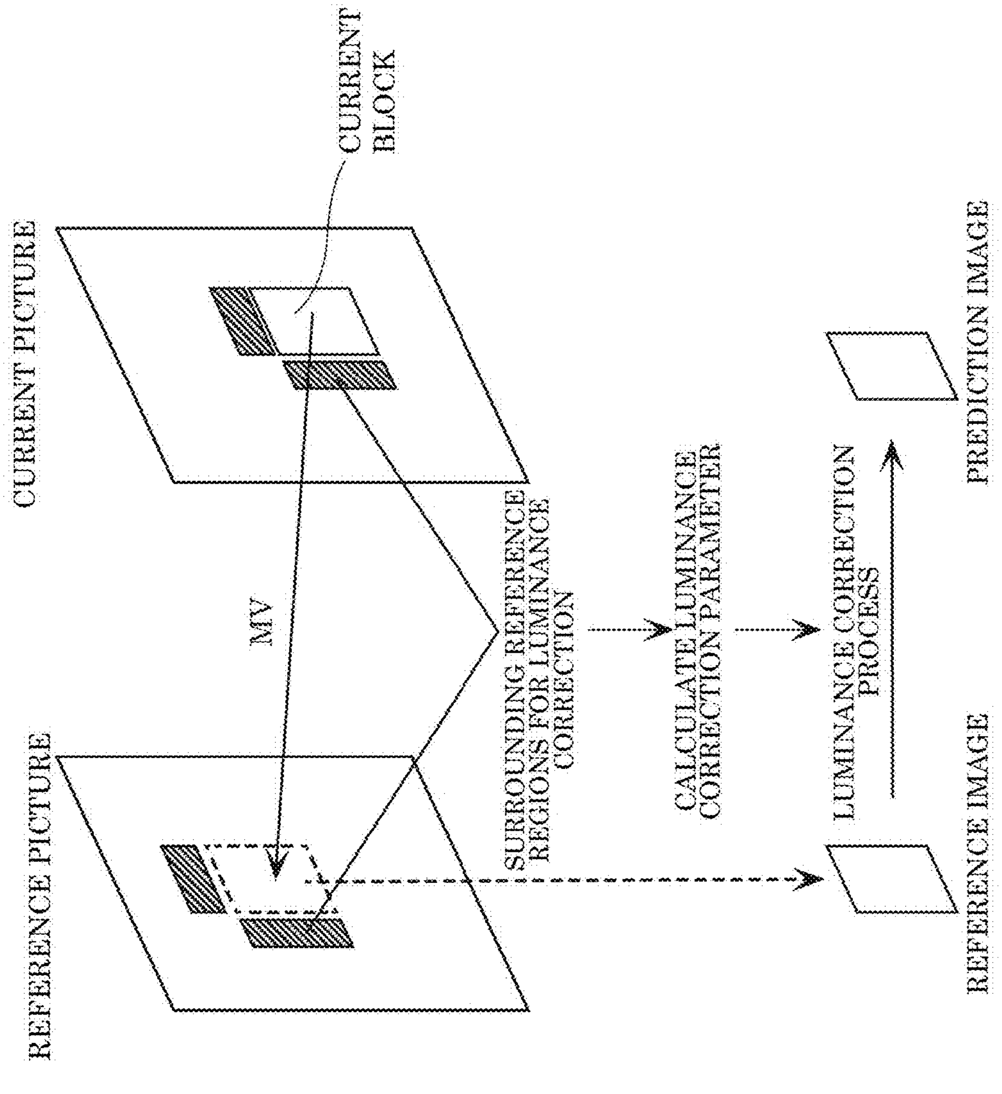
FIG. 66A is a diagram for illustrating one example of a prediction image generation method using a luminance correction process by local illumination compensation (LIC)

FIG. 66A is a diagram for illustrating one example of a prediction image generation method using a luminance correction process performed by LIC. FIG. 66B is a flow chart illustrating one example of a prediction image generation method using the LIC.

First, inter predictor 126 derives an MV from an encoded reference picture, and obtains a reference image corresponding to the current block (Step Sz_1).

Next, inter predictor 126 extracts, for the current block, information indicating how the luma value has changed between the current block and the reference picture (Step Sz_2). This extraction is performed based on the luma pixel values of the encoded left neighboring reference region (surrounding reference region) and the encoded upper neighboring reference region (surrounding reference region) in the current picture, and the luma pixel values at the corresponding positions in the reference picture specified by the derived MVs. Inter predictor 126 calculates a luminance correction parameter, using the information indicating how the luma value has changed (Step Sz_3).

Inter predictor 126 generates a prediction image for the current block by performing a luminance correction process in which the luminance correction parameter is applied to the reference image in the reference picture specified by the MV (Step Sz_4). In other words, the prediction image which is the reference image in the reference picture specified by the MV is subjected to the correction based on the luminance correction parameter. In this correction, luminance may be corrected, or chrominance may be corrected. In other words, a chrominance correction parameter may be calculated using information indicating how chrominance has changed, and a chrominance correction process may be performed.

It is to be noted that the shape of the surrounding reference region illustrated in FIG. 66A is one example; another shape may be used.

Moreover, although the process in which a prediction image is generated from a single reference picture has been described here, cases in which a prediction image is generated from a plurality of reference pictures can be described in the same manner. The prediction image may be generated after performing a luminance correction process of the reference images obtained from the reference pictures in the same manner as described above.

One example of a method for determining whether to apply LIC is a method for using a lic_flag which is a signal indicating whether to apply the LIC. As one specific example, encoder 100 determines whether the current block belongs to a region having a luminance change. Encoder 100 sets the lic_flag to a value of "1" when the block belongs to a region having a luminance change and applies LIC when encoding, and sets the lic_flag to a value of "0" when the block does not belong to a region having a luminance change and performs encoding without applying LIC. Decoder 200 may decode the lic_flag written in the stream and decode the current block by switching between application and non-application of LIC in accordance with the flag value.

One example of a different method of determining whether to apply a LIC process is a determining method in accordance with whether a LIC process has been applied to a surrounding block. As one specific example, when a current block has been processed in merge mode, inter predictor 126 determines whether an encoded surrounding block selected in MV derivation in merge mode has been encoded using LIC. Inter predictor 126 performs encoding by switching between application and non-application of LIC according to the result. It is to be noted that, also in this example, the same processes are applied to processes at the decoder 200 side.

The luminance correction (LIC) process has been described with reference to FIGS. 66A and 66B, and is further described below.

First, inter predictor 126 derives an MV for obtaining a reference image corresponding to a current block from a reference picture which is an encoded picture.

Next, inter predictor 126 extracts information indicating how the luma value of the reference picture has been changed to the luma value of the current picture, using the luma pixel values of encoded surrounding reference regions which neighbor to the left of and above the current block and the luma pixel values in the corresponding positions in the reference pictures specified by MVs, and calculates a luminance correction parameter. For example, it is assumed that the luma pixel value of a given pixel in the surrounding reference region in the current picture is p0, and that the luma pixel value of the pixel corresponding to the given pixel in the surrounding reference region in the reference picture is p1. Inter predictor 126 calculates coefficients A and B for optimizing A×p1+B=p0 as the luminance correction parameter for a plurality of pixels in the surrounding reference region.

Next, inter predictor 126 performs a luminance correction process using the luminance correction parameter for the reference image in the reference picture specified by the MV, to generate a prediction image for the current block. For example, it is assumed that the luma pixel value in the reference image is p2, and that the luminance-corrected luma pixel value of the prediction image is p3. Inter predictor 126 generates the prediction image after being subjected to the luminance correction process by calculating A×p2+B=p3 for each of the pixels in the reference image.

It is to be noted that part of the surrounding reference regions illustrated in FIG. 66A may be used. For example, a region having a determined number of pixels extracted from each of upper neighboring pixels and left neighboring pixels may be used as a surrounding reference region. In addition, the surrounding reference region is not limited to a region which neighbors the current block, and may be a region which does not neighbor the current block. In the example illustrated in FIG. 66A, the surrounding reference region in the reference picture may be a region specified by another MV in a current picture, from a surrounding reference region in the current picture. For example, the other MV may be an MV in a surrounding reference region in the current picture.

Although operations performed by encoder 100 have been described here, it is to be noted that decoder 200 performs similar operations.

It is to be noted that LIC may be applied not only to luma but also to chroma. At this time, a correction parameter may be derived individually for each of Y, Cb, and Cr, or a common correction parameter may be used for any of Y, Cb, and Cr.

In addition, the LIC process may be applied in units of a sub-block. For example, a correction parameter may be derived using a surrounding reference region in a current sub-block and a surrounding reference region in a reference sub-block in a reference picture specified by an MV of the current sub-block.

[Prediction Controller]

Prediction controller 128 selects one of an intra prediction image (an image or a signal output from intra predictor 124) and an inter prediction image (an image or a signal output from inter predictor 126), and outputs the selected prediction image to subtractor 104 and adder 116.

[Prediction Parameter Generator]

Prediction parameter generator 130 may output information related to intra prediction, inter prediction, selection of a prediction image in prediction controller 128, etc. as a prediction parameter to entropy encoder 110. Entropy encoder 110 may generate a stream, based on the prediction parameter which is input from prediction parameter generator 130 and quantized coefficients which are input from quantizer 108. The prediction parameter may be used in decoder 200. Decoder 200 may receive and decode the stream, and perform the same processes as the prediction processes performed by intra predictor 124, inter predictor 126, and prediction controller 128. The prediction parameter may include (i) a selection prediction signal (for example, an MV, a prediction type, or a prediction mode used by intra predictor 124 or inter predictor 126), or (ii) an optional index, a flag, or a value which is based on a prediction process performed in each of intra predictor 124, inter predictor 126, and prediction controller 128, or which indicates the prediction process.

[Decoder]

Next, decoder 200 capable of decoding a stream output from encoder 100 described above is described. FIG. 67 is a block diagram illustrating a configuration of decoder 200 according to this embodiment. Decoder 200 is an apparatus which decodes a stream that is an encoded image in units of a block.

As illustrated in FIG. 67, decoder 200 includes entropy decoder 202, inverse quantizer 204, inverse transformer 206, adder 208, block memory 210, loop filter 212, frame memory 214, intra predictor 216, inter predictor 218, prediction controller 220, prediction parameter generator 222, and splitting determiner 224. It is to be noted that intra predictor 216 and inter predictor 218 are configured as part of a prediction executor.

[Mounting Example of Decoder]

Figure 68:
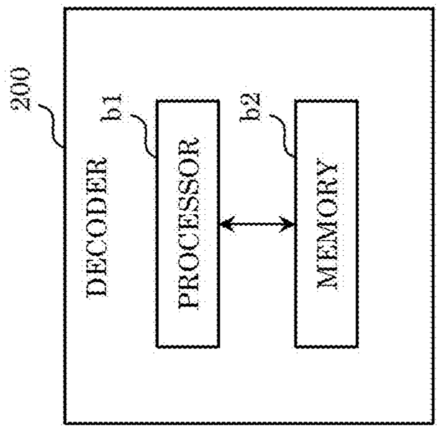
FIG. 68 is a block diagram illustrating a mounting example of a decoder.

FIG. 68 is a block diagram illustrating a mounting example of decoder 200. Decoder 200 includes processor b1 and memory b2. For example, the plurality of constituent elements of decoder 200 illustrated in FIG. 67 are mounted on processor b1 and memory b2 illustrated in FIG. 68.

Processor b1 is circuitry which performs information processing and is accessible to memory b2. For example, processor b1 is a dedicated or general electronic circuit which decodes a stream. Processor b1 may be a processor such as a CPU. In addition, processor b1 may be an aggregate of a plurality of electronic circuits. In addition, for example, processor b1 may take the roles of two or more constituent elements other than a constituent element for storing information out of the plurality of constituent elements of decoder 200 illustrated in FIG. 67, etc.

Memory b2 is dedicated or general memory for storing information that is used by processor b1 to decode a stream. Memory b2 may be electronic circuitry, and may be connected to processor b1. In addition, memory b2 may be included in processor b1. In addition, memory b2 may be an aggregate of a plurality of electronic circuits. In addition, memory b2 may be a magnetic disc, an optical disc, or the like, or may be represented as a storage, a medium, or the like. In addition, memory b2 may be non-volatile memory, or volatile memory.

For example, memory b2 may store an image or a stream. In addition, memory b2 may store a program for causing processor b1 to decode a stream.

In addition, for example, memory b2 may take the roles of two or more constituent elements for storing information out of the plurality of constituent elements of decoder 200 illustrated in FIG. 67, etc. More specifically, memory b2 may take the roles of block memory 210 and frame memory 214 illustrated in FIG. 67. More specifically, memory b2 may store a reconstructed image (specifically, a reconstructed block, a reconstructed picture, or the like).

It is to be noted that, in decoder 200, not all of the plurality of constituent elements illustrated in FIG. 67, etc. may be implemented, and not all the processes described above may be performed. Part of the constituent elements indicated in FIG. 67, etc. may be included in another device, or part of the processes described above may be performed by another device.

Hereinafter, an overall flow of the processes performed by decoder 200 is described, and then each of the constituent elements included in decoder 200 is described. It is to be noted that, some of the constituent elements included in decoder 200 perform the same processes as performed by some of the constituent elements included in encoder 100, and thus the same processes are not repeatedly described in detail. For example, inverse quantizer 204, inverse transformer 206, adder 208, block memory 210, frame memory 214, intra predictor 216, inter predictor 218, prediction controller 220, and loop filter 212 included in decoder 200 perform similar processes as performed by inverse quantizer 112, inverse transformer 114, adder 116, block memory 118, frame memory 122, intra predictor 124, inter predictor 126, prediction controller 128, and loop filter 120 included in encoder 100, respectively.

[Overall Flow of Decoding Process]

Figure 69:
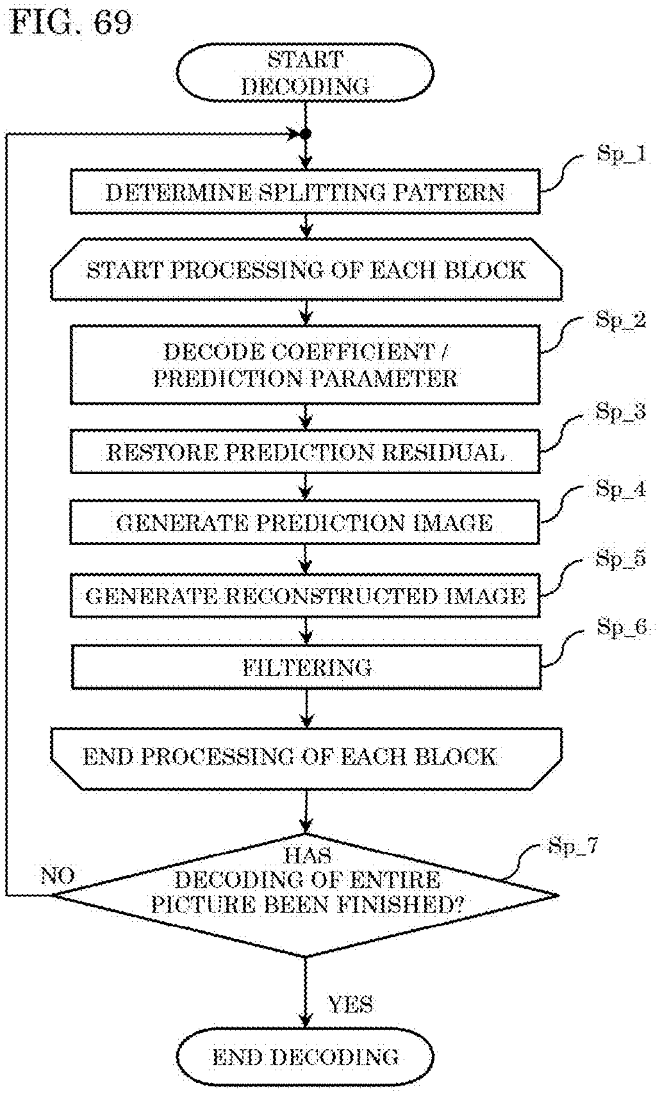
FIG. 69 is a flow chart illustrating one example of an overall decoding process performed by the decoder.

FIG. 69 is a flow chart illustrating one example of an overall decoding process performed by decoder 200.

First, splitting determiner 224 in decoder 200 determines a splitting pattern of each of a plurality of fixed-size blocks (128×128 pixels) included in a picture, based on a parameter which is input from entropy decoder 202 (Step Sp_1). This splitting pattern is a splitting pattern selected by encoder 100. Decoder 200 then performs processes of Steps Sp_2 to Sp_6 for each of a plurality of blocks of the splitting pattern.

Entropy decoder 202 decodes (specifically, entropy decodes) encoded quantized coefficients and a prediction parameter of a current block (Step Sp_2).

Next, inverse quantizer 204 performs inverse quantization of the plurality of quantized coefficients and inverse transformer 206 performs inverse transform of the result, to restore prediction residuals of the current block (Step Sp_3).

Next, the prediction executor including all or part of intra predictor 216, inter predictor 218, and prediction controller 220 generates a prediction image of the current block (Step Sp_4).

Next, adder 208 adds the prediction image to a prediction residual to generate a reconstructed image (also referred to as a decoded image block) of the current block (Step Sp_5).

When the reconstructed image is generated, loop filter 212 performs filtering of the reconstructed image (Step Sp_6).

Decoder 200 then determines whether decoding of the entire picture has been finished (Step Sp_7). When determining that the decoding has not yet been finished (No in Step Sp_7), decoder 200 repeatedly executes the processes starting with Step Sp_1.

It is to be noted that the processes of these Steps Sp_1 to Sp_7 may be performed sequentially by decoder 200, or two or more of the processes may be performed in parallel. The processing order of the two or more of the processes may be modified.

[Splitting Determiner]

Figure 70:
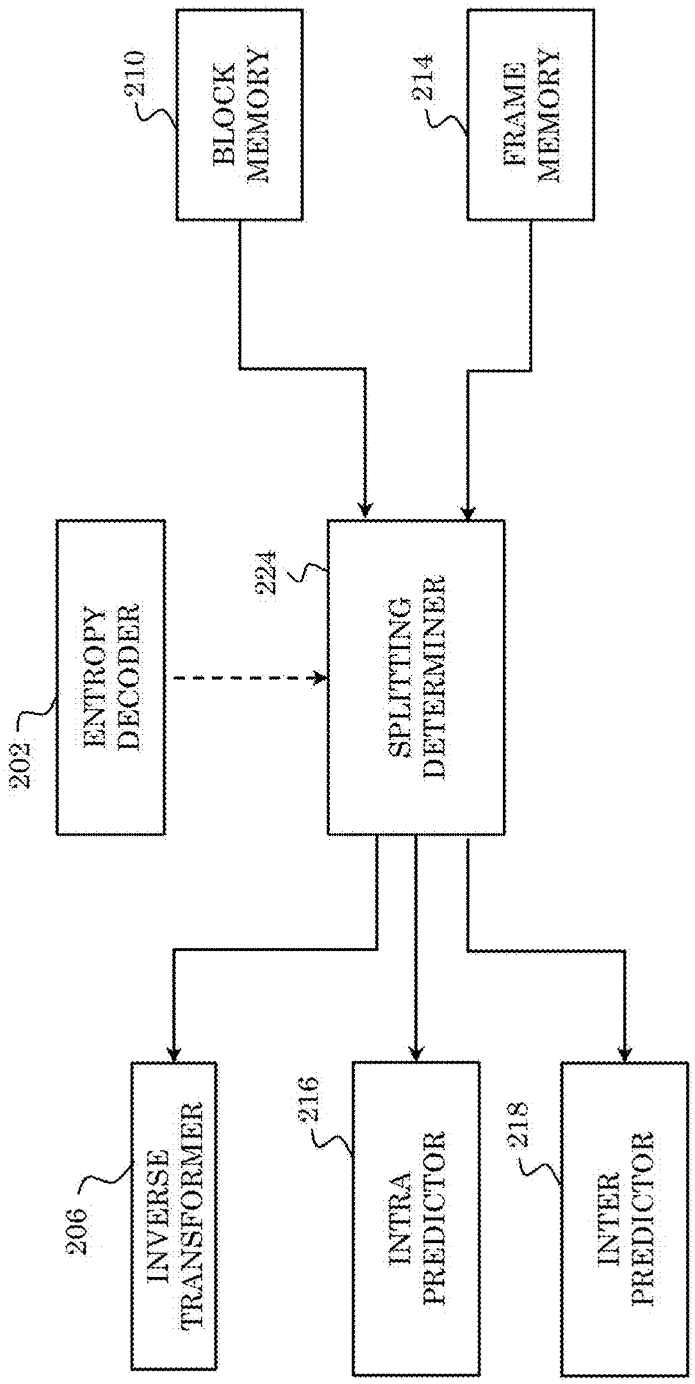
FIG. 70 is a diagram illustrating a relationship between a splitting determiner and other constituent elements.

FIG. 70 is a diagram illustrating a relationship between splitting determiner 224 and other constituent elements. Splitting determiner 224 may perform the following processes as examples.

For example, splitting determiner 224 collects block information from block memory 210 or frame memory 214, and furthermore obtains a parameter from entropy decoder 202. Splitting determiner 224 may then determine the splitting pattern of a fixed-size block, based on the block information and the parameter. Splitting determiner 224 may then output information indicating the determined splitting pattern to inverse transformer 206, intra predictor 216, and inter predictor 218. Inverse transformer 206 may perform inverse transform of transform coefficients, based on the splitting pattern indicated by the information from splitting determiner 224. Intra predictor 216 and inter predictor 218 may generate a prediction image, based on the splitting pattern indicated by the information from splitting determiner 224.

[Entropy Decoder]

Figure 71:
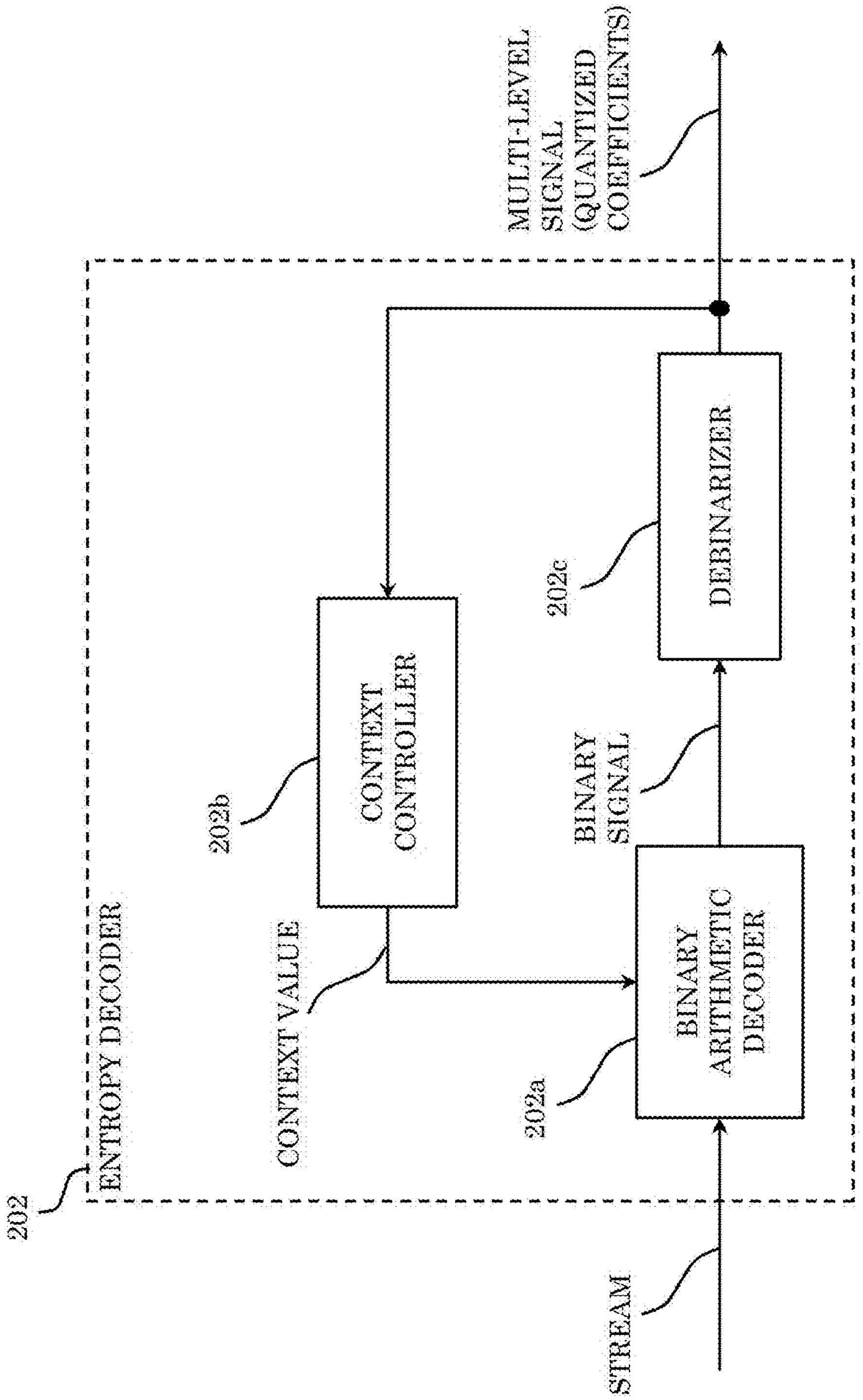
FIG. 71 is a block diagram illustrating one example of a configuration of an entropy decoder.

FIG. 71 is a block diagram illustrating one example of a configuration of entropy decoder 202.

Entropy decoder 202 generates quantized coefficients, a prediction parameter, and a parameter related to a splitting pattern, by entropy decoding the stream. For example, CABAC is used in the entropy decoding. More specifically, entropy decoder 202 includes, for example, binary arithmetic decoder 202*a*, context controller 202*b*, and debinarizer 202*c*. Binary arithmetic decoder 202*a* arithmetically decodes the stream using a context value derived by context controller 202*b* to a binary signal. Context controller 202*b* derives a context value according to a feature or a surrounding state of a syntax element, that is, an occurrence probability of a binary signal, in the same manner as performed by context controller 110*b* of encoder 100. Debinarizer 202*c* performs debinarization for transforming the binary signal output from binary arithmetic decoder 202*a* to a multi-level signal indicating quantized coefficients as described above. This binarization is performed according to the binarization method described above.

With this, entropy decoder 202 outputs quantized coefficients of each block to inverse quantizer 204. Entropy decoder 202 may output a prediction parameter included in a stream (see FIG. 1) to intra predictor 216, inter predictor 218, and prediction controller 220. Intra predictor 216, inter predictor 218, and prediction controller 220 are capable of executing the same prediction processes as those performed by intra predictor 124, inter predictor 126, and prediction controller 128 at the encoder 100 side.

[Entropy Decoder]

Figure 72:
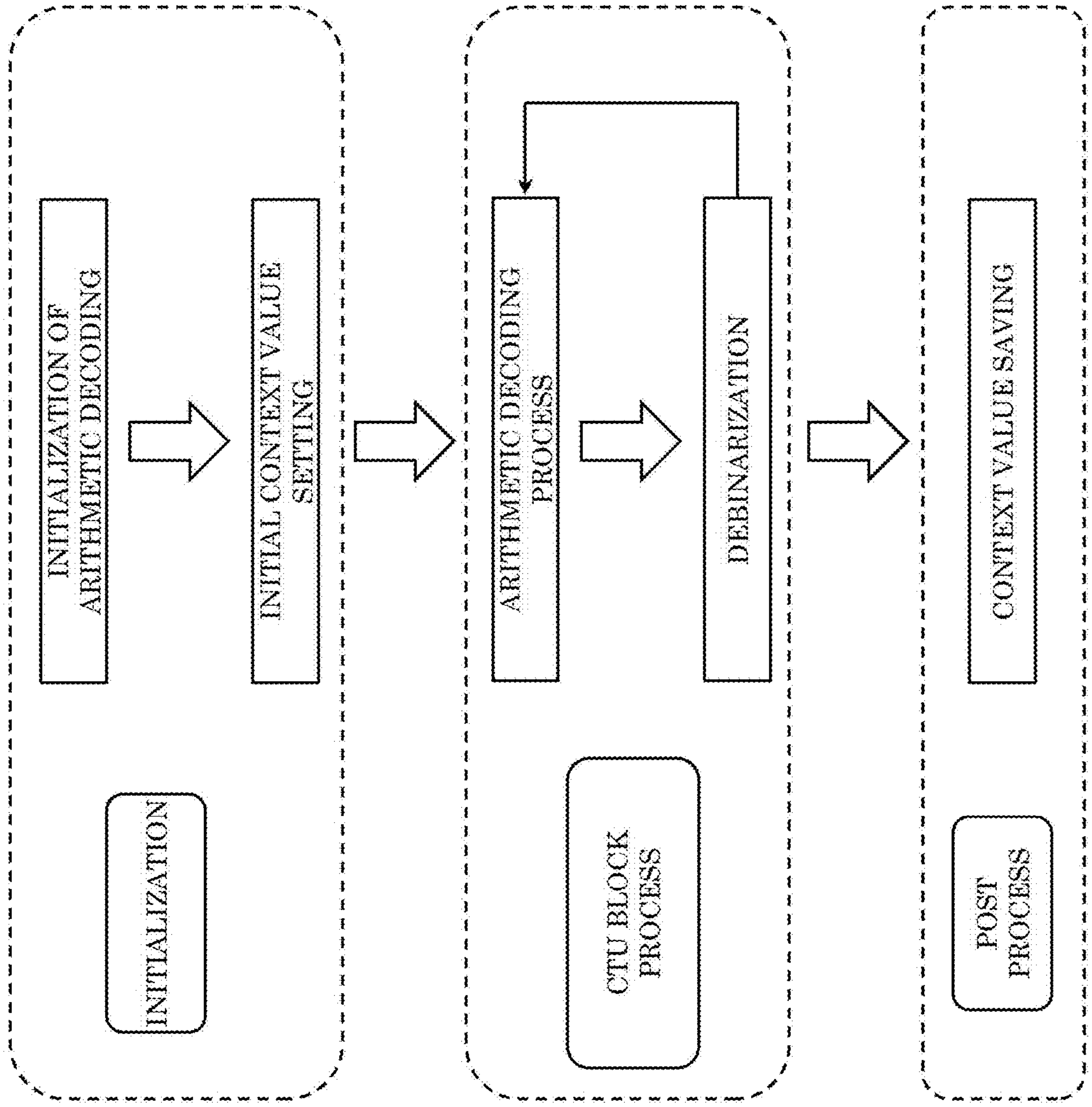
FIG. 72 is a diagram illustrating a flow of CABAC in the entropy decoder.

FIG. 72 is a diagram illustrating a flow of CABAC in entropy decoder 202.

First, initialization is performed in CABAC in entropy decoder 202. In the initialization, initialization in binary arithmetic decoder 202*a* and setting of an initial context value are performed. Binary arithmetic decoder 202*a* and debinarizer 202*c* then execute arithmetic decoding and debinarization of, for example, encoded data of a CTU. At this time, context controller 202*b* updates the context value each time arithmetic decoding is performed. Context controller 202*b* then saves the context value as a post process. The saved context value is used, for example, to initialize the context value for the next CTU.

[Inverse Quantizer]

Inverse quantizer 204 inverse quantizes quantized coefficients of a current block which are inputs from entropy decoder 202. More specifically, inverse quantizer 204 inverse quantizes the quantized coefficients of the current block, based on quantization parameters corresponding to the quantized coefficients. Inverse quantizer 204 then outputs the inverse quantized transform coefficients (that are transform coefficients) of the current block to inverse transformer 206.

FIG. 73 is a block diagram illustrating one example of a configuration of inverse quantizer 204.

Inverse quantizer 204 includes, for example, quantization parameter generator 204*a*, predicted quantization parameter generator 204*b*, quantization parameter storage 204*d*, and inverse quantization executor 204*e*.

Figure 74:
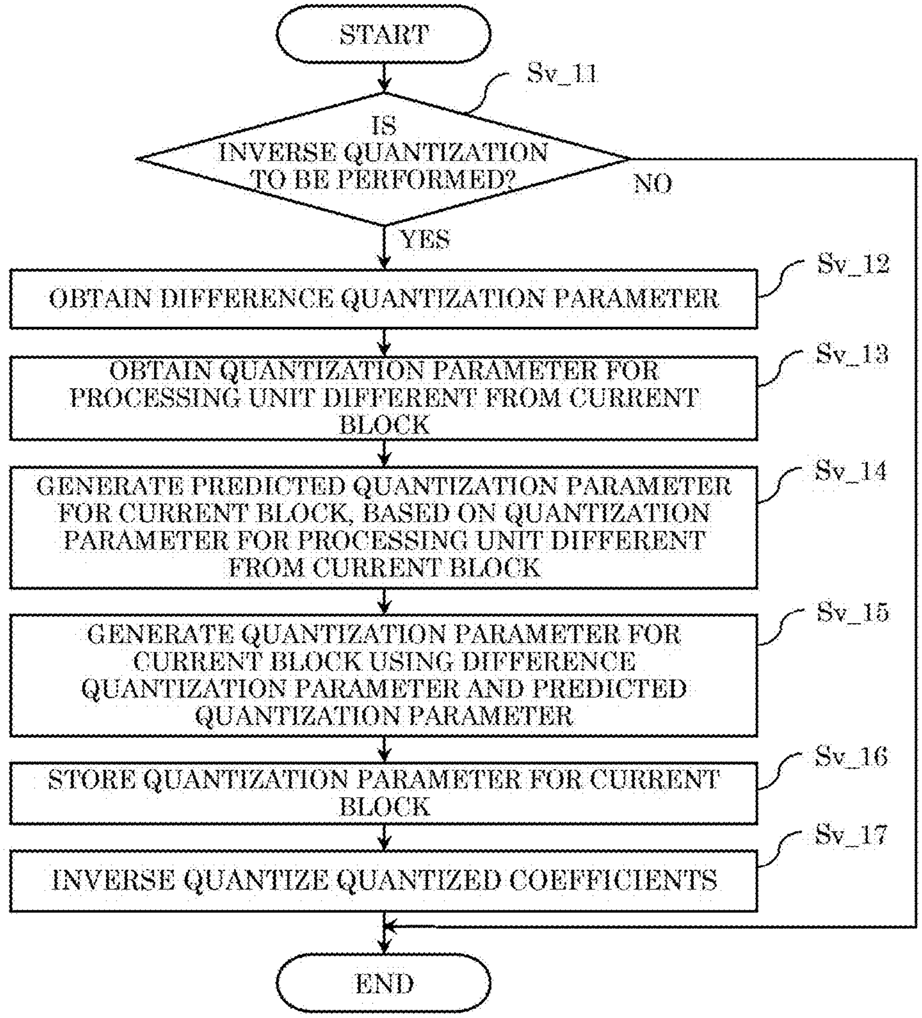
FIG. 74 is a flow chart illustrating one example of inverse quantization performed by the inverse quantizer.

FIG. 74 is a flow chart illustrating one example of inverse quantization performed by inverse quantizer 204.

Inverse quantizer 204 may perform an inverse quantization process as one example for each CU based on the flow illustrated in FIG. 74. More specifically, quantization parameter generator 204*a* determines whether to perform inverse quantization (Step Sv_11). Here, when determining to perform inverse quantization (Yes in Step Sv_11), quantization parameter generator 204*a* obtains a difference quantization parameter for the current block from entropy decoder 202 (Step Sv_12).

Next, predicted quantization parameter generator 204*b* then obtains a quantization parameter for a processing unit different from the current block from quantization parameter storage 204*d* (Step Sv_13). Predicted quantization parameter generator 204*b* generates a predicted quantization parameter of the current block based on the obtained quantization parameter (Step Sv_14).

Quantization parameter generator 204*a* then adds the difference quantization parameter for the current block obtained from entropy decoder 202 and the predicted quantization parameter for the current block generated by predicted quantization parameter generator 204*b* (Step Sv_15). This addition generates a quantization parameter for the current block. In addition, quantization parameter generator 204*a* stores the quantization parameter for the current block in quantization parameter storage 204*d* (Step Sv_16).

Next, inverse quantization executor 204*e* inverse quantizes the quantized coefficients of the current block into transform coefficients, using the quantization parameter generated in Step Sv_15 (Step Sv_17).

It is to be noted that the difference quantization parameter may be decoded at the bit sequence level, picture level, slice level, brick level, or CTU level. In addition, the initial value of the quantization parameter may be decoded at the sequence level, picture level, slice level, brick level, or CTU level. At this time, the quantization parameter may be generated using the initial value of the quantization parameter and the difference quantization parameter.

It is to be noted that inverse quantizer 204 may include a plurality of inverse quantizers, and may inverse quantize the quantized coefficients using an inverse quantization method selected from a plurality of inverse quantization methods.

[Inverse Transformer]

Inverse transformer 206 restores prediction residuals by inverse transforming the transform coefficients which are inputs from inverse quantizer 204.

For example, when information parsed from a stream indicates that EMT or AMT is to be applied (for example, when an AMT flag is true), inverse transformer 206 inverse transforms the transform coefficients of the current block based on information indicating the parsed transform type.

Moreover, for example, when information parsed from a stream indicates that NSST is to be applied, inverse transformer 206 applies a secondary inverse transform to the transform coefficients.

Figure 75:
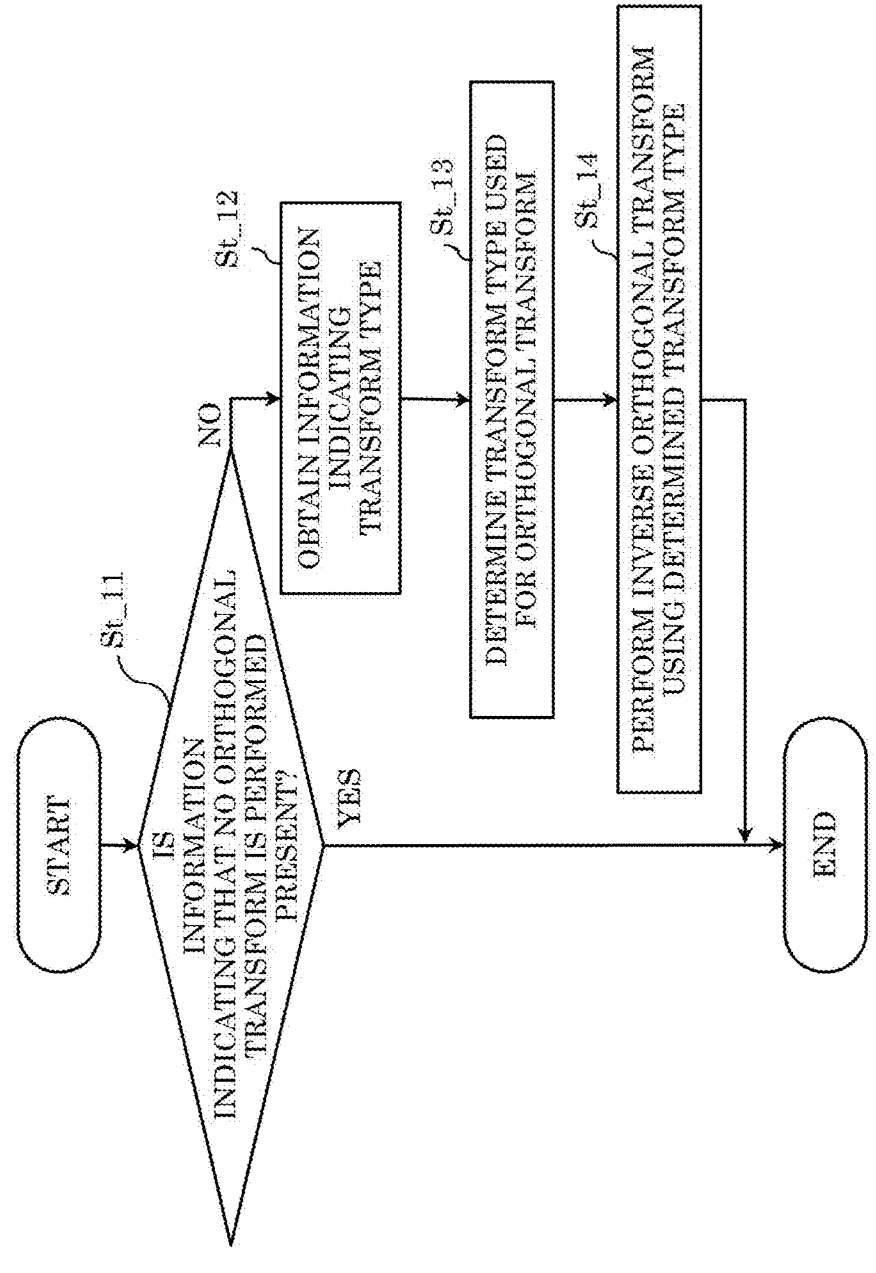
FIG. 75 is a flow chart illustrating one example of a process performed by an inverse transformer.

FIG. 75 is a flow chart illustrating one example of a process performed by inverse transformer 206.

For example, inverse transformer 206 determines whether information indicating that no orthogonal transform is performed is present in a stream (Step St_11). Here, when determining that no such information is present (No in Step St_11), inverse transformer 206 obtains information indicating the transform type decoded by entropy decoder 202 (Step St_12). Next, based on the information, inverse transformer 206 determines the transform type used for the orthogonal transform in encoder 100 (Step St_13). Inverse transformer 206 then performs inverse orthogonal transform using the determined transform type (Step St_14).

Figure 76:
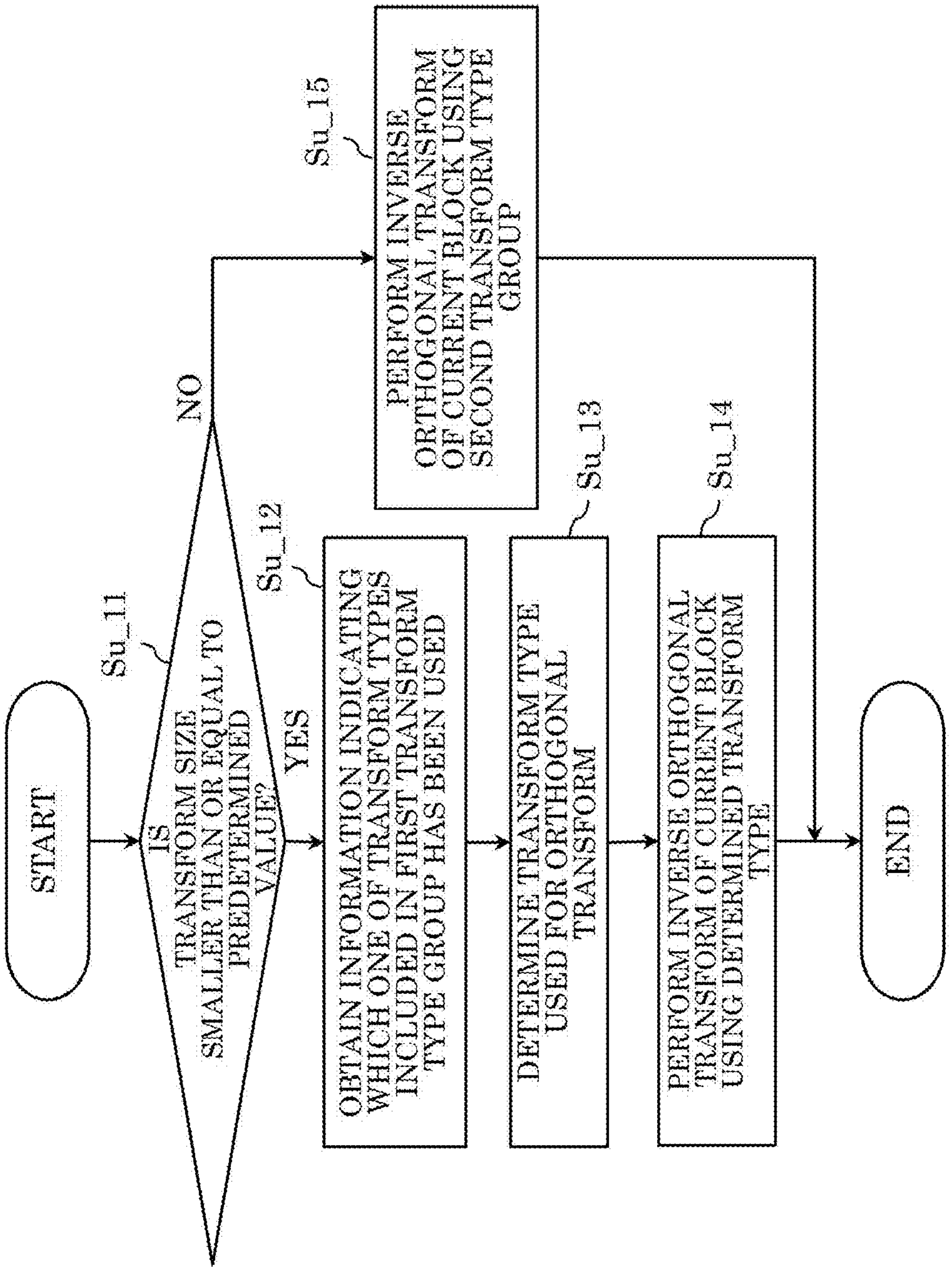
FIG. 76 is a flow chart illustrating another example of a process performed by the inverse transformer.

FIG. 76 is a flow chart illustrating another example of a process performed by inverse transformer 206.

For example, inverse transformer 206 determines whether a transform size is smaller than or equal to a predetermined value (Step Su_11). Here, when determining that the transform size is smaller than or equal to a predetermined value (Yes in Step Su_11), inverse transformer 206 obtains, from entropy decoder 202, information indicating which transform type has been used by encoder 100 among at least one transform type included in the first transform type group (Step Su_12). It is to be noted that such information is decoded by entropy decoder 202 and output to inverse transformer 206.

Based on the information, inverse transformer 206 determines the transform type used for the orthogonal transform in encoder 100 (Step Su_13). Inverse transformer 206 then inverse orthogonal transforms the transform coefficients of the current block using the determined transform type (Step Su_14). When determining that a transform size is not smaller than or equal to the predetermined value (No in Step Su_11), inverse transformer 206 inverse transforms the transform coefficients of the current block using the second transform type group (Step Su_15).

It is to be noted that the inverse orthogonal transform by inverse transformer 206 may be performed according to the flow illustrated in FIG. 75 or FIG. 76 for each TU as one example. In addition, inverse orthogonal transform may be performed by using a predefined transform type without decoding information indicating a transform type used for orthogonal transform. In addition, the transform type is specifically DST7, DCT8, or the like. In inverse orthogonal transform, an inverse transform basis function corresponding to the transform type is used.

[Adder]

Adder 208 reconstructs the current block by adding a prediction residual which is an input from inverse transformer 206 and a prediction image which is an input from prediction controller 220. In other words, a reconstructed image of the current block is generated. Adder 208 then outputs the reconstructed image of the current block to block memory 210 and loop filter 212.

[Block Memory]

Block memory 210 is storage for storing a block which is included in a current picture and is referred to in intra prediction. More specifically, block memory 210 stores a reconstructed image output from adder 208.

[Loop Filter]

Loop filter 212 applies a loop filter to the reconstructed image generated by adder 208, and outputs the filtered reconstructed image to frame memory 214 and a display device, etc.

When information indicating ON or OFF of an ALF parsed from a stream indicates that an ALF is ON, one filter from among a plurality of filters is selected based on the direction and activity of local gradients, and the selected filter is applied to the reconstructed image.

Figure 77:
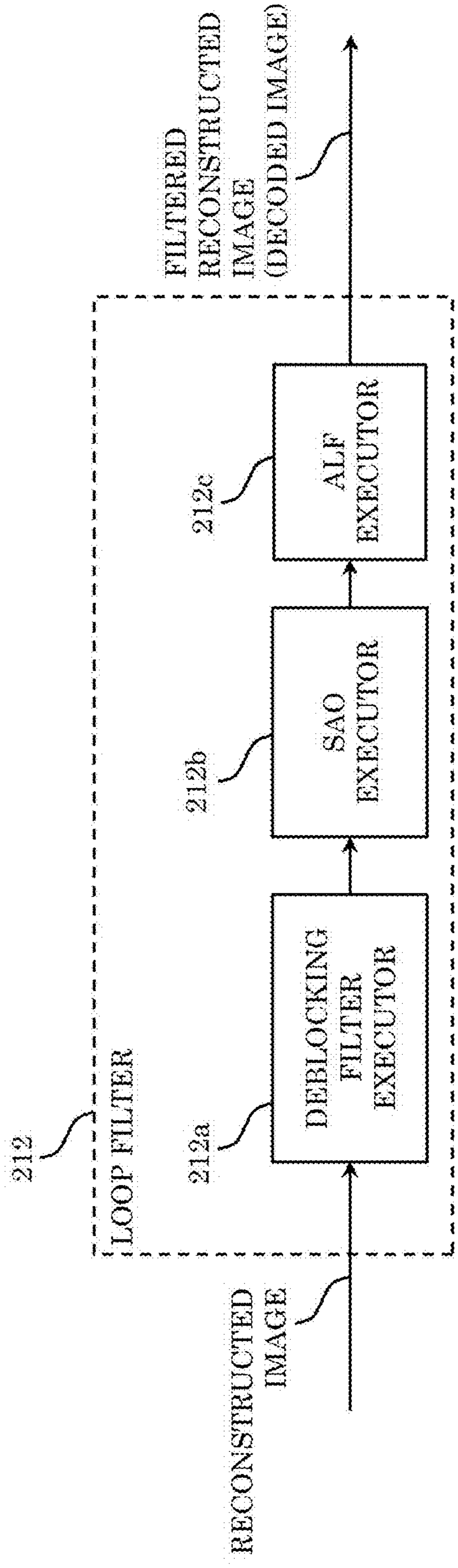
FIG. 77 is a block diagram illustrating one example of a configuration of a loop filter.

FIG. 77 is a block diagram illustrating one example of a configuration of loop filter 212. It is to be noted that loop filter 212 has a configuration similar to the configuration of loop filter 120 of encoder 100.

For example, as illustrated in FIG. 77, loop filter 212 includes deblocking filter executor 212*a*, SAO executor 212*b*, and ALF executor 212*c*. Deblocking filter executor 212*a* performs a deblocking filter process of the reconstructed image. SAO executor 212*b* performs a SAO process of the reconstructed image after being subjected to the deblocking filter process. ALF executor 212*c* performs an ALF process of the reconstructed image after being subjected to the SAO process. It is to be noted that loop filter 212 does not always need to include all the constituent elements disclosed in FIG. 77, and may include only part of the constituent elements. In addition, loop filter 212 may be configured to perform the above processes in a processing order different from the one disclosed in FIG. 77.

[Frame Memory]

Frame memory 214 is, for example, storage for storing reference pictures for use in inter prediction, and is also referred to as a frame buffer. More specifically, frame memory 214 stores a reconstructed image filtered by loop filter 212.

[Predictor (Intra Predictor, Inter Predictor, Prediction Controller)]

Figure 78:
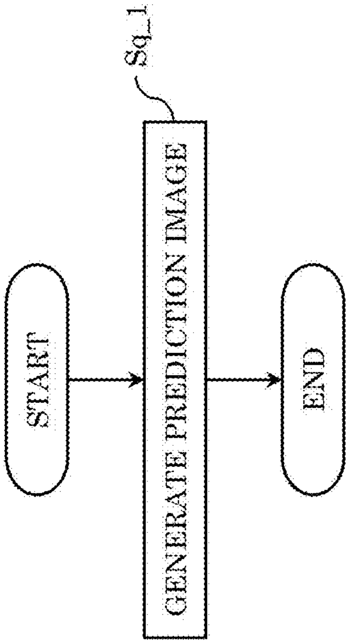
FIG. 78 is a flow chart illustrating one example of a process performed by a predictor of the decoder.

FIG. 78 is a flow chart illustrating one example of a process performed by a predictor of decoder 200. It is to be noted that the prediction executor includes all or part of the following constituent elements: intra predictor 216; inter predictor 218; and prediction controller 220. The prediction executor includes, for example, intra predictor 216 and inter predictor 218.

The predictor generates a prediction image of a current block (Step Sq_1). This prediction image is also referred to as a prediction signal or a prediction block. It is to be noted that the prediction signal is, for example, an intra prediction signal or an inter prediction signal. More specifically, the predictor generates the prediction image of the current block using a reconstructed image which has been already obtained for another block through generation of a prediction image, restoration of a prediction residual, and addition of a prediction image. The predictor of decoder 200 generates the same prediction image as the prediction image generated by the predictor of encoder 100. In other words, the prediction images are generated according to a method common between the predictors or mutually corresponding methods.

The reconstructed image may be, for example, an image in a reference picture, or an image of a decoded block (that is, the other block described above) in a current picture which is the picture including the current block. The decoded block in the current picture is, for example, a neighboring block of the current block.

Figure 79:
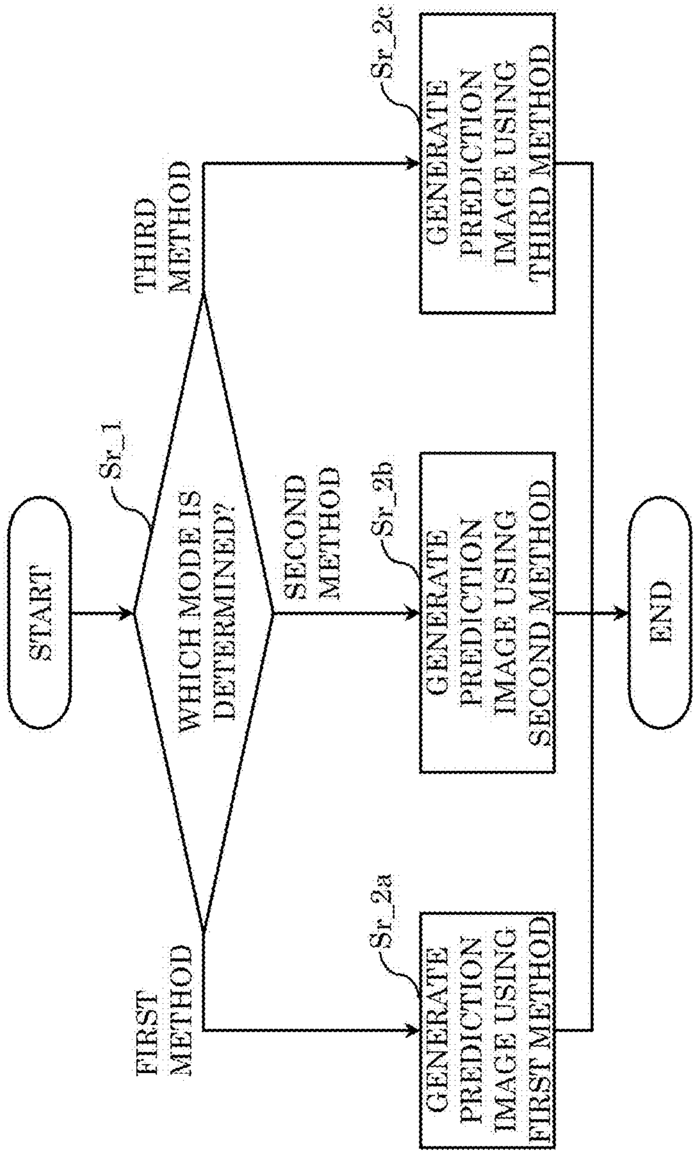
FIG. 79 is a flow chart illustrating another example of a process performed by the predictor of the decoder.

FIG. 79 is a flow chart illustrating another example of a process performed by the predictor of decoder 200.

The predictor determines either a method or a mode for generating a prediction image (Step Sr_1). For example, the method or mode may be determined based on, for example, a prediction parameter, etc.

When determining a first method as a mode for generating a prediction image, the predictor generates a prediction image according to the first method (Step Sr_2*a*). When determining a second method as a mode for generating a prediction image, the predictor generates a prediction image according to the second method (Step Sr_2*b*). When determining a third method as a mode for generating a prediction image, the predictor generates a prediction image according to the third method (Step Sr_2*c*).

The first method, the second method, and the third method may be mutually different methods for generating a prediction image. Each of the first to third methods may be an inter prediction method, an intra prediction method, or another prediction method. The above-described reconstructed image may be used in these prediction methods.

FIG. 80A and FIG. 80B illustrate a flow chart illustrating another example of a process performed by a predictor of decoder 200.

The predictor may perform a prediction process according to the flow illustrated in FIG. 80A and FIG. 80B as one example. It is to be noted that intra block copy illustrated in FIG. 80A and FIG. 80B is one mode which belongs to inter prediction, and in which a block included in a current picture is referred to as a reference image or a reference block. In other words, no picture different from the current picture is referred to in intra block copy. In addition, the PCM mode illustrated in FIG. 80A is one mode which belongs to intra prediction, and in which no transform and quantization is performed.

[Intra Predictor]

Intra predictor 216 performs intra prediction by referring to a block in a current picture stored in block memory 210, based on the intra prediction mode parsed from the stream, to generate a prediction image of a current block (that is, an intra prediction image). More specifically, intra predictor 216 performs intra prediction by referring to pixel values (for example, luma and/or chroma values) of a block or blocks neighboring the current block to generate an intra prediction image, and then outputs the intra prediction image to prediction controller 220.

It is to be noted that when an intra prediction mode in which a luma block is referred to in intra prediction of a chroma block is selected, intra predictor 216 may predict the chroma component of the current block based on the luma component of the current block.

Moreover, when information parsed from a stream indicates that PDPC is to be applied, intra predictor 216 corrects intra predicted pixel values based on horizontal/vertical reference pixel gradients.

FIG. 81 is a diagram illustrating one example of a process performed by intra predictor 216 of decoder 200.

Intra predictor 216 firstly determines whether an MPM flag indicating 1 is present in the stream (Step Sw_11). Here, when determining that the MPM flag indicating 1 is present (Yes in Step Sw_11), intra predictor 216 obtains, from entropy decoder 202, information indicating the intra prediction mode selected in encoder 100 among MPMs (Step Sw_12). It is to be noted that such information is decoded by entropy decoder 202 and output to intra predictor 216. Next, intra predictor 216 determines an MPM (Step Sw_13). MPMs include, for example, six intra prediction modes. Intra predictor 216 then determines the intra prediction mode which is included in a plurality of intra prediction modes included in the MPMs and is indicated by the information obtained in Step Sw_12 (Step Sw_14).

When determining that no MPM flag indicating 1 is present (No in Step Sw_11), intra predictor 216 obtains information indicating the intra prediction mode selected in encoder 100 (Step Sw_15). In other words, intra predictor 216 obtains, from entropy decoder 202, information indicating the intra prediction mode selected in encoder 100 from among at least one intra prediction mode which is not included in the MPMs. It is to be noted that such information is decoded by entropy decoder 202 and output to intra predictor 216. Intra predictor 216 then determines the intra prediction mode which is not included in a plurality of intra prediction modes included in the MPMs and is indicated by the information obtained in Step Sw_15 (Step Sw_17).

Intra predictor 216 generates a prediction image according to the intra prediction mode determined in Step Sw_14 or Step Sw_17 (Step Sw_18).

[Inter Predictor]

Inter predictor 218 predicts the current block by referring to a reference picture stored in frame memory 214. Prediction is performed in units of a current block or a current sub-block in the current block. It is to be noted that the sub-block is included in the block and is a unit smaller than the block. The size of the sub-block may be 4×4 pixels, 8×8 pixels, or another size. The size of the sub-block may be switched for a unit such as a slice, brick, picture, etc.

For example, inter predictor 218 generates an inter prediction image of a current block or a current sub-block by performing motion compensation using motion information (for example, an MV) parsed from a stream (for example, a prediction parameter output from entropy decoder 202), and outputs the inter prediction image to prediction controller 220.

When the information parsed from the stream indicates that the OBMC mode is to be applied, inter predictor 218 generates the inter prediction image using motion information of a neighboring block in addition to motion information of the current block obtained through motion estimation.

Moreover, when the information parsed from the stream indicates that the FRUC mode is to be applied, inter predictor 218 derives motion information by performing motion estimation in accordance with the pattern matching method (bilateral matching or template matching) parsed from the stream. Inter predictor 218 then performs motion compensation (prediction) using the derived motion information.

Moreover, when the BIO mode is to be applied, inter predictor 218 derives an MV based on a model assuming uniform linear motion. In addition, when the information parsed from the stream indicates that the affine mode is to be applied, inter predictor 218 derives an MV for each sub-block, based on the MVs of a plurality of neighboring blocks.

[MV Derivation Flow]

Figure 82:
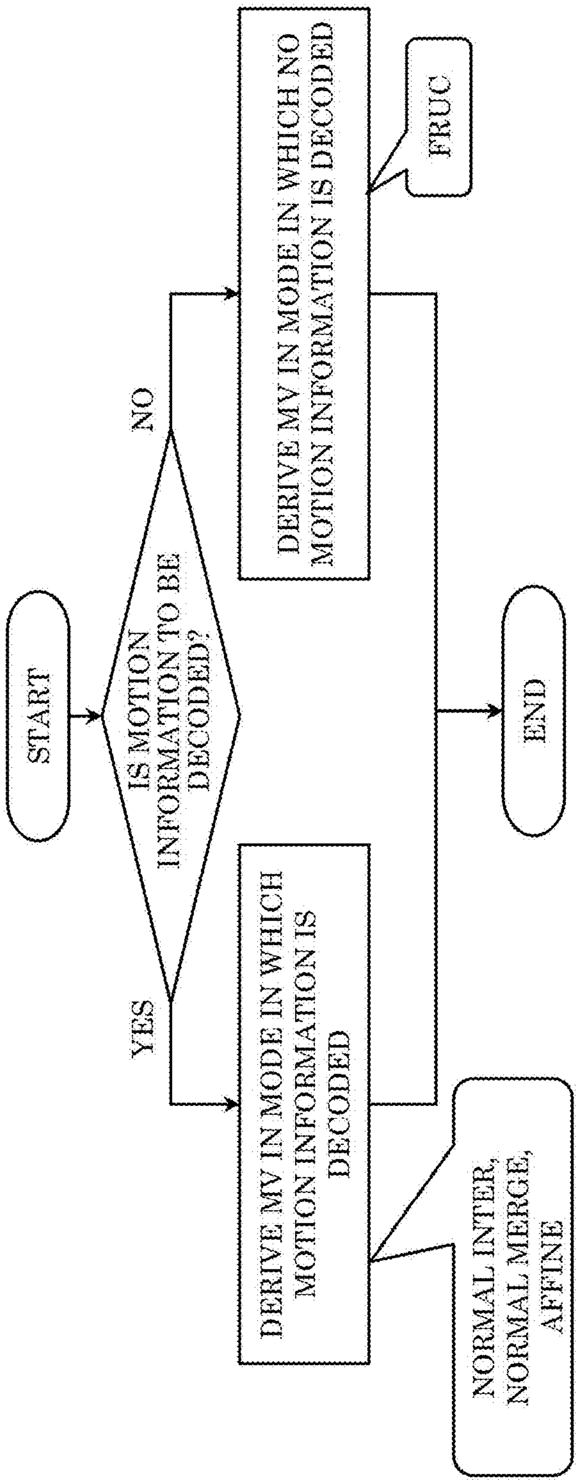
FIG. 82 is a flow chart illustrating one example of MV derivation in the decoder.

FIG. 82 is a flow chart illustrating one example of MV derivation in decoder 200.

Inter predictor 218 determines, for example, whether to decode motion information (for example, an MV). For example, inter predictor 218 may make the determination according to the prediction mode included in the stream, or may make the determination based on other information included in the stream. Here, when determining to decode motion information, inter predictor 218 derives an MV for a current block in a mode in which the motion information is decoded. When determining not to decode motion information, inter predictor 218 derives an MV in a mode in which no motion information is decoded.

Here, MV derivation modes include a normal inter mode, a normal merge mode, a FRUC mode, an affine mode, etc. which are described later. Modes in which motion information is decoded among the modes include the normal inter mode, the normal merge mode, the affine mode (specifically, an affine inter mode and an affine merge mode), etc. It is to be noted that motion information may include not only an MV but also MV predictor selection information which is described later. Modes in which no motion information is decoded include the FRUC mode, etc. Inter predictor 218 selects a mode for deriving an MV for the current block from the plurality of modes, and derives the MV for the current block using the selected mode.

Figure 83:
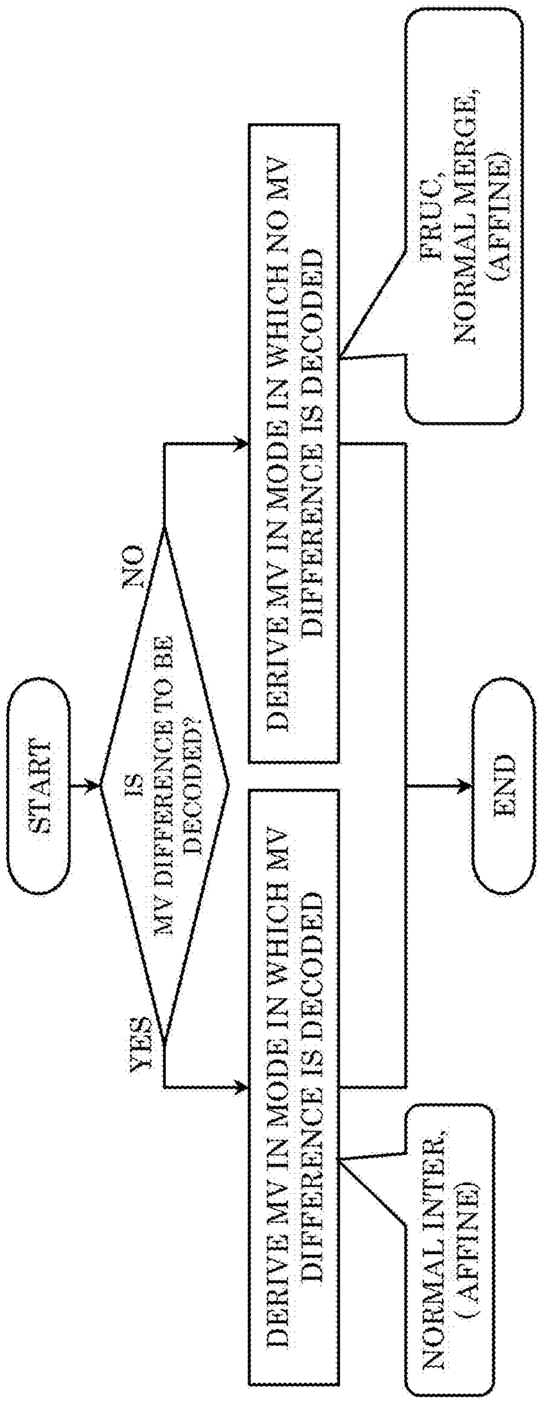
FIG. 83 is a flow chart illustrating another example of MV derivation in the decoder.

FIG. 83 is a flow chart illustrating another example of MV derivation in decoder 200.

For example, inter predictor 218 may determine whether to decode an MV difference, that is for example, may make the determination according to the prediction mode included in the stream, or may make the determination based on other information included in the stream. Here, when determining to decode an MV difference, inter predictor 218 may derive an MV for a current block in a mode in which the MV difference is decoded. In this case, for example, the MV difference included in the stream is decoded as a prediction parameter.

When determining not to decode any MV difference, inter predictor 218 derives an MV in a mode in which no MV difference is decoded. In this case, no encoded MV difference is included in the stream.

Here, as described above, the MV derivation modes include the normal inter mode, the normal merge mode, the FRUC mode, the affine mode, etc. which are described later. Modes in which an MV difference is encoded among the modes include the normal inter mode and the affine mode (specifically, the affine inter mode), etc. Modes in which no MV difference is encoded include the FRUC mode, the normal merge mode, the affine mode (specifically, the affine merge mode), etc. Inter predictor 218 selects a mode for deriving an MV for the current block from the plurality of modes, and derives the MV for the current block using the selected mode.

[MV Derivation>Normal Inter Mode]

For example, when information parsed from a stream indicates that the normal inter mode is to be applied, inter predictor 218 derives an MV based on the information parsed from the stream and performs motion compensation (prediction) using the MV.

Figure 84:
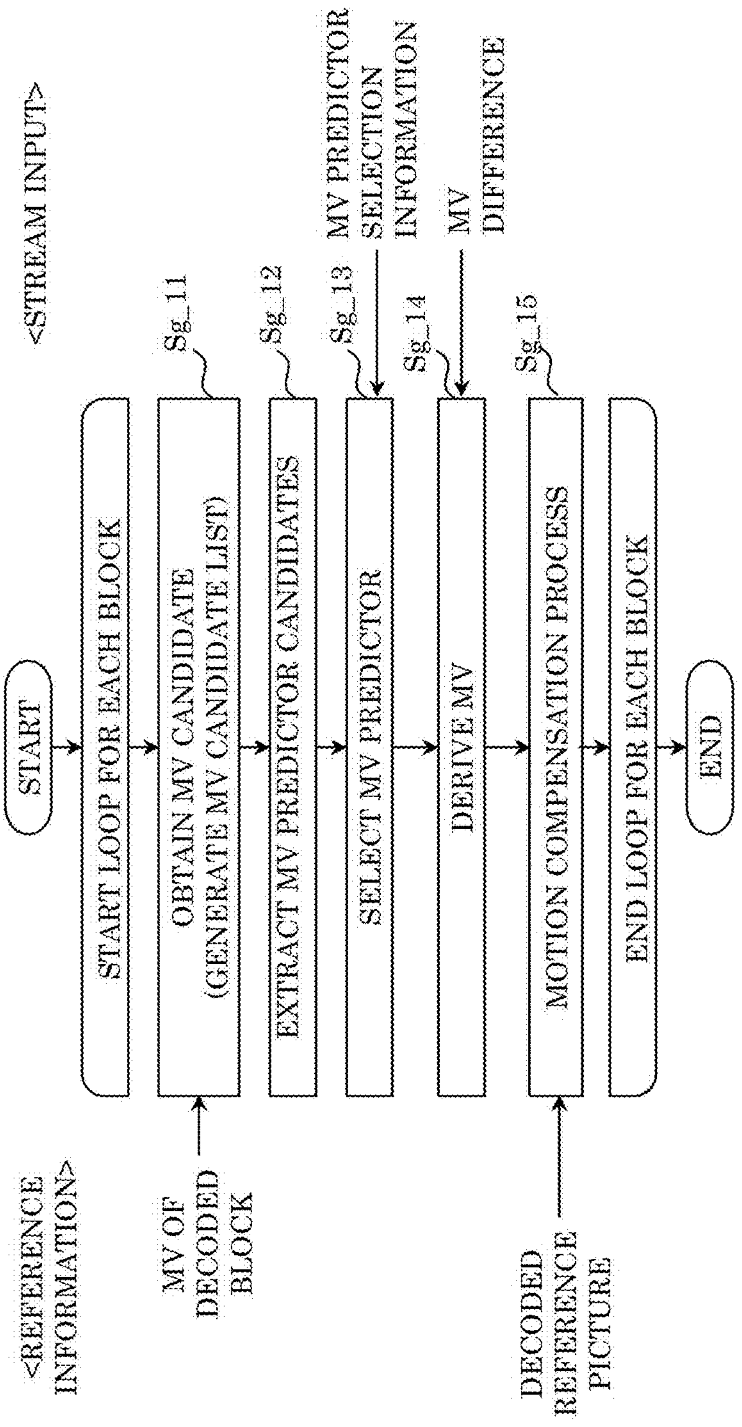
FIG. 84 is a flow chart illustrating an example of inter prediction by normal inter mode in the decoder.

FIG. 84 is a flow chart illustrating an example of inter prediction by normal inter mode in decoder 200.

Inter predictor 218 of decoder 200 performs motion compensation for each block. At this time, first, inter predictor 218 obtains a plurality of MV candidates for a current block based on information such as MVs of a plurality of decoded blocks temporally or spatially surrounding the current block (Step Sg_11). In other words, inter predictor 218 generates an MV candidate list.

Next, inter predictor 218 extracts N (an integer of 2 or larger) MV candidates from the plurality of MV candidates obtained in Step Sg_11, as motion vector predictor candidates (also referred to as MV predictor candidates) according to the predetermined ranks in priority order (Step Sg_12). It is to be noted that the ranks in priority order are determined in advance for the respective N MV predictor candidates.

Next, inter predictor 218 decodes the MV predictor selection information from the input stream, and selects one MV predictor candidate from the N MV predictor candidates as the MV predictor for the current block using the decoded MV predictor selection information (Step Sg_13).

Next, inter predictor 218 decodes an MV difference from the input stream, and derives an MV for the current block by adding a difference value which is the decoded MV difference and the selected MV predictor (Step Sg_14).

Lastly, inter predictor 218 generates a prediction image for the current block by performing motion compensation of the current block using the derived MV and the decoded reference picture (Step Sg_15). The processes in Steps Sg_11 to Sg_15 are executed on each block. For example, when the processes in Steps Sg_11 to Sg_15 are executed on each of all the blocks in the slice, inter prediction of the slice using the normal inter mode finishes. For example, when the processes in Steps Sg_11 to Sg_15 are executed on each of all the blocks in the picture, inter prediction of the picture using the normal inter mode finishes. It is to be noted that not all the blocks included in the slice may be subjected to the processes in Steps Sg_11 to Sg_15, and inter prediction of the slice using the normal inter mode may finish when part of the blocks are subjected to the processes. Likewise, inter prediction of the picture using the normal inter mode may finish when the processes in Steps Sg_11 to Sg_15 are executed on part of the blocks in the picture.

[MV Derivation>Normal Merge Mode]

For example, when information parsed from a stream indicates that the normal merge mode is to be applied, inter predictor 218 derives an MV and performs motion compensation (prediction) using the MV.

Figure 85:
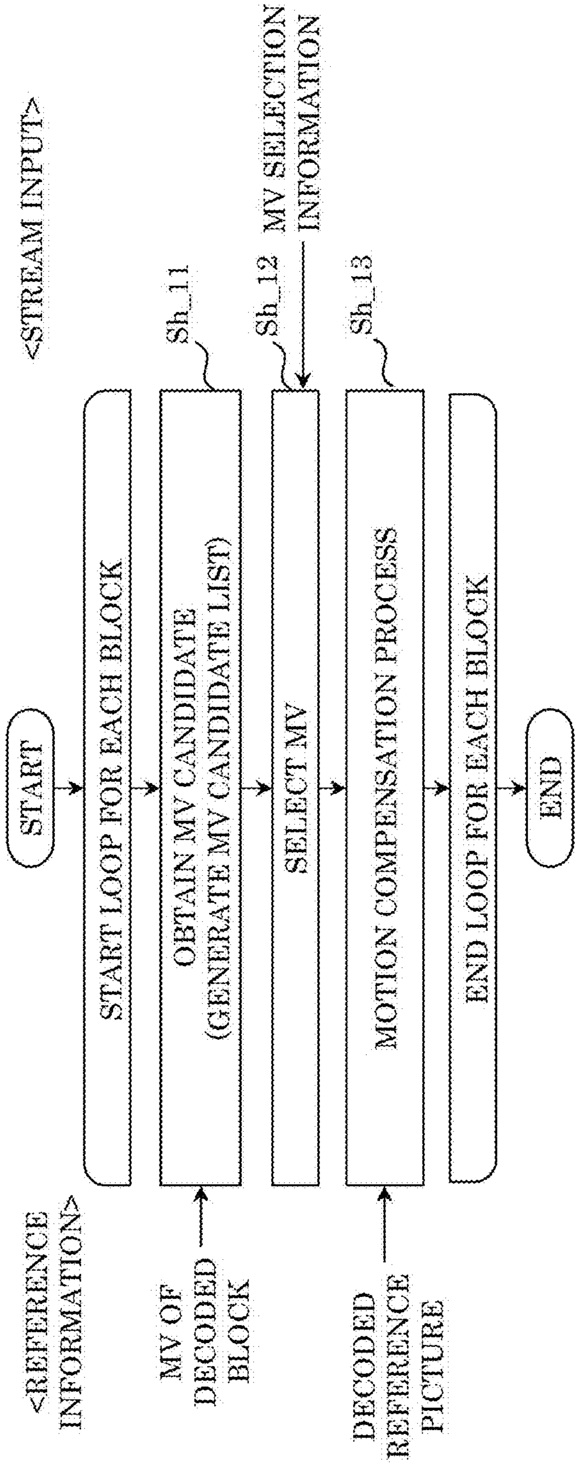
FIG. 85 is a flow chart illustrating an example of inter prediction by normal merge mode in the decoder.

FIG. 85 is a flow chart illustrating an example of inter prediction by normal merge mode in decoder 200.

At this time, first, inter predictor 218 obtains a plurality of MV candidates for a current block based on information such as MVs of a plurality of decoded blocks temporally or spatially surrounding the current block (Step Sh_11). In other words, inter predictor 218 generates an MV candidate list.

Next, inter predictor 218 selects one MV candidate from the plurality of MV candidates obtained in Step Sh_11, thereby deriving an MV for the current block (Step Sh_12). More specifically, inter predictor 218 obtains MV selection information included as a prediction parameter in a stream, and selects the MV candidate identified by the MV selection information as the MV for the current block.

Lastly, inter predictor 218 generates a prediction image for the current block by performing motion compensation of the current block using the derived MV and the decoded reference picture (Step Sh_13). The processes in Steps Sh_11 to Sh_13 are executed, for example, on each block. For example, when the processes in Steps Sh_11 to Sh_13 are executed on each of all the blocks in the slice, inter prediction of the slice using the normal merge mode finishes. In addition, when the processes in Steps Sh_11 to Sh_13 are executed on each of all the blocks in the picture, inter prediction of the picture using the normal merge mode finishes. It is to be noted that not all the blocks included in the slice are subjected to the processes in Steps Sh_11 to Sh_13, and inter prediction of the slice using the normal merge mode may finish when part of the blocks are subjected to the processes. Likewise, inter prediction of the picture using the normal merge mode may finish when the processes in Steps Sh_11 to Sh_13 are executed on part of the blocks in the picture.

[MV Derivation>FRUC Mode]

For example, when information parsed from a stream indicates that the FRUC mode is to be applied, inter predictor 218 derives an MV in the FRUC mode and performs motion compensation (prediction) using the MV. In this case, the motion information is derived at the decoder 200 side without being signaled from the encoder 100 side. For example, decoder 200 may derive the motion information by performing motion estimation. In this case, decoder 200 performs motion estimation without using any pixel value in a current block.

Figure 86:
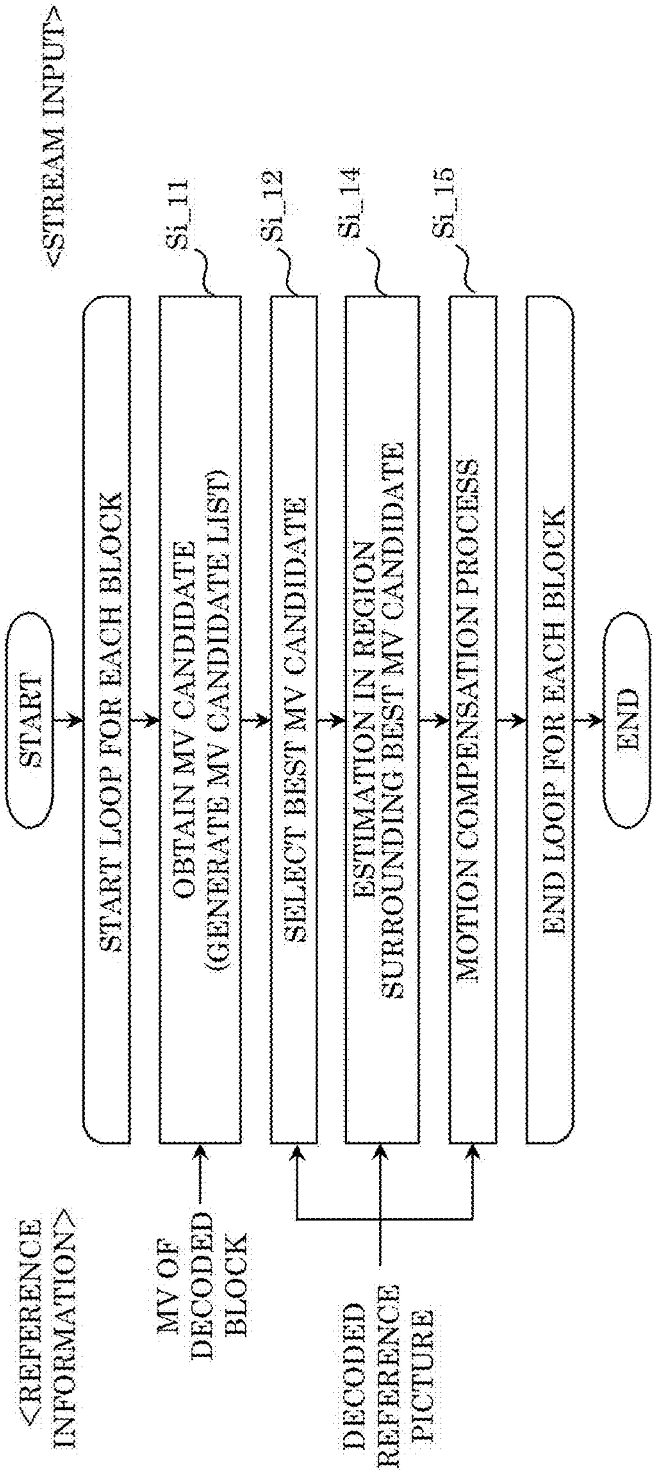
FIG. 86 is a flow chart illustrating an example of inter prediction by FRUC mode in the decoder.

FIG. 86 is a flow chart illustrating an example of inter prediction by FRUC mode in decoder 200.

First, inter predictor 218 generates a list indicating MVs of decoded blocks spatially or temporally neighboring the current block by referring to the MVs as MV candidates (the list is an MV candidate list, and may be used also as an MV candidate list for normal merge mode (Step Si_11). Next, a best MV candidate is selected from the plurality of MV candidates registered in the MV candidate list (Step Si_12). For example, inter predictor 218 calculates the evaluation value of each MV candidate included in the MV candidate list, and selects one of the MV candidates as the best MV candidate based on the evaluation values. Based on the selected best MV candidate, inter predictor 218 then derives an MV for the current block (Step Si_14). More specifically, for example, the selected best MV candidate is directly derived as the MV for the current block. In addition, for example, the MV for the current block may be derived using pattern matching in a surrounding region of a position which is included in a reference picture and corresponds to the selected best MV candidate. In other words, estimation using the pattern matching in a reference picture and the evaluation values may be performed in the surrounding region of the best MV candidate, and when there is an MV that yields a better evaluation value, the best MV candidate may be updated to the MV that yields the better evaluation value, and the updated MV may be determined as the final MV for the current block. Update to the MV that yields the better evaluation value may not be performed.

Lastly, inter predictor 218 generates a prediction image for the current block by performing motion compensation of the current block using the derived MV and the decoded reference picture (Step Si_15). The processes in Steps Si_11 to Si_15 are executed, for example, on each block. For example, when the processes in Steps Si_11 to Si_15 are executed on each of all the blocks in the slice, inter prediction of the slice using the FRUC mode finishes. For example, when the processes in Steps Si_11 to Si_15 are executed on each of all the blocks in the picture, inter prediction of the picture using the FRUC mode finishes. Each sub-block may be processed similarly to the above-described case of processing each block.

[MV Derivation>Affine Merge Mode]

For example, when information parsed from a stream indicates that the affine merge mode is to be applied, inter predictor 218 derives an MV in the affine merge mode and performs motion compensation (prediction) using the MV.

Figure 87:
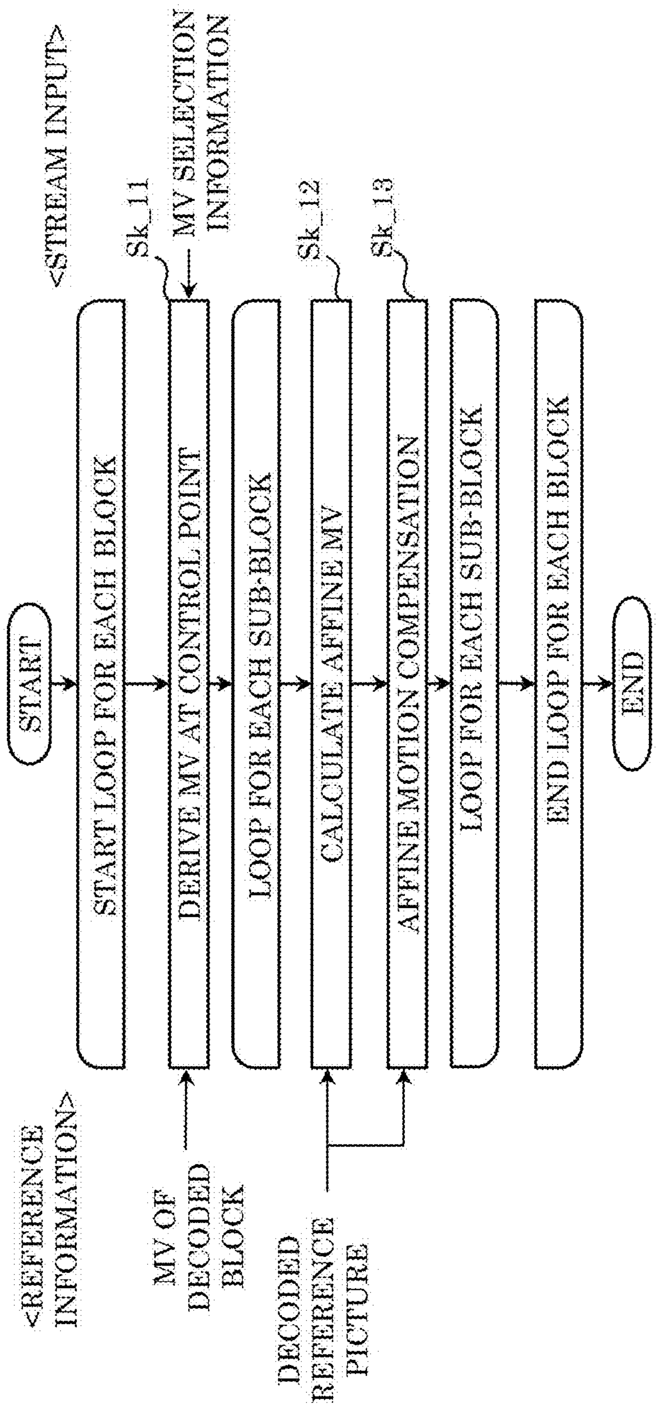
FIG. 87 is a flow chart illustrating an example of inter prediction by affine merge mode in the decoder.

FIG. 87 is a flow chart illustrating an example of inter prediction by the affine merge mode in decoder 200.

In the affine merge mode, first, inter predictor 218 derives MVs at respective control points for a current block (Step Sk_11). The control points are an upper-left corner point of the current block and an upper-right corner point of the current block as illustrated in FIG. 46A, or an upper-left corner point of the current block, an upper-right corner point of the current block, and a lower-left corner point of the current block as illustrated in FIG. 46B.

For example, when the MV derivation methods illustrated in FIGS. 47A to 47C are used, as illustrated in FIG. 47A, inter predictor 218 checks decoded block A (left), block B (upper), block C (upper-right), block D (lower-left), and block E (upper-left) in this order, and identifies the first effective block decoded according to the affine mode.

Inter predictor 218 derives the MV at the control point using the identified first effective block decoded according to the affine mode. For example, when block A is identified and block A has two control points, as illustrated in FIG. 47B, inter predictor 218 calculates motion vector $v_0$ at the upper-left corner control point of the current block and motion vector $v_1$ at the upper-right corner control point of the current block by projecting motion vectors $v_3$ and $v_4$ at the upper-left corner and the upper-right corner of the decoded block including block A onto the current block. In this way, the MV at each control point is derived.

It is to be noted that, as illustrated in FIG. 49A, MVs at three control points may be calculated when block A is identified and block A has two control points, and that, as illustrated in FIG. 49B, MVs at two control points may be calculated when block A is identified and when block A has three control points.

In addition, when MV selection information is included as a prediction parameter in a stream, inter predictor 218 may derive the MV at each control point for the current block using the MV selection information.

Next, inter predictor 218 performs motion compensation of each of a plurality of sub-blocks included in the current block. In other words, inter predictor 218 calculates an MV for each of the plurality of sub-blocks as an affine MV, using either two motion vectors $v_0$ and $v_1$ and the above expression (1A) or three motion vectors $v_0$, $v_1$, and $v_2$ and the above expression (1B) (Step Sk_12). Inter predictor 218 then performs motion compensation of the sub-blocks using these affine MVs and decoded reference pictures (Step Sk_13). When the processes in Steps Sk_12 and Sk_13 are executed for each of all the sub-blocks included in the current block, the inter prediction using the affine merge mode for the current block finishes. In other words, motion compensation of the current block is performed to generate a prediction image of the current block.

It is to be noted that the above-described MV candidate list may be generated in Step Sk_11. The MV candidate list may be, for example, a list including MV candidates derived using a plurality of MV derivation methods for each control point. The plurality of MV derivation methods may be any combination of the MV derivation methods illustrated in FIGS. 47A to 47C, the MV derivation methods illustrated in FIGS. 48A and 48B, the MV derivation methods illustrated in FIGS. 49A and 49B, and other MV derivation methods.

It is to be noted that an MV candidate list may include MV candidates in a mode in which prediction is performed in units of a sub-block, other than the affine mode.

It is to be noted that, for example, an MV candidate list including MV candidates in an affine merge mode in which two control points are used and an affine merge mode in which three control points are used may be generated as an MV candidate list. Alternatively, an MV candidate list including MV candidates in the affine merge mode in which two control points are used and an MV candidate list including MV candidates in the affine merge mode in which three control points are used may be generated separately. Alternatively, an MV candidate list including MV candidates in one of the affine merge mode in which two control points are used and the affine merge mode in which three control points are used may be generated.

[MV Derivation>Affine Inter Mode]

For example, when information parsed from a stream indicates that the affine inter mode is to be applied, inter predictor 218 derives an MV in the affine inter mode and performs motion compensation (prediction) using the MV.

Figure 88:
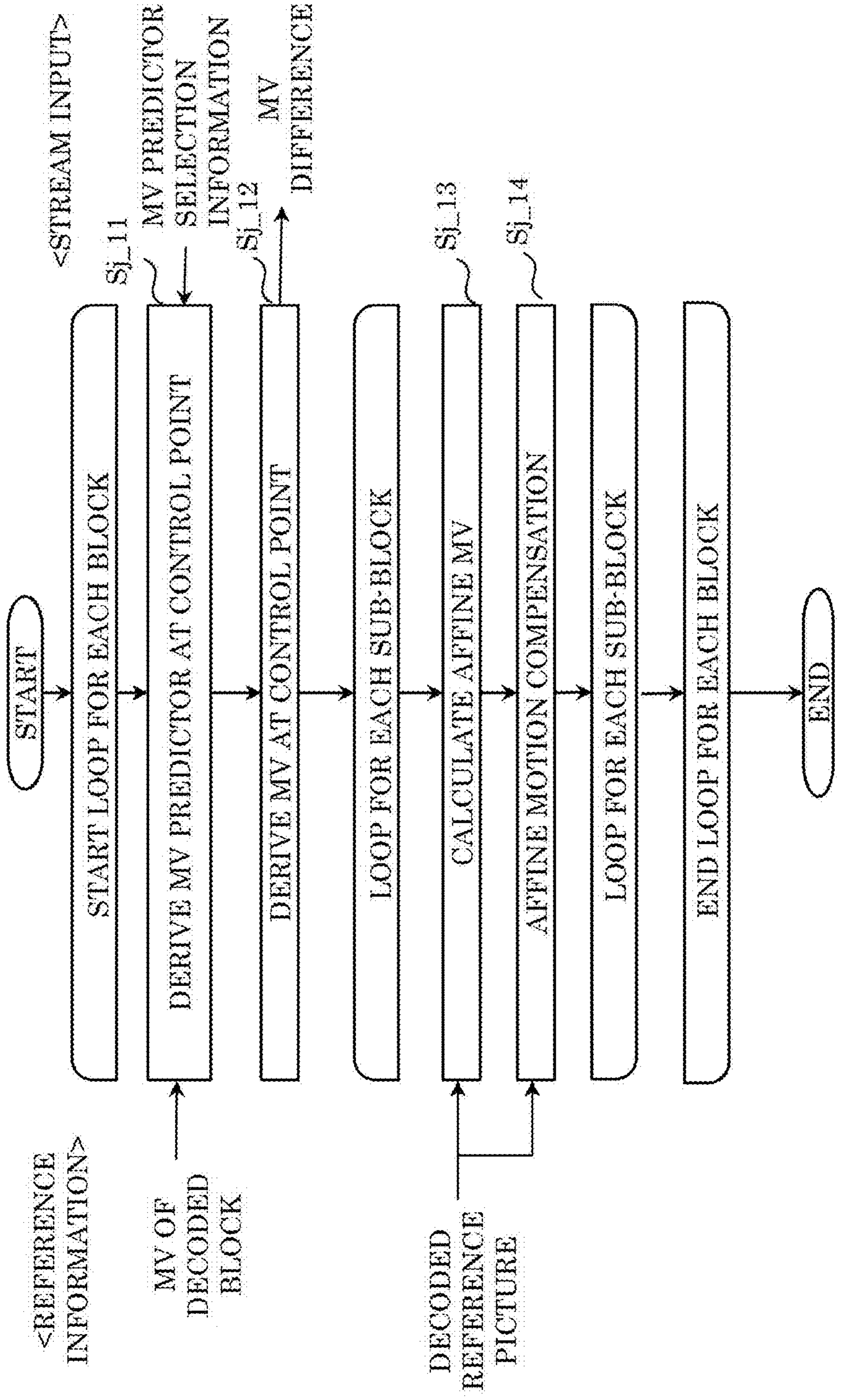
FIG. 88 is a flow chart illustrating an example of inter prediction by affine inter mode in the decoder.

FIG. 88 is a flow chart illustrating an example of inter prediction by the affine inter mode in decoder 200.

In the affine inter mode, first, inter predictor 218 derives MV predictors ($v_0$, $v_1$) or ($v_0$, $v_1$, $v_2$) of respective two or three control points for a current block (Step Sj_11). The control points are an upper-left corner point of the current block, an upper-right corner point of the current block, and a lower-left corner point of the current block as illustrated in FIG. 46A or FIG. 46B.

Inter predictor 218 obtains MV predictor selection information included as a prediction parameter in the stream, and derives the MV predictor at each control point for the current block using the MV identified by the MV predictor selection information. For example, when the MV derivation methods illustrated in FIGS. 48A and 48B are used, inter predictor 218 derives the motion vector predictors ($v_0$, $v_1$) or ($v_0$, $v_1$, $v_2$) at control points for the current block by selecting the MV of the block identified by the MV predictor selection information among decoded blocks in the vicinity of the respective control points for the current block illustrated in either FIG. 48A or FIG. 48B.

Next, inter predictor 218 obtains each MV difference included as a prediction parameter in the stream, and adds the MV predictor at each control point for the current block and the MV difference corresponding to the MV predictor (Step Sj_12). In this way, the MV at each control point for the current block is derived.

Next, inter predictor 218 performs motion compensation of each of a plurality of sub-blocks included in the current block. In other words, inter predictor 218 calculates an MV for each of the plurality of sub-blocks as an affine MV, using either two motion vectors $v_0$ and $v_1$ and the above expression (1A) or three motion vectors $v_0$, $v_1$, and $v_2$ and the above expression (1B) (Step Sj_13). Inter predictor 218 then performs motion compensation of the sub-blocks using these affine MVs and decoded reference pictures (Step Sj_14). When the processes in Steps Sj_13 and Sj_14 are executed for each of all the sub-blocks included in the current block, the inter prediction using the affine merge mode for the current block finishes. In other words, motion compensation of the current block is performed to generate a prediction image of the current block.

It is to be noted that the above-described MV candidate list may be generated in Step Sj_11 as in Step Sk_11.

[MV Derivation>Triangle Mode]

For example, when information parsed from a stream indicates that the triangle mode is to be applied, inter predictor 218 derives an MV in the triangle mode and performs motion compensation (prediction) using the MV.

Figure 89:
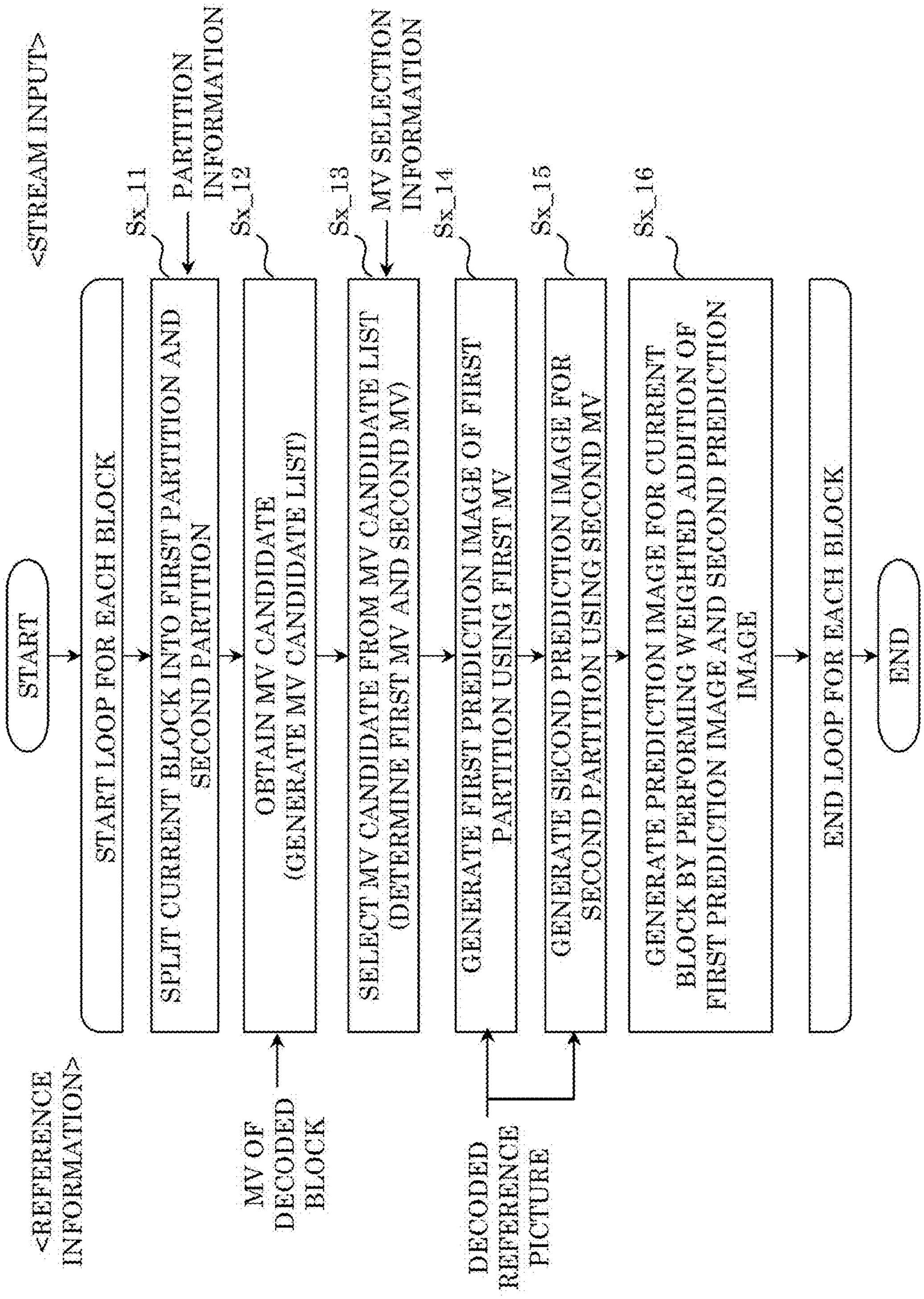
FIG. 89 is a flow chart illustrating an example of inter prediction by triangle mode in the decoder.

FIG. 89 is a flow chart illustrating an example of inter prediction by the triangle mode in decoder 200.

In the triangle mode, first, inter predictor 218 splits the current block into a first partition and a second partition (Step Sx_11). At this time, inter predictor 218 may obtain, from the stream, partition information which is information related to the splitting as a prediction parameter. Inter predictor 218 may then split a current block into a first partition and a second partition according to the partition information.

Next, first, inter predictor 218 obtains a plurality of MV candidates for a current block based on information such as MVs of a plurality of decoded blocks temporally or spatially surrounding the current block (Step Sx_12). In other words, inter predictor 218 generates an MV candidate list.

Inter predictor 218 then selects the MV candidate for the first partition and the MV candidate for the second partition as a first MV and a second MV, respectively, from the plurality of MV candidates obtained in Step Sx_11 (Step Sx_13). At this time, inter predictor 218 may obtain, from the stream, MV selection information for identifying each selected MV candidate, as a prediction parameter. Inter predictor 218 may then select the first MV and the second MV according to the MV selection information.

Next, inter predictor 218 generates a first prediction image by performing motion compensation using the selected first MV and a decoded reference picture (Step Sx_14). Likewise, inter predictor 218 generates a second prediction image by performing motion compensation using the selected second MV and a decoded reference picture (Step Sx_15).

Lastly, inter predictor 218 generates a prediction image for the current block by performing a weighted addition of the first prediction image and the second prediction image (Step Sx_16).

[Motion Estimation>DMVR]

For example, information parsed from a stream indicates that DMVR is to be applied, inter predictor 218 performs motion estimation using DMVR.

Figure 90:
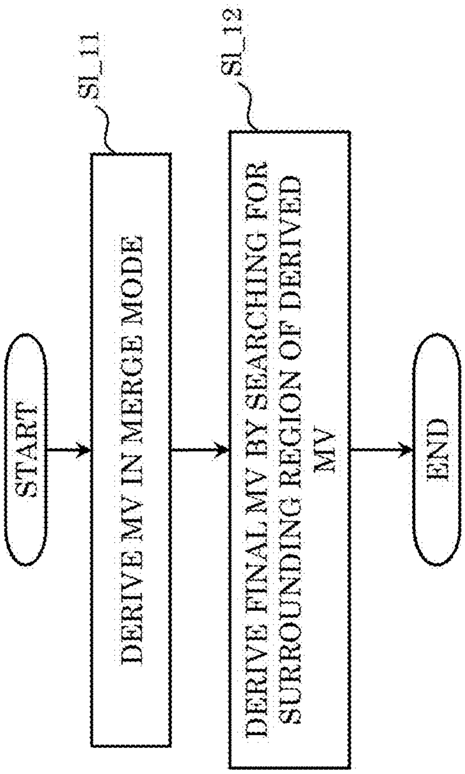
FIG. 90 is a flow chart illustrating an example of motion estimation by DMVR in the decoder.

FIG. 90 is a flow chart illustrating an example of motion estimation by DMVR in decoder 200.

Inter predictor 218 derives an MV for a current block according to the merge mode (Step Sl_11). Next, inter predictor 218 derives the final MV for the current block by searching the region surrounding the reference picture indicated by the MV derived in Sl_11 (Step Sl_12). In other words, the MV of the current block is determined according to the DMVR.

Figure 91:
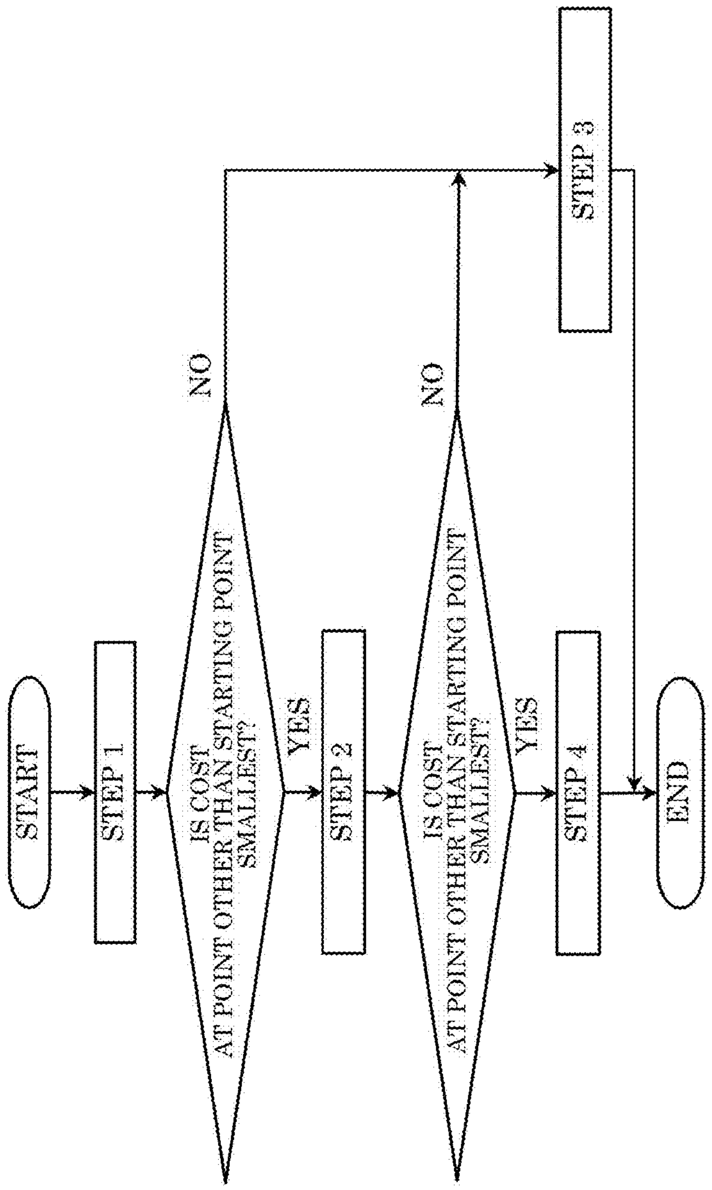
FIG. 91 is a flow chart illustrating one specific example of motion estimation by DMVR in the decoder.

FIG. 91 is a flow chart illustrating a specific example of motion estimation by DMVR in decoder 200.

First, in Step 1 illustrated in FIG. 58A, inter predictor 218 calculates the cost between the search position (also referred to as a starting point) indicated by the initial MV and eight surrounding search positions. Inter predictor 218 then determines whether the cost at each of the search positions other than the starting point is the smallest. Here, when determining that the cost at one of the search positions other than the starting point is the smallest, inter predictor 218 changes a target to the search position at which the smallest cost is obtained, and performs the process in Step 2 illustrated in FIG. 58A. When the cost at the starting point is the smallest, inter predictor 218 skips the process in Step 2 illustrated in FIG. 58A and performs the process in Step 3.

In Step 2 illustrated in FIG. 58A, inter predictor 218 performs search similar to the process in Step 1, regarding the search position after the target change as a new starting point according to the result of the process in Step 1. Inter predictor 218 then determines whether the cost at each of the search positions other than the starting point is the smallest. Here, when determining that the cost at one of the search positions other than the starting point is the smallest, inter predictor 218 performs the process in Step 4. When the cost at the starting point is the smallest, inter predictor 218 performs the process in Step 3.

In Step 4, inter predictor 218 regards the search position at the starting point as the final search position, and determines the difference between the position indicated by the initial MV and the final search position to be a vector difference.

In Step 3 illustrated in FIG. 58A, inter predictor 218 determines the pixel position at sub-pixel accuracy at which the smallest cost is obtained, based on the costs at the four points located at upper, lower, left, and right positions with respect to the starting point in Step 1 or Step 2, and regards the pixel position as the final search position. The pixel position at the sub-pixel accuracy is determined by performing weighted addition of each of the four upper, lower, left, and right vectors ((0, 1), (0, −1), (−1, 0), and (1, 0)), using, as a weight, the cost at a corresponding one of the four search positions. Inter predictor 218 then determines the difference between the position indicated by the initial MV and the final search position to be the vector difference.

[Motion Compensation>BIO/OBMC/LIC]

For example, when information parsed from a stream indicates that correction of a prediction image is to be performed, upon generating a prediction image, inter predictor 218 corrects the prediction image based on the mode for the correction. The mode is, for example, one of BIO, OBMC, and LIC described above.

Figure 92:
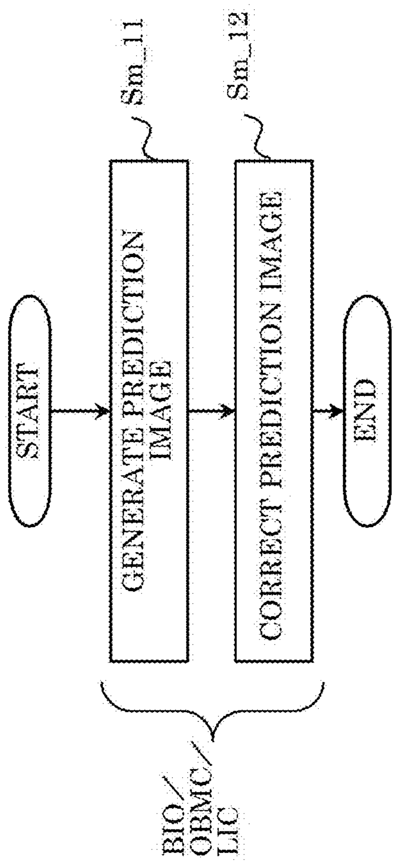
FIG. 92 is a flow chart illustrating one example of generation of a prediction image in the decoder.

FIG. 92 is a flow chart illustrating one example of generation of a prediction image in decoder 200.

Inter predictor 218 generates a prediction image (Step Sm_11), and corrects the prediction image according to any of the modes described above (Step Sm_12).

Figure 93:
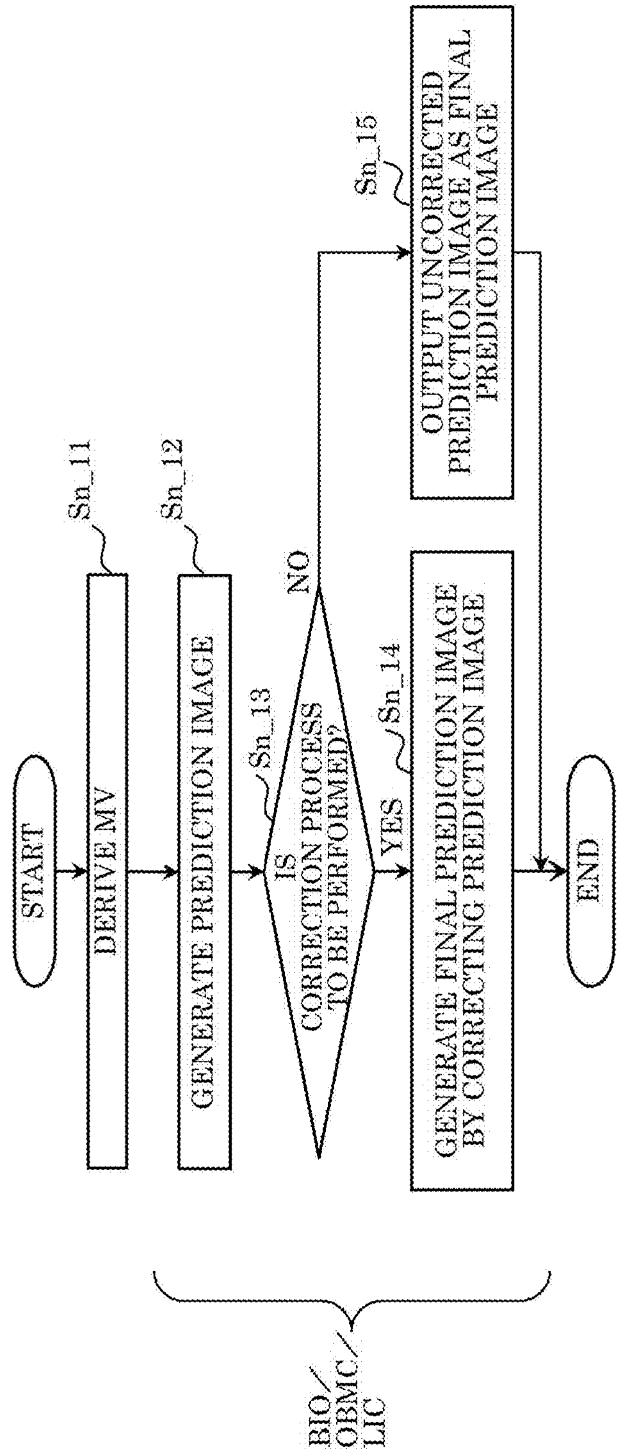
FIG. 93 is a flow chart illustrating another example of generation of a prediction image in the decoder.

FIG. 93 is a flow chart illustrating another example of generation of a prediction image in decoder 200.

Inter predictor 218 derives an MV for a current block (Step Sn_11). Next, inter predictor 218 generates a prediction image using the MV (Step Sn_12), and determines whether to perform a correction process (Step Sn_13). For example, inter predictor 218 obtains a prediction parameter included in the stream, and determines whether to perform a correction process based on the prediction parameter. This prediction parameter is, for example, a flag indicating whether each of the above-described modes is to be applied. Here, when determining to perform a correction process (Yes in Step Sn_13), inter predictor 218 generates the final prediction image by correcting the prediction image (Step Sn_14). It is to be noted that, in LIC, the luminance and chrominance of the prediction image may be corrected in Step Sn_14. When determining not to perform a correction process (No in Step Sn_13), inter predictor 218 outputs the final prediction image without correcting the prediction image (Step Sn_15).

[Motion Compensation>OBMC]

For example, when information parsed from a stream indicates that OBMC is to be performed, upon generating a prediction image, inter predictor 218 corrects the prediction image according to the OBMC.

Figure 94:
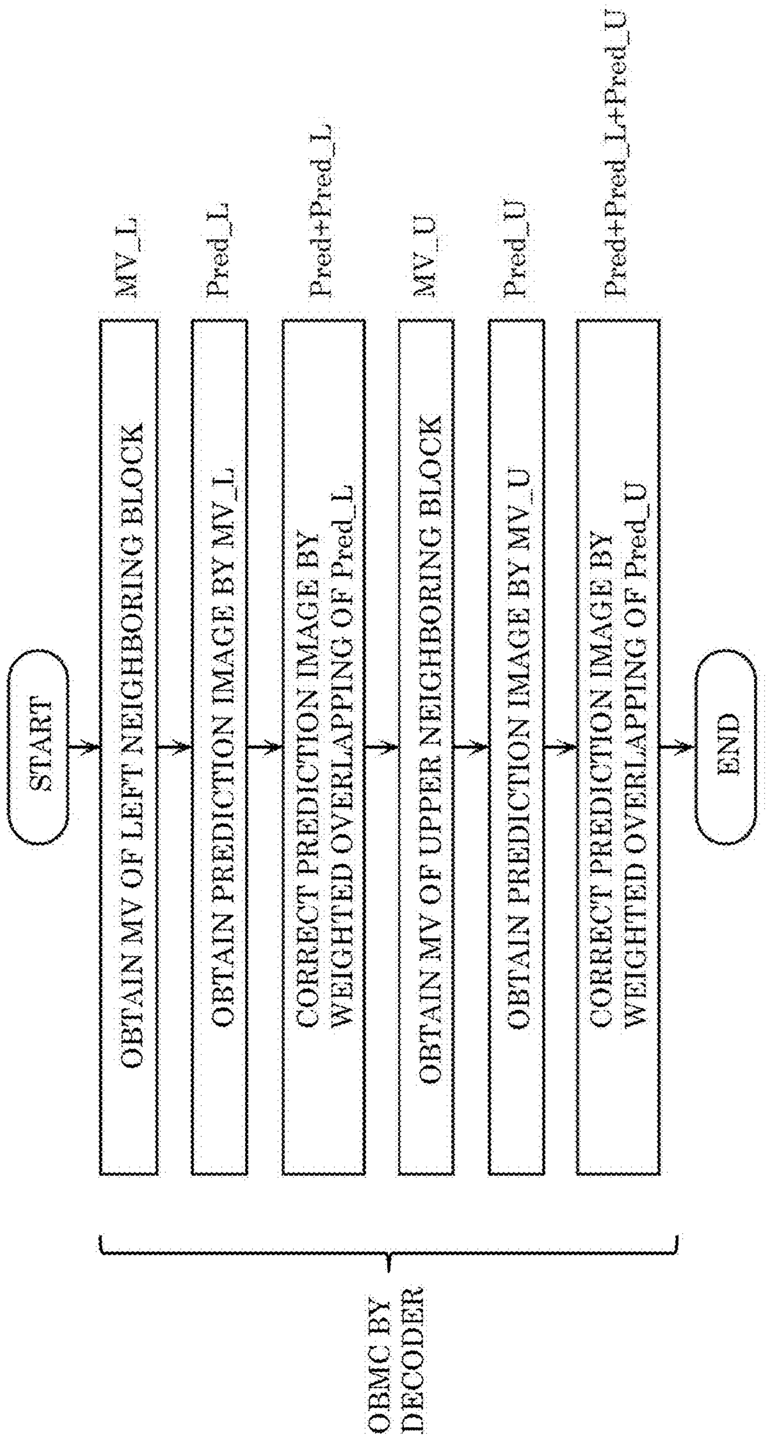
FIG. 94 is a flow chart illustrating another example of correction of a prediction image by OBMC in the decoder.

FIG. 94 is a flow chart illustrating an example of correction of a prediction image by OBMC in decoder 200. It is to be noted that the flow chart in FIG. 94 indicates the correction flow of a prediction image using the current picture and the reference picture illustrated in FIG. 62.

First, as illustrated in FIG. 62, inter predictor 218 obtains a prediction image (Pred) by normal motion compensation using an MV assigned to the current block.

Next, inter predictor 218 obtains a prediction image (Pred_L) by applying a motion vector (MV_L) which has been already derived for the decoded block neighboring to the left of the current block to the current block (re-using the motion vector for the current block). Inter predictor 218 then performs a first correction of a prediction image by overlapping two prediction images Pred and Pred_L. This provides an effect of blending the boundary between neighboring blocks.

Likewise, inter predictor 218 obtains a prediction image (Pred_U) by applying an MV (MV_U) which has been already derived for the decoded block neighboring above the current block to the current block (re-using the motion vector for the current block). Inter predictor 218 then performs a second correction of the prediction image by overlapping the prediction image Pred_U to the prediction images (for example, Pred and Pred_L) on which the first correction has been performed. This provides an effect of blending the boundary between neighboring blocks. The prediction image obtained by the second correction is the one in which the boundary between the neighboring blocks has been blended (smoothed), and thus is the final prediction image of the current block.

[Motion Compensation>BIO]

For example, when information parsed from a stream indicates that BIO is to be performed, upon generating a prediction image, inter predictor 218 corrects the prediction image according to the BIO.

FIG. 95 is a flow chart illustrating an example of correction of a prediction image by the BIO in decoder 200.

As illustrated in FIG. 63, inter predictor 218 derives two motion vectors (M0, M1), using two reference pictures ($Ref_0$, $Ref_1$) different from the picture (Cur Pic) including a current block. Inter predictor 218 then derives a prediction image for the current block using the two motion vectors (M0, M1) (Step Sy_11). It is to be noted that motion vector M0 is a motion vector ($MVx_0$, $MVy_0$) corresponding to reference picture $Ref_0$, and motion vector M1 is a motion vector ($MVx_1$, $MVy_1$) corresponding to reference picture $Ref_1$.

Next, inter predictor 218 derives interpolated image $I^0$ for the current block using motion vector M0 and reference picture L0. In addition, inter predictor 218 derives interpolated image $I^1$ for the current block using motion vector M1 and reference picture L1 (Step Sy_12). Here, interpolated image $I^0$ is an image included in reference picture $Ref_0$ and to be derived for the current block, and interpolated image $I^1$ is an image included in reference picture $Ref_1$ and to be derived for the current block. Each of interpolated image $I^0$ and interpolated image $I^1$ may be the same in size as the current block. Alternatively, each of interpolated image $I^0$ and interpolated image $I^1$ may be an image larger than the current block. Furthermore, interpolated image $I^0$ and interpolated image $I^1$ may include a prediction image obtained by using motion vectors (M0, M1) and reference pictures (L0, L1) and applying a motion compensation filter.

In addition, inter predictor 218 derives gradient images ($Ix^0$, $Ix^1$, $Iy^0$, $Iy^1$) of the current block, from interpolated image $I^0$ and interpolated image $I^1$ (Step Sy_13). It is to be noted that the gradient images in the horizontal direction are ($Ix^0$, $Ix^1$), and the gradient images in the vertical direction are ($Iy^0$, $Iy^1$). Inter predictor 218 may derive the gradient images by, for example, applying a gradient filter to the interpolated images. The gradient images may be the ones each of which indicates the amount of spatial change in pixel value along the horizontal direction or the amount of spatial change in pixel value along the vertical direction.

Next, inter predictor 218 derives, for each sub-block of the current block, an optical flow (vx, vy) which is a velocity vector, using the interpolated images ($I^0$, $I^1$) and the gradient images ($Ix^0$, $Ix^1$, $Iy^0$, $Iy^1$). As one example, a sub-block may be 4×4 pixel sub-CU.

Next, inter predictor 218 corrects a prediction image for the current block using the optical flow (vx, vy). For example, inter predictor 218 derives a correction value for the value of a pixel included in a current block, using the optical flow (vx, vy) (Step Sy_15). Inter predictor 218 may then correct the prediction image for the current block using the correction value (Step Sy_16). It is to be noted that the correction value may be derived in units of a pixel, or may be derived in units of a plurality of pixels or in units of a sub-block.

It is to be noted that the BIO process flow is not limited to the process disclosed in FIG. 95. Only part of the processes disclosed in FIG. 95 may be performed, or a different process may be added or used as a replacement, or the processes may be executed in a different processing order.

[Motion Compensation>LIC]

For example, when information parsed from a stream indicates that LIC is to be performed, upon generating a prediction image, inter predictor 218 corrects the prediction image according to the LIC.

FIG. 96 is a flow chart illustrating an example of correction of a prediction image by the LIC in decoder 200.

First, inter predictor 218 obtains a reference image corresponding to a current block from a decoded reference picture using an MV (Step Sz_11).

Next, inter predictor 218 extracts, for the current block, information indicating how the luma value has changed between the current picture and the reference picture (Step Sz_12). This extraction is performed based on the luma pixel values for the decoded left neighboring reference region (surrounding reference region) and the decoded upper neighboring reference region (surrounding reference region), and the luma pixel values at the corresponding positions in the reference picture specified by the derived MVs. Inter predictor 218 calculates a luminance correction parameter, using the information indicating how the luma value changed (Step Sz_13).

Inter predictor 218 generates a prediction image for the current block by performing a luminance correction process in which the luminance correction parameter is applied to the reference image in the reference picture specified by the MV (Step Sz_14). In other words, the prediction image which is the reference image in the reference picture specified by the MV is subjected to the correction based on the luminance correction parameter. In this correction, luminance may be corrected, or chrominance may be corrected.

[Prediction Controller]

Prediction controller 220 selects either an intra prediction image or an inter prediction image, and outputs the selected image to adder 208. As a whole, the configurations, functions, and processes of prediction controller 220, intra predictor 216, and inter predictor 218 at the decoder 200 side may correspond to the configurations, functions, and processes of prediction controller 128, intra predictor 124, and inter predictor 126 at the encoder 100 side.

[Geometric Partitioning Mode]

The present disclosure relates to mapping between geometric partitioning modes and intra prediction modes, and mapping between narrow-angle intra prediction modes and wide-angle intra prediction modes.

Some video codecs calculate predictions for each block of data within an image using data obtained from already encoded or decoded video signal and prediction information. In some modes, a final prediction is determined by calculating a weighted linear combination (sum) of two different predictions for the same block. Moreover, there is the possibility to combine the two different predictions for the same block according to a combination rule.

For example, different weights may be applied to the two predictions based on the positions of the pixels within the block. One example of a mode in which two different predictions for the same block are used to obtain a final prediction for the block is called GPM (Geometric Partitioning Mode). When a GPM is applied, a block is split along a linear line (boundary) into two partitions. The boundary may be defined by an angle with respect to a reference direction and a distance to the center of the block.

Figure 97:
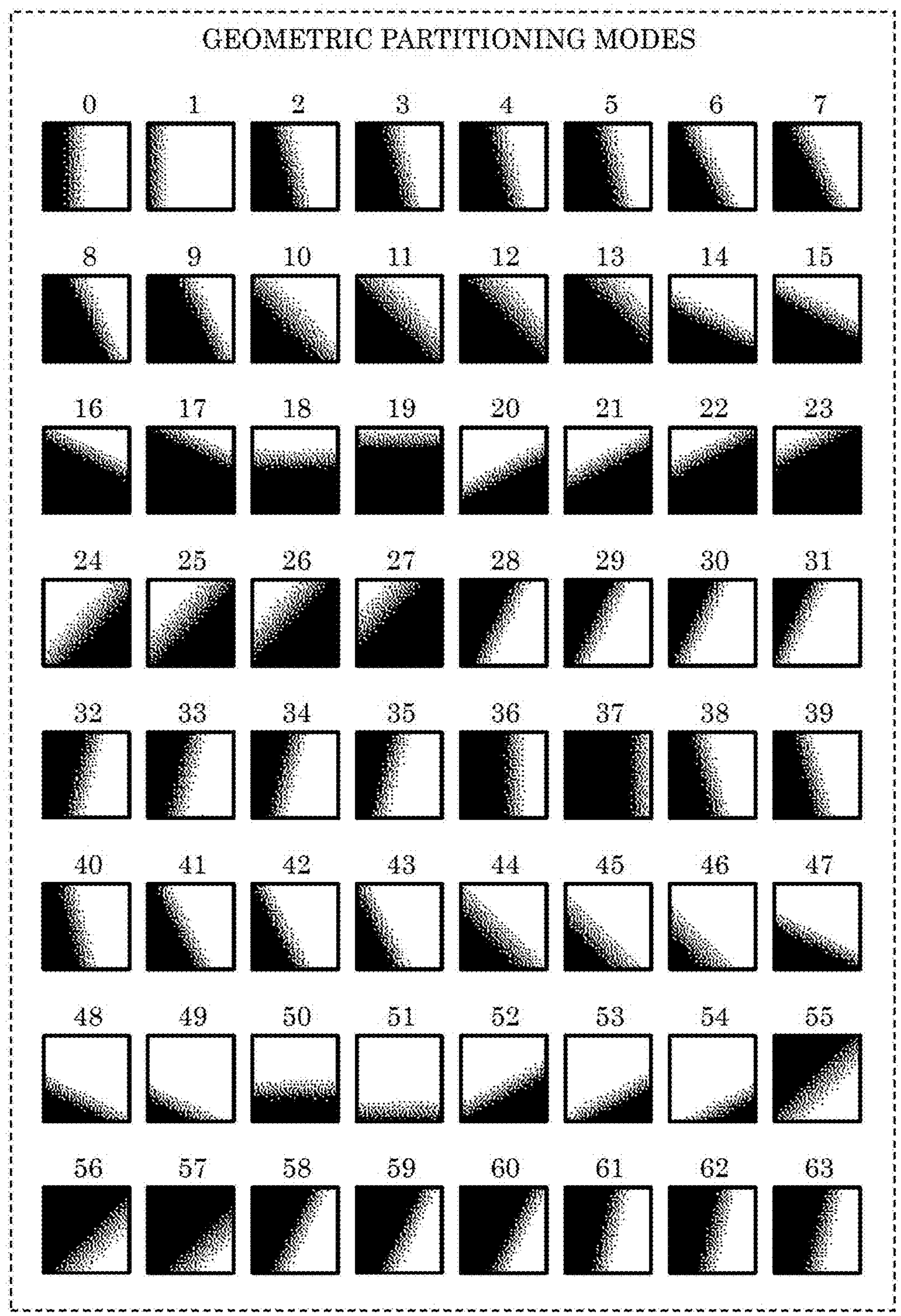
FIG. 97 is a conceptual diagram illustrating geometric partitioning modes according to VVC.

FIG. 97 is a conceptual diagram illustrating geometric partitioning modes (GPMs) according to VVC. The geometric partitioning modes identified using indices 0 to 63 differ from one another in one or both of the angle and the distance of the boundary.

Each panel of FIG. 97 illustrates two partitions and their respective weights w(x, y). Here, the weights are associated with the pixels at column x and row y of the two partitions of the block. For example, in FIG. 97, the white portion corresponds to the maximum weight, and the black portion corresponds to the minimum weight. The maximum weight may be 1, and the minimum weight may be 0.

The final prediction (pred(x, y)) may be calculated as a weighted sum of the two predictions pA (x, y) and pB (x, y) for the two partitions of the block using Equation (3) indicated below. In Equation (3), the maximum weight is set to 8 and the minimum weight is set to 0 in order to increase the granularity of the calculation for the final prediction. After calculation of the linear combination of prediction pA and prediction pB, the shift operation ">>3" which corresponds to a division by 8 is applied. In this manner, after the calculation is performed with the increased granularity, the prediction value is converted into a range of the pixel value.

[MATH. 4]

$$pred(x, y) = (w(x, y) * pA(x, y) + (8 - w(x, y)) * pB(x, y)) >> 3 \quad (3)$$

As illustrated in FIG. 97, the weights within the two GPM partitions are predominantly the maximum weight or the minimum weight. In a boundary region separating the two partitions from one another, the weights may be set to intermediate values, or the weights may gradually transition from the weight of the first partition to the weight of the second partition.

In GPM of VVC, the weights for two predictions pA and pB are determined based on the value of variable weightIdx. Variable weightIdx is determined by the position of each pixel within the block and the GPM mode selected. The following equation (4) shows an example of the calculation of weightIdx.

[MATH. 5]

$$weightIdx(x, y) = 32 \pm (((( x + offsetX) << 1) + 1) * disLut[disX] + (((y + offsetY) << 1) + 1) * disLut[disY]) \quad (4)$$

Here, disLut is a look-up table, such as the one specified in VVC. Moreover, offsetX and offsetY correspond to horizontal and vertical offsets of a separating line with respect to the center of the block, respectively, and determined by the block size and the index of the GPM mode. disX, disY and the subtraction or addition operation are determined by only the index of the GPM mode. disLut [disX], and disLut [disY] correspond to horizontal and vertical changes in weight, respectively.

[Mixed Intra/Inter Prediction for GPM]

In the exploration software known as an enhanced compression model (ECM), the GPM scheme from VVC is extended with new capabilities. One of these capabilities is to mix an intra-prediction and inter-prediction within the same block. These two predictions are combined according to one of the geometric partitioning modes as illustrated in FIG. 97.

In other words, for one of the two partitions, inter prediction is performed. For this purpose, the bitstream may include motion information indicating a reference picture and a reference block. For the other one of the two partitions, intra prediction is performed, e.g. according to an angular intra prediction mode as illustrated in FIG. 31.

The prediction in which inter prediction is applied to one of the two partitions and intra prediction is applied to the other one of the two partition is referred to as mixed intra/inter prediction. The mixed intra/inter prediction may be also referred to as a mixed intra/inter GPM prediction mode or GPM intra/inter.

It is noted that the term "inter prediction" indicates prediction derived from sample blocks of one or more reference pictures as determined by motion vectors. The term "intra prediction" indicates prediction derived from neighboring sample values in the same slice. The term "angular intra prediction mode", also referred to as a directional prediction mode, indicates a directional intra prediction method in which neighboring reference samples are estimated along a direction, and may be specified by a prediction angle, for example.

However, not all the intra-prediction modes may be meaningful for usage with GPM. For this reason, only some intra-prediction modes may be allowed for calculating the intra-prediction in the mixed intra/inter prediction. For example, only three intra-prediction modes are allowed in the mixed intra/inter prediction. As one of the three intra-prediction modes, the angular intra prediction mode having a prediction direction parallel to the boundary of the two partitions is allowed.

In other words, the angle of the angular intra prediction mode may correspond to the angle of the geometric partitioning mode, i.e. the angle of the boundary between the two GPM partitions. For this purpose, in the ECM, a look-up table is defined to map the geometric partitioning modes illustrated in FIG. 97 to angular intra prediction modes having a direction parallel to the boundary. As the result, the angular intra prediction mode specified for each GPM is set as an intra prediction mode to be used for intra prediction of a first partition.

Figure 98:
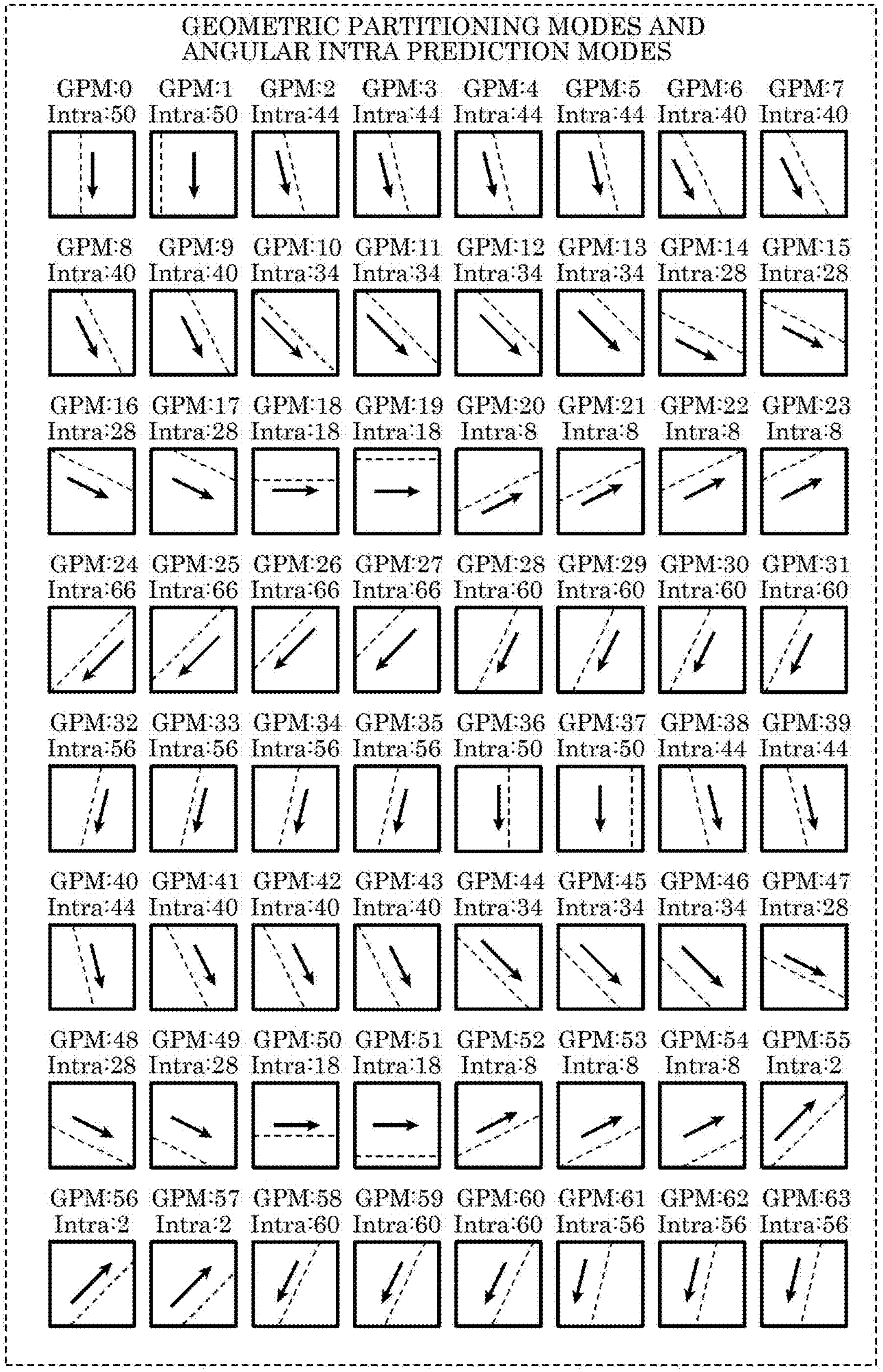
FIG. 98 is a conceptual diagram illustrating examples of mapping relation between geometric partitioning modes and angular intra prediction modes.

FIG. 98 is a conceptual diagram illustrating an example of mapping relation between geometric partitioning modes and angular intra prediction modes. In FIG. 98, the dotted line represents the boundary between two GPM partitions, whereas the arrow represents the direction of the angular intra prediction mode corresponding to the GPM. It is to be noted that the arrow corresponds to the direction from a reference source towards a reference destination, and corresponds to the copy direction of the pixel values.

As illustrated in FIG. 98, the arrow is parallel to the dotted line. In other words, the direction of the angular intra prediction mode is parallel to the boundary between the two GPM partitions.

FIG. 98 also illustrates, for each geometric partitioning mode, the index of the geometric partitioning mode, and the index of the angular intra prediction mode corresponding to the geometric partitioning mode. As illustrated in FIG. 98, for each geometric partitioning mode, an angular intra prediction mode is associated. Specifically, for the index of each geometric partitioning mode, the index of the angular intra prediction mode is associated.

Figure 99:
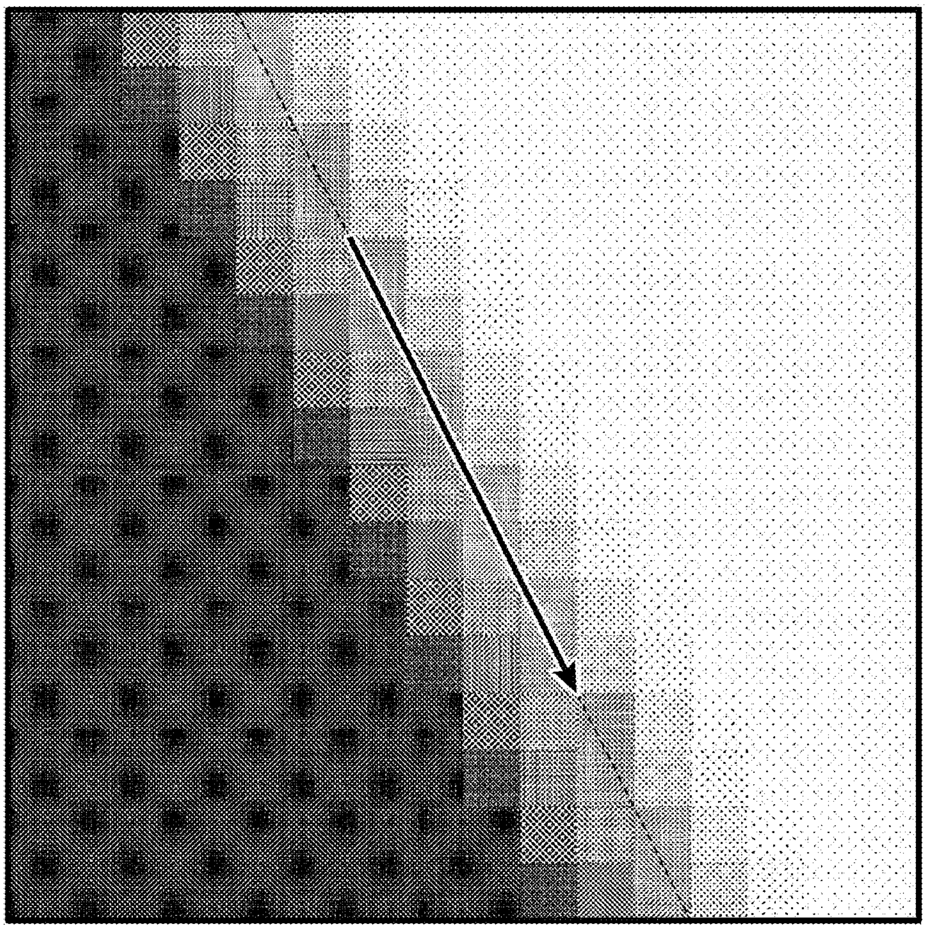
FIG. 99 is a conceptual diagram illustrating an example of mapping relation between one geometric partitioning mode and one angular intra prediction mode.

FIG. 99 is a conceptual diagram illustrating an example of mapping relation between one geometric partitioning mode and one angular intra prediction mode. Specifically, FIG. 99 illustrates an example of mapping relation between the geometric partitioning mode with index 6 and the angular intra prediction mode with index 40. The dotted line represents the boundary between two GPM partitions, whereas the arrow represents the direction of the angular intra prediction mode. It is to be noted that the arrow corresponds to the direction from a reference source towards a reference destination, and corresponds to the copy direction of the pixel values.

As illustrated in FIG. 99, the direction of the angular intra prediction mode associated with the GPM is parallel to the boundary between the two GPM partitions.

The other two intra prediction modes that can be selected for usage with the mixed intra/inter prediction in the ECM are typically dependent on a block rather than a GPM partition. The modes include decoder-side intra mode derivation (DIMD), template-based intra mode derivation (TIMD), or a mode used for the neighboring block.

[DIMD and TIMD]

When usage of DIMD is signaled in the bitstream, two angular intra prediction modes are derived based on gradient values of the reconstructed neighboring samples. The two predictors are combined with the planar intra prediction mode using weights derived from the gradient values.

In TIMD, matching of a template and candidate predictors of different intra prediction modes is performed. The intra prediction mode is derived by selecting the intra prediction mode with the best match. A template is an area of pixels in an already reconstructed adjacent block. The candidate predictors are generated from a reference line neighboring the template area. Matching is performed by calculating a similarity metric such as the sum of absolute differences (SAD) between the template samples and the candidate predictor samples. The intra prediction mode which results in the minimum SAD is chosen as the final derived intra prediction mode in TIMD.

The intra prediction modes derived in DIMD and TIMD are based on already coded neighboring signal. Accordingly, both DIMD-based intra prediction and TIMD-based intra prediction may be independent from the geometric partitioning mode. The details on DIMD is disclosed, for example, in Abdoli M., et al., "Non-CE3: Decoder-side Intra Mode Derivation with Prediction Fusion Using Planar", JVET-O0449, JVET (Joint Video Experts Team) of ITU-T SG 16 WP 3 and ISO/IEC JTC 1/SC 29/WG11, 15th Meeting, Goteborg, Sweden, July 3 through 12, 2019. The details on TIMD is disclosed, for example, in Cao K., et al., "EE2-related: Fusion for template-based intra mode derivation", JVET-W0123, JVET (Joint Video Experts Team) of ITU-T SG16 WP 3 and ISO/IEC JTC 1/SC 29, 23th Meeting, teleconference, July 7 through 16, 2021.

[Wide-Angle Intra Prediction Modes]

In VVC, for non-square rectangular blocks, additional angular intra prediction modes may be used, which are different from the intra-prediction modes for square blocks, as illustrated in FIG. 31, for example. Specifically, one or more angular intra prediction modes to be selected depending on the ratio of width and height of the block are each replaced with other angular intra prediction modes each having a prediction direction forming an angle greater than 45° with the horizontal or vertical direction. Here, the horizontal or vertical direction corresponds to the normal direction of a line of neighboring reference pixels.

Such additional angular intra prediction modes are called "wide-angle modes" or "wide-angle intra prediction modes". In contrast, angular intra-prediction modes each having a prediction direction forming an angle not greater than 45° with the horizontal or vertical direction, are called "narrow-angle modes" or "narrow-angle intra prediction modes".

If a block is non-square rectangular, one or more of the narrow-angle intra prediction modes are automatically mapped to one or more of the wide-angle intra prediction modes. In this manner, the narrow-angle intra prediction mode is replaced with another wide-angle intra prediction mode that has a direction substantially opposite to the direction of this narrow-angle intra prediction mode.

Specifically, a narrow-angle intra prediction mode with a first index is mapped to a wide-angle intra prediction mode having a direction exactly opposite to the direction of a narrow-angle intra prediction mode with a second index equal to the first index plus 1 or the first index minus 1.

This offset of +1 or −1 is due to the fact that the narrow-angle intra prediction modes include two narrow-angle intra prediction modes having a prediction direction exactly opposite to each other.

For example, the narrow-angle intra prediction modes include a narrow-angle intra prediction mode having a diagonal prediction direction of 45° from lower left to upper right, and a narrow-angle intra prediction mode with the exact opposite diagonal prediction direction. In order to prevent the mapping of one of the two narrow-angle intra prediction modes to the other of the two narrow-angle intra prediction modes, a narrow-angle intra prediction mode is mapped to another narrow-angle intra prediction mode having a prediction direction deviating from the exactly opposite prediction direction. Accordingly, in the mapping for a wide-angle intra prediction mode, an offset of +1 or −1 is applied.

Figure 100:
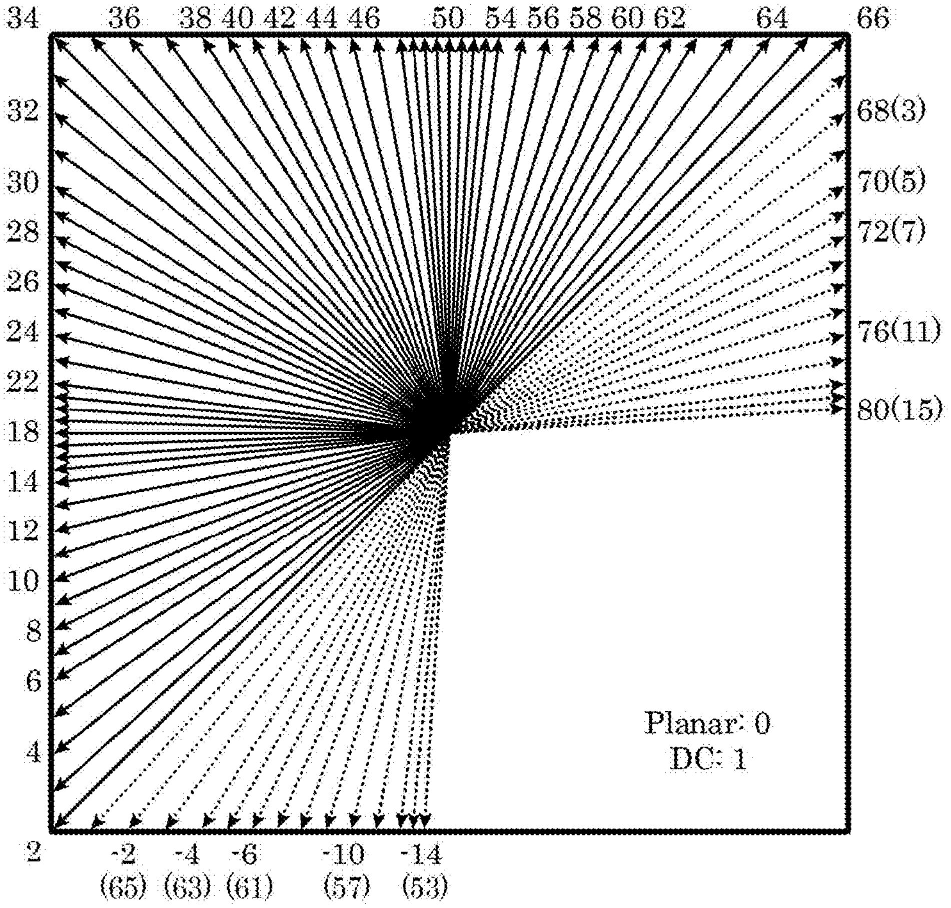
FIG. 100 is a diagram illustrating an example of intra prediction modes including narrow-angle intra prediction modes and wide-angle intra prediction modes.

FIG. 100 is a diagram illustrating an example of intra prediction modes including narrow-angle intra prediction modes and wide-angle intra prediction modes.

Specifically, in FIG. 100, narrow-angle intra prediction modes with indices of 2 to 66 and wide-angle intra prediction modes with indices of −14 to −1 and 67 to 80 are illustrated. The arrow in FIG. 100 corresponds to the direction towards a reference destination, and corresponds to the reference direction of the pixel values. The narrow-angle intra prediction modes are denoted by solid lines, and the wide-angle intra prediction mode are denoted by dashed lines.

The wide-angle intra prediction mode may be also referred to as WAIP mode. WAIP is an abbreviation of wide angle intra prediction.

If the narrow-angle intra prediction mode with index 2 is mapped to the narrow-angle intra prediction mode with index 66, these two narrow-angle intra prediction modes are equal to each other. As the result, the variations of the intra prediction modes are substantially reduced. Moreover, mapping of the narrow-angle intra prediction mode to the existing narrow-angle intra prediction mode may be a useless process.

In view of this, as illustrated in FIG. 100, for example, a narrow-angle intra prediction mode with index 2 is mapped to not the existing narrow-angle intra prediction mode with index 66 but a wide-angle intra prediction mode with index 67. The direction of the wide-angle intra prediction mode with index 67 is exactly opposite to the direction of the narrow-angle intra prediction mode with index 3.

As the result, a narrow-angle intra prediction mode with index 2 is mapped to the wide-angle intra prediction mode having a direction exactly opposite to the direction of the narrow-angle intra prediction mode with index to which an offset of +1 is applied.

As a further example, a narrow-angle intra prediction mode with index 66 is mapped to not the existing narrow-angle intra prediction mode with index 2 but a wide-angle intra prediction mode with index −1. The direction of the wide-angle intra prediction mode with index −1 is exactly opposite to the direction of the narrow-angle intra prediction mode with index 65.

As the result, a narrow-angle intra prediction mode with index 66 is mapped to the wide-angle intra prediction mode having a direction exactly opposite to the direction of the narrow-angle intra prediction mode with index to which an offset of −1 is applied.

In other words, for example, the wide-angle intra prediction mode having a direction exactly opposite to the direction of the narrow-angle intra prediction mode is obtained by mapping the narrow-angle intra prediction mode to the wide-angle intra prediction mode after an offset of +1 or −1 is applied to the index of the narrow-angle intra prediction mode.

Whether the offset is +1 or −1 depends on whether the narrow-angle intra prediction mode to be mapped is within the lower left quadrant or the upper right quadrant. Specifically, when the narrow-angle intra prediction mode to be mapped is within the lower left quadrant, the offset is +1, and when the narrow-angle intra prediction mode to be mapped is within the upper right quadrant, the offset is −1.

For example, resulting from the mapping of the lower-left narrow-angle intra prediction mode to the upper-right wide-angle intra prediction mode, pixels in the upper-right direction of the block can be used as reference samples for prediction instead of pixels in the lower-left direction of the block. This mapping is effective when the width of the block is greater than the height of the block.

Alternatively, for example, resulting from the mapping of the upper-right narrow-angle intra prediction mode to the lower-left wide-angle intra prediction mode, pixels in the lower-left direction of the block can be used as reference samples for prediction instead of pixels in the upper-right direction of the block. This mapping is effective when the height of the block is greater than the width of the block.

As illustrated in FIG. 100, the narrow-angle intra prediction mode having a direction exactly opposite to the direction of the narrow-angle intra prediction mode with index 2 is the narrow-angle intra prediction mode with index 66, and thus this mode already exists. For this reason, the narrow-angle intra prediction mode with index 2 is mapped to a wide-angle intra prediction mode with index 67. The direction of the wide-angle intra prediction mode with index 67 is not exactly opposite to the direction of the narrow-angle intra prediction mode with index 2.

In other words, in the mapping of the narrow-angle intra prediction mode to the wide-angle intra prediction mode, an angular corresponding to the prediction direction slightly changes.

Which of the narrow-angle intra prediction modes is mapped to a wide-angle intra prediction mode may be dependent on the shape of a current block. Specifically, which of the narrow-angle intra prediction modes is mapped to a wide-angle intra prediction mode may be dependent on the ratio of the height and the width of the current block. For example, a narrow-angle intra prediction mode to be mapped may be predefined for each pattern regarded as a ratio of the height and the width of the current block.

It is to be noted that 67 to 80 and −2 to −14 in FIG. 100 represent indices provisionally defined as indices of wide-angle intra prediction modes. In the actual process, 2 to 15 and 53 to 66 are used as indices of wide-angle intra prediction modes. In other words, 2 to 15 and 53 to 66 represent indices of narrow-angle intra prediction modes or indices of wide-angle intra prediction modes depending on the shape of the block.

[Mapping Relation between Geometric Partitioning Mode and Intra Prediction Mode]

In the case of non-square rectangular blocks, the mapping between geometric partitioning modes and intra prediction modes in the mixed intra/inter prediction is modified.

In the ECM, when the mixed intra/inter prediction of the geometric partitioning mode is performed, the mapping between geometric partitioning modes and intra prediction modes as described above is applied for all square blocks and all non-square rectangular blocks, independently from the shape of the block. Moreover, for non-square rectangular blocks, mapping between narrow-angle intra prediction modes and wide-angle intra prediction modes is applied.

However, as described above, in the mapping between narrow-angle intra prediction modes and wide-angle intra prediction modes, the direction of the narrow-angle intra prediction mode and the direction of the wide-angle intra prediction mode are not exactly opposite to each other. In the case of non-square rectangular blocks, this results in mapping of a narrow-angle intra prediction mode having a prediction direction parallel to the GPM boundary to a wide-angle intra prediction mode having a prediction direction not parallel to the GPM boundary.

Figure 101A:
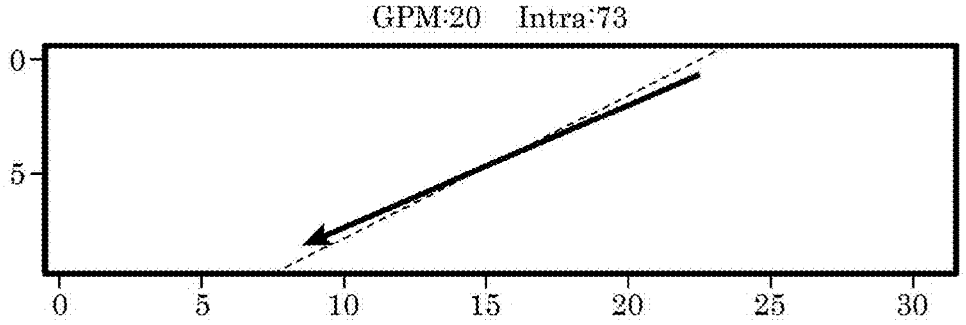

FIG. 101A is a conceptual diagram illustrating the first example of a relation between the geometric partitioning mode and the wide-angle intra prediction mode. FIG. 101A illustrates an example of applying the geometric partitioning mode with index 20 to a block of size 32×8 pixels. It is to be noted that the dotted line denotes the boundary defined by the geometric partitioning mode, and the arrow denotes the direction of the angular intra prediction mode. Moreover, the arrow corresponds to the direction from a reference source towards a reference destination, and corresponds to the copy direction of the pixel values.

As shown in FIG. 98, the geometric partitioning mode with index 20 is mapped to the narrow-angle intra prediction mode with index 8. Furthermore, the current block is a non-square rectangular block of size 32×8 pixels, and thus the narrow-angle intra prediction mode with index 8 is remapped to the wide-angle intra prediction mode with index 73 (see FIG. 100).

As can be seen in FIG. 101A, the resulting direction of the wide-angle intra prediction mode is not parallel to the boundary defined by the geometric partitioning mode with index 20. Accordingly, in the case of non-square rectangular blocks, the mapping between geometric partitioning modes and angular intra prediction modes is modified to make sure that the boundary defined by the geometric partitioning mode and the direction of the intra prediction are parallel to each other.

Figure 101B:
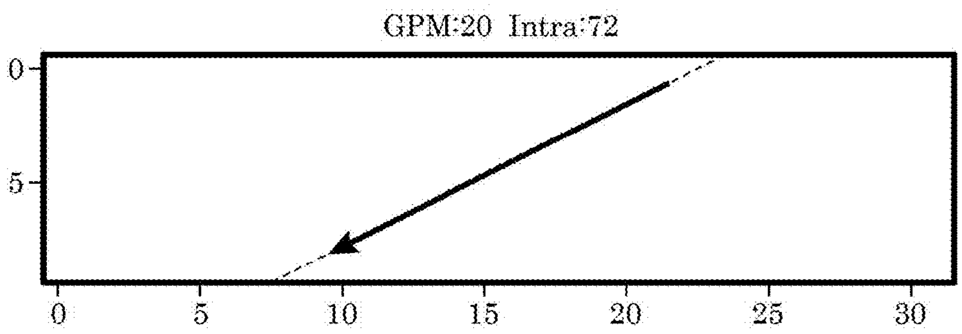

FIG. 101B is a conceptual diagram illustrating the second example of a relation between the geometric partitioning mode and the wide-angle intra prediction mode. As with the case of FIG. 101A, FIG. 101B illustrates an example of applying the geometric partitioning mode with index 20 to a block of size 32×8 pixels.

In this example, instead of the wide-angle intra prediction mode with index 73, the wide-angle intra prediction mode with index 72 is applied. The direction of the wide-angle intra prediction mode with index 72 is parallel to the boundary defined by the geometric partitioning mode with index 20.

Specifically, for a block of size 32×8 pixels, the geometric partitioning mode with index 20 is mapped to the narrow-angle intra prediction mode with index 7. This narrow-angle intra prediction mode corresponds to the narrow-angle intra prediction mode with index 7 obtained by subtracting 1 from index 8 of the narrow-angle intra prediction mode to which the geometric partitioning mode is mapped in the case of a square block.

The narrow-angle intra prediction mode with index 7 is then remapped to a wide-angle intra prediction mode with index 72. In this manner, the wide-angle intra prediction mode having a direction parallel to the boundary defined by the geometric partitioning mode with index 20 is obtained.

Specifically, the following equation (5) may be applied to the mapping between geometric partitioning modes and angular intra prediction modes.

[MATH. 6]

$$\begin{aligned}
&\text{if width} > \text{height}: \\
&\quad maxMode = \begin{cases} 8 + 2 * R \text{ if } R > 1 \\ 8 \text{ otherwise} \end{cases} \\
&\quad \text{if } intraAng == 2: \\
&\quad\quad intraAng = 66 \\
&\quad \text{else if } intraAng < maxMode: \\
&\quad\quad intraAng = intraAng - 1 \\
&\text{else if width} < \text{height}: \\
&\quad minMode = \begin{cases} 60 - 2 * R \text{ if } R > 1 \\ 60 \text{ otherwise} \end{cases} \\
&\quad \text{if } intraAng == 66: \\
&\quad\quad intraAng = 2 \\
&\quad \text{else if } intraAng > minMode: \\
&\quad\quad intraAng = intraAng + 1
\end{aligned} \tag{5}$$

Value R in equation (5) is calculated as the absolute different between the binary logarithms of width of the block and the binary logarithms of height of the block as illustrated in Equation (6). Value R corresponds to a difference between the width and height of the block. Specifically, value R corresponds to the ratio between the width and height of the block, more specifically, indicates the binary logarithms of the ratio between the width and height of the block. In other words, the ratio between the width and height of the block is indicated by 2 to the power of R.

[MATH. 7]

$$R = Abs(\text{Log2(width)} - \text{Log2(height)}) \tag{6}$$

Before applying Equation (5), firstly, the mapping between geometric partitioning modes and narrow-angle intra prediction modes in the case of square blocks is used to derive index intraAng of the narrow-angle intra prediction mode parallel to the boundary corresponding to the geometric partitioning mode. The direction of the narrow-angle intra prediction mode with index intraAng is parallel to the boundary defined by the geometric partitioning mode. Index intraAng indicates an angular intra prediction mode, and thus is neither equal to 0 (planar mode) nor equal to 1 (DC mode).

In the case of non-square rectangular blocks, i.e. when the width and height of the block are not equal in number of pixels, Equation (5) is applied to indices intraAng of 2 to 66. Equation (5) includes: the case for horizontal blocks whose width is greater in number of pixels than the height; and the case for vertical blocks whose width is smaller in number of pixels than the height.

If index intraAng is 2, which corresponds to the direction of 45° from lower left to upper right, for horizontal blocks whose width is greater in number of pixels than the height, then it is re-mapped to 66 which corresponds to the opposite direction of 45° from upper right to lower left.

Moreover, maximum index maxMode is calculated as 8+R×2 if value R is greater than 1, or is calculated as 8 if value R is not greater than 1. If index intraAng is smaller than maximum index maxMode, then the narrow-angle intra prediction mode with index intraAng is the narrow-angle intra prediction mode to be remapped to a wide-angle intra prediction mode.

Specifically, when index intraAng is smaller than maximum index maxMode, index intraAng is modified by subtracting 1 from index intraAng. This subtraction results in mapping the narrow-angle intra prediction mode with index intraAng to the neighboring narrow-angle intra prediction mode with index intraAng−1.

The neighboring narrow-angle intra prediction mode with index intraAng−1 is then remapped to a wide-angle intra prediction mode having a prediction direction parallel to the boundary defined by the geometric partitioning mode.

If index intraAng is 66, which corresponds to the direction of 45° from upper right to lower left, for vertical blocks whose width is smaller in number of pixels than the height, then it is re-mapped to 2 which corresponds to the opposite direction of 45° from lower left to upper right.

Moreover, minimum index minMode is calculated as 60−R×2 if value R is greater than 1, or is calculated as 60 if value R is not greater than 1. If index intraAng is greater than minimum index minMode, then the narrow-angle intra prediction mode with index intraAng is the narrow-angle intra prediction mode to be remapped to a wide-angle intra prediction mode.

Specifically, when index intraAng is greater than minimum index minMode, index intraAng is modified by adding 1 to index intraAng. This addition results in mapping the narrow-angle intra prediction mode with index intraAng to the neighboring narrow-angle intra prediction mode with index intraAng+1.

The neighboring narrow-angle intra prediction mode with index intraAng+1 is then remapped to a wide-angle intra prediction mode having a prediction direction parallel to the boundary defined by the geometric partitioning mode.

Figure 102A:
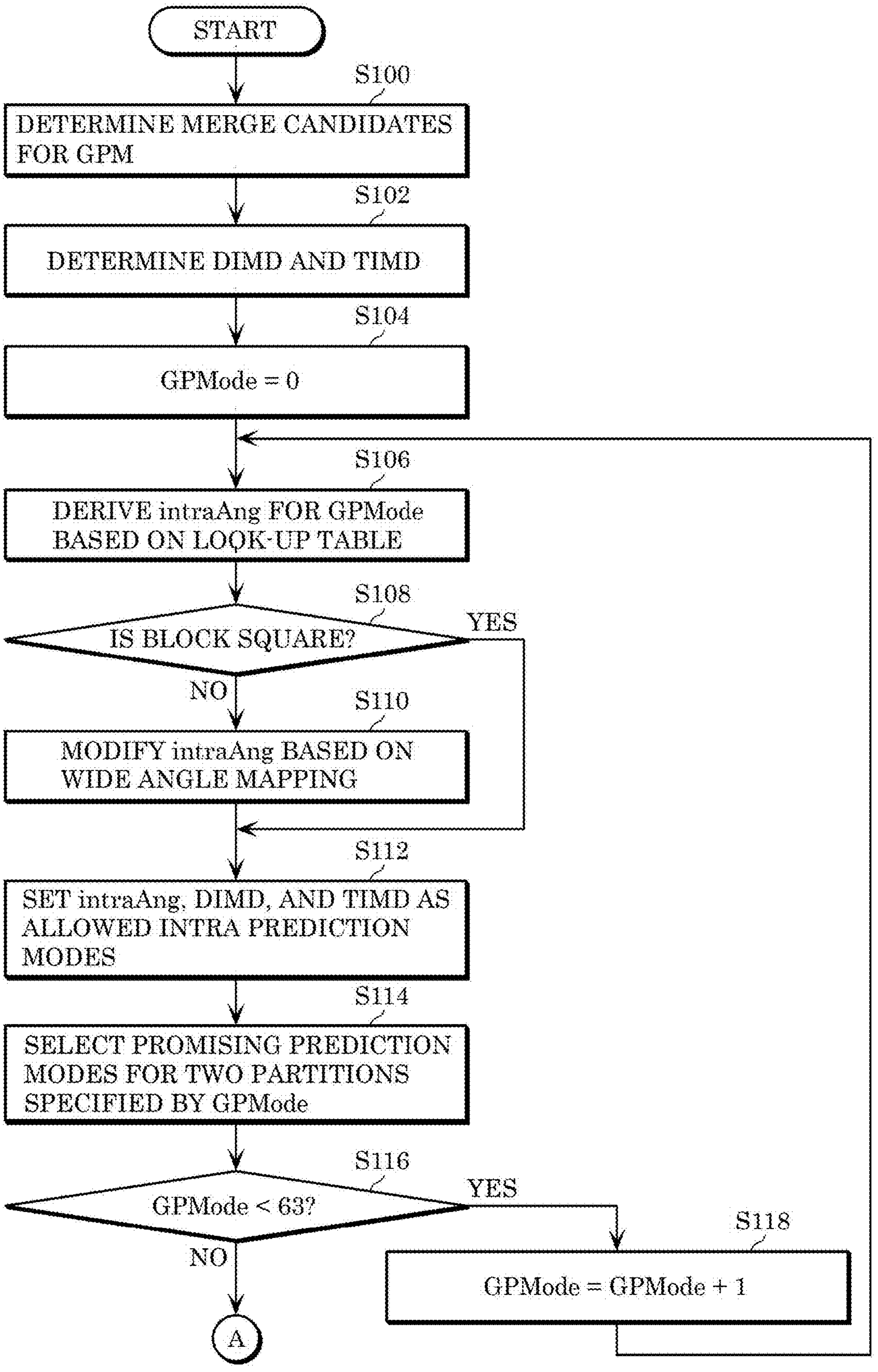
Figure 102B:
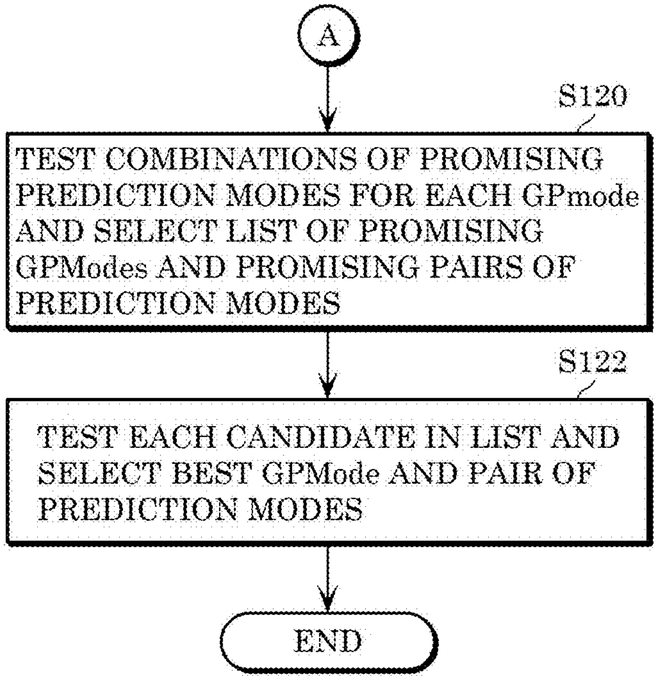

FIG. 102A and FIG. 102B illustrate a flow chart indicating an operation of determining parameters of the geometric partitioning mode. Specifically, FIG. 102A and FIG. 102B illustrate an example of a rate-distortion search performed by encoder 100 when encoding a block using the geometric partitioning mode.

Firstly, encoder 100 determines merge candidates of the current block for usage in the inter prediction of the geometric partitioning mode (S100). Encoder 100 also determines intra prediction candidates DIMD and TIMD for usage in the inter prediction of the geometric partitioning mode for the current block (S102). Subsequently, encoder 100 determines, for each geometric partitioning mode GPMode, a set of allowed intra prediction modes by applying a loop over all geometric partitioning modes GPModes, as detailed in the following.

In the loop, firstly, encoder 100 initializes geometric partitioning mode GPMode to 0 (S104). Encoder 100 then derives index intraAng of the narrow-angle intra prediction mode for geometric partitioning mode GPMode, based on a loop-up table (S106). Here, the look-up table corresponds to a mapping relation between geometric partitioning modes and narrow-angle intra prediction modes, e.g., as illustrated in FIG. 98.

Encoder 100 determines whether the shape of the block is square (S108). Specifically, encoder 100 may determine whether the height of the block is equal to the width of the block based on, for example, the number of pixels.

When the height of the block is not equal to the width of the block, encoder 100 determines that the shape of the block is not square (No in S108). In this case, for the mapping to the wide-angle intra prediction mode, encoder 100 modifies index intraAng as shown in Equation (5) (S110). When the block is square (Yes in S108), encoder 100 skips the modifying process (S110).

For geometric partitioning mode GPMode, encoder 100 then sets, as the allowed intra prediction modes, the narrow-angle intra prediction mode with index intraAng and intra prediction candidates DIMD and TIMD (S112).

For example, when intra prediction candidate DIMD or TIMD cannot be obtained due to at the border of the picture or the like, or when there is duplication of modes between the narrow-angle intra prediction mode with index intraAng and intra prediction candidates DIMD and TIMD, the number of allowed intra prediction modes decreases. When the number of allowed intra prediction modes is not enough, encoder 100 may set the intra prediction mode applied to neighboring blocks and/or the planar mode as additional allowed intra prediction modes.

Encoder 100 then selects promising prediction modes for the two partitions specified by geometric partitioning mode GPMode among from available prediction modes including the allowed intra prediction modes and merge candidates for inter prediction (S114).

Encoder 100 then continues the loop on geometric partitioning modes by checking the next value of geometric partitioning mode GPMode. Specifically, when geometric partitioning mode GPMode is less than the maximum value (Yes in step S116), encoder 100 increments geometric partitioning mode GPMode by 1 (S118). Here, the maximum value is, for example, 63 in VVC. Encoder 100 then repeats the operation from the process of deriving index intraAng (S106).

On the other hand, when geometric partitioning mode GPMode is not less than the maximum value (No in S116), encoder 100 ends the loop.

Encoder 100 tests combinations of promising prediction modes for each geometric partitioning mode GPMode using a rate-distortion cost. Encoder 100 then selects a list of promising geometric partitioning modes GPModes and promising pairs of prediction modes for predicting the block (S120).

Subsequently, encoder 100 tests each candidate in the list of promising geometric partitioning modes GPModes and pairs of prediction modes using the rate-distortion cost. Encoder 100 then selects, from among the candidates, the best geometric partitioning mode GPMode and pair of prediction modes for prediction of the block (S122). Encoder 100 then outputs the best geometric partitioning mode and pair of prediction modes for prediction of the block, and ends the processing. The prediction mode may be the inter prediction mode or the intra prediction mode.

Figure 103A:
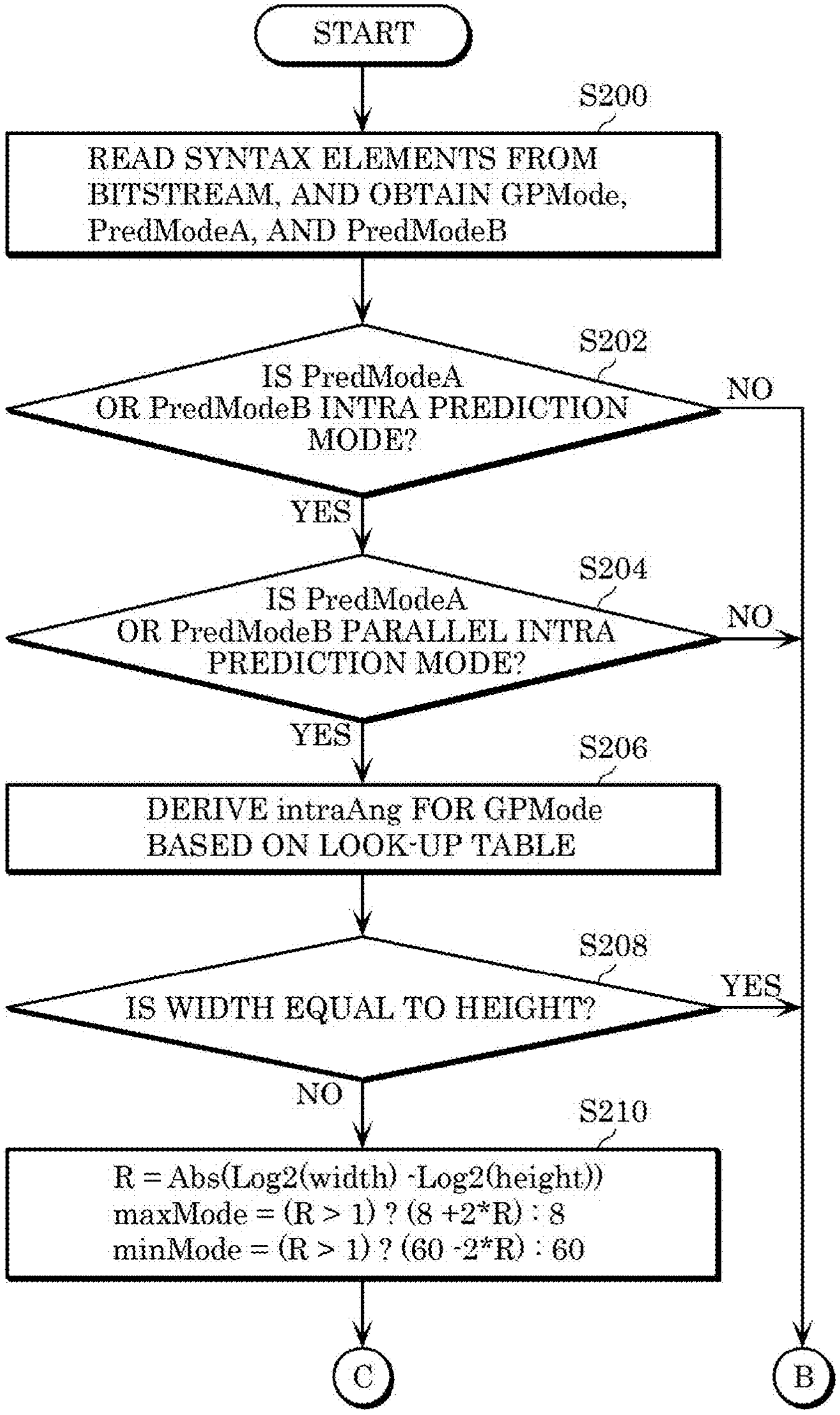
Figure 103B:
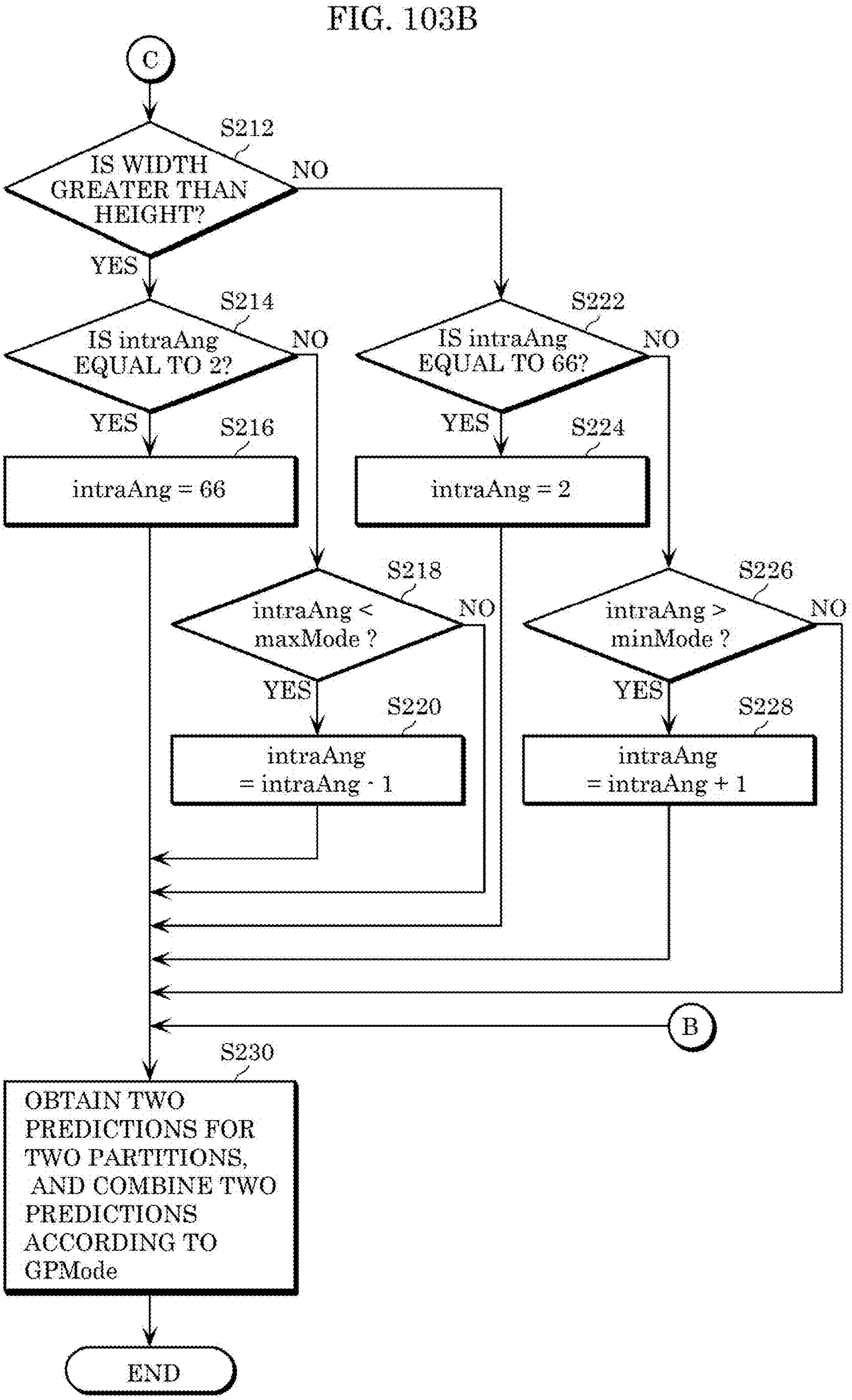

FIG. 103A and FIG. 103B illustrate a flow chart indicating an operation of performing prediction according to the geometric partitioning mode. For example, the operation illustrated in FIG. 103A and FIG. 103B is performed by decoder 200.

Firstly, decoder 200 reads, from the bitstream, syntax elements including a GPM indicator and two prediction mode indicators, for example. Here, the GPM indicator indicates the geometric partitioning mode GPMode to be applied to the current block among multiple geometric partitioning modes. The two prediction mode indicators indicate two prediction modes PredModeA and PredModeB. Decoder 200 then obtains a geometric partitioning mode GPMode and two prediction modes PredModeA and PredModeB for two partitions A and B (S200).

Next, decoder 200 determines whether one of two prediction modes PredModeA and PredModeB is an intra prediction mode (S202). When one of two prediction modes PredModeA and PredModeB is an intra prediction mode (Yes in S202), decoder 200 further determines whether the one of PredModeA and PredModeB is a parallel intra prediction mode (S204).

In other words, decoder 200 determines whether one of PredModeA and PredModeB is the angular intra prediction mode having a prediction direction parallel to the boundary in geometric partitioning mode GPMode.

When one of PredModeA and PredModeB is the parallel intra prediction mode (Yes in S204), decoder 200 derives index intraAng of the narrow-angle intra prediction mode for the geometric partitioning mode GPMode based on the look-up table (S206). This look-up table corresponds to a mapping relation between geometric partitioning modes and narrow-angle intra prediction modes.

Next, decoder 200 determines whether the width of the block is equal to the height of the block (S208). Specifically, decoder 200 determines whether the number of pixels in the width of the block is equal to the number of pixels in the height of the block.

When the width of the block is not equal to the height of the block (No in S208), the block is non-square rectangular. Decoder 200 therefore adjusts index intraAng in the following steps (S210 to S228) as shown in Equation (5).

Specifically, decoder 200 calculates value R as shown in Equation (5). Maximum index maxMode of the narrow-angle intra prediction modes mapped to the wide-angle intra prediction modes for horizontal blocks is also calculated as shown in Equation (5). Minimum index minMode of the narrow-angle intra prediction modes mapped to the wide-angle intra prediction modes for vertical blocks is also calculated as shown in Equation (5) (S210).

Decoder 200 then determines whether the width is greater than the height (S212). In other words, decoder 200 determines whether the non-square rectangular block is a horizontal block whose width is greater than the height or a vertical block whose width is smaller than the height.

When the width is greater than the height (Yes in S212), decoder 200 determines whether index intraAng is equal to 2 (S214). When index intraAng is equal to 2 (Yes in S214), decoder 200 changes index intraAng to 66 (S216). When index intraAng is not equal to 2 (No in S214), decoder 200 determines whether index intraAng is smaller than maximum index maxMode (S218).

When index intraAng is smaller than maximum index maxMode (Yes in S218), decoder 200 decrements index intraAng by 1 (S220). In this manner, decoder 200 changes the narrow-angle intra prediction mode with index intraAng to the neighboring narrow-angle intra prediction mode.

When the width is not greater than the height (No in S212), decoder 200 determines whether index intraAng is equal to 66 (S222). When index intraAng is equal to 66 (Yes in S222), decoder 200 changes index intraAng to 2 (S224). When index intraAng is not equal to 66 (No in S222), decoder 200 determines whether index intraAng is greater than minimum index minMode (S226).

When index intraAng is greater than minimum index minMode (Yes in S226), decoder 200 increments index intraAng by 1 (S228). In this manner, decoder 200 changes the narrow-angle intra prediction mode with index intraAng to the neighboring narrow-angle intra prediction mode.

When neither of two prediction modes PredModeA and PredModeB is the intra prediction mode (No in S202), decoder 200 uses another prediction mode without calculating index intraAng of the narrow-angle intra prediction mode. When neither of two prediction modes PredModeA and PredModeB is the parallel intra prediction mode (No in S204), decoder 200 uses another prediction mode without calculating index intraAng of the narrow-angle intra prediction mode.

Moreover, when the width of the block is equal to the height (Yes in S208), decoder 200 uses the narrow-angle intra prediction mode with index intraAng without changing index intraAng. Moreover, when index intraAng is changed to 66 (S216) or when index intraAng is changed to 2 (S224), decoder 200 uses the narrow-angle intra prediction mode with changed index intraAng.

Moreover, when index intraAng is not smaller than maximum index maxMode (No in S218), decoder 200 uses the narrow-angle intra prediction mode with index intraAng without changing index intraAng. Moreover, when index intraAng is not greater than minimum index minMode (No in S226), decoder 200 uses the narrow-angle intra prediction mode with index intraAng without changing index intraAng.

Moreover, when index intraAng is decremented by 1 (S220), decoder 200 uses the wide-angle intra prediction mode by remapping the narrow-angle intra prediction mode with decremented index intraAng to the wide-angle intra prediction mode. Moreover, when index intraAng is incremented by 1 (S228), decoder 200 uses the wide-angle intra prediction mode by remapping the narrow-angle intra prediction mode with incremented index intraAng to the wide-angle intra prediction mode.

Decoder 200 then calculates two predictions for two partitions of geometric partitioning mode GPMode according to two prediction modes PredModeA and PredModeB. Furthermore, decoder 200 calculates the prediction for the current block by combining the two predictions according to Equation (3) and Equation (4) corresponding to geometric partitioning mode GPMode, for example (S230). Decoder 200 then outputs the prediction for the current block and ends the prediction operation.

[Variations]

In the foregoing examples, a narrow-angle intra prediction mode having a prediction direction parallel to the boundary of the geometric partitioning mode is determined. However, another narrow-angle intra prediction mode which has a relation other than parallel with the GPM boundary may be determined.

In other words, the mapping of narrow-angle intra prediction modes to wide-angle intra prediction mode may be applied to any narrow-angle angular intra prediction mode selected for one of two partitions in the geometric partitioning mode. In other words, for example, the mapping as defined by Equation (5) may be applied to any narrow-angle intra prediction mode.

For example, the narrow-angle intra prediction mode is selected depending on the angle of the GPM boundary. A narrow-angle intra prediction mode having a prediction direction perpendicular to the GPM boundary may be selected. The geometric partitioning mode and the narrow-angle intra prediction mode are not limited to be associated with each other in parallel or perpendicular, but may be associated with each other in any manner based on the boundary angle and the prediction direction.

For example, a narrow-angle intra prediction mode having a prediction direction close to parallel to the GPM boundary may be selected. For example, a narrow-angle intra prediction mode having a prediction direction forming a given angular difference with the GPM boundary may be selected.

Even when the geometric partitioning mode and the narrow-angle intra prediction mode are associated with each other in any manner, the narrow-angle intra prediction mode selected for square blocks according to the association can be adapted to non-square rectangular blocks using Equation (5). In other words, the narrow-angle intra prediction mode is mapped to the wide-angle intra prediction mode while maintaining the angle between the prediction direction and the boundary.

With the above configuration, even when a block is non-square, there is a possibility to split the block along the edge of the object using the geometric partitioning mode and perform prediction along the edge of the object using the intra prediction mode. Specifically, when the intra prediction and the inter prediction are used in combination in the geometric partitioning mode, there is a possibility to use the wide-angle intra prediction mode whose angle is correctly adjusted. Accordingly, there is a possibility to accurately predict the blocks located at the boundary between objects.

In the foregoing example, the present disclosure is implemented by modifying an existing video coding standard such as VVC, in particular in respect to a geometric partitioning mode. However, the method according to the present disclosure is not limited to be used in VVC or another existing video coding standard. Multiple aspects applying to the method according to the present disclosure are described below.

According to a first aspect, provided is a method for decoding a current block of a video from a bitstream. The method comprises determining two partitions of the current block according to a geometric partitioning mode (GPM) in which the current block is divided into two partitions along a boundary defined by an angle and a position.

For a first partition from among the two partitions, an angular intra prediction mode associated with the GPM is determined using a mapping relation between a plurality of GPMs and a plurality of angular intra prediction modes.

In the determining the angular intra prediction mode, a first mapping relation is applied when the current block is a square block, and a second mapping relation different from the first mapping relation is applied when the current block is a non-square block. Further, the method comprises calculating a prediction for the first partition according to the determined angular intra prediction mode.

As described above, the GPM may be a GPM according to VVC. However, the present disclosure is not limited to VVC, but may be applied to any GPM. Here, the GPM is, for example, a mode in which the current block is divided into two partitions according to a specific procedure associated with the GPM.

In other words, for one of the two partitions, mapping is performed to determine an angular intra prediction mode associated with the GPM. The mapping differs depending on whether the current block is a square block or a non-square block.

Here, the square block is a rectangular block having a height equal to its width. The non-square block is a rectangular block having a height not equal to its width. The non-square block may be a horizontal block having a height smaller than its width or a vertical block having a height greater than its width.

The mapping relations may be predefined for each block shape (specifically, the ratio of width and height), or may be selected based on the block shape, for example. In other words, for example, the second mapping relation is selected according to the shape of the current block.

For example, the first mapping relation and the second mapping relation are each a mapping relation between the plurality of geometric partitioning modes and a plurality of narrow-angle intra prediction modes. The second mapping relation differs from the first mapping relation in mapping between a subset of the plurality of geometric partitioning modes and a subset of the plurality of narrow-angle intra prediction modes. In the calculating of the prediction for the first partition, the determined narrow-angle intra prediction mode is remapped to a wide-angle intra prediction mode when the determined narrow-angle intra prediction mode is included in the subset of the plurality of narrow-angle intra prediction modes.

A narrow-angle intra prediction mode is an angular intra prediction mode having a prediction direction not exceeding 45° from a vertical or horizontal reference direction. For example, as illustrated in FIG. 31, a narrow-angle intra prediction mode may have a reference direction extending from a center of a square block towards an upper left half of the square block including a diagonal in the case where the square block is separated by the diagonal passing through the lower left corner and the upper right corner of the square block.

A wide-angle intra prediction mode is an angular intra prediction mode having a prediction direction exceeding 45° from the vertical or horizontal reference direction. For example, a wide-angle intra prediction mode may be an angular intra prediction mode having a reference direction extending from the center of a square block towards an upper right direction on the right of the direction of the narrow-angle intra prediction mode or towards a lower left direction below the direction of the narrow-angle intra prediction mode.

The remapping may remap a narrow-angle intra prediction mode having a reference direction towards a lower left direction to a wide-angle intra prediction mode having a reference direction towards an upper right direction. Alternatively, a narrow-angle intra prediction mode having a reference direction towards an upper right direction may be remapped to a wide-angle intra prediction mode having a reference direction towards a lower left direction.

For example, for a GPM included in the subset of the plurality of GPMs, the second mapping relation differs from the first mapping relation in that:

(first difference) for example, the GPM included in the subset of the plurality of GPMs is mapped by the first mapping relation to a non-diagonal narrow-angle intra prediction mode with index i, and in this case, the same GPM is mapped by the second mapping relation to a narrow-angle intra prediction mode with index j obtained by adding or subtracting a fixed offset to or from index i; and (second difference) for example, the GPM included in the subset of the plurality of GPMs is mapped by the first mapping relation to a diagonal narrow-angle intra prediction mode, and in this case, the same GPM is mapped by the second mapping relation to a diagonal narrow-angle intra prediction mode having an opposite direction.

Here, the diagonal narrow-angle intra prediction mode is a narrow-angle intra prediction mode having a reference direction from the center of a square block towards the lower left corner, or a narrow-angle intra prediction mode having a reference direction from the center of a square block towards the upper right corner. The non-diagonal narrow-angle intra prediction mode is a narrow-angle intra prediction mode different from the diagonal narrow-angle intra prediction mode.

For example, whether to add or subtract the fixed offset to or from index i in the determining of index j is determined based on the shape of the current block.

For example, the fixed offset is added to index i to determine index j when the width of the current block is smaller than the height of the current block. The fixed offset is subtracted from index i to determine index j when the width of the current block is larger than the height of the current block.

For example, the fixed offset is 1.

In other words, the GPM to be mapped by the first mapping relation to a specific narrow-angle intra prediction mode is mapped by the second mapping relation to a narrow-angle intra prediction mode next to the specific narrow-angle intra prediction mode. Moreover, the GPM to be mapped by the first mapping relation to a diagonal narrow-angle intra prediction mode is mapped by the second mapping relation to a diagonal narrow-angle intra prediction mode with an opposite direction. In terms of the above, the second mapping relation may differ from the first mapping relation.

The diagonal narrow-angle intra prediction mode may be, for example, the narrow-angle intra prediction mode with index 2 or 66 in FIG. 100.

For example, the subset of the plurality of narrow-angle intra prediction modes depends on a shape of the current block. For example, the subset of the plurality of GPMs depends on a shape of the current block.

In other words, the narrow-angle prediction modes to be remapped to the wide-angle intra prediction modes may differ depending on the shape of the current block. The shape of the current block may be determined by the ratio of the height to the width or the ratio of the width to the height. The number of narrow-angle intra prediction modes included in the subset may increase with a larger ratio.

For example, for horizontal blocks, the subset may include a diagonal narrow-angle intra prediction mode and a plurality of narrow-angle intra prediction modes following the diagonal narrow-angle intra prediction mode. Here, for example, the diagonal narrow-angle intra prediction mode is the narrow-angle intra prediction mode with index 2 in FIG. 100. The plurality of narrow-angle intra prediction modes following the diagonal narrow-angle intra prediction mode are the narrow-angle intra prediction modes with indices 3, 4, 5, . . . in FIG. 100.

For example, for vertical blocks, the subset may include a diagonal narrow-angle intra prediction mode and a plurality of narrow-angle intra prediction modes following the diagonal narrow-angle intra prediction mode. Here, for example, the diagonal narrow-angle intra prediction mode is the narrow-angle intra prediction mode with index 66 in FIG. 100. The plurality of narrow-angle intra prediction modes following the diagonal narrow-angle intra prediction mode are the narrow-angle intra prediction modes with indices 65, 64, 63, . . . in FIG. 100.

For example, a direction of a narrow-angle intra prediction mode determined according to the first mapping relation is parallel to the GPM boundary. A direction of a narrow-angle intra prediction mode determined according to the second mapping relation and not included in the subset is parallel to the GPM boundary.

Furthermore, a direction of a diagonal narrow-angle intra prediction mode determined according to the second mapping relation and included in the subset is parallel to the GPM boundary. A direction of a non-diagonal narrow-angle intra prediction mode determined according to the second mapping relation and included in the subset is remapped to a wide-angle intra prediction mode having a direction parallel to the GPM boundary.

However, the relation between the GPM boundary and the narrow-angle intra prediction mode is not limited to in parallel.

For example, an angle between the direction of the narrow-angle intra prediction mode determined according to the first mapping relation and the GPM boundary is a certain angle. An angle between the direction of the narrow-angle intra prediction mode determined according to the second mapping relation and not included in the subset and the GPM boundary is the same certain angle.

Furthermore, an angle between the direction of the diagonal narrow-angle intra prediction mode determined according to the second mapping relation and included in the subset and the GPM boundary is a certain angle. The non-diagonal narrow-angle intra prediction mode determined according to the second mapping relation and included in the subset is remapped to the wide-angle intra prediction mode having a direction forming the same certain angle with the GPM boundary.

For example, the first mapping relation is a mapping relation between the plurality of GPMs and a plurality of narrow-angle intra prediction modes. The second mapping relation is a mapping relation between the plurality of GPMs and a plurality of angular intra prediction modes including a plurality of narrow-angle intra prediction modes and one or more wide-angle intra prediction modes. In other words, the single mapping may be performed. The remapping does not need to be performed.

For example, in the second mapping relation, mapping between the plurality of GPMs and the plurality of angular intra prediction modes including the plurality of narrow-angle intra prediction modes and the one or more wide-angle intra prediction modes may depend on a shape of the current block.

For example, furthermore, a GPM indicator indicating a GPM to be applied to the current block among a plurality of GPMs is decoded from the bitstream. In other words, it may be determined based on the GPM indicator decoded from the bitstream which GPM is to be applied for prediction of the current block.

For example, a first prediction mode indicator for the first partition and a second prediction mode indicator for a second partition are also decoded from the bitstream. The first prediction mode indicator indicates that an angular intra prediction mode associated with the GPM is to be used for prediction of the first partition.

It is to be noted that according to the GPM, a block is divided into two partitions, i.e., a first GPM partition (GPM partition A) and a second GPM partition (GPM partition B).

The first partition in the above description is not necessarily the first GPM partition (GPM partition A), and the second partition is also not necessarily the second GPM partition (GPM partition B). The intra prediction is performed for one of the two GPM partitions.

Moreover, whether or not to perform the intra prediction may be indicated in the bitstream by two prediction mode indicators corresponding to two prediction modes PredModeA and PredModeB as illustrated in FIG. 103A and FIG. 103B, for example.

For example, the second prediction mode indicator may indicate an inter prediction mode to be used for prediction of the second partition.

As described above, the second partition is also not necessarily the second GPM partition (GPM partition B). The second partition may be the first GPM partition (GPM partition A). In other words, for example, a partition for which the intra prediction is performed corresponds to the first partition. The other partition for which another prediction such as inter prediction may be performed corresponds to the second partition.

For example, furthermore, prediction for the second partition is calculated according to an inter prediction mode. The prediction for the current block is calculated by combining the prediction for the first partition and the prediction for the second partition.

For example, the prediction for the current block may be determined by calculating a weighted linear combination of the prediction for the first partition and the prediction for the second partition.

According to a second aspect, provided is a method for encoding a current block of a video into a bitstream. The method comprises determining two partitions of the current block according to a geometric partitioning mode (GPM) in which the current block is divided into two partitions along a boundary defined by an angle and a position.

For a first partition from among the two partitions, an angular intra prediction mode associated with the GPM is determined using a mapping relation between a plurality of GPMs and a plurality of angular intra prediction modes.

In the determining the angular intra prediction mode, a first mapping relation is applied when the current block is a square block, and a second mapping relation different from the first mapping relation is applied when the current block is a non-square block. Further, the method comprises calculating a prediction for the first partition according to the determined angular intra prediction mode.

For example, the second mapping relation is selected according to the shape of the current block.

For example, the first mapping relation and the second mapping relation are each a mapping relation between the plurality of geometric partitioning modes and a plurality of narrow-angle intra prediction modes. The second mapping relation differs from the first mapping relation in mapping between a subset of the plurality of geometric partitioning modes and a subset of the plurality of narrow-angle intra prediction modes. In the calculating of the prediction for the first partition, the determined narrow-angle intra prediction mode is remapped to a wide-angle intra prediction mode when the determined narrow-angle intra prediction mode is included in the subset of the plurality of narrow-angle intra prediction modes.

For example, for a GPM included in the subset of the plurality of GPMs, the second mapping relation differs from the first mapping relation in that:

(first difference) for example, the GPM included in the subset of the plurality of GPMs is mapped by the first mapping relation to a non-diagonal narrow-angle intra prediction mode with index i, and in this case, the same GPM is mapped by the second mapping relation to a narrow-angle intra prediction mode with index j obtained by adding or subtracting a fixed offset to or from index i; and (second difference) for example, the GPM included in the subset of the plurality of GPMs is mapped by the first mapping relation to a diagonal narrow-angle intra prediction mode, and in this case, the same GPM is mapped by the second mapping relation to a diagonal narrow-angle intra prediction mode having an opposite direction.

For example, whether to add or subtract the fixed offset to or from index i in the determining of index j is determined based on the shape of the current block.

For example, the fixed offset is added to index i to determine index j when the width of the current block is smaller than the height of the current block. The fixed offset is subtracted from index i to determine index j when the width of the current block is larger than the height of the current block.

For example, the fixed offset is 1.

In other words, the GPM to be mapped by the first mapping relation to a specific narrow-angle intra prediction mode is mapped by the second mapping relation to a narrow-angle intra prediction mode next to the specific narrow-angle intra prediction mode. Moreover, the GPM to be mapped by the first mapping relation to a diagonal narrow-angle intra prediction mode is mapped by the second mapping relation to a diagonal narrow-angle intra prediction mode with an opposite direction. In terms of the above, the second mapping relation may differ from the first mapping relation.

For example, the subset of the plurality of narrow-angle intra prediction modes depends on a shape of the current block. For example, the subset of the plurality of GPMs depends on a shape of the current block.

For example, a direction of a narrow-angle intra prediction mode determined according to the first mapping relation is parallel to the GPM boundary. A direction of a narrow-angle intra prediction mode determined according to the second mapping relation and not included in the subset is parallel to the GPM boundary.

Furthermore, a direction of a diagonal narrow-angle intra prediction mode determined according to the second mapping relation and included in the subset is parallel to the GPM boundary. A direction of a non-diagonal narrow-angle intra prediction mode determined according to the second mapping relation and included in the subset is remapped to a wide-angle intra prediction mode having a direction parallel to the GPM boundary.

For example, an angle between the direction of the narrow-angle intra prediction mode determined according to the first mapping relation and the GPM boundary is a certain angle. An angle between the direction of the narrow-angle intra prediction mode determined according to the second mapping relation and not included in the subset and the GPM boundary is the same certain angle.

Furthermore, an angle between the direction of the diagonal narrow-angle intra prediction mode determined according to the second mapping relation and included in the subset and the GPM boundary is a certain angle. The non-diagonal narrow-angle intra prediction mode determined according to the second mapping relation and included in the subset is remapped to the wide-angle intra prediction mode having a direction forming the same certain angle with the GPM boundary.

For example, the first mapping relation is a mapping relation between the plurality of GPMs and a plurality of narrow-angle intra prediction modes. The second mapping relation is a mapping relation between the plurality of GPMs and a plurality of angular intra prediction modes including a plurality of narrow-angle intra prediction modes and one or more wide-angle intra prediction modes.

For example, in the second mapping relation, mapping between the plurality of GPMs and the plurality of angular intra prediction modes including the plurality of narrow-angle intra prediction modes and the one or more wide-angle intra prediction modes may depend on a shape of the current block.

For example, furthermore, a GPM indicator indicating a GPM to be applied to the current block among a plurality of GPMs is encoded into the bitstream.

For example, a first prediction mode indicator for the first partition and a second prediction mode indicator for a second partition are further encoded into the bitstream. The first prediction mode indicator indicates that an angular intra prediction mode associated with the GPM is to be used for prediction of the first partition.

For example, the second prediction mode indicator may indicate an inter prediction mode to be used for prediction of the second partition.

For example, furthermore, prediction for the second partition is calculated according to an inter prediction mode. The prediction for the current block is calculated by combining the prediction for the first partition and the prediction for the second partition.

For example, provided is a program including instructions which, when executed by processing circuitry, causes control circuitry to perform any one of the methods described above. For example, the processing circuitry may be one or more processors for executing software (code instructions) fetched from memory. The processing circuitry of encoder 100 and decoder 200 may be further configured to perform the steps described here as a method.

In summary, the present disclosure relates to mapping between the geometric partitioning modes and the angular intra prediction modes, in which intra prediction is performed for either one of two partitions. In order to improve the prediction accuracy for the current block to be predicted according to the geometric partitioning mode, a different mapping relation is used depending on whether the current block is a square block or a non-square block.

It is to be noted that the mapping relation between the narrow-angle intra prediction modes and the wide-angle intra prediction modes as illustrated in FIG. 100 is applied not only to the angular intra prediction modes in the GPMs, but also to other angular intra prediction modes. By modifying the narrow-angle intra prediction mode in the GPM as described above, a possible mapping relation to be also applied to another angular intra prediction mode can be applied to the modified narrow-angle intra prediction mode. Accordingly, the complication of the processing is reduced.

Moreover, the foregoing describes a combination of the intra prediction and the inter prediction, but two intra predictions may be combined. Specifically, two different intra prediction modes may be applied to two partitions. For example, one of the two intra prediction modes may be derived from the GPM boundary.

Alternatively, both the two intra prediction modes for two partitions may be derived from the GPM boundary. For example, one of the two intra prediction modes may have a prediction direction parallel to the GPM boundary, the other of the two intra prediction modes may have a prediction direction perpendicular to the GPM boundary.

[Representative Examples of Configuration and Processing]

The following shows a representative example of the configuration and the processing of each of encoder 100 and decoder 200 as described above.

FIG. 104 is a flow chart indicating an operation performed by encoder 100. For example, encoder 100 includes circuitry and memory connected to the circuitry, and encodes a current block of a video into a bitstream. The circuitry and memory included in encoder 100 may correspond to processor al and memory a2 illustrated in FIG. 8. The circuitry of encoder 100 performs the following steps in operation.

For example, the circuitry of encoder 100 determines two partitions in the current block according to a geometric partitioning mode (S301).

Moreover, the circuitry of encoder 100 derives an angular intra prediction mode from the geometric partitioning mode using a mapping relation between geometric partitioning modes and angular intra prediction modes (S302).

Specifically, when a shape of the current block is square, the circuitry of encoder 100 uses a first mapping relation to derive the angular intra prediction mode. Moreover, when the shape of the current block is not square, the circuitry of encoder 100 uses a second mapping relation different from the first mapping relation to derive the angular intra prediction mode.

The circuitry of encoder 100 predicts a first partition among the two partitions according to the angular intra prediction mode (S303).

In this manner, it may be possible to apply a different mapping relation to derivation of the intra prediction mode for a square block and a non-square block. Accordingly, it may be possible to perform the intra prediction using an appropriate prediction direction. This may reduce the degradation of the prediction accuracy.

For example, the first mapping relation may include a mapping relation between a geometric partitioning mode and a first narrow-angle intra prediction mode. The second mapping relation may include a mapping relation between the same geometric partitioning mode and a second narrow-angle intra prediction mode.

Here, when the first narrow-angle intra prediction mode is included in a subset of the angular intra prediction modes, the second narrow-angle intra prediction mode may be a narrow-angle intra prediction mode as described below.

Specifically, when a prediction direction of the first narrow-angle intra prediction mode is a diagonal direction of 45° with respect to a horizontal direction or a vertical direction, the second narrow-angle intra prediction mode may have a prediction direction opposite to the prediction direction of the first narrow-angle intra prediction mode.

Moreover, when the prediction direction of the first narrow-angle intra prediction mode is not the diagonal direction of 45°, the second narrow-angle intra prediction mode may have a second index obtained by applying addition or subtraction of a fixed offset to a first index of the first narrow-angle intra prediction mode. In this case, the second narrow-angle intra prediction mode may be remapped to a wide-angle intra prediction mode.

In contrast, when the first narrow-angle intra prediction mode is not included in the subset of the angular intra prediction modes, the second narrow-angle intra prediction mode may be identical to the first narrow-angle intra prediction mode.

In this manner, it may be possible to correct the deviation of the prediction direction. Accordingly, it may be possible to perform the intra prediction using an appropriate prediction direction.

Moreover, for example, the fixed offset value may be 1. In this manner, it may be possible to correct the deviation corresponding to one intra prediction mode. Accordingly, it may be possible to perform the intra prediction using an appropriate prediction direction.

Moreover, for example, the subset of the angular intra prediction modes may be defined by a difference between a width and a height of the current block. In this manner, it may be possible to define the narrow-angle intra prediction mode to which mapping different from the mapping for a square block is applied, according to a difference between a width and a height of the current block. Accordingly, it may be possible to adjust the prediction direction according to a difference between a width and a height of the current block. Accordingly, it may be possible to perform the intra prediction using an appropriate prediction direction.

Moreover, for example, the prediction direction of the first narrow-angle intra prediction mode may be parallel to a boundary between the two partitions. Moreover, the prediction direction of the wide-angle intra prediction mode may be parallel to the boundary. In this manner, it may be possible to perform the intra prediction using a prediction direction corresponding to the boundary between the two partitions determined by the geometric partitioning mode. This may reduce the degradation of the prediction accuracy.

Moreover, for example, the prediction direction of the first narrow-angle intra prediction mode may have a certain angle with respect to a boundary between the two partitions. Moreover, the prediction direction of the wide-angle intra prediction mode may have the certain angle with respect to the boundary. In this manner, it may be possible to perform the intra prediction using a prediction direction associated with the boundary between the two partitions determined by the geometric partitioning mode. This may reduce the degradation of the prediction accuracy.

Moreover, for example, the first mapping relation may be a mapping relation between the geometric partitioning modes and the angular intra prediction modes that are narrow-angle intra prediction modes. Moreover, the second mapping relation may be a mapping relation between the geometric partitioning modes and the angular intra prediction modes including narrow-angle intra prediction modes and one or more wide-angle intra prediction modes.

In this manner, for a non-square block, it may be possible to map the geometric partitioning mode to the wide-angle intra prediction mode. Accordingly, it may be possible to perform the intra prediction using an appropriate prediction direction.

Moreover, for example, the circuitry of encoder 100 may encode, into the bitstream, a first prediction mode indicator indicating a prediction method for the first partition, and a second prediction mode indicator indicating a prediction method for a second partition among the two partitions. Here, the first prediction mode indicator may indicate that the angular intra prediction mode derived from the geometric partitioning mode is to be used for prediction of the first partition.

In this manner, it may be possible to control the prediction method for each of the two partitions. For the first partition, it may be possible to control the application of the intra prediction mode corresponding to the geometric partitioning mode.

Moreover, for example, intra predictor 124 of encoder 100 may perform the operation described above as the circuitry of encoder 100. Intra predictor 124 also may perform the operation described above in cooperation with the other constituent elements. For example, entropy encoder 110 may perform a process relating to encoding.

FIG. 105 is a flow chart indicating an operation performed by decoder 200. For example, decoder 200 includes circuitry and memory connected to the circuitry, and decodes a current block of a video from a bitstream. The circuitry and memory included in decoder 200 may correspond to processor b1 and memory b2 illustrated in FIG. 68. The circuitry of decoder 200 performs the following in operation.

For example, the circuitry of decoder 200 determines two partitions in the current block according to a geometric partitioning mode (S401).

Moreover, the circuitry of decoder 200 derives an angular intra prediction mode from the geometric partitioning mode using a mapping relation between geometric partitioning modes and angular intra prediction modes (S402).

Specifically, when a shape of the current block is square, the circuitry of decoder 200 uses a first mapping relation to derive the angular intra prediction mode. Moreover, when the shape of the current block is not square, the circuitry of decoder 200 uses a second mapping relation different from the first mapping relation to derive the angular intra prediction mode.

The circuitry of decoder 200 predicts a first partition among the two partitions according to the angular intra prediction mode (S403).

In this manner, it may be possible to apply a different mapping relation to derivation of the intra prediction mode for a square block and a non-square block. Accordingly, it may be possible to perform the intra prediction using an appropriate prediction direction. This may reduce the degradation of the prediction accuracy.

For example, the first mapping relation may include a mapping relation between the geometric partitioning mode and a first narrow-angle intra prediction mode. The second mapping relation may include a mapping relation between the same geometric partitioning mode and a second narrow-angle intra prediction mode.

Here, when the first narrow-angle intra prediction mode is included in a subset of the angular intra prediction modes, the second narrow-angle intra prediction mode may be a narrow-angle intra prediction mode as described below.

Specifically, when a prediction direction of the first narrow-angle intra prediction mode is a diagonal direction of 45° with respect to a horizontal direction or a vertical direction, the second narrow-angle intra prediction mode may have a prediction direction opposite to the prediction direction of the first narrow-angle intra prediction mode.

Moreover, when the prediction direction of the first narrow-angle intra prediction mode is not the diagonal direction of 45°, the second narrow-angle intra prediction mode may have a second index obtained by applying addition or subtraction of a fixed offset to a first index of the first narrow-angle intra prediction mode. In this case, the second narrow-angle intra prediction mode may be remapped to a wide-angle intra prediction mode.

In contrast, when the first narrow-angle intra prediction mode is not included in the subset of the angular intra prediction modes, the second narrow-angle intra prediction mode may be identical to the first narrow-angle intra prediction mode.

In this manner, it may be possible to correct the deviation of the prediction direction. Accordingly, it may be possible to perform the intra prediction using an appropriate prediction direction.

Moreover, for example, the fixed offset value may be 1. In this manner, it may be possible to correct the deviation corresponding to one intra prediction mode. Accordingly, it may be possible to perform the intra prediction using an appropriate prediction direction.

Moreover, for example, the subset of the angular intra prediction modes may be defined by a difference between a width and a height of the current block. In this manner, it may be possible to define the narrow-angle intra prediction mode to which mapping different from the mapping for a square block is applied, according to a difference between a width and a height of the current block. Accordingly, it may be possible to adjust the prediction direction according to a difference between a width and a height of the current block. Accordingly, it may be possible to perform the intra prediction using an appropriate prediction direction.

Moreover, for example, the prediction direction of the first narrow-angle intra prediction mode may be parallel to a boundary between the two partitions. Moreover, the prediction direction of the wide-angle intra prediction mode may be parallel to the boundary. In this manner, it may be possible to perform the intra prediction using a prediction direction corresponding to the boundary between the two partitions determined by the geometric partitioning mode. This may reduce the degradation of the prediction accuracy.

Moreover, for example, the prediction direction of the first narrow-angle intra prediction mode may have a certain angle with respect to a boundary between the two partitions. Moreover, the prediction direction of the wide-angle intra prediction mode may have the certain angle with respect to the boundary. In this manner, it may be possible to perform the intra prediction using a prediction direction associated with the boundary between the two partitions determined by the geometric partitioning mode. This may reduce the degradation of the prediction accuracy.

Moreover, for example, the first mapping relation may be a mapping relation between the geometric partitioning modes and the angular intra prediction modes that are narrow-angle intra prediction modes. Moreover, the second mapping relation may be a mapping relation between the geometric partitioning modes and the angular intra prediction modes including narrow-angle intra prediction modes and one or more wide-angle intra prediction modes.

In this manner, for a non-square block, it may be possible to map the geometric partitioning mode to the wide-angle intra prediction mode. Accordingly, it may be possible to perform the intra prediction using an appropriate prediction direction.

Moreover, for example, the circuitry of decoder 200 may decode, from the bitstream, a first prediction mode indicator indicating a prediction method for the first partition, and a second prediction mode indicator indicating a prediction method for a second partition among the two partitions. Here, the first prediction mode indicator may indicate that the angular intra prediction mode derived from the geometric partitioning mode is to be used for prediction of the first partition.

In this manner, it may be possible to control the prediction method for each of the two partitions. For the first partition, it may be possible to control the application of the intra prediction mode corresponding to the geometric partitioning mode.

Moreover, for example, intra predictor 216 of decoder 200 may perform the operation described above as the circuitry of decoder 200. Intra predictor 216 also may perform the operation described above in cooperation with the other constituent elements. For example, entropy decoder 202 may perform a process relating to decoding.

Moreover, for example, a non-transitory computer readable medium for a computer may store a bitstream that causes the computer to execute a decoding process of decoding a current block.

The decoding process may include determining two partitions in the current block according to a geometric partitioning mode.

The decoding process may also include deriving an angular intra prediction mode from the geometric partitioning mode using a mapping relation between geometric partitioning modes and angular intra prediction modes. Specifically, when a shape of the current block is square, a first mapping relation may be used to derive the angular intra prediction mode. Moreover, when the shape of the current block is not square, a second mapping relation different from the first mapping relation may be used to derive the angular intra prediction mode.

The decoding process may then include predicting a first partition among the two partitions according to the angular intra prediction mode.

With this, it may be possible to use the medium to perform the foregoing decoding method.

Moreover, the examples described above use a mapping relation between geometric partitioning modes and angular intra prediction modes. More specifically, the mapping relation between the geometric partitioning modes and the angular intra prediction modes may be a mapping relation between angles of the geometric partitioning modes and the angular intra prediction modes. Here, an angle of a geometric partitioning mode is an angle of the boundary between two partitions defined by the geometric partitioning mode and an angle with respect to a reference direction.

Moreover, predicting a partition corresponds to generating a prediction image of the partition.

[Other Examples]

Encoder 100 and decoder 200 in each of the above-described examples may be used as an image encoder and an image decoder, respectively, or may be used as a video encoder and a video decoder, respectively.

Alternatively, each of encoder 100 and decoder 200 may be used as an intra prediction device. In other words, encoder 100 and decoder 200 may correspond to only intra predictor 124 and intra predictor 216, respectively. The other constituent elements may be included in other devices.

Moreover, encoder 100 may include an inputter and an outputter. For example, one or more pictures are input to an inputter of encoder 100, and an encoded bitstream is output from an outputter of encoder 100. Decoder 200 may also include an inputter and an outputter. For example, an encoded bitstream is input to an inputter of decoder 200, and one or more pictures are output from an outputter of decoder 200. The encoded bitstream may include quantized coefficients to which variable length encoding has been applied and control information.

Moreover, the term encode may be replaced with another term such as store, include, write, describe, signal, send out, notice, or hold. For example, encoding information may be including information in a bitstream. Moreover, encoding information into a bitstream may mean that information is encoded to generate a bitstream including the encoded information.

Moreover, the term decode may be replaced with another term such as retrieve, parse, read, load, derive, obtain, receive, extract, or restore. For example, decoding information may be obtaining information from a bitstream. Moreover, decoding information from a bitstream may mean that a bitstream is decoded to obtain information included in the bitstream.

Moreover, in the above description, the term set may be interchangeable with the term determine.

In addition, at least a part of each example described above may be used as an encoding method or a decoding method, may be used as an entropy encoding method or an entropy decoding method, or may be used as another method.

In addition, each constituent element may be configured with dedicated hardware, or may be implemented by executing a software program suitable for the constituent element. Each component may be implemented by causing a program executer such as a CPU or a processor to read out and execute a software program stored on a medium such as a hard disk or a semiconductor memory.

More specifically, each of encoder 100 and decoder 200 may include processing circuitry and storage which is electrically connected to the processing circuitry and is accessible from the processing circuitry. For example, the processing circuitry corresponds to processor a1 or b1, and the storage corresponds to memory a2 or b2.

The processing circuitry includes at least one of a dedicated hardware and a program executer, and performs processing using the storage. Moreover, when the processing circuitry includes the program executer, the storage stores a software program to be executed by the program executer.

An example of the software program described above is a bitstream. The bitstream includes an encoded image and syntaxes for performing a decoding process that decodes an image. The bitstream causes decoder 200 to execute the process according to the syntaxes, and thereby causes decoder 200 to decode an image. Moreover, for example, the software which implements encoder 100, decoder 200, or the like described above is a program indicated below.

For example, this program may cause a computer to execute an encoding method of encoding a current block of a video into a bitstream. The encoding method includes: determining two partitions in the current block according to a geometric partitioning mode; deriving an angular intra prediction mode from the geometric partitioning mode using a mapping relation between geometric partitioning modes and angular intra prediction modes; and predicting a first partition among the two partitions according to the angular intra prediction mode, in which in the deriving of the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode.

Moreover, for example, this program may cause a computer to execute a decoding method of decoding a current block of a video from a bitstream. The decoding method includes: determining two partitions in the current block according to a geometric partitioning mode; deriving an angular intra prediction mode from the geometric partitioning mode using a mapping relation between geometric partitioning modes and angular intra prediction modes; and predicting a first partition among the two partitions according to the angular intra prediction mode, in which in the deriving of the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode.

Moreover, each constituent element may be a circuit as described above. The circuits may compose circuitry as a whole, or may be separate circuits. Moreover, each constituent element may be implemented as a general processor for executing the above-mentioned specific program, or may be implemented as a dedicated processor.

Moreover, the process that is executed by a particular constituent element may be executed by another constituent element. Moreover, the processing execution order may be modified, or a plurality of processes may be executed in parallel. Moreover, an encoding and decoding device may include encoder 100 and decoder 200.

Moreover, decoder 200 may perform an operation corresponding to the operation described as the operation of encoder 100, or encoder 100 may perform an operation corresponding to the operation described as the operation of decoder 200.

In addition, the ordinal numbers such as "first" and "second" used for explanation may be changed appropriately. Moreover, the ordinal number may be newly assigned to a component, etc., or may be deleted from a component, etc. Moreover, the ordinal numbers may be assigned to components to differentiate between the components, and may not correspond to the meaningful order.

Moreover, in the above description, the picture may express a frame. Moreover, the expression of all elements is not limited to that there are a plurality of elements. When there is only one element, this expression may refer to the one element.

Although aspects of encoder 100 and decoder 200 have been described based on a plurality of examples, aspects of encoder 100 and decoder 200 are not limited to these examples. The scope of the aspects of encoder 100 and decoder 200 may encompass embodiments obtainable by adding, to any of these embodiments, various kinds of modifications that a person skilled in the art would conceive and embodiments configurable by combining constituent elements in different embodiments, without deviating from the scope of the present disclosure.

The present aspect may be performed by combining one or more aspects disclosed herein with at least part of other aspects according to the present disclosure. In addition, part of the processes indicated in any of the flow charts, part of the configuration of any of the devices, part of syntaxes, etc. according to one or more of the aspects disclosed herein may be performed in combination with the other aspects.

[Implementations and Applications]

As described in each of the above embodiments, each functional or operational block may typically be realized as an MPU (micro processing unit) and memory, for example. Moreover, processes performed by each of the functional blocks may be realized as a program execution unit, such as a processor which reads and executes software (a program) recorded on a medium such as ROM. The software may be distributed. The software may be recorded on a variety of media such as semiconductor memory. Note that each functional block can also be realized as hardware (dedicated circuit).

The processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments will be described, as well as various systems that implement the application examples. Such a system may be characterized as including an image encoder that employs the image encoding method, an image decoder that employs the image decoding method, or an image encoder-decoder that includes both the image encoder and the image decoder. Other configurations of such a system may be modified on a case-by-case basis.

[Usage Examples]

Figure 106:
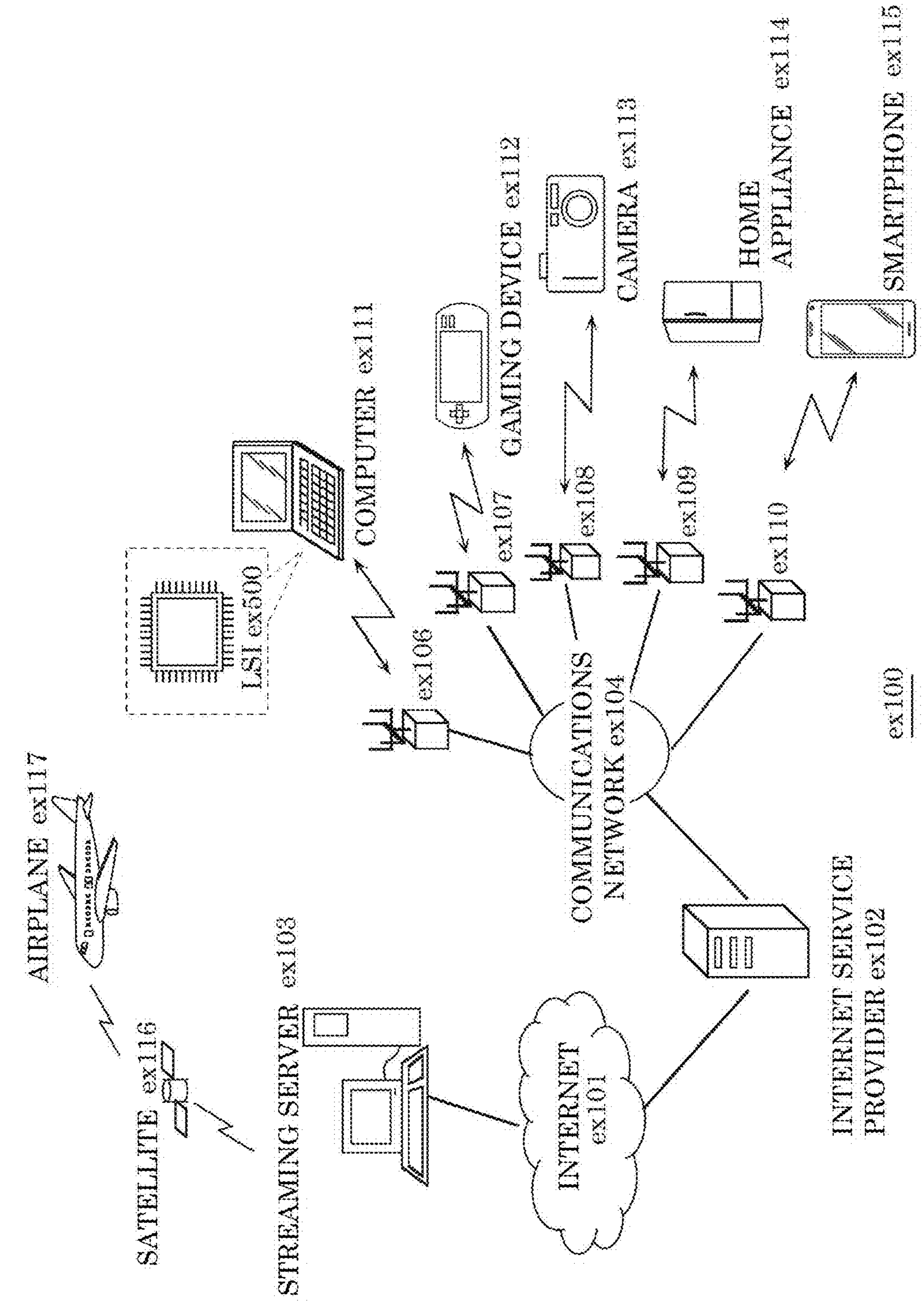

FIG. 106 illustrates an overall configuration of content providing system ex100 suitable for implementing a content distribution service. The area in which the communication service is provided is divided into cells of desired sizes, and base stations ex106, ex107, ex108, ex109, and ex110, which are fixed wireless stations in the illustrated example, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any of the above devices. In various implementations, the devices may be directly or indirectly connected together via a telephone network or near field communication, rather than via base stations ex106 through ex110. Further, streaming server ex103 may be connected to devices including computer ex111, gaming device ex112, camera ex113, home appliance ex114, and smartphone ex115 via, for example, internet ex101. Streaming server ex103 may also be connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the 2G, 3G, 3.9G, and 4G systems, as well as the next-generation 5G system.

Home appliance ex114 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or a terminal in airplane ex117) may perform the encoding processing described in the above embodiments on still-image or video content captured by a user via the terminal, may multiplex video data obtained via the encoding and audio data obtained by encoding audio corresponding to the video, and may transmit the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices may each function as the image decoder, according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near a client is dynamically assigned to the client. Content is cached and streamed to the edge server to reduce load times. In the event of, for example, some type of error or change in connectivity due, for example, to a spike in traffic, it is possible to stream data stably at high speeds, since it is possible to avoid affected parts of the network by, for example, dividing the processing between a plurality of edge servers, or switching the streaming duties to a different edge server and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning (or content significance) of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos, and the server, on a per-unit basis. The units may be, for example, groups of pictures (GOP), pictures, or tiles resulting from dividing a picture. This makes it possible to reduce load times and achieve streaming that is closer to real time.

Since the videos are of approximately the same scene, management and/or instructions may be carried out by the server so that the videos captured by the terminals can be cross-referenced. Moreover, the server may receive encoded data from the terminals, change the reference relationship between items of data, or correct or replace pictures themselves, and then perform the encoding. This makes it possible to generate a stream with increased quality and efficiency for the individual items of data.

Furthermore, the server may stream video data after performing transcoding to convert the encoding format of the video data. For example, the server may convert the encoding format from MPEG to VP (e.g., VP9), and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

There has been an increase in usage of images or videos combined from images or videos of different scenes concurrently captured, or of the same scene captured from different angles, by a plurality of terminals such as camera ex113 and/or smartphone ex115. Videos captured by the terminals are combined based on, for example, the separately obtained relative positional relationship between the terminals, or regions in a video having matching feature points.

In addition to the encoding of two-dimensional moving pictures, the server may encode a still image based on scene analysis of a moving picture, either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. The server may separately encode three-dimensional data generated from, for example, a point cloud and, based on a result of recognizing or tracking a person or object using three-dimensional data, may select or reconstruct and generate a video to be transmitted to a reception terminal, from videos captured by a plurality of terminals.

This allows the user to enjoy a scene by freely selecting videos corresponding to the video capturing terminals, and allows the user to enjoy the content obtained by extracting a video at a selected viewpoint from three-dimensional data reconstructed from a plurality of images or videos. Furthermore, as with video, sound may be recorded from relatively different angles, and the server may multiplex audio from a specific angle or space with the corresponding video, and transmit the multiplexed video and audio.

In recent years, content that is a composite of the real world and a virtual world, such as virtual reality (VR) and augmented reality (AR) content, has also become popular. In the case of VR images, the server may create images from the viewpoints of both the left and right eyes, and perform encoding that tolerates reference between the two viewpoint images, such as multi-view coding (MVC), and, alternatively, may encode the images as separate streams without referencing. When the images are decoded as separate streams, the streams may be synchronized when reproduced, so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information. The server may generate superimposed data based on three-dimensional data stored in the server, in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a determined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area, or inspect a region in further detail up close.

In situations in which a plurality of wireless connections are possible over near, mid, and far distances, indoors or outdoors, it may be possible to seamlessly receive content using a streaming system standard such as MPEG Dynamic Adaptive Streaming over HTTP (MPEG-DASH). The user may switch between data in real time while freely selecting a decoder or display apparatus including the user's terminal, displays arranged indoors or outdoors, etc. Moreover, using, for example, information on the position of the user, decoding can be performed while switching which terminal handles decoding and which terminal handles the displaying of content. This makes it possible to map and display information, while the user is on the move in route to a destination, on the wall of a nearby building in which a device capable of displaying content is embedded, or on part of the ground. Moreover, it is also possible to switch the bit rate of the received data based on the accessibility to the encoded data on a network, such as when encoded data is cached on a server quickly accessible from the reception terminal, or when encoded data is copied to an edge server in a content delivery service.

[Web Page Optimization]

Figure 107:
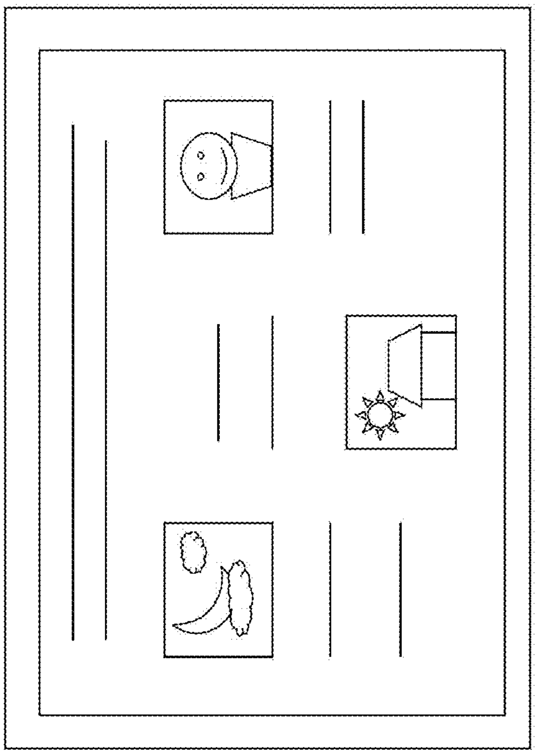
Figure 108:
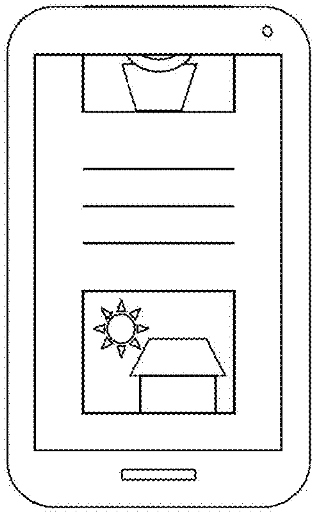

FIG. 107 illustrates an example of a display screen of a web page on computer ex111, for example. FIG. 108 illustrates an example of a display screen of a web page on smartphone ex115, for example. As illustrated in FIG. 107 and FIG. 108, a web page may include a plurality of image links that are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) may display, as the image links, still images included in the content or I pictures; may display video such as an animated gif using a plurality of still images or I pictures; or may receive only the base layer, and decode and display the video.

When an image link is selected by the user, the display apparatus performs decoding while giving the highest priority to the base layer. Note that if there is information in the Hyper Text Markup Language (HTML) code of the web page indicating that the content is scalable, the display apparatus may decode up to the enhancement layer. Further, in order to guarantee real-time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Still further, the display apparatus may purposely ignore the reference relationship between pictures, and coarsely decode all B and P pictures as forward reference pictures, and then perform normal decoding as the number of pictures received over time increases.

[Autonomous Driving]

When transmitting and receiving still image or video data such as two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., containing the reception terminal is mobile, the reception terminal may seamlessly receive and perform decoding while switching between base stations among base stations ex106 through ex110 by transmitting information indicating the position of the reception terminal. Moreover, in accordance with the selection made by the user, the situation of the user, and/or the bandwidth of the connection, the reception terminal may dynamically select to what extent the metadata is received, or to what extent the map information, for example, is updated.

In content providing system ex100, the client may receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, and short content from an individual are also possible. Such content from individuals is likely to further increase in popularity. The server may first perform editing processing on the content before the encoding processing, in order to refine the individual content. This may be achieved using the following configuration, for example.

In real time while capturing video or image content, or after the content has been captured and accumulated, the server performs recognition processing based on the raw data or encoded data, such as capture error processing, scene search processing, meaning analysis, and/or object detection processing. Then, based on the result of the recognition processing, the server-either when prompted or automatically-edits the content, examples of which include: correction such as focus and/or motion blur correction; removing low-priority scenes such as scenes that are low in brightness compared to other pictures, or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement, based on an image processing result. Alternatively, the server may generate and encode a video digest based on a result of an analysis of the meaning of a scene.

There may be instances in which individual content may include content that infringes a copyright, moral right, portrait rights, etc. Such instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Further, the server may be configured to recognize the faces of people other than a registered person in images to be encoded, and when such faces appear in an image, may apply a mosaic filter, for example, to the face of the person. Alternatively, as pre- or post-processing for encoding, the user may specify, for copyright reasons, a region of an image including a person or a region of the background to be processed. The server may process the specified region by, for example, replacing the region with a different image, or blurring the region. If the region includes a person, the person may be tracked in the moving picture, and the person's head region may be replaced with another image as the person moves.

Since there is a demand for real-time viewing of content produced by individuals, which tends to be small in data size, the decoder first receives the base layer as the highest priority, and performs decoding and reproduction, although this may differ depending on bandwidth. When the content is reproduced two or more times, such as when the decoder receives the enhancement layer during decoding and reproduction of the base layer, and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Implementation and Application Examples]

The encoding and decoding may be performed by LSI (large scale integration circuitry) ex500 (see FIG. 106), which is typically included in each terminal. LSI ex500 may be configured of a single chip or a plurality of chips. Software for encoding and decoding moving pictures may be integrated into some type of a medium (such as a CD-ROM, a flexible disk, or a hard disk) that is readable by, for example, computer ex111, and the encoding and decoding may be performed using the software. Furthermore, when smartphone ex115 is equipped with a camera, video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content, or whether it is capable of executing a specific service. When the terminal is not compatible with the encoding scheme of the content, or when the terminal is not capable of executing a specific service, the terminal first downloads a codec or application software and then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast, whereas unicast is easier with content providing system ex100.

[Hardware Configuration]

Figure 109:
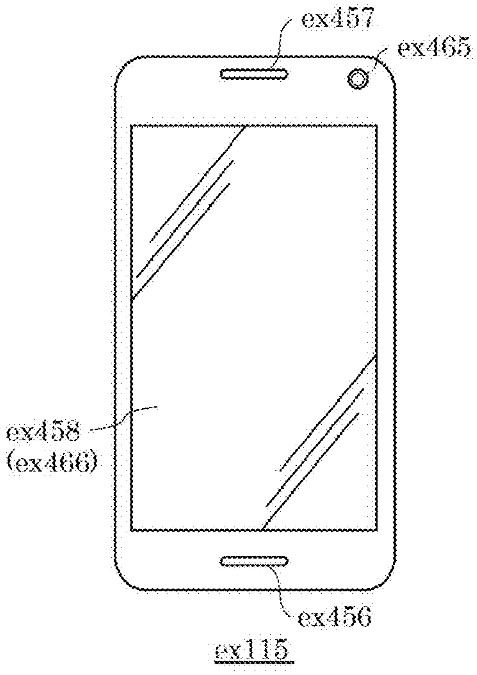

FIG. 109 illustrates further details of smartphone ex115 shown in FIG. 106. FIG. 110 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for Subscriber Identity Module (SIM) ex468 for authorizing access to a network and various data. Note that external memory may be used instead of memory ex467.

Main controller ex460, which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns on the power button of power supply circuit ex461, smartphone ex115 is powered on into an operable state, and each component is supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, to which spread spectrum processing is applied by modulator/demodulator ex452 and digital-analog conversion and frequency conversion processing are applied by transmitter/receiver ex451, and the resulting signal is transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 based on operation of user interface ex466 of the main body, for example. Similar transmission and reception processing is performed. In data transmission mode, when sending a video, still image, or video and audio, video signal processor ex455 compression encodes, by the moving picture encoding method described in the above embodiments, a video signal stored in memory ex467 or a video signal input from camera ex465, and transmits the encoded video data to multiplexer/demultiplexer ex453. Audio signal processor ex454 encodes an audio signal recorded by audio input unit ex456 while camera ex465 is capturing a video or still image, and transmits the encoded audio data to multiplexer/demultiplexer ex453. Multiplexer/demultiplexer ex453 multiplexes the encoded video data and encoded audio data using a determined scheme, modulates and converts the data using modulator/demodulator (modulator/demodulator circuit) ex452 and transmitter/receiver ex451, and transmits the result via antenna ex450.

When a video appended in an email or a chat, or a video linked from a web page, is received, for example, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Audio signal processor ex454 decodes the audio signal and outputs audio from audio output unit ex457. Since real-time streaming is becoming increasingly popular, there may be instances in which reproduction of the audio may be socially inappropriate, depending on the user's environment. Accordingly, as an initial value, a configuration in which only video data is reproduced, i.e., the audio signal is not reproduced, may be preferable; and audio may be synchronized and reproduced only when an input is received from the user clicking video data, for instance.

Although smartphone ex115 was used in the above example, three other implementations are conceivable: a transceiver terminal including both an encoder and a decoder; a transmitter terminal including only an encoder; and a receiver terminal including only a decoder. In the description of the digital broadcasting system, an example is given in which multiplexed data obtained as a result of video data being multiplexed with audio data is received or transmitted. The multiplexed data, however, may be video data multiplexed with data other than audio data, such as text data related to the video. Further, the video data itself rather than multiplexed data may be received or transmitted.

Although main controller ex460 including a CPU is described as controlling the encoding or decoding processes, various terminals often include Graphics Processing Units (GPUs). Accordingly, a configuration is acceptable in which a large area is processed at once by making use of the performance ability of the GPU via memory shared by the CPU and GPU, or memory including an address that is managed so as to allow common usage by the CPU and GPU. This makes it possible to shorten encoding time, maintain the real-time nature of streaming, and reduce delay. In particular, processing relating to motion estimation, deblocking filtering, sample adaptive offset (SAO), and transformation/quantization can be effectively carried out by the GPU, instead of the CPU, in units of pictures, for example, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, teleconferencing systems, electronic mirrors, etc.

What is claimed is:

1. A decoding method of decoding a current block of a video from a bitstream, the decoding method comprising:

determining two partitions in the current block according to a geometric partitioning mode;

deriving an angular intra prediction mode from the geometric partitioning mode using a mapping relation between geometric partitioning modes and angular intra prediction modes; and predicting a first partition among the two partitions according to the angular intra prediction mode, wherein in the deriving of the angular intra prediction mode, when a shape of the current block is square, a first mapping relation is used as the mapping relation to derive the angular intra prediction mode, when the shape of the current block is not square, a second mapping relation different from the first mapping relation is used as the mapping relation to derive the angular intra prediction mode, the first mapping relation includes a mapping relation between the geometric partitioning mode and a first narrow-angle intra prediction mode, the second mapping relation includes a mapping relation between the geometric partitioning mode and a second narrow-angle intra prediction mode, when the first narrow-angle intra prediction mode is included in a subset of the angular intra prediction modes, (i) when a prediction direction of the first narrow-angle intra prediction mode is a diagonal direction of 45° with respect to a horizontal direction or a vertical direction, the second narrow-angle intra prediction mode has a prediction direction opposite to the prediction direction of the first narrow-angle intra prediction mode, and (ii) when the prediction direction of the first narrow-angle intra prediction mode is not the diagonal direction of 45° with respect to the horizontal direction or the vertical direction, the second narrow-angle intra prediction mode: has a second index obtained by applying addition or subtraction of a fixed offset to a first index of the first narrow-angle intra prediction mode; and is remapped to a wide-angle intra prediction mode, and when the first narrow-angle intra prediction mode is not included in the subset of the angular intra prediction modes, the second narrow-angle intra prediction mode is identical to the first narrow-angle intra prediction mode.

2. The decoding method according to claim 1, wherein the fixed offset is 1.

3. The decoding method according to claim 1, wherein the subset of the angular intra prediction modes is defined by a difference between a width and a height of the current block.

4. The decoding method according to claim 1, wherein the prediction direction of the first narrow-angle intra prediction mode is parallel to a boundary between the two partitions, and the prediction direction of the wide-angle intra prediction mode is parallel to the boundary.

5. The decoding method according to claim 1, wherein the prediction direction of the first narrow-angle intra prediction mode has a certain angle with respect to a boundary between the two partitions, and the prediction direction of the wide-angle intra prediction mode has the certain angle with respect to the boundary.

6. The decoding method according to claim 1, further comprising:

decoding, from the bitstream, a first prediction mode indicator indicating a prediction method for the first partition, and a second prediction mode indicator indicating a prediction method for a second partition among the two partitions, wherein the first prediction mode indicator indicates, as the prediction method for the first partition, that the angular intra prediction mode derived from the geometric partitioning mode is to be used for prediction of the first partition.

7. An encoding method of encoding a current block of a video into a bitstream, the encoding method comprising:

determining two partitions in the current block according to a geometric partitioning mode;

deriving an angular intra prediction mode from the geometric partitioning mode using a mapping relation between geometric partitioning modes and angular intra prediction modes; and predicting a first partition among the two partitions according to the angular intra prediction mode, wherein in the deriving of the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode, the first mapping relation includes a mapping relation between the geometric partitioning mode and a first narrow-angle intra prediction mode, the second mapping relation includes a mapping relation between the geometric partitioning mode and a second narrow-angle intra prediction mode, when the first narrow-angle intra prediction mode is included in a subset of the angular intra prediction modes, (i) when a prediction direction of the first narrow-angle intra prediction mode is a diagonal direction of 45° with respect to a horizontal direction or a vertical direction, the second narrow-angle intra prediction mode has a prediction direction opposite to the prediction direction of the first narrow-angle intra prediction mode, and (ii) when the prediction direction of the first narrow-angle intra prediction mode is not the diagonal direction of 45° with respect to the horizontal direction or the vertical direction, the second narrow-angle intra prediction mode: has a second index obtained by applying addition or subtraction of a fixed offset to a first index of the first narrow-angle intra prediction mode; and is remapped to a wide-angle intra prediction mode, and when the first narrow-angle intra prediction mode is not included in the subset of the angular intra prediction modes, the second narrow-angle intra prediction mode is identical to the first narrow-angle intra prediction mode.

8. The encoding method according to claim 7, wherein the fixed offset is 1.

9. The encoding method according to claim 7, wherein the subset of the angular intra prediction modes is defined by a difference between a width and a height of the current block.

10. The encoding method according to claim 7, wherein the prediction direction of the first narrow-angle intra prediction mode is parallel to a boundary between the two partitions, and the prediction direction of the wide-angle intra prediction mode is parallel to the boundary.

11. The encoding method according to claim 7, wherein the prediction direction of the first narrow-angle intra prediction mode has a certain angle with respect to a boundary between the two partitions, and the prediction direction of the wide-angle intra prediction mode has the certain angle with respect to the boundary.

12. The encoding method according to claim 7, further comprising:

encoding, into the bitstream, a first prediction mode indicator indicating a prediction method for the first partition, and a second prediction mode indicator indicating a prediction method for a second partition among the two partitions, wherein the first prediction mode indicator indicates, as the prediction method for the first partition, that the angular intra prediction mode derived from the geometric partitioning mode is to be used for prediction of the first partition.

13. A non-transitory computer readable medium for a computer, storing a bitstream that causes the computer to execute a decoding process of decoding a current block, wherein the decoding process includes:

determining two partitions in the current block according to a geometric partitioning mode;

deriving an angular intra prediction mode from the geometric partitioning mode using a mapping relation between geometric partitioning modes and angular intra prediction modes; and predicting a first partition among the two partitions according to the angular intra prediction mode, wherein in the deriving of the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode, the first mapping relation includes a mapping relation between the geometric partitioning mode and a first narrow-angle intra prediction mode, the second mapping relation includes a mapping relation between the geometric partitioning mode and a second narrow-angle intra prediction mode, when the first narrow-angle intra prediction mode is included in a subset of the angular intra prediction modes, (i) when a prediction direction of the first narrow-angle intra prediction mode is a diagonal direction of 45° with respect to a horizontal direction or a vertical direction, the second narrow-angle intra prediction mode has a prediction direction opposite to the prediction direction of the first narrow-angle intra prediction mode, and (ii) when the prediction direction of the first narrow-angle intra prediction mode is not the diagonal direction of 45° with respect to the horizontal direction or the vertical direction, the second narrow-angle intra prediction mode: has a second index obtained by applying addition or subtraction of a fixed offset to a first index of the first narrow-angle intra prediction mode; and is remapped to a wide-angle intra prediction mode, and when the first narrow-angle intra prediction mode is not included in the subset of the angular intra prediction modes, the second narrow-angle intra prediction mode is identical to the first narrow-angle intra prediction mode.

14. A decoder that decodes a current block of a video from a bitstream, the decoder comprising:

circuitry; and memory coupled to the circuitry, wherein in operation, the circuitry:

determines two partitions in the current block according to a geometric partitioning mode;

derives an angular intra prediction mode from the geometric partitioning mode using a mapping relation between geometric partitioning modes and angular intra prediction modes; and predicts a first partition among the two partitions according to the angular intra prediction mode, wherein in deriving the angular intra prediction mode, when a shape of the current block is square, a first mapping relation is used as the mapping relation to derive the angular intra prediction mode, and when the shape of the current block is not square, a second mapping relation different from the first mapping relation is used as the mapping relation to derive the angular intra prediction mode, the first mapping relation includes a mapping relation between the geometric partitioning mode and a first narrow-angle intra prediction mode, the second mapping relation includes a mapping relation between the geometric partitioning mode and a second narrow-angle intra prediction mode, when the first narrow-angle intra prediction mode is included in a subset of the angular intra prediction modes, (i) when a prediction direction of the first narrow-angle intra prediction mode is a diagonal direction of 45° with respect to a horizontal direction or a vertical direction, the second narrow-angle intra prediction mode has a prediction direction opposite to the prediction direction of the first narrow-angle intra prediction mode, and (ii) when the prediction direction of the first narrow-angle intra prediction mode is not the diagonal direction of 45° with respect to the horizontal direction or the vertical direction, the second narrow-angle intra prediction mode: has a second index obtained by applying addition or subtraction of a fixed offset to a first index of the first narrow-angle intra prediction mode; and is remapped to a wide-angle intra prediction mode, and when the first narrow-angle intra prediction mode is not included in the subset of the angular intra prediction modes, the second narrow-angle intra prediction mode is identical to the first narrow-angle intra prediction mode.

15. An encoder that encodes a current block of a video into a bitstream, the encoder comprising:

circuitry; and memory coupled to the circuitry, wherein in operation, the circuitry:

determines two partitions in the current block according to a geometric partitioning mode;

derives an angular intra prediction mode from the geometric partitioning mode using a mapping relation between geometric partitioning modes and angular intra prediction modes; and predicts a first partition among the two partitions according to the angular intra prediction mode, wherein in deriving the angular intra prediction mode, when a shape of the current block is square, a first mapping relation is used as the mapping relation to derive the angular intra prediction mode, when the shape of the current block is not square, a second mapping relation different from the first mapping relation is used as the mapping relation to derive the angular intra prediction mode, the first mapping relation includes a mapping relation between the geometric partitioning mode and a first narrow-angle intra prediction mode, the second mapping relation includes a mapping relation between the geometric partitioning mode and a second narrow-angle intra prediction mode, when the first narrow-angle intra prediction mode is included in a subset of the angular intra prediction modes, (i) when a prediction direction of the first narrow-angle intra prediction mode is a diagonal direction of 45° with respect to a horizontal direction or a vertical direction, the second narrow-angle intra prediction mode has a prediction direction opposite to the prediction direction of the first narrow-angle intra prediction mode, and (ii) when the prediction direction of the first narrow-angle intra prediction mode is not the diagonal direction of 45° with respect to the horizontal direction or the vertical direction, the second narrow-angle intra prediction mode: has a second index obtained by applying addition or subtraction of a fixed offset to a first index of the first narrow-angle intra prediction mode; and is remapped to a wide-angle intra prediction mode, and when the first narrow-angle intra prediction mode is not included in the subset of the angular intra prediction modes, the second narrow-angle intra prediction mode is identical to the first narrow-angle intra prediction mode.

* * * * *